US008290425B2

(12) United States Patent
Albrett

(10) Patent No.: US 8,290,425 B2
(45) Date of Patent: Oct. 16, 2012

(54) PROVIDING ALTERNATIVE PROGRAMMING ON A RADIO IN RESPONSE TO USER INPUT

(75) Inventor: Adam Albrett, Fairfax, VA (US)

(73) Assignee: Refractor Applications, LLC, Wilmington, DE (US)

( * ) Notice: Subject to any disclaimer, the term of this patent is extended or adjusted under 35 U.S.C. 154(b) by 464 days.

(21) Appl. No.: 12/605,987

(22) Filed: Oct. 26, 2009

(65) Prior Publication Data

US 2010/0105315 A1    Apr. 29, 2010

Related U.S. Application Data

(63) Continuation of application No. 11/229,383, filed on Sep. 15, 2005, now Pat. No. 7,610,011.

(60) Provisional application No. 60/611,405, filed on Sep. 19, 2004.

(51) Int. Cl.
 H04B 1/16 (2006.01)
(52) U.S. Cl. .................................. 455/3.04; 455/186.1
(58) Field of Classification Search .................... None
 See application file for complete search history.

(56) References Cited

U.S. PATENT DOCUMENTS

| | | | |
|---|---|---|---|
| 6,588,015 | B1 | 7/2003 | Eyer et al. |
| 7,720,432 | B1 | 5/2010 | Colby et al. |
| 8,032,648 | B2 * | 10/2011 | Bodlaender ................... 709/231 |
| 2005/0249080 | A1 * | 11/2005 | Foote et al. .................. 369/59.1 |

FOREIGN PATENT DOCUMENTS

| | | |
|---|---|---|
| WO | 0219581 | 3/2002 |
| WO | 2004038966 | 5/2004 |

OTHER PUBLICATIONS

International Search Report in Application No. PCT/US2005/033306 dated Jul. 8, 2008, 2 pages.
International Preliminary Report in Application No. PCT/US2005/033306 dated Mar. 10, 2009, 1 page.
Written Opinion in Application No. PCT/US2005/033306 dated Jul. 8, 2008, 6 pages.
Supplemental European Search Report in Application No. 05821316.6 dated Aug. 26, 2010, 2 pages.
European Search Opinion for Application No. 05821316.6, 5 pages, Sep. 3, 2010, 5 pages.
Extended European Search Report for Application No. 05821316.6 dated Sep. 3, 2010, 8 pages.

* cited by examiner

Primary Examiner — Philip Sobutka

(57) ABSTRACT

A method of and apparatus for allowing a user to interact with first media material that is broadcast on a first broadcast channel and second nedia material that is broadcast on a second broadcast that are received and presented by a broadcast reception device while the broadcast reception device is tuned to a third broadcast channel. The method includes maintaining in a temporary storage an item identifier. Additionally, when the broadcast reception device is tuned to the third broadcast channel and presents the first representation of the first media item, the method includes providing the item identifier as a basis for identifying the first media item-related information. When the broadcast reception device is tuned to the third broadcast channel and presents the first representation of the second media item, the method includes providing the item identifier as a basis for identifying the second media item-related information.

19 Claims, 29 Drawing Sheets

FIG. 1a

| 2a | 2b | 2c | 2d |
|---|---|---|---|
| 01012002 | 00:00:00 | Ray Coniff | Moonlight Serenade |
| | 00:05:03 | Madonna | Like A Virgin |
| | 00:9:49 | Elton John | Honky Cat |
| | 00:13:27 | Compaq | Presario Home PC |
| | • 2g | | |
| 2e / 2f | 13:25:04 | Bananarama | Blue Skies |
| | 13:30:00 | ADI | Vanguard Ad |
| | • | | |
| | 23:30:00 | Premiere Radio | Dean Edell Show |

FIG. 1b

| | 4a | 4b | 4c |
|---|---|---|---|
| 5a | 88.5 | WAMU Coverage Definition | WAMU Schedule |
| 5b | 97.5 | WALK Coverage Definition | WALK Schedule |
| 5c | 101.1 | WWDC Coverage Definition | WWDC Schedule |
| 5d | 106.7 | WJFK Coverage Definition (5g) | WJFK Schedule (5h) |
| | 5f / 5i | WLTW Coverage Definition | WLTW Schedule 5j |
| 5e | 107.3 | WBBT Coverage Definition | WBBT Schedule |
| | | WRQX Coverage Definition | WRQX Schedule |
| | | WMVK Coverage Definition | WMVK Schedule |

FIG. 1c

| 7a | 7b | 7c |
|---|---|---|
| Region 1 | 97.5 | WALK Schedule |
| Region 2 | 106.7 | WLTW Schedule |
| Region 3 | 107.3 | WMVK Schedule |
| Region 4 (8d) | 88.5 8e | WAMU Schedule 8f |
| | 101.1 8g | WWDC Schedule 8h |
| | 106.7 8i | WJFK Schedule 8j |
| | 107.3 8k | WRQX Schedule 8l |
| Region 5 | 107.3 | WBBT Schedule |

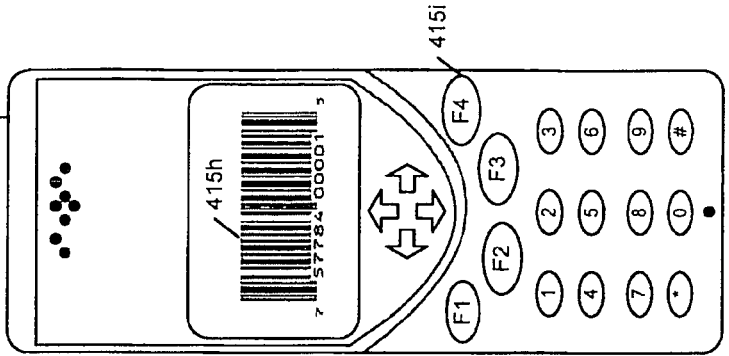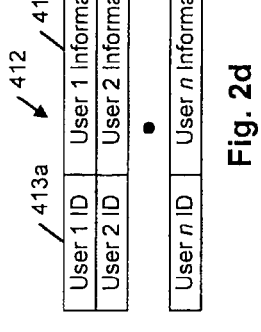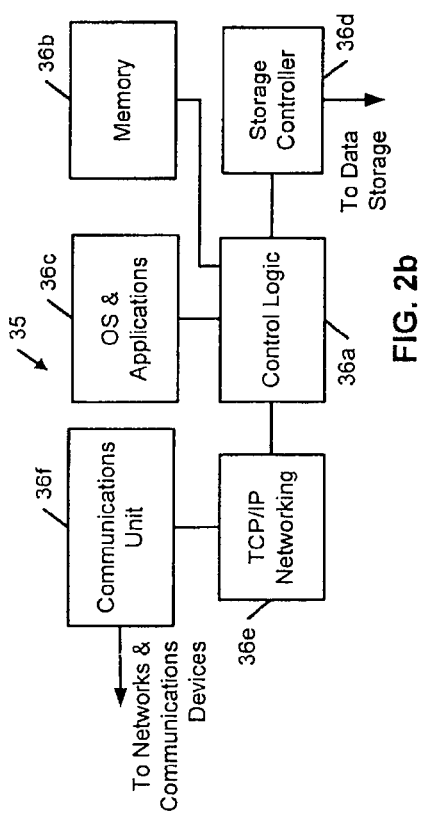

| 417 |
|---|
| Moonlight Serenade |
| Honky Cat |
| Rhapsody in Rhythm |
| Camaro Spring Promo |
| Staying Alive |
| Elegantly Wasted |
| True Confessions |
| I Heard A Rumor |
| Venus |
| Jumpin' Jack Flash |
| We Are The Champions |
| Forever |

| 419 | |
|---|---|
| 12:13:29 | Flashdance |
| 12:17:03 | S |
| 12:21:30 | Kick Start My Heart |
| 12:25:45 | Ipac Computers |
| 12:26:15 | S |
| 12:30:27 | Suburbia |
| 12:34:33 | S |
| 12:39:27 | We Are The Champions |
| 12:44:35 | Venus |
| 12:49:23 | S |
| 12:54:02 | Shopping |
| 12:57:49 | Can't Get No Satisfaction |

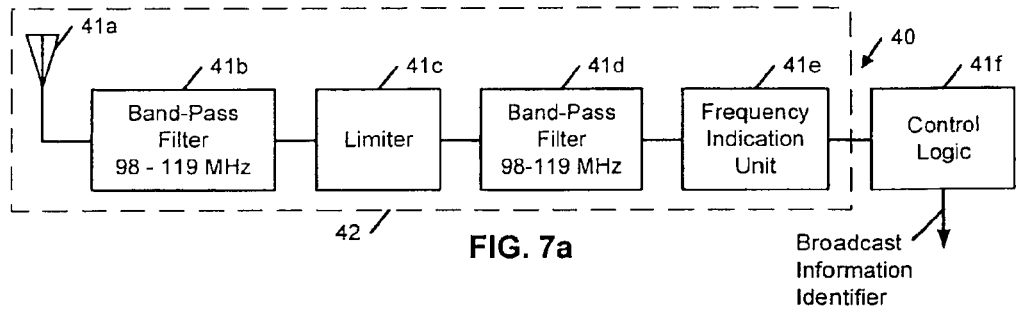
FIG. 7a
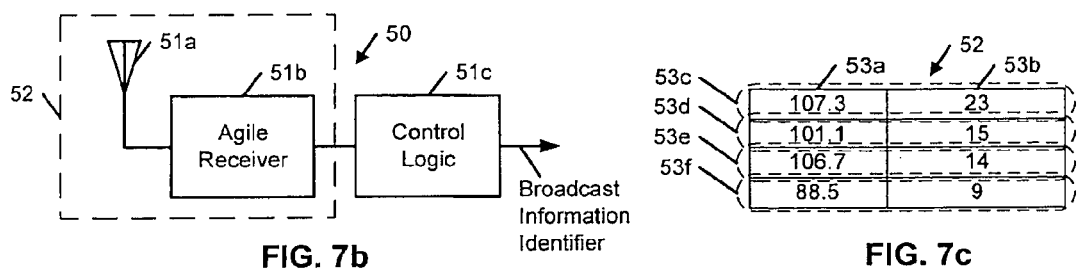
FIG. 7b
FIG. 7c
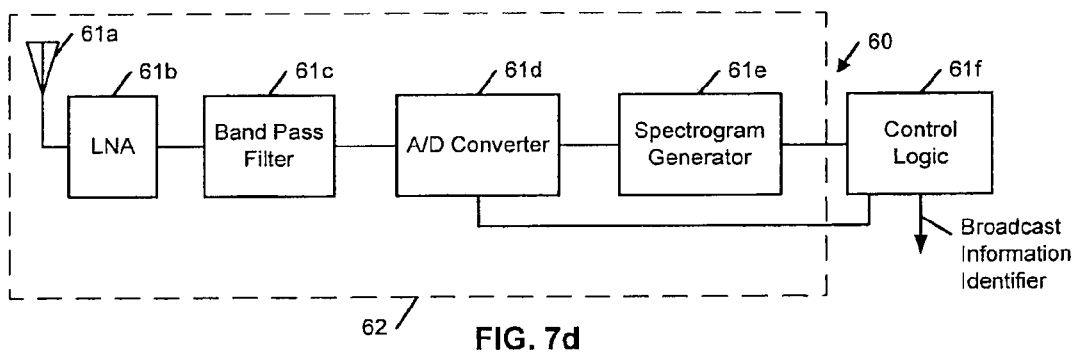
FIG. 7d
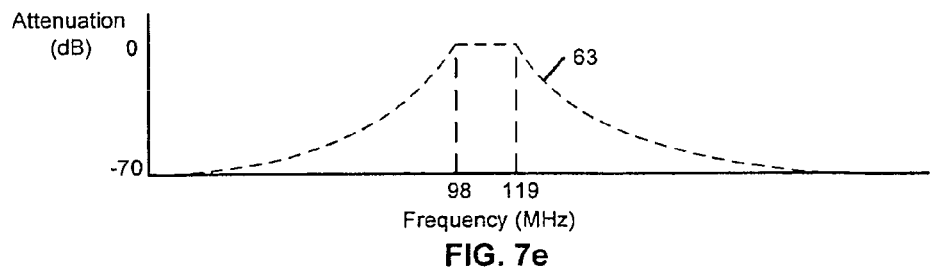
FIG. 7e

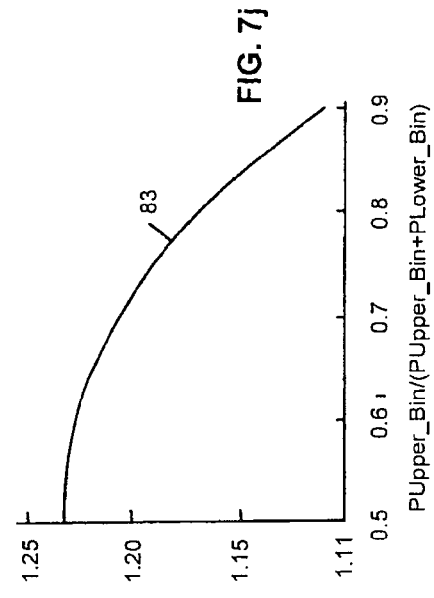
FIG. 7j
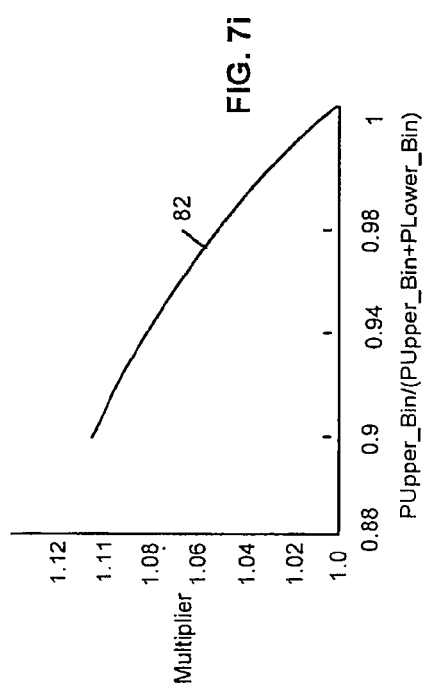
FIG. 7i
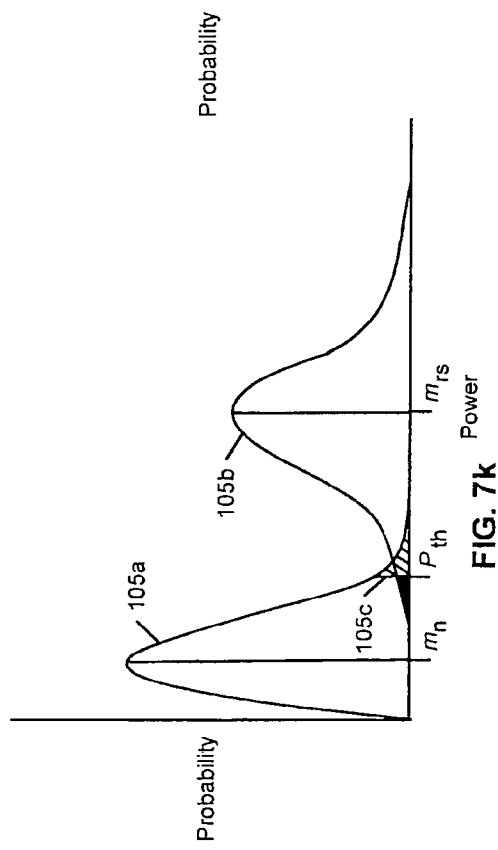
FIG. 7l
FIG. 7k

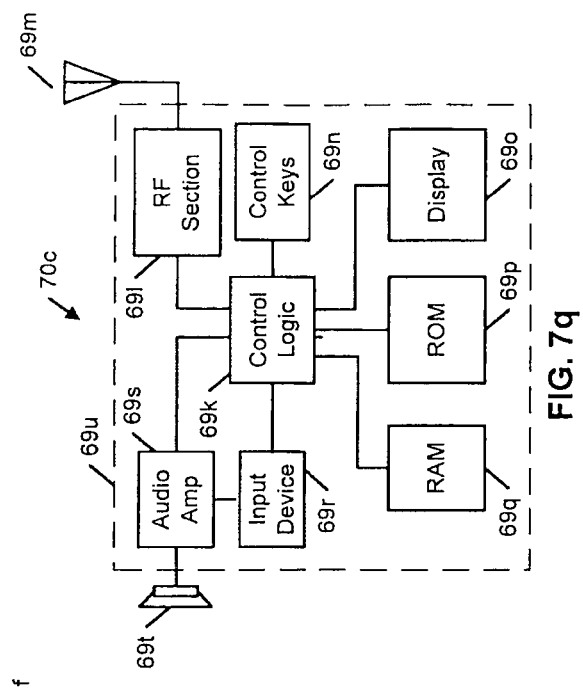
FIG. 7q
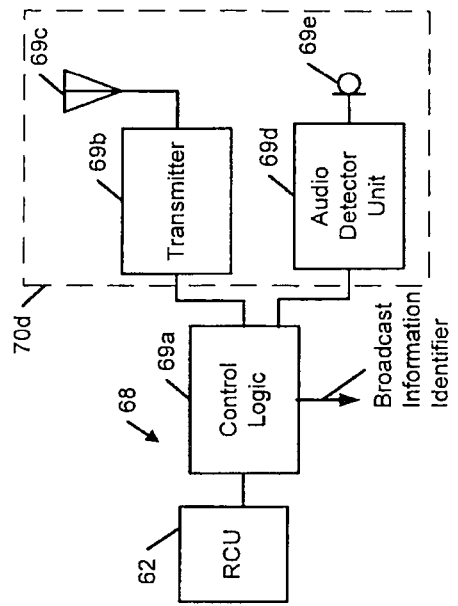
FIG. 7o
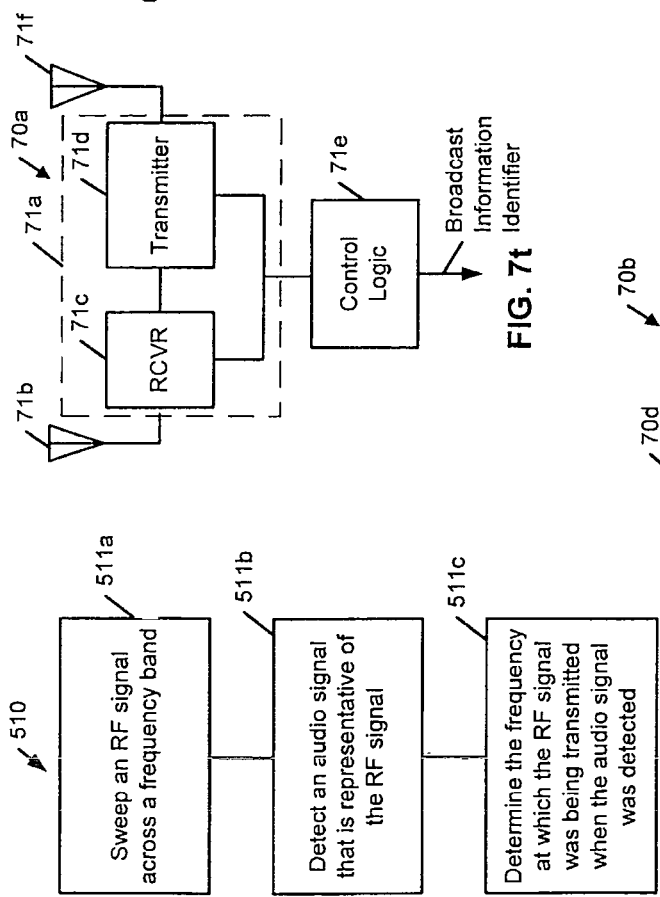
FIG. 7t
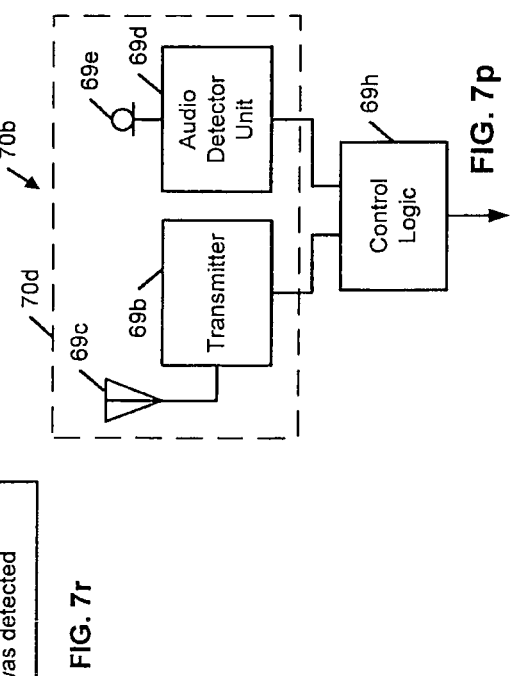
FIG. 7p
FIG. 7r

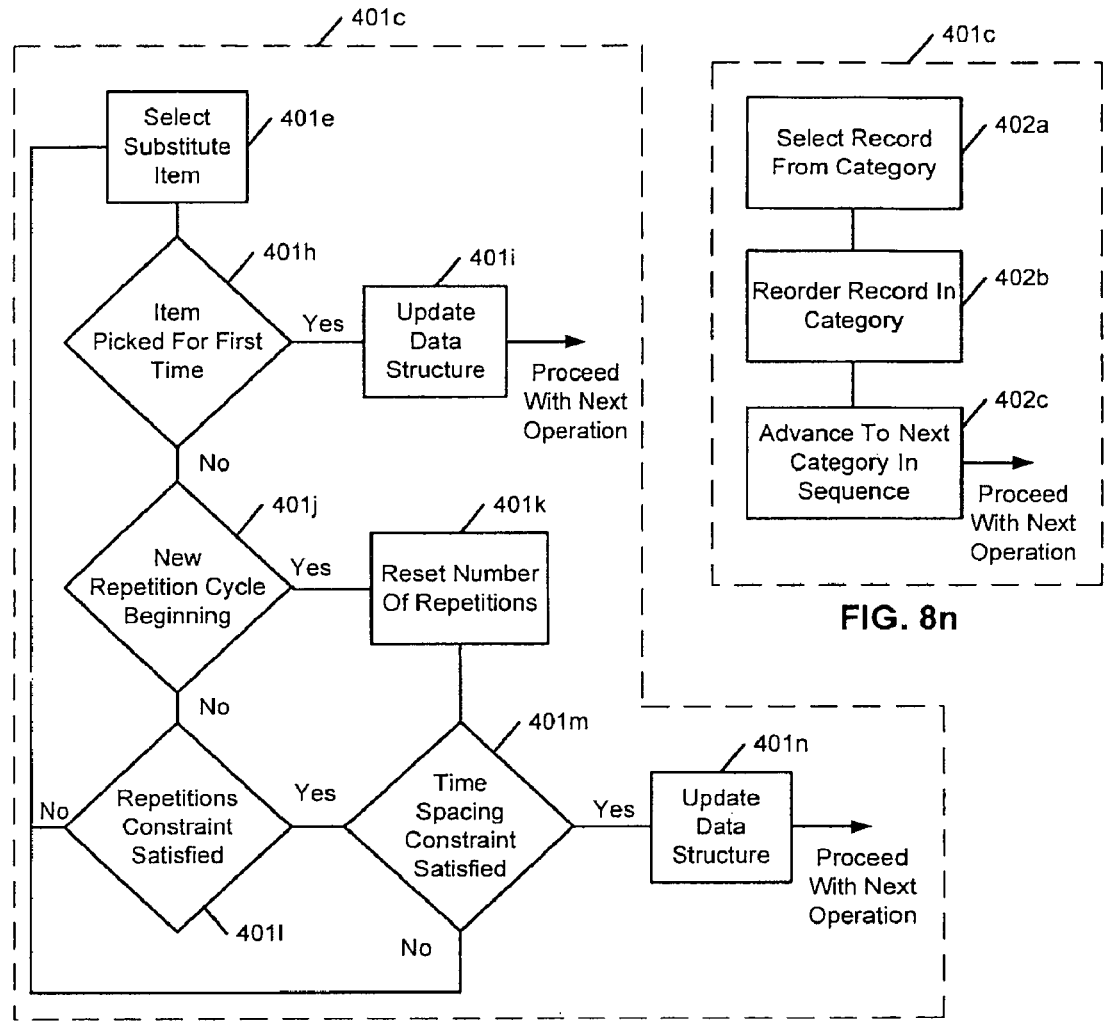
FIG. 8j
FIG. 8n
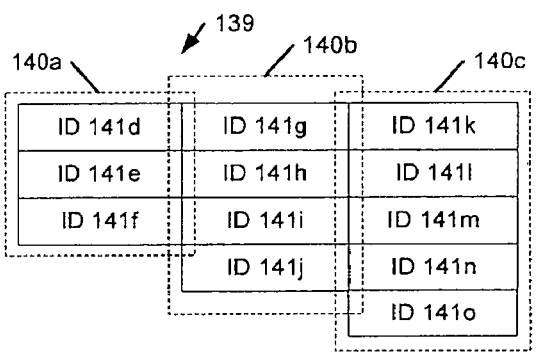
FIG. 8k
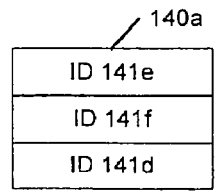
FIG. 8o
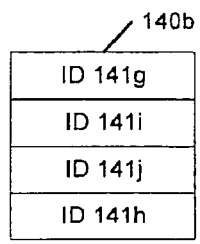
FIG. 8q

| 160a | 151a | 151b | | | | | | | |
|---|---|---|---|---|---|---|---|---|---|
| N | 98.7 | 01012001 | | | | | | | |

| | 151c | 151d | 151e | 151f | 151g | | 151h | 151i |
|---|---|---|---|---|---|---|---|---|
| | 00:00:00 | 1 | Ray Coniff | Moonlight Serenade | Big Band Orchestra | | 14, 76, 89 | 109101 |
| 151j | 00:05:03 | 2 | Madonna | Ray Of Light | 90's Contemporary | | 12, 91 | 397018 |
| 151k | 00:9:49 | 3 | Elton John | Honky Cat | 70's Pop | | 89, 54 | 123092 |
| | 00:13:27 | 4 | Coke | Diet Caffeine Free Ad | Ad Consumer-Soft Beverage | | 109, 55 | 32092 |
| | • | | | | | | | |
| | 13:25:04 | p | Bananarama | Blue Skies | 90's Contemporary | | 139, 91 | 2400923 |
| | 13:30:00 | p+1 | Compaq | Presario Ad | Ad-Consumer-Computer | | 203, 80 | 92234 |
| | • | | | | | | | |
| | 23:30:00 | n | Premiere Radio | Dean Edell Show | Spoken Word Medical | | 48, 2, 5 | 109232 |

| 160a | 151a | 151b | | | | | | 151o | | |
|---|---|---|---|---|---|---|---|---|---|---|
| N | 98.7 | 01012001 | | | | | | | | |

| | 151c | 151d | 151e | 151f | 151g | | 151h | | 151i | |
|---|---|---|---|---|---|---|---|---|---|---|
| | 00:00:00 | 1 | Ray Coniff | Moonlight Serenade | Big Band Orchestra | | 14, 76, 89 | | 109101 | 1455 |
| 151j | 00:05:03 | 2 | Madonna | Ray Of Light | 80's Contemporary | | 12, 91 | 397018 | 123092 | 12807 |
| 151m | 00:9:49 | 3 | Elton John | Honky Cat | 70's Pop | | 89, 54 | 123092 | 32092 | |
| | 00:13:27 | 4 | Coke | Diet Caffeine Free Ad | Ad Consumer-Soft Beverage | | 109, 55 | | | |
| | • | | | | | | | | | |
| 151n | 13:25:04 | p | Bananarama | Blue Skies | 90's Contemporary | | 139, 91 | 2400923 | | 28022 |
| | 13:30:00 | p+1 | Compaq | Presario Ad | Ad-Consumer-Computer | | 203, 80 | 92234 | | |
| | • | | | | | | | | | |
| 151p | 23:30:00 | n | Premiere Radio | Dr. Dean Edell Show | Spoken Word Medical | | 48, 2, 5 | 109232 | | 5190 |

| 12 |
|----|
| 54 |
| 89 |
| 91 |

FIG. 9e (74b): Moonlight Serenade

| Blue Skies |
| Dean Edell Show |
| Diet Caffeine Free Ad |
| Honky Cat |
| Presario Ad |
| Ray Of Light |

FIG. 9g (74a)

| 32092 |
| 92234 |
| 109232 |
| 123092 |
| 2400923 |
| 397018 |

FIG. 9y (74d, 76l)

| 76m | 76n | 76o | 76p | 76q | 76r | 76s |
|---|---|---|---|---|---|---|
| 14 | Quality 1 | Quality 2 | Quality 3 | $W_{u,14,q1}$ | $W_{u,14,q2}$ | |
| 76 | Quality 1 | Quality 2 | Quality 3 | $W_{u,76,q1}$ | $W_{u,76,q2}$ | $W_{u,76,q3}$ |
| 91 | Quality 1 | Quality 2 | Quality 3 | $W_{u,91,q1}$ | $W_{u,91,q2}$ | $W_{u,91,q3}$ |

FIG. 9k (74d, 76h)

| 76i | | | | | 76j | 76k |
|---|---|---|---|---|---|---|
| 14 | $\beta_1$ | $\beta_2$ | $\beta_3$ | $\beta_4$ | $\beta_5$ | Number Of Items | $W_{u,14}$ |
| 76 | $\beta_1$ | $\beta_2$ | $\beta_3$ | $\beta_4$ | $\beta_5$ | Number Of Items | $W_{u,76}$ |
| 91 | $\beta_1$ | $\beta_2$ | $\beta_3$ | $\beta_4$ | $\beta_5$ | Number Of Items | $W_{u,91}$ |

FIG. 9z (76a)

| 76b | 76c | 76d | 76e | 76f | 76g |
|---|---|---|---|---|---|
| 14 | 30 | 15 | 0.66 | 171 | 192 |

FIG. 9x (74h)

| Dean Edell Show | 4 |
| Diet Caffeine Free Ad | 4 |
| Honky Cat | 5 |
| Presario Ad | 3 |
| Ray Of Light | 3 |

FIG. 9v (74g, 74h)

| 32092 | 4 |
| 92234 | 3 |
| 109232 | 4 |
| 123092 | 5 |
| 397018 | 3 |

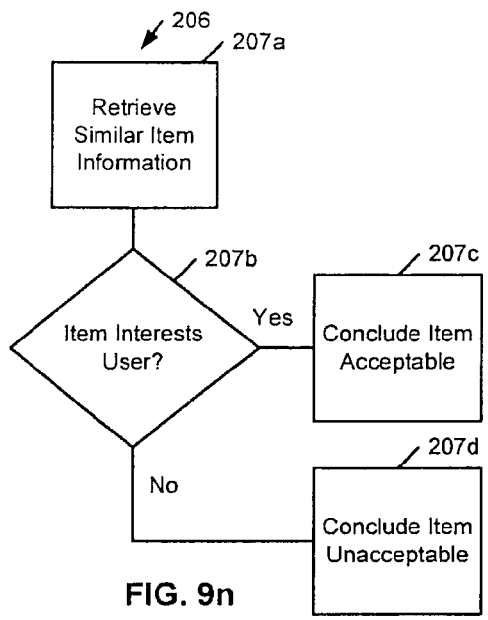
FIG. 9n
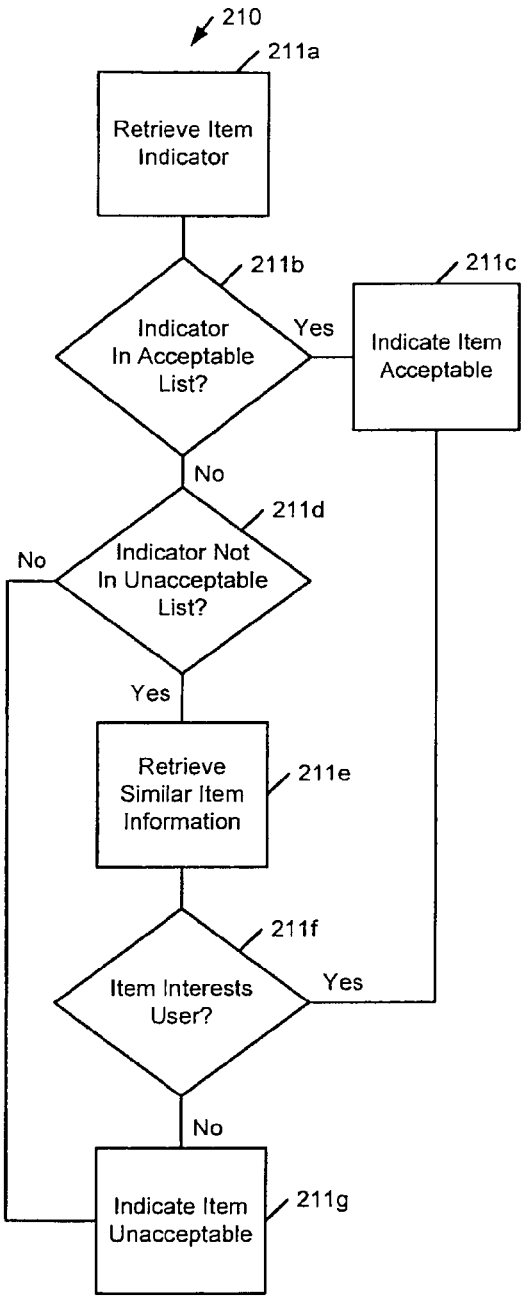
FIG. 9p
FIG. 9q

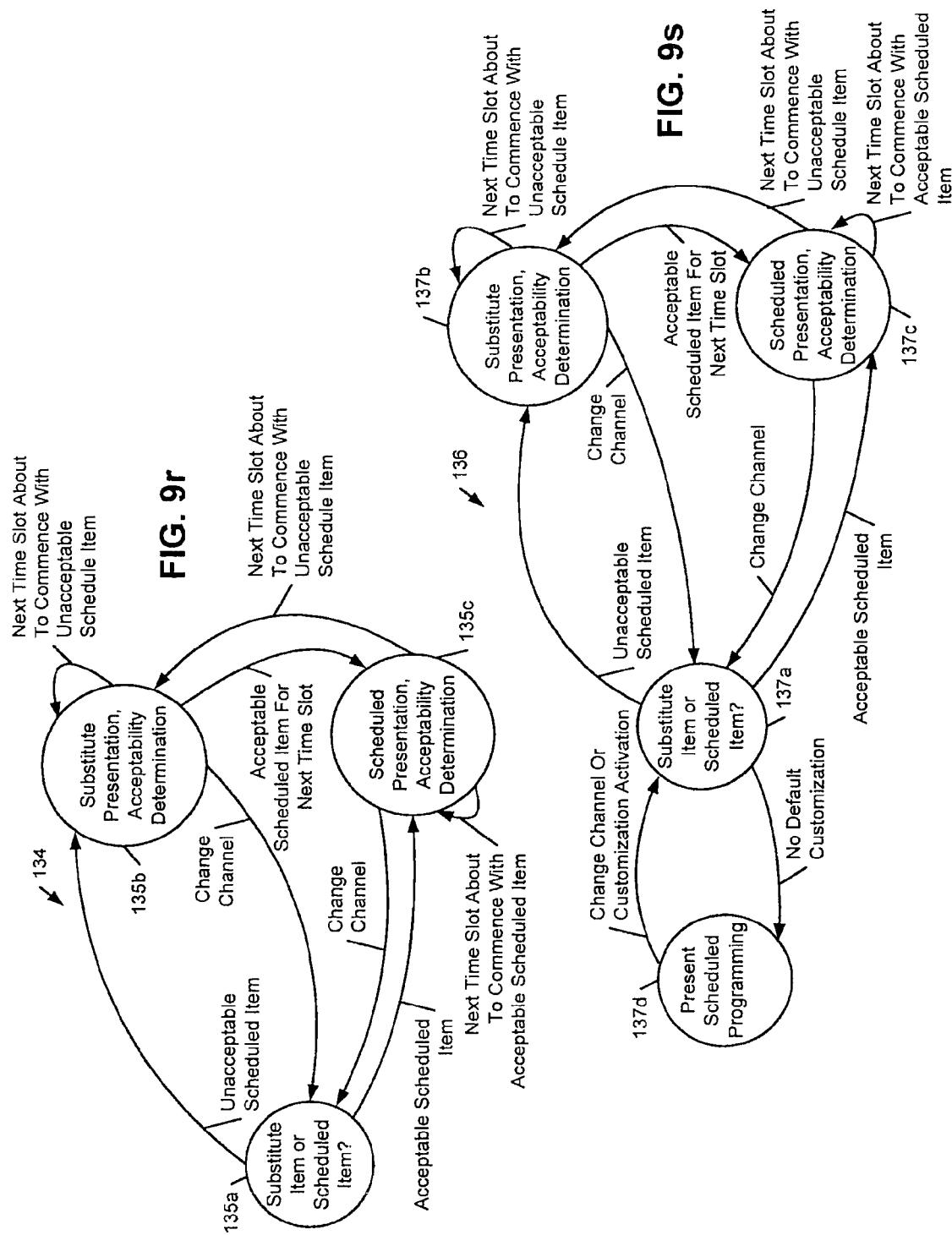

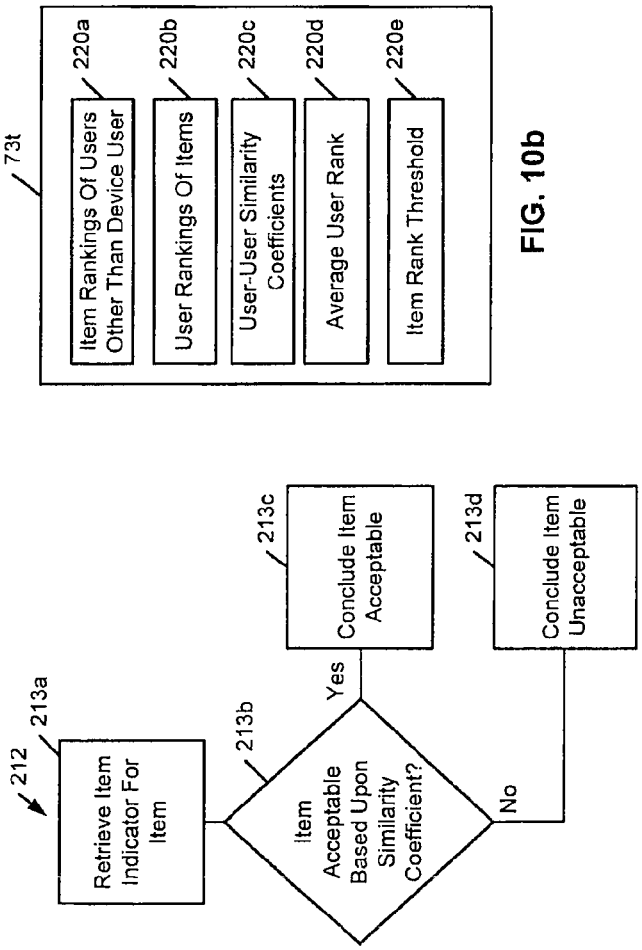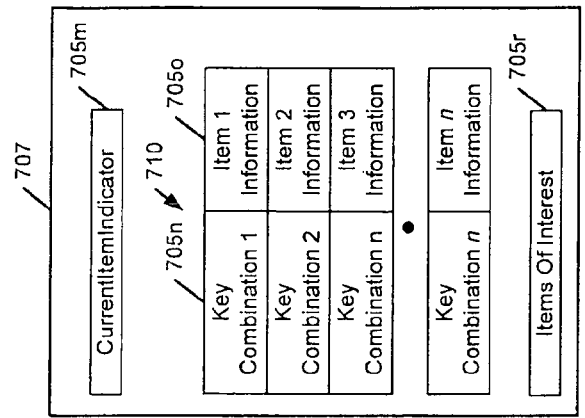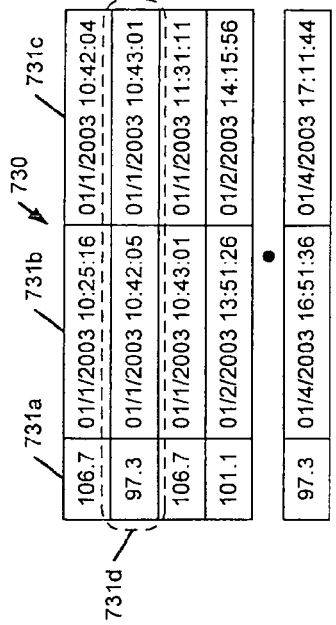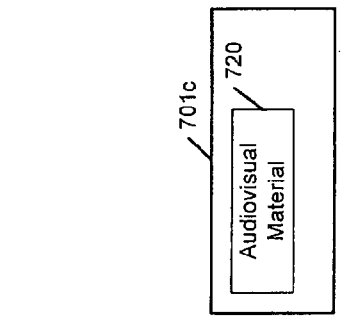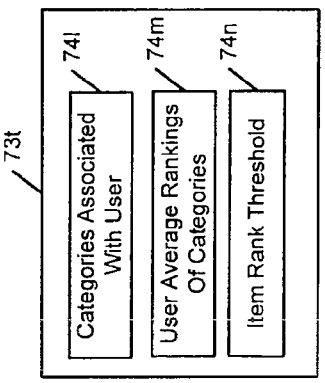

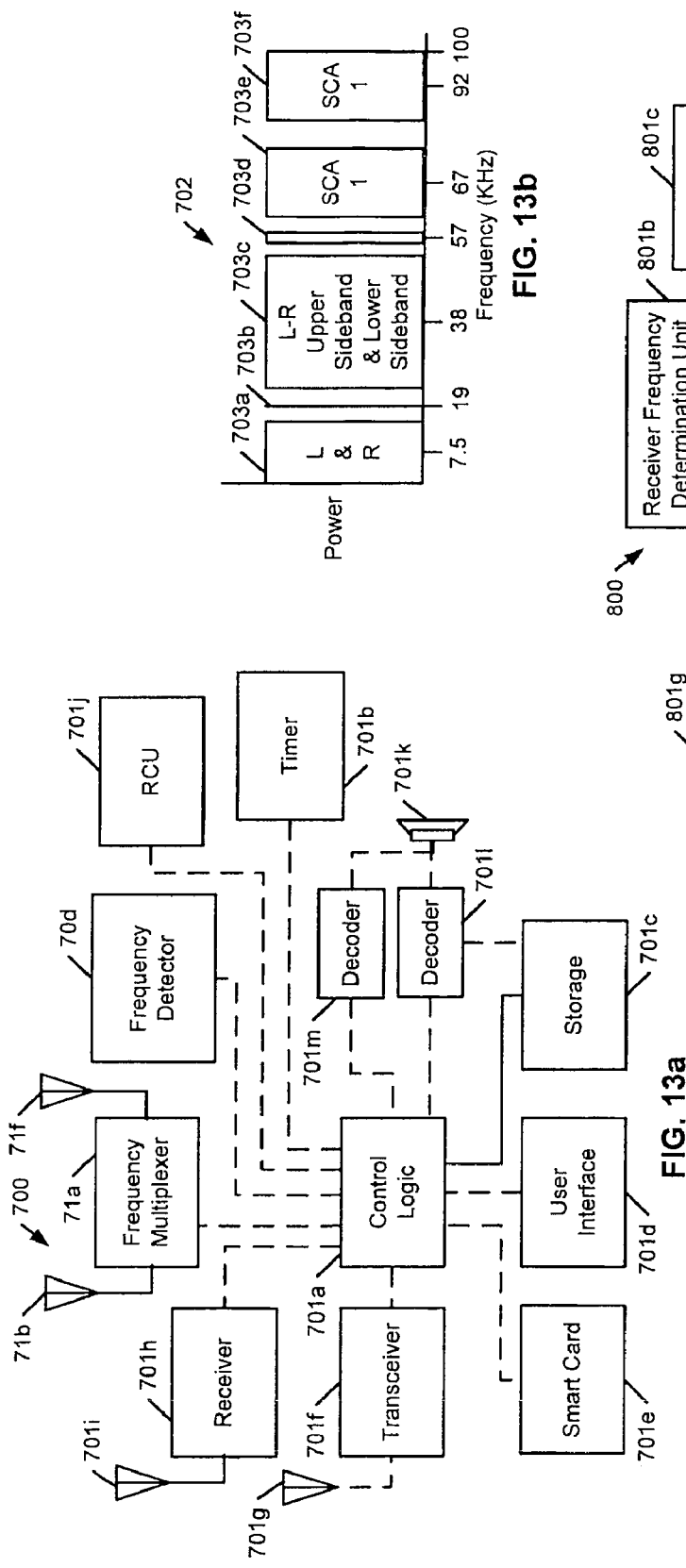
FIG. 13b
FIG. 13a
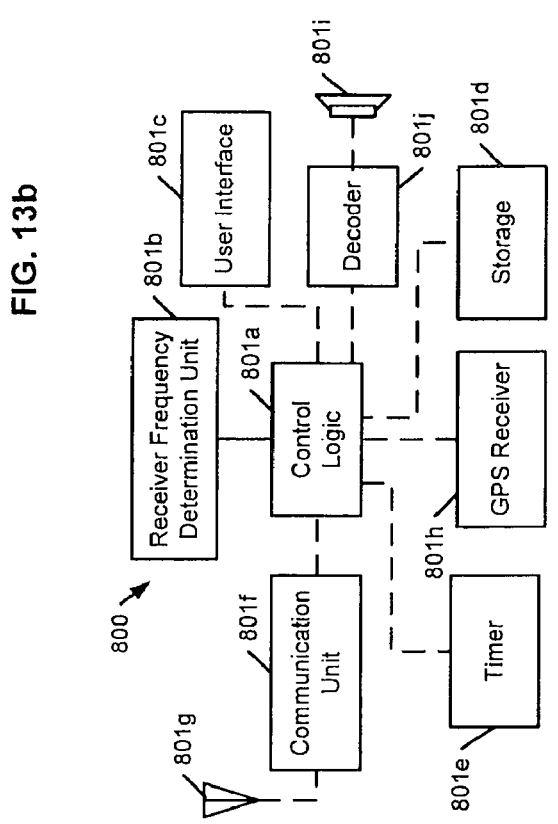
FIG. 12b

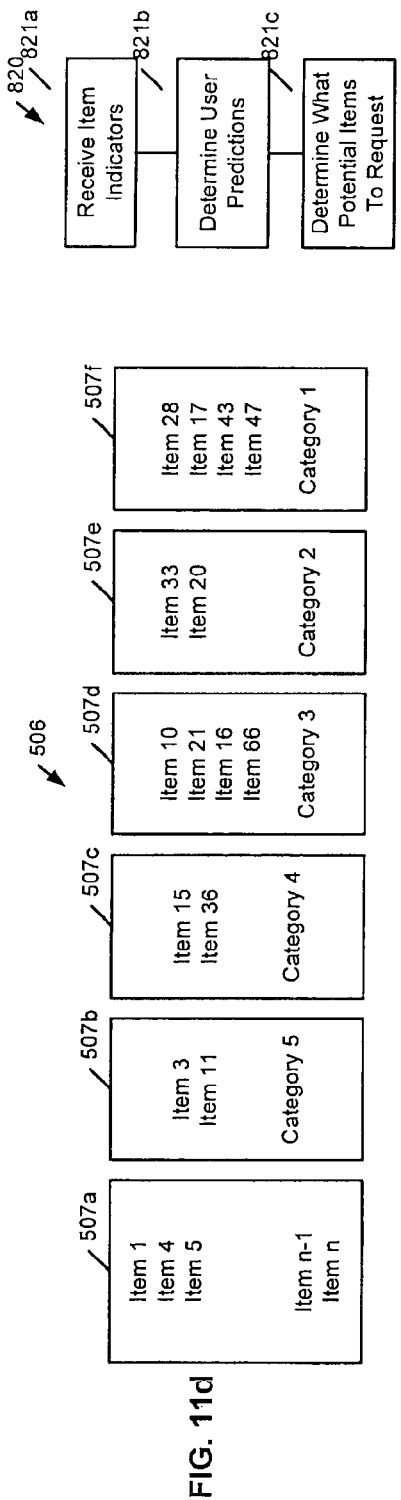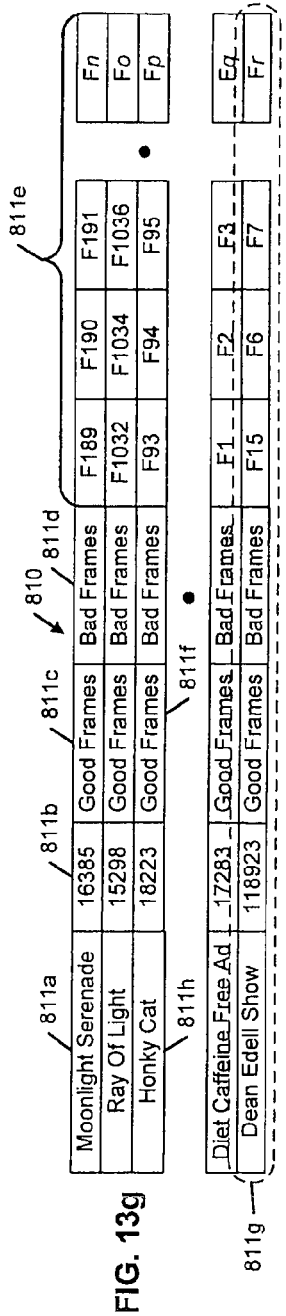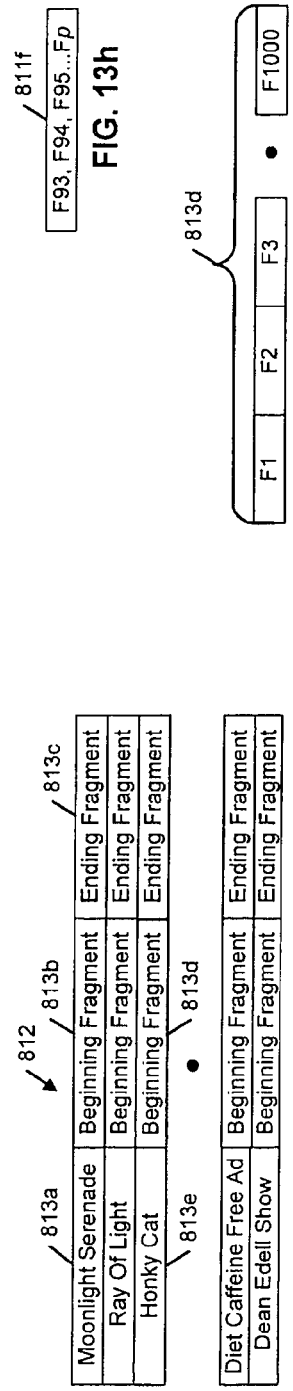

PROVIDING ALTERNATIVE PROGRAMMING ON A RADIO IN RESPONSE TO USER INPUT

This application is a continuation of U.S. patent application Ser. No. 11/229,383, filed Sep. 15, 2005 now U.S. Pat. No. 7,610,011, which in turn claims the benefit of U.S. Provisional Application No. 60/611,405, filed Sep. 19, 2004, both of which are incorporated by reference in the present application in their entireties. The present application claims the benefit of priority of both applications.

BACKGROUND INFORMATION

Unlike interactive cable television systems that have interactivity services designed into the systems, most of broadcast programming is typically a one-way service with no mechanism for interactivity. Add-on systems to provide interactivity to conventional broadcast programming have been proposed but are not appealing to the public because they are relatively complicated, time consuming to operate, and in some instances do not provide true real-time interactivity.

For example, U.S. Pat. No. 6,314,577B1 to Pocok (hereinafter '577 patent) describes a system that allows users to access additional information associated with a broadcast. The user can access the additional information by telephoning an interactive voice response (IVR) system and providing verbally or by means of a telephone's touch tone pad the call letters (e.g., WRQX) or frequency of the station presenting the broadcast. The system then presents to the user in reverse chronological order program descriptions or excerpts from which the user is allowed to select one for further examination.

Another add-on system is provided by ConneXus Corp. of Berwyn, Pa. The ConneXus service requests a user to navigate voice menus hosted by an IVR system or graphical menus provided by a server to a browser running on a computing device in order to provide information such as state, city, and station name. The ConneXus then provides a list of recent songs that have been presented by the station identified while navigating the voice or graphical menus. While the ConneXus system and the system described in the '577 patent are a desirable improvement over the system that has human operators handle user inquiries, neither system provides the ease and swiftness associated with interactive cable systems or Internet based systems.

Another two add-on systems, Xenote, Inc.'s iTag® and Sony Inc.'s eMarker®, existed briefly between 1999 and 2001, but were unable to generate significant user loyalty or interest to be financially viable. Xenote, formerly of San Mateo, Calif., launched its service before Sony of Tokyo, Japan launched its essentially identical service. Both Xenote and Sony sold a simple device that the user could employ while experiencing radio broadcasts. Whenever a song or advertisement of interest is presented by a radio, the user could depress a button on the device causing the device to store the time the user depressed the button. After making one or more button depressions, to obtain information about the song or advertisement, the user would have to attach the device to a computer connected to an Internet-based website. An application executed by the computer would retrieve the time stamps from the device and then provide to the website the time stamps. If the user were able to remember the identity of each station that was associated with the times and provide the identities to the website, the website would then provide information related to the song or advertisement that had piqued the user's interest. Due to the lack of immediate interaction, the requirement that users remember the identity of each station that is associated with each stored time, or both shortcomings, usage of the Xenote device dropped off or ended completely within one month of obtaining the device. Sony's eMarker® service was terminated a few months after Xenote went out of business.

U.S. Pat. No. 5,703,795 (hereinafter '795 patent) to Mankowitz describes an integrated system rather than an add-on system for providing interactivity. The device described in the '795 patent is actually a new type of radio that is incapable of providing interactivity for programming presented by other radios, but is capable of providing interactivity for programming presented by the receiver within the device described in the '795 patent. The device described in the '795 patent includes a receiver that presents songs and advertisements to the user and, upon user depression of a button, stores the time and channel or call letters of the station to which the receiver is tuned. Additional information regarding the song or advertisement can be obtained by having the device dial a telephone number that is associated with the particular station that is associated with the button depression. The radio then provides each of the stored time and channel pairs to a server which replies back with the additional information. While the device described in the '795 patent doesn't require the user to memorize for each button depression the channel or station that was being listened to, the device cannot be used to provide interactivity for existing radios. Furthermore, the device described in the '795 patent requires that two stations that have the same channel but are geographically displaced such that their broadcast areas do not overlap to be each assigned a different telephone number. Two numbers are required because the device and system described in the '795 patent are unable to resolve the ambiguity about which station the user is referring to using just the time and channel information provided by the device.

Existing online, web-based, jukebox, or over the air programming does not provide a personalized user experience. For example, a person listening to a radio station, jukebox, or streaming programming has very little or no capacity to change the programming to suit the person's taste in music, advertisements, or both. Listeners often are forced to constantly change channels or sources of programming (e.g., compact disc, tape, or other storage media). For example, if a song is unacceptable to the user, the listener is forced to change channels in order to hear an alternative song. The same is true of advertisements.

A user of mass broadcast programming has little or no control over how often items are presented relative to each other and how often they are presented within a predefined span of time. For instance, even when listening to broadcast programming, a user does not want to be bothered with having to change channels because a song is being heard for the second time in a very short span of time, or because some songs are heard too frequently relative to other songs that are more pleasing to the user.

Users of media players (e.g., MP3 player) have limited ability to exchange programming or music easily. A user of a first media player often has to share the user's ear plugs with another person so that the other person can sample music in order to determine whether the music is desirable. This is a time consuming and non-intelligent way to share music.

Existing broadcast reception devices fail to capture indications of whether programming is acceptable to the user. Furthermore, such indications are not used to tailor programming to suit the individual. Furthermore, existing devices do not provide a simple mechanism for indicating that the user would like an alert to be received in anticipation of certain programming being aired.

The prior art solutions suffer from, among other shortcomings, at least one or more of the following deficiencies: relatively complex to use, require user to make determinations about what station is being listened to before being able to use the interactivity service, time consuming to operate, incapable of true real-time interactivity, or incapable of providing interactivity without the purchase of an additional broadcast receiver, do not allow easy intelligent exchange of programming among users, fail to capture indications of acceptability of items of programming, fail to use such indications to customize programming, and do not provide a personalized experience. Given the shortcomings of the prior art, it is desirable to provide solutions that permit users to consume programming in a manner that overcomes deficiencies of the prior art.

SUMMARY OF THE INVENTION

In an embodiment, the channel to which a broadcast receiver is tuned is determined from a radiated tuning signal emitted by the broadcast receiver while the receiver is presenting an item of broadcast programming, and, pursuant to the channel determination, a channel indication is provided as a basis for identifying information related to the item of broadcast programming presented by the receiver. Alternatively, the channel to which a broadcast receiver is tuned is determined by transmitting a radio frequency channel identification signal and detecting an audio alias of the identification signal, and pursuant to the channel determination, a channel indication is provided as a basis for identifying information related to the item of broadcast programming presented by the receiver. Additionally, in an embodiment, a representation of time is paired with a channel indication, and both the representation of time and the channel indication are provided as a basis for identifying information related to an item of broadcast programming. Furthermore, in an embodiment, a representation of geographic location is provided as a basis for identifying information related to an item of broadcast programming.

BRIEF DESCRIPTION OF THE DRAWINGS

The present invention is illustrated by way of example, and not limitation, in the figures of the accompanying drawings in which like references denote similar elements, and in which:

FIG. 1a illustrates a data structure for a broadcaster's schedule of programming;

FIG. 1b illustrates a data structure for multiple programming schedules which are grouped by common station identifier;

FIG. 1c illustrates a data structure for programming schedules that are grouped together based on geographic region;

FIG. 2b illustrates in greater detail a server according to an embodiment of the present invention;

FIG. 2d illustrates a data structure for user related information that is used by a server's control logic to process received information identifiers;

FIG. 2e illustrates in greater detail a data structure for user related information;

FIG. 3 illustrates a recording device in greater detail according to an alternative embodiment of the present invention;

FIG. 4 illustrates a broadcast interactivity device presenting a coupon according to an alternative embodiment of the present invention;

FIG. 7a illustrates a tuning signal detector according to an embodiment of the present invention;

FIG. 7b illustrates a tuning signal detector according to an alternative embodiment of the present invention;

FIG. 7c illustrates a data structure that represents frequencies at which a radiated local oscillator signal is most likely to be found;

FIG. 7d illustrates a tuning signal detector according to an alternative embodiment of the present invention;

FIG. 7e illustrates the frequency response of a band pass filter;

FIG. 7i illustrates a relationship between the power of a peak spectral component of a carrier whose frequency lies in between two adjacent FFT samples and a ratio of powers in the adjacent FFT samples;

FIG. 7j illustrates another relationship between the power of a peak spectral component of a carrier whose frequency lies in between two adjacent FFT samples and a ratio of powers in the adjacent FFT samples;

FIG. 7k illustrates probability distribution functions for noise and a radiated tuning signal in the presence of noise;

FIG. 7l illustrates probability distribution functions for noise and a radiated tuning signal in the presence of noise after post-detection integration;

FIG. 7o illustrates a tuning signal detector according to an alternative embodiment of the present invention;

FIG. 7p illustrates a information identifier generator according to an alternative embodiment of the present invention;

FIG. 7q illustrates a broadcast reception device with which embodiments of the present invention interact;

FIG. 7r illustrates a process for determining the channel according to one embodiment of the present invention;

FIG. 7t illustrates an information identifier generator according to an alternative embodiment of the present invention;

FIG. 8j illustrates in greater detail the operation of identifying a substitute item of FIG. 8d according to an alternative embodiment of the present invention;

FIG. 8k illustrates a data structure, according to an alternative embodiment of the present invention, which facilitates enforcement of rules regarding presentation of items;

FIG. 8n illustrates in greater detail the operation of identifying a substitute item of FIG. 8d according to an alternative embodiment of the present invention;

FIG. 8o illustrates the state of a field in a data structure, according to one embodiment, after a substitution of an item of programming;

FIG. 8q illustrates the state of a field in a data structure, according to an alternative embodiment, after updating due to presentation of an item of programming that corresponds to a substitute item subject to presentation rules;

FIG. 9a illustrates, according to an alternative embodiment of the present invention, a data structure for information descriptive of non-user specified items of programming that may be presented;

FIG. 9d illustrates user item-unacceptability related information in greater detail according to an alternative embodiment of the present invention;

FIG. 9e illustrates user item-unacceptability related information in greater detail according to an alternative embodiment of the present invention;

FIG. 9g illustrates user item-acceptability related information in greater detail according to an alternative embodiment of the present invention;

FIG. 9h illustrates user item-acceptability related information in greater detail according to an alternative embodiment of the present invention;

FIG. 9j illustrates user group-affiliation related information in greater detail according to an alternative embodiment of the present invention;

FIG. 9k illustrates user group similarity coefficient-related information in greater detail according to an alternative embodiment of the present invention;

FIG. 9l illustrates a data structure for a schedule used for determining what items of programming to present to a user of a broadcast interactivity device according to an alternative embodiment of the present invention;

FIG. 9n illustrates an acceptability determination process according to an alternative embodiment, of the present invention;

FIG. 9p illustrates an acceptability determination process according to an alternative embodiment, of the present invention;

FIG. 9q illustrates an acceptability determination process according to an alternative embodiment, of the present invention;

FIG. 9r illustrates a state machine, according to one embodiment of the present invention, for real-time customization of the presentation of programming;

FIG. 9s illustrates a state machine, according to an alternative embodiment of the present invention, for real-time customization of the presentation of programming;

FIG. 9v illustrates user item-acceptability related information in greater detail according to an alternative embodiment of the present invention;

FIG. 9w illustrates a data structure produced by a customization process according to one embodiment of the present invention;

FIG. 9x illustrates user item-acceptability related information in greater detail according to an alternative embodiment of the present invention;

FIG. 9y illustrates user group similarity coefficient-related information in greater detail according to an alternative embodiment of the present invention;

FIG. 9z illustrates user group similarity coefficient-related information in greater detail according to an alternative embodiment of the present invention;

FIG. 10a illustrates an acceptability determination process according to an alternative embodiment, of the present invention;

FIG. 10b illustrates user profile information in greater detail according to an alternative embodiment of the present invention;

FIG. 10c illustrates user profile information in greater detail according to one embodiment of the present invention.

FIG. 11d illustrates a display presenting items for association with ranks according to an alternative embodiment of the present invention;

FIG. 12b illustrates a broadcast interactivity device according to an alternative embodiment of the present invention;

FIG. 13a illustrates a broadcast interactivity device according to an alternative embodiment of the present invention;

FIG. 13b illustrates the baseband spectrum of a frequency modulated signal, including mono signal, stereo signal, sub-carriers and radio data service signal, in the United States commercial FM band;

FIG. 13e illustrates, according to an alternative embodiment of the present invention, a temporary storage space that includes information related to an item of programming that is being presented;

FIG. 13f illustrates audiovisual material in the storage of a broadcast interactivity device according to an alternative embodiment of the present invention;

FIG. 13g illustrates a data structure for received digital audio samples according to an alternative embodiment of the present invention;

FIG. 13h illustrates in greater detail an entry in a data structure that holds indications of received frames with acceptable samples according to an alternative embodiment of the present invention;

FIG. 13i illustrates a data structure that stores fragments of items of broadcast programming according to an alternative embodiment of the present invention;

FIG. 13j illustrates in greater detail an entry in a data structure that holds frames that represent a fragment of an item according to an alternative embodiment of the present invention;

FIG. 13k illustrates a process by which a broadcast interactivity device requests items from another broadcast interactivity device according to an alternative embodiment of the present invention; and FIG. 13l illustrates a data structure for channel tracking information according to an alternative embodiment of the present invention.

DETAILED DESCRIPTION

Figure 1D:
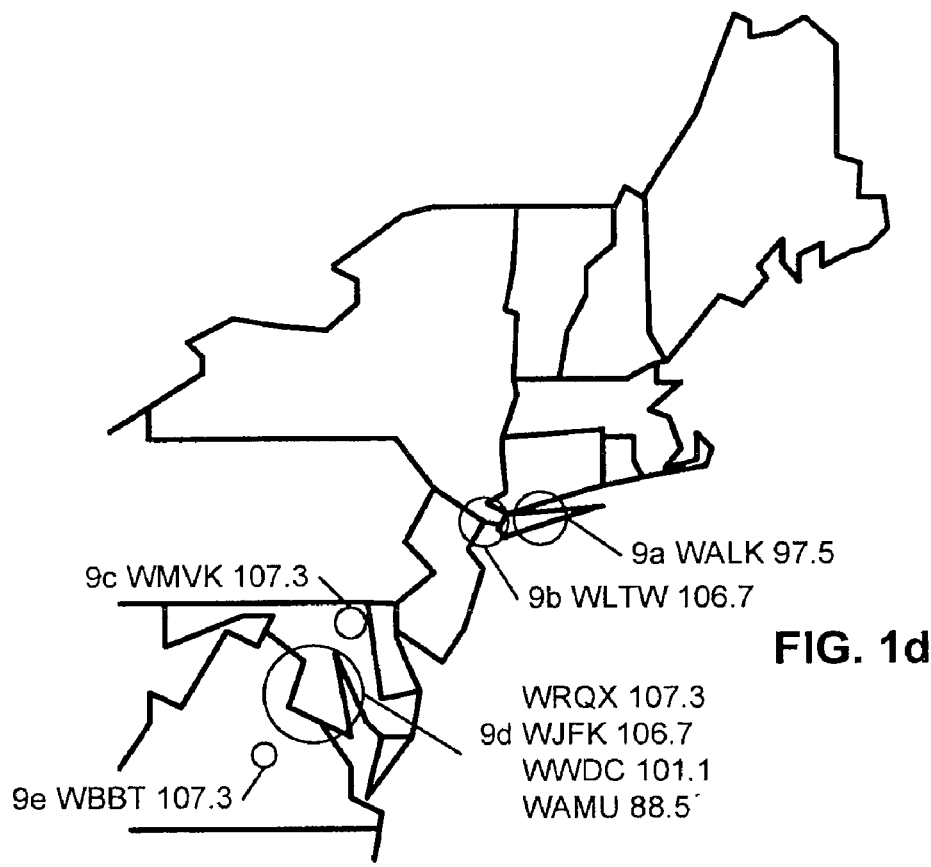
FIG. 1d illustrates a map that shows the approximate coverage areas for several stations some of which have the same carrier frequency.

According to the present invention, methods of and apparatus for consuming or interacting with items of programming including but not limited to songs, advertisements and video clips are described. Furthermore, methods and apparatus for providing an information identifier that is suitable for identifying information related to an item of broadcast programming presented by a broadcast receiver are described. In the following description, for purposes of explanation, numerous specific details are set forth in order to provide a thorough understanding of embodiments according to the present invention. It will be evident, however, to one skilled in the art that the present invention may be practiced in a variety of broadcast programming reception contexts including cable, satellite and over-the-air (OTA) television, and cable, OTA and satellite radio, and other systems in which a broadcast receiver radiates a tuning signal or is capable of receiving a channel identification signal, without these specific details. In other instances, well-known operations, steps, functions and elements are not shown in order to avoid obscuring the description.

Parts of the description will be presented using terminology commonly employed by those skilled in the art to convey the substance of their work to others skilled in the art, such as frequency, power spectrum, tuning signal, local oscillator, frequency counter, filter, data structure, and so forth. Various operations will be described as multiple discrete steps performed in turn in a manner that is most helpful in understanding the embodiments according to the present invention. However, the order of description should not be construed as to imply that these operations are necessarily performed in the order that they are presented, or even order dependent. Lastly, repeated usage of the phrases "in an embodiment," "an alternative embodiment," or an "alternate embodiment" does not necessarily refer to the same embodiment, although it may.

FIG. 1a illustrates a data structure for a broadcaster's schedule of programming. Data structure (DS) 1 represents a schedule of items of broadcast programming that a broadcaster transmits during a certain period of time. Examples of items of programming include songs, advertisements, news, and talk shows, among other forms of programming. Many broadcasters possess a computing system that permits a human operator to produce a schedule which can be stored in volatile or non-volatile storage and retrieved at a later time. The schedule may be generated for a variety of purposes including, but not limited to, calculation of royalties arising from the broadcast of copyrighted work, production of a recording for broadcast later, or control of automation equipment that broadcasts items of programming in the order identified in the schedule.

DS 1 can be produced hours, days, or even a week or more in advance of the broadcast of the items of programming represented in data structure 1. Alternatively, DS 1 may be derived in real-time by using signal identification equipment that monitors the OTA broadcast of a broadcaster. The signal identification equipment includes item signatures which are used to uniquely identify items, such as songs, as they are received by the equipment. Nielsen Broadcast Data Systems of White Plains, N.Y. provides a real-time monitoring service that tracks airplay of programming on over 1,000 stations in the United States.

DS 1 includes date field 2a whose contents identify the broadcast date of the schedule whose information is represented in DS 1. Date field 2a has the value 01012002 which represents the date Jan. 1, 2002: the first two digits of date field 2a represent a month; the third and fourth digits represent a day of the month, and the last four digits represent a year. An entry for date field 2a has one or more associated triplets of information, where each triplet is related to an item of programming. Dark circles 2g indicate that the data structure illustrated is not limited to the information depicted in the figure, but may include additional entries.

The entry for date field 2a has associated triplets such as triplets 2e, 2f. Each triplet includes entries for three fields: time field 2b, title/artist field 2c, and song/ad/show field 2d. Triplet 2e corresponds to an item of programming that, according to contents of time field 2b, has a broadcast time of 13:25:04 (or 1:25 PM and four seconds). The item of programming represented in triplet 2e is, according to title/artist field 2c, the work of the group "Bananarama." Entries for title/artist field 2c refer to the source of an associated item of programming where the item, for example, is a show or an advertisement. Alternatively, entries for title/artist field 2c refer to the name of a recording group or artist who created the associated item of programming where the item is a song or other artistic aural expression. Entries for song/ad/show name field 2d identify the name of the song, advertisement, or show for an associated item of programming. Song/ad/show name field 2d of triplet 2e indicates that the name of the item of programming is "Blue Skies"

Triplet 2f corresponds to an item of programming that, according to contents of time field 2b, has a broadcast time of 13:30:00 (or 1:30 PM). The source of the item of programming represented in record 2f is, according to title/artist field 2c, "ADI," a computer firm. Song/ad/show name field 2d of record 2f indicates that the name of the item of programming is "Vanguard Ad."

While DS 1 includes the schedule for a single day, it would be appreciated by one of ordinary skill in the art that in an implementation of a scheduling system the schedules of multiple days may be stored and manipulated. The schedules for multiple days may be represented by a data structure in which the information associated with each day's schedule is uniquely identified by a unique entry in date field 2a. Furthermore, while FIG. 1a illustrates a schedule for a radio broadcaster, it would be appreciated by one of ordinary skill in the art that programming broadcast by other types of broadcasters can be and is often described using a schedule similar to DS 1. Other types of broadcasters include, but are not limited to, OTA television, satellite radio and television, and cable radio and television.

Alternatively, DS 1 is a play list that is composed by a broadcaster or other provider of items of programming. In such an embodiment, the play list does not include field 2b, but alternatively it may.

Furthermore, DS 1, depending upon the embodiment, may include fields other than or less than those identified in FIG. 1a. In an alternative embodiment, records in DS 1 includes a field that indicates directly or indirectly what action is to be taken to satisfy a user request with respect to an item described in a record of DS 1.

Given that a schedule contains a wealth of information about what is being presented and since it is a readily accessible either from a broadcaster or from a monitoring service, the schedule is a resource which can be used advantageously to provide valuable services to audience members. Valuable services include, but are not limited to, sales of music and provision of programming related information.

According to embodiments of the present invention, the item of programming which is causing listener interest is identified by leveraging information contained within the schedule. By examining DS 1 it becomes apparent that an item of programming can be uniquely identified by a combination of the entries in date field 2a and time field 2b. When a data structure includes the programming schedule of only one station, date and time are sufficient information for identifying information related to an item of programming. However, when a data structure includes multiple programming schedules, date and time are insufficient.

FIG. 1b illustrates a data structure for multiple programming schedules which are grouped by common station identifier. Data structure 3 includes station identifier field 4a, coverage definition field 4b, and schedule field 4c. In the case illustrated by FIG. 1b, each entry for station identifier field 4a is a carrier frequency in megahertz in the FM band. A record in DS 3 includes an entry for station identifier field 4a and one or more pairs of entries for coverage definition field 4b and schedule 4c. For example, record 5d includes station identifier entry 5f which is 106.7 MHz. The station identifier entry 5f indicates the carrier frequency that is common to the stations whose schedules are contained in record 5d. The Federal Communications Commission (FCC) assigns some broadcasters the same carrier frequency because they are geographically sufficiently distant from each other and have essentially non-overlapping broadcast coverage areas minimizing the possibility of interference.

Record 5d includes a pair of entries of information related to station WJFK and another pair of entries of information related to station WLTW, both of which have a common 106.7 MHz carrier frequency. The pair of entries of WJFK related information is WJFK coverage definition entry 5g and WJFK schedule entry 5h. Similarly, station WLTW is represented by the pair of WLTW coverage definition entry 5i and WLTW schedule entry 5j. As discussed in greater detail herein, the coverage definition entries in a particular record, such as entries 5g, 5i, serve the purpose of identifying which of the stations whose schedules are represented in a record is being heard at a certain location. Since stations represented within a record have essentially non-overlapping coverage areas, by determining which of the station coverage area definition entries in a record includes the certain location the station being heard at a certain location and its schedule are identified. The schedule of the station is identified because each coverage area definition entry is paired with an associated schedule entry.

FIG. 1d illustrates a map that shows the approximate coverage areas for several stations some of which have the same carrier frequency. Coverage area 9a is associated with an FM station in Patchogue, N.Y. which has a 97.5 MHz carrier frequency and is known by the call letters "WALK." Coverage area 9b is associated with FM station WLTW in New York, N.Y. which has a 106.7 MHz carrier frequency. Coverage area 9c is associated with WMVK in Perryville, Md. which has a 107.3 MHz carrier frequency.

Due to significant overlap in the coverage areas of stations WWDC, WJFK, WRQX, and WAMU, for ease of graphical representation only, the coverage areas are represented by coverage area 9d. Stations WWDC, WRQX, WAMU and WJFK transmit from locations in the Washington, D.C. metropolitan area. Understandably and expectedly, stations WWDC, WJFK, WRQX and WAMU do not have the same carrier frequency because were they to have the same frequency, their largely overlapping coverage areas would make it extremely difficult for any of their signals to be heard clearly by listeners. On the other hand, stations WLTW of New York, N.Y. and WJFK of Manassas, Va. have the same 106.7 MHz carrier frequency because they are sufficiently far apart that their coverage areas 9b, 9d do not overlap. Coverage area 9e is associated with Powhatan, Va. WBBT which has the same 107.3 MHz carrier frequency as WRQX of Washington, D.C. Due to the distance between WRQX and WBBT and the low power of WBBT, 1400 watts, relative to the power of WRQX, 34,000 watts, there is practically no overlap between their coverage areas 9d, 9e.

While FIG. 1d provides shows the approximate coverage areas of existing stations, it should be appreciated that the call letters of the stations are used merely as labels to facilitate explanation of the common phenomena of geographically distant stations having a common carrier frequency and geographically close stations having substantially overlapping coverage areas. The characteristics, including actual coverage area and carrier frequency, of the stations identified by call letters are not incorporated herein nor are they intended to limit in any manner the description of embodiments of the present invention. Furthermore, in FIGS. 1a-e and FIG. 5a, b and the present description, the usage of labels by which existing artists, songs, ads, companies, and radio stations are known are not intended to limit in any manner the description, but rather are simply used as convenient references by which certain types of information can be identified.

Referring to record 5d of FIG. 1b, the entry for station identifier field 4a is 106.7 MHz. The entry of 106.7 MHz in station identifier field 4a indicates that record 5d contains the scheduling information of one or more stations that have a 106.7 MHz carrier frequency. The entries for coverage definition field 4b of record 5d define the extent of the coverage area of the station whose schedule is provided as an associated entry in schedule field 4c of record 5d. The schedules of WJFK of Manassas, Va. and WLTW of New York, N.Y. are provided as entries in schedule field 4c of record 5d.

It is apparent from FIG. 1d that any reasonable coverage area definition for WLTW would not include a point that would be within the coverage area definition for WJFK. Similarly, the coverage area definitions of stations WRQX, WMVK, and WBBT in coverage definition field 4a of record 5e would not have any points in common. Records 5a, 5b, 5c illustrate that for station identifiers 88.5 MHz, 97.5 MHz, and 101.1 MHz, respectively, there is only one schedule. Even though there is only one schedule in each of records 5a, 5b, 5c, the entries for coverage definition field 4b in each of these records serves, as described below, the same purpose as the coverage definition entries in records which include the schedules of multiple stations. However, in an alternative embodiment, when a single schedule is present in a record, the entry for field 4b may be left empty.

There are many possible expressions for defining coverage area including, but not limited to, continuous analytical expressions, piecewise expressions, discrete numerical models, sets of zip-codes, county names, or telephone area codes and local exchange numbers in which a station's broadcast signal may be received, and combinations thereof. Furthermore, there are many techniques for determining whether a geographic location is within a certain coverage area or, to which one of several antenna locations, the geographic location is closest.

Due to the coverage area definitions in DS 3, a particular item of programming is identifiable based upon the frequency of the station presenting the item, a representation of the approximate geographic location at which the station's signal is being received, and the date and time the item is heard. For example, consider an item of programming which is heard at 1:28 PM on Jan. 1, 2002 while listening to a receiver tuned to 107.3 MHz in Arlington, Va. The frequency of 107.3 MHz to which the receiver is tuned is a basis for identifying record 5e from among records 5a-5e in DS 3. Record 5e includes the schedules of stations whose carrier frequency is 107.3 MHz. The representation of geographic location of Arlington, Va. is a basis for identifying the WRQX coverage area definition entry in definition field 4b of record 5e from among the WBBT, WMVK, and WRQX coverage definitions. The WRQX coverage area definition is identified because of the three coverage definitions in record 5e it is the only one which would encompass a representation of a geographic location in Arlington, Va.

Figure 1E:
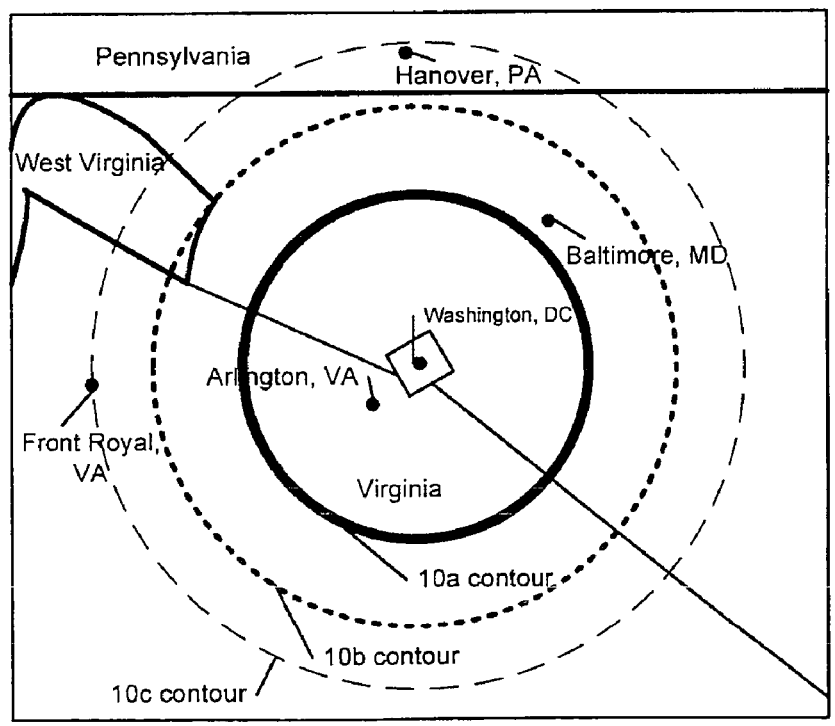
FIG. 1e illustrates a radio station's coverage areas for different signal strength contours.

FIG. 1e illustrates a radio station's coverage areas for different signal strength contours. Contour 10a depicts the boundary at which the signal strength of WRQX which is located in Washington, D.C. falls to 60 dBu (1 mV/m). The area enclosed by a 60 dBu contour corresponds to an area in which signal strength ranges from extremely strong to good. Contours 10b, 10c are for 50 dBu and 40 dBu, respectively, and points on the contours are about 46 miles and 63 miles, respectively, from WRQX's antenna location. It is apparent from FIG. 1e that contour 10a encompasses Arlington, Va. While in the past receivers required signal strength levels exceeding 60 dBu (1 mV/m) to operate at an acceptable level, modern receivers can operate at signal strength levels around 40 dBu (0.1 mV/m) or even lower for monoaural FM transmission. Nevertheless, the 50 dBu and 40 dBu contours for stations WBBT and WMVK do not extend to Arlington, Va., and consequently, are not represented in FIG. 1e. Therefore, a representation of the geographic location of Arlington, Va. would be included only in the WRQX coverage definition and not the WBBT and WMVK coverage definitions in record 5e.

Having identified the WRQX coverage definition on the basis of a representation of the geographic location of Arlington, Va., the WRQX schedule entry in schedule field 4c of record 5e is identified as the schedule containing information related to the item of programming. The information related to the item of programming is identified in the WRQX schedule entry of record 5e based on the date, Jan. 1, 2002, and time 1:28 PM (13:28:00) the item was heard. Consider DS 1 of FIG. 1a as being a detailed representation of the WRQX schedule entry of record 5e. According to DS 1, record 2e describes an item presented between 13:25:04 and 13:30:00 on Jan. 1, 2002. Since the items described in the records of DS 1 do not overlap in time, record 2e spans a time period which includes 13:28:00 on Jan. 1, 2002 and is identified on this basis as containing information related to the item of programming heard. The information related to the item of programming is the title/artist entry "Bananarama" and the song/ad/show name entry "Blue Skies."

While title/artist and song/ad/show name are the information related to the item of programming in DS 1, it would be appreciated by one of ordinary skill in the art that other or additional information may also be included in DS 1. For example, information related to the item of programming may be a pointer that points to marketing material, instructions to a computing system to perform, or a page in a markup language.

While entries for station field 4a are carrier frequency in MHz, it would be appreciated by one of ordinary skill in the art that other common identifiers, including channel number, may be used. For example, all stations with carrier frequency 87.9 MHz can be assigned the channel number "1," and stations with carrier frequency 88.1 MHz can be assigned the channel number "2," and so forth in 200 KHz (0.2 MHz) increments up to 107.9 MHz. While FM radio stations are equally spaced apart in the frequency domain, the mapping from frequency to channel number does not depend upon the spacing but rather the sequential order of the frequencies. For example, television channels are not equally spaced apart in the frequency domain, but are still represented using channel numbers.

FIG. 1c illustrates a data structure for programming schedules that are grouped together based on geographic region. Data structure 6 represents another structure for organizing the schedules of multiple stations. DS 6 includes region definition field 7a, station identifier field 7b, and schedule field 7c. A record in DS 6 includes an entry for region field 7a and one or more pairs of entries for station identifier field 7b and schedule field 7c. The entry for region field 7a defines a region within which certain stations can be heard. Each of the stations that can be heard within the region defined by an entry for field 7a is represented by a pair of entries in station identifier field 7b and schedule field 7c.

For example, record 8c includes a region definition entry 8d, and four pairs of entries for station identifier field 7b and schedule field 7c: WAMU entry pair 8e, 8f; WWDC entry pair 8g, 8h; WJFK entry pair 8i, 8j; and WRQX entry pair 8k, 8l. The above discussion of expressions for defining coverage area is incorporated herein because the same expressions can be used to define geographic regions.

It would be apparent to one of ordinary skill in the art that, depending upon the embodiment, DS 3 and DS 6 can and do contain the same information but organize it differently. In DS 3, geographic area definitions are limited to the coverage area of one station. On the other hand, in DS 6 geographic areas definitions include the coverage areas of multiple stations. Similarly, in DS 3, stations are grouped together within a record based on common carrier frequency, while, in DS 6, stations are grouped together based upon having coverage areas that are within a larger common geographic area. Consequently, if the values of the item identification example described above are used with DS 6, rather than DS 3, the same item of programming is identified.

In the above example, an item of programming is heard at 1:28 PM on Jan. 1, 2002 while a receiver is tuned to 107.3 MHz in Arlington, Va. A representation of the geographic location of the receiver is a basis for identifying record 8c in DS 6. Record 8c includes region definition entry 8d which is represented by coverage area 9d of FIG. 1d. Preferably and to simplify computation, the region definition entries in DS 6 are mutually exclusive such that no two region definition entries in region definition field 7a refer to the same geographic area. By having the region definition entries mutually exclusive, a geographic location will map into one or none of the region definition entries. Consequently, a representation of geographic location of a receiver in Arlington, Va. will map only to region definition entry 8d of record 8c.

Record 8c includes four station identifier entries in field 7b each of which is paired with a schedule entry in schedule field 7c. Station identifier entry 8k is the only station identifier that matches the carrier frequency to which the receiver of the example is tuned. Consequently, schedule entry 8l which is the pair of identifier entry 8k is identified as the schedule which contains information related to the item of programming. Once a schedule is identified, the item of programming is identified, as described above, on the basis of date and time.

One of ordinary skill in the art would appreciate that instead of determining which one of multiple coverage area definition entries in a record includes a certain location, the inquiry can be reframed as which one of multiple antenna locations is closest to a certain location, where each antenna location is associated with a station in the group of stations sharing the common frequency. Since some stations do not have the same size coverage patterns, the geographic distances between a certain location and two different antenna locations cannot be compared directly one of them must first be adjusted. For example, adjustment can be made using a ratio of the distance from a first station's antenna location to a first location at which a specific signal strength level is reached to the distance from a second station's antenna location to a second location at which the same specific signal strength level is reached. The ratio can be used to either shrink or expand the distance from the receiver's location to one antenna before it is compared with the distance from the receiver's location to another antenna. In this manner, a relatively far distance from the antenna of a station with relatively large coverage can be decreased before being compared with the shorter distance to the antenna of a station with relatively smaller coverage.

While in the above description an adjustment ratio was calculated for two stations, one of ordinary skill in the art would appreciate that an adjustment ratio can be calculated for three or more stations. Furthermore, an adjustment ratio may, in some instances, only be valid for adjusting distances within a limited arc in the transmission pattern of an antenna. Consequently, more than one adjustment ratio may be needed to correct distances to different locations within different arcs in an antenna's transmission pattern.

The foregoing description demonstrated that representations of frequency, date, time, and optionally geographic location are suitable for identifying information related to an item of programming in data structures such as those described herein. Methods and apparatus for generating information identifiers that include representations of frequency, date, time and optionally geographic location are also described herein. Furthermore, an exemplary environment in which embodiments of the invention may operate and a high-level description of the operations performed by an embodiment are also provided.

Figure 2A:
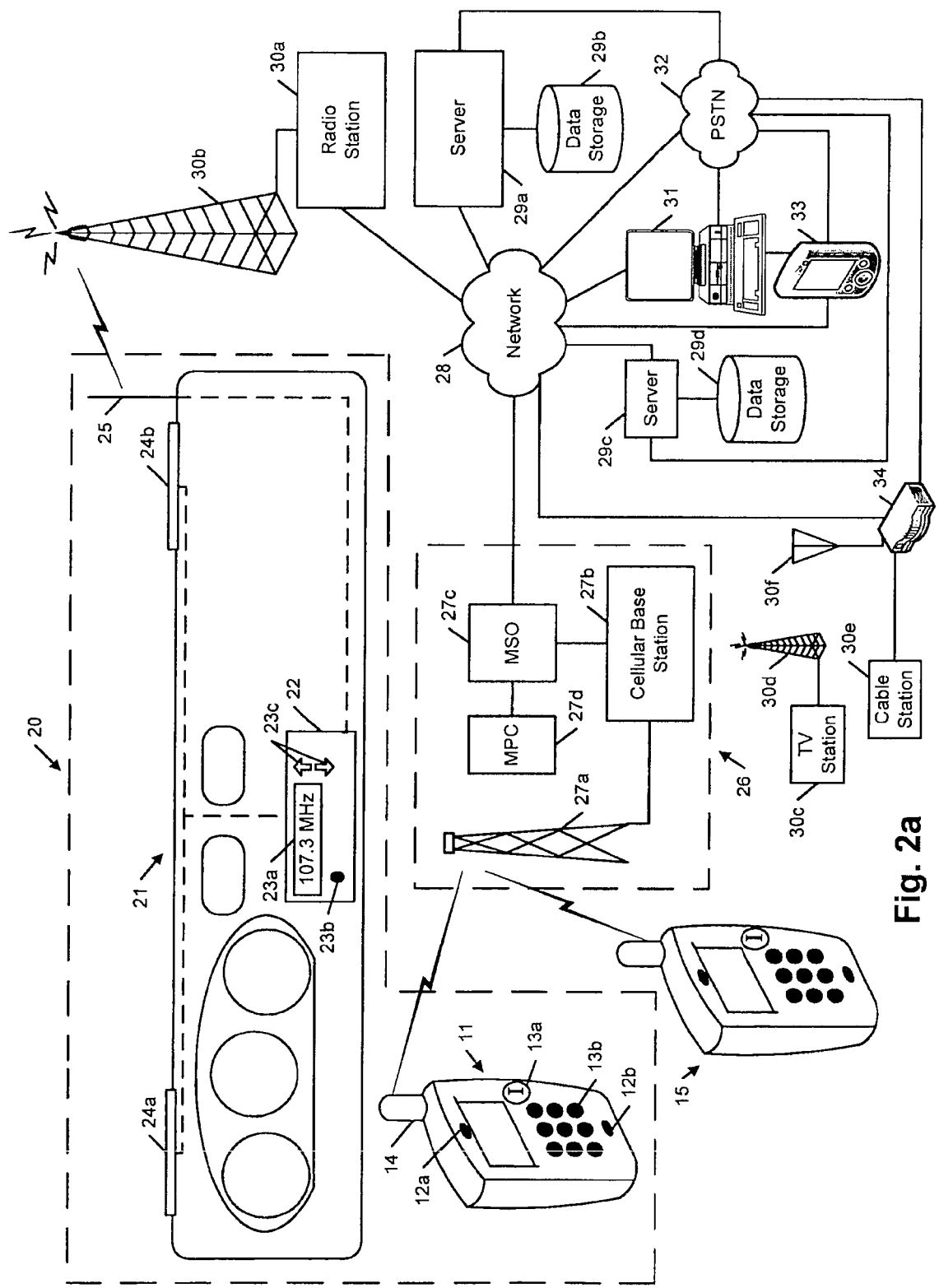
FIG. 2a illustrates an exemplary environment in which an exemplary embodiment of a broadcast interactivity device provides a broadcast programming identifier according to the present invention.

FIG. 2a illustrates an exemplary environment in which an exemplary embodiment of a broadcast interactivity device provides a broadcast programming identifier according to the present invention. The exemplary environment in FIG. 2a includes the interior of a vehicle 20, but one would appreciate that the present invention is not limited to use in the interior of a vehicle but may be used profitably in the vicinity of a broadcast receiver wherever it may be found. The exemplary environment includes a dashboard 21 that has broadcast receiver 22 that is coupled to speakers 24a, 24b. The exemplary environment includes antenna 25 coupled to receiver 22. Broadcast interactivity device (BID) 11 is a cell phone.

Receiver 22 is an amplitude modulation (AM) and frequency modulation (FM) receiver that receives broadcast programming in the United States AM band which extends from 550 kilohertz (KHz) to 1650 KHz and the US FM band which extends from 87.9 megahertz (MHz) to 107.9 MHz. Receiver 22 has on/off button and volume control 23b which is used to turn on the receiver for operation and to adjust the volume level of sound presented through speakers 24a, 24b. Receiver 22 also includes up/down channel buttons 23c which are used to control the broadcast channel to which receiver 22 is tuned, and display 23a which displays the tuned broadcast channel by displaying the frequency in megahertz (MHz).

When receiver 22 is turned on, antenna 25 and receiver 22 radiate a local oscillator signal (LO). The LO signal is a tuning signal produced within receiver 22 as a part of a process of recovering the audio information being received on a particular channel so that the audio information may be presented through speakers 24a, 24b. The LO signal produced within receiver 22 is not intended to be radiated, but only to be used to recover the audio information being received in a broadcast signal. To prevent radiated LO signals from thousands and millions of receivers from interfering with the operation of other receivers and other electrical devices, the US government enforces strict regulations governing the strength of radiated local oscillator signals. Nevertheless, an appreciable signal is radiated during the audio recovery process and the local signal radiated by broadcast receivers is used to advantage in the present invention.

The LO signal is used to advantage because it is related to the broadcast channel to which receiver 22 is tuned. Specifically, the frequency of the LO signal is related to the broadcast signal's carrier frequency which is also commonly referred to by a number defined as the broadcast channel or channel number. For example, to recover the audio information for a broadcast signal with carrier frequency of 88.7 MHz, a receiver such as receiver 22 typically generates a LO signal that is 10.7 MHz higher than the carrier frequency it wants to "tune to." Thus, audio information in a broadcast signal with carrier frequency 88.7 MHz is recovered using a LO signal with frequency of 99.4 MHz. By determining the frequency of a radiated LO signal, the carrier frequency to which receiver 22 is tuned can be determined by making an adjustment of 10.7 MHz. For example, if a radiated LO signal is determined to have a frequency of 107.4 MHz, then receiver 22 is tuned to a broadcast signal which has a carrier frequency of 96.7 MHz.

When operating, receiver 22 fills at least some of the surrounding environment with a radiated LO signal which is received at antenna 14. BID 11 includes a LO signal detector (not shown in FIG. 2a) that is coupled to antenna 14 from which the detector receives the radiated LO signal. The LO signal detector detects a characteristic of the radiated LO signal, and based upon the detected characteristic generates a representation of the frequency of the radiated LO signal. Methods and apparatus by which the LO signal detector generates a representation of the frequency of the LO signal are described in greater detail herein.

According to an alternative embodiment, BID 11 further derives, based upon representation of the frequency of the radiated LO signal, a representation of the carrier frequency to which receiver 22 is tuned. As indicated elsewhere herein, the frequency of the radiated LO signal or the carrier frequency to which the receiver is tuned may be represented by a channel number. The representation of the frequency of the LO signal, the representation of the carrier frequency, or a channel number is also referred to herein as a "channel indication." Methods and apparatus by which BID 11 generates a channel indication are described in greater detail herein. In an embodiment, in response to activation of IB 13a, BID 11 also captures the date and time at which IB 13a is pressed. Depending upon the context being described herein, it should be clear that the label "time" refers to a combined representation of date and hour, minutes, and seconds, making it unnecessary to state "date and time."

BID 11 includes a transceiver (not shown in FIG. 2a) coupled to antenna 14, allowing BID 11 to communicate with server 29a via networks 26, 28. The mechanisms by which a wireless communications device such as BID 11 communicates with a server via a wireless network are well known in the art, and need not be described in detail herein so as to not obscure the present description. While in the above description wireless network 26 is a cellular telephone network, one of ordinary skill in the art would appreciate that embodiments of the present invention are not limited to operating with any particular wired or wireless networks, wired devices or wireless devices, modulation schemes, protocols, or frequency. Accordingly, one of ordinary skill of the art would appreciate that the present invention is not limited to a particular protocol, modulation, or physical layer for communicating information between a communications device such as BID 11 and a another communications device, including but not limited to computer 31, media player 33, phone 15, server 29c, personal digital assistant, pocket personal computer, and pager.

BID 11 provides, based upon a combination of a channel indication and a representation of time, an information identifier for identifying information related to an item of programming. The term "information identifier" refers to identification information for identifying information related to an item of programming. In an alternative embodiment, BID 11 provides, based upon the channel indication, an information identifier.

In an alternative embodiment, BID 11 provides to server 29a, as an information identifier, a combination of channel indication and the representation of time. In an alternative embodiment, BID 11 provides to computer 31, as an information identifier, the channel indication and the representation of time.

In an alternative embodiment, BID 11, accepts as input at keypad 13b a representation of geographic location. In an alternative embodiment, BID 11, based upon global positioning system (GPS) signals received by a GPS receiver (not shown in FIG. 2a) included in BID 11, provides a representation of the approximate geographic location of receiver 22 by generating a representation of the geographic location of BID 11. In an alternative embodiment, BID 11 receives a representation of geographic location from MPC 27d by way of station 27b, and antenna 27a.

In an alternative embodiment, BID 11 provides a representation of geographic location as a basis for identifying information related to an item of programming by including the representation of geographic location in an information identifier. In an alternative embodiment, BID 11 provides to server 29a, as an information identifier, a combination of a channel indication, a representation of time, and a representation of geographic location. In an alternative embodiment, BID 11 provides to computer 31, as an information identifier, a combination of a channel indication, a representation of time, and a representation of geographic location.

While parts of the description are made in the context of BID 11 providing an information identifier to server 29*a* or computer 31, one of ordinary skill in the art would appreciate that, in an alternative embodiment, any of the broadcast interactivity devices described herein, including BID 11, depending upon the embodiment, communicate an information identifier directly or indirectly to other devices. As a consequence of communicating the information identifier, depending upon the embodiment, one or more of the following occurs: an action is taken, information is received at BID 11, or alternatively another device, and a service is provided on behalf of the user of BID 11. Actions, information, and services are described in greater detail elsewhere herein.

As indicated above, BID 11 includes a tuning signal detector that provides an indication of the channel to which a neighboring broadcast receiver is tuned. A tuning signal detector, such as the one in BID 11 or other broadcast interactivity devices described herein, may operate in accordance with one or more of the embodiments of the present invention.

FIG. 7*a* illustrates a tuning signal detector according to an embodiment of the present invention. Tuning signal detector 40 includes two units: radiated tuning signal receiver and characterization unit (RCU) 42 and control logic 41*f*. RCU 42 includes an antenna 41*a* that receives a local oscillator signal radiated by a broadcast receiver. Antenna 41*a* is coupled to bandpass filter (BPF) 41*b* that passes radio frequency (RF) signals, including the radiated local oscillator signal, whose frequencies are within a band extending from $f_{low}$ to $f_{High}$. According to an embodiment, $f_{Low}$ is 98 MHz and $f_{High}$ is 119 MHz. However, one of ordinary skill in the art would appreciate that other frequency ranges are possible and that the frequency range depends upon the type of broadcast receiver whose radiated local oscillator signal is to be detected. For example, according to an embodiment, the tuning signal detector may selectively detect the radiate local oscillator signal of an FM radio receiver or a television receiver, in which case the tuning signal detector may have two or more bandpass filters, with at least one of the bandpass filters passing a frequency range in which a radiated local oscillator signal of a television receiver may be found.

Limiter 41*c* receives the bandpass filtered signal produced by BPF 41*b* and removes the amplitude fluctuations to produce a signal with uniform amplitude and a frequency related to the frequency of the radiated local oscillator signal. The signal produced by limiter 41*c* is applied to a second bandpass filter 41*d*. An output of BPF 41*d* is applied to frequency indication unit (FIU) 41*e* that produces a voltage that is indicative of the frequency of the radiated local oscillator signal. Control logic 41*f* receives the voltage produced by FIU 41*e* and maps the voltage level to a representation of a frequency between 98.6 MHz and 118.6 MHz. In an embodiment, control logic 41*f* includes a microprocessor and memory that stores an array that represents the relationship between a voltage produced by FIU 41*e* and a corresponding frequency. The memory also includes instructions for execution by a microprocessor. Under control of the instructions in the memory, the microprocessor performs the mapping. The microprocessor provides, based upon the representation of the frequency to which the voltage is mapped, an information identifier that is a basis for identifying information related to an item of programming.

According to an alternative embodiment, BPF 41*b* includes a comb filter that passes frequency ranges in which a radiated local oscillator signal may be present while blocking the frequency ranges in which a broadcast program signal is present. According to an alternative embodiment, FIU 41*e* includes a frequency counter that produces a digital representation of the frequency of the radiated local oscillator signal. According to an alternative embodiment, control logic 41*f*, based upon the digital representation produced by the frequency counter, provides an information identifier.

The term "provides" according to an embodiment refers to any operation that may be initiated by control logic to make the information identifier accessible for use as the basis for identifying information related to an item of programming. The operation need not be completed entirely by control logic, and may involve apparatus that perform one or more of the following: transmit, transform, store, or process electrical, magnetic or electromechanical signals. Examples of apparatus include, but are not limited to, one or more of the following: wired or wireless transceivers, modems, temporary storage, input/output (I/O) chips, devices, and peripherals. Examples of operations include, but are not limited to, one of the following: storing the information identifier in volatile or non-volatile memory from where it can be accessed for use as an information identifier, and transmitting the information identifier to a computing or communications device.

FIG. 7*b* illustrates a tuning signal detector according to an alternative embodiment of the present invention. Tuning signal detector 50 includes two units: radiated tuning signal receiver and characterization unit (RCU) 52 and control logic 51*c*. RCU 52 includes an antenna 51*a* that receives RF signals including a local oscillator signal radiated by a broadcast receiver. The RF signals are applied to receiver 51*b* that is under the control of control logic 51*c*.

In an embodiment, control logic 51*c* includes a microprocessor and memory containing instructions for execution by the microprocessor. Under control of the instructions, control logic 51*c*, applies a frequency control signal to receiver 51*b*. The frequency control signal causes receiver 51*b* to hop, within a reception band extending from $f_{Low}$ to $f_{High}$, to certain frequencies at which a radiated local oscillator signal may be present. In an embodiment, $f_{Low}$ is 98.6 MHz and $f_{High}$ is 118.6 MHz, but as indicated elsewhere herein the reception band limits are an implementation issue and not a limitation of the present invention. In an embodiment, control logic 51*c* instructs receiver 51*b* to hop to and dwell at frequencies that are spaced 200 KHz apart beginning at 98.6 MHz and ending at 118.6 MHz. In an embodiment, control logic 51*c* includes a memory in which logic 51*c* maintains a representation of the frequency at which receiver 51*b* is presently dwelling. Receiver 51*b* dwells at the frequencies for just enough time to reliably produce a received signal strength indication (RSSI) signal for a RF signal being received at the frequency. The dwell time is a function of receiver technology used and, one of ordinary skill in the art would appreciate, is not a limitation of embodiments of the present invention. The RSSI signal is applied to control logic 51*c*.

Control logic 51*c* determines whether the level of the RSSI signal indicates that a radiated local oscillator signal is present. In an embodiment, the determination is made by comparing the RSSI signal level to a threshold stored in the memory included in control logic 51*c*. When the RSSI signal level is indicative of the presence of a radiated local oscillator signal, control logic 51*c*, based upon the representation of the frequency at which receiver 51*b* is presently dwelling, provides an information identifier.

According to an alternative embodiment, multiple thresholds, each of which may be associated with one or more frequencies at which receiver 51*b* may dwell in the reception band, may be stored in the memory. In the embodiment with multiple thresholds, to determine whether a RSSI signal level is indicative of the presence of a radiated local oscillator signal, control logic 51c compares the RSSI signal level with the threshold associated with the frequency at which receiver 51b is dwelling.

While in an embodiment logic 51c instructs receiver 51b to begin at 98.6 MHz the cycle of searching for a radiated local oscillator signal within the reception band, one of ordinary skill in the art would appreciate that the starting frequency may be a frequency other than the lowest frequency in the reception band. According to an alternative embodiment, control logic 51c includes a microprocessor and temporary memory that stores a value, Starting_Frequency, for the frequency at which hopping is to commence. When tuning signal detector 50 is first put into operation, Starting_Frequency is initialized to a default frequency within the reception band, and control logic 51c instructs receiver 51b to begin searching at the default frequency for a radiated local oscillator signal. When control logic 51c detects a radiated local oscillator signal a certain frequency in the reception band, control logic 51c assigns to Starting_Frequency a new value which is the frequency at which the radiated local oscillator signal was detected. Subsequently, when control logic 51c begins another search for a radiated local oscillator signal, control logic 51c instructs receiver 51b to begin the cycle of searching for a radiated local oscillator signal at the new value for Starting_Frequency, which now happens to be the frequency at which the radiated local oscillator signal was last detected. Beginning a search for the radiated local oscillator signal at the frequency at which the radiated local oscillator signal was last detected, may shorten the time needed to detect the radiated local oscillator signal in some situations. For example, where the channel to which the broadcast receiver is tuned is more likely than not to remain the same between any two local oscillator signal detection attempts, it is more efficient to start the search at the frequency at which a local oscillator signal is last detected.

FIG. 7d illustrates a tuning signal detector according to an alternative embodiment of the present invention. Tuning signal detector 60 includes two units: radiated tuning signal receiver and characterization unit (RCU) 62 and control logic 61f. RCU 62 includes an antenna 61a that receives RF signals including a local oscillator signal radiated by a broadcast receiver. The RF signals are applied to low noise amplifier (LNA) 61b for amplification. The amplified signals that emerge from LNA 61b are applied to bandpass filter (BPF) 61c. BPF 61c produces a bandpass filtered signal containing the RF signals in the reception band extending from $f_{Low}$ to $f_{High}$ in which a radiated local oscillator signal may be present. In an embodiment, $f_{Low}$ and $f_{High}$ are 98.6 MHz and 118.6 MHz, respectively. However, as indicated elsewhere herein the reception band limits are an implementation issue which depends on the context in which an embodiment of the present invention is applied, and is not a limitation of the present invention.

While in the foregoing description BPF 61c passes signals in the entire $f_{Low}$ to $f_{High}$ band, in an alternative embodiment, BPF 61c selectively passes signals in a fraction of the $f_{Low}$ to $f_{High}$ band. In an alternative embodiment, BPF 61c is a switched bank band pass filter that passes signals in selectable segments of the $f_{Low}$ to $f_{High}$ band. In such an embodiment, BPF 61c is coupled to control logic 61f from which it receives signals indicating which segment of the $f_{Low}$ to $f_{High}$ band is to be passed. Tunable band pass filters may also be used in an alternative embodiment. One of ordinary skill in the art would appreciated that there are benefits to passing signals in a band that is a fraction of the width of the $f_{Low}$ to $f_{High}$ band.

FIG. 7e illustrates the frequency response of a band pass filter. Frequency response 63 indicates that the band pass filter passes the signals in a band extending from 98 MHz to 119 MHz, and attenuates signals on either side of the band in a gradual manner. One of ordinary skill in the art would appreciate that frequency response 63 is indicative of the frequency response of band pass filters in general and that in actual operation band pass filters used in an implementation of an embodiment may have a frequency response different from that illustrated in FIG. 7e. In an embodiment BPF 61c has the frequency response associated with having a pass band with a 108.5 MHz center frequency and −3 dB frequencies at 98 MHz and 119 MHz. As indicated by the shape of frequency response 63, signals are not completely blocked or attenuated on either side of the pass band, but rather there is a gradually increasing attenuation at frequencies above 119 MHz and frequencies below 98 MHz. Gradually increasing attention is an inherent characteristic of physical filters, and is taken into consideration when selecting sampling frequencies as one of ordinary skill in the art is well aware.

The band pass filtered signal emerging from BPF 61c is applied to analog to digital converter (ADC) ADC 61d. ADC 61d samples the band pass filtered signal and digitizes the samples to produce digital samples which are applied to spectrogram computation unit (SCU) 61e. Given the gradual nature of the attenuation and a phenomenon known as aliasing, sampling at twice the bandwidth, 42 million samples per second (MSPS), to satisfy the well-known Nyquist criterion may not produce an accurate representation of the signals in the reception band. The Nyquist criterion states that sample rate must be at least twice as large as the bandwidth of the signal being sampled in order to preserve the signal information. However, the Nyquist criterion assumes a sudden and abrupt transition between the stop band and the passband, a quality not found in physical filters. According to an embodiment, ADC 61d generates samples of the bandpass filtered signal at a sampling rate, $F_s$, of 446 MSPS. One of ordinary skill in the art would appreciate that other sampling rates are may be used in alternative embodiments. Furthermore, in an alternative embodiment the sampling rate is adjustable, and ADC 61d receives a signal from control logic 61f indicating the sampling rate at which the band pass filtered signal is to be sampled. In an alternative embodiment, control logic 61f controls a clock generation circuit (not shown in FIG. 7d) which applies a clock signal to ADC 61d which uses the clock signal to sample at a rate proportional to the clock signal frequency.

The sampling rate selected depends upon the bandwidth of the pass band and the ability of the band pass filter to minimize the effect of aliasing on the signals that are supposed to pass through the filter with no more attenuation than that due to the filter's unavoidable insertion loss. The sampling rate, however, does not depend on the location of the sampled signal in the spectrum. Thus, a signal may be sampled at a sample rate that is less than the highest frequency in the signal so long as the sample rate is at least twice the bandwidth. In an alternative embodiment, the band pass filtered signal is sampled at less than the highest frequency in the signal.

The digital samples produced by ADC 61d are processed by SCU 61e to produce a frequency domain representation of the signals in the reception band. In an embodiment, the frequency domain representation depicts the power present at discrete frequencies in the reception band. By determining the power at certain frequencies in the frequency domain representation, SCU 61e determines whether one or more radiated tuning signals are present in the reception band.

In an embodiment, SCU 61*e* is a digital signal processing (DSP) chip which includes, among other elements, an arithmetic unit, random access memory, and one or more of the following: flash memory, read-only-memory (ROM), or electrical erasable programmable memory (EEPROM). Given that memory in its various forms is an inherent element of some DSP chips, it is not shown in FIG. 7*d*. However, in an alternative embodiment, additional memory (not shown in FIG. 7*d*) is coupled to SCU 61*e*. The location of the memory is not critical to the present invention. In an alternative embodiment, SCU 61*e* is a field programmable logic array (FPGLA) with the capacity to perform digital signal processing algorithms. A general purpose microprocessor may also be used. Furthermore, in an alternative embodiment, SCU 61*e* is a general purpose microprocessor whose instruction set includes instructions for performing digital signal processing operations.

Common methods for producing frequency domain representations include the Discrete Fourier Transform (DFT), the Fast Fourier Transform (FFT), the discrete Hartley transform, and the discrete fast Hartley transform. Other methods known in the art include, but are not limited to, the maximum entropy method (MEM), covariance method of linear prediction, pole-zero models, signal modeling, or eigenvector analysis of the signal covariance matrix. It is not uncommon to use multiple methods in combination.

For example, often an FFT is generated for a set of samples, and information as to the number of sharp spectral features (e.g., presence of carriers) gleaned from the FFT is used to select the order of the all-pole spectrum that is to be produced by MEM. In an alternative embodiment, SCU 61*e* produces more than one frequency domain representation for the samples received from ADC 61*d* and uses them to identify presence of a radiated tuning signal in the $f_{Low}$ to $f_{High}$ band. In an alternative embodiment, SCU 61*e* produces an FFT for a set of time samples, analyzes the FFT to determine a suitable order for a MEM spectrum, and then performs a MEM on the original time samples using the order derived from the FFT analysis.

A frequency domain representation of the power of signals as a function of frequency is commonly illustrated in the form of a graph referred to as a spectrogram or power spectral density graph. However, one of ordinary skill in the art would appreciate that frequency domain representations produced by SCU 61*e* are stored as a data structure in storage such as volatile memory (not shown in FIG. 7*d*) included in SCU 61*e* or coupled to it. Accordingly, graphical representation of the information in the data structure in any figure herein is not to be understood as indicating that SCU 61*e* produces a graphical representation, but that the subject matter of interest is advantageously explained using a graphical representation.

Figure 7F:
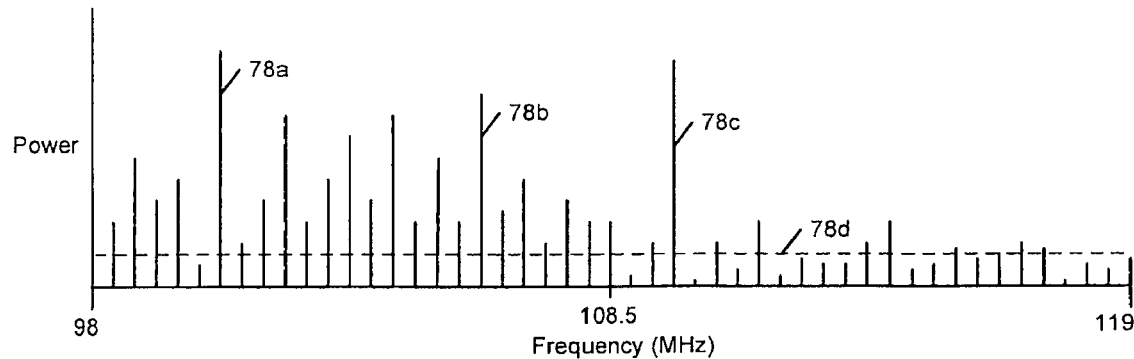
FIG. 7f illustrates a spectrogram that represents relative strength of a radiated tuning signal and broadcast signals in a reception band.

FIG. 7*f* illustrates a spectrogram that represents relative strength of a radiated tuning signal and broadcast signals in a reception band. One of ordinary skill in the art would appreciate that the spectrogram of FIG. 7*f* represents a hypothetical situation, and that the frequency domain representations produced by SCU 61*e* in actual operation will vary dynamically depending upon location and time. However, the spectrogram of FIG. 7*f* describes a phenomenon that is observed and analyzed by tuning signal detector 60 when it is in the vicinity of a broadcast receiver which is subject to the signals of multiple broadcast stations and which is, itself, radiating a tuning signal.

The spectrogram of FIG. 7*f* shows the presence of noise and several strong signals in the reception band. Given that FM radio stations in the US broadcast at odd tenth-MHz frequencies between 87.9 MHz and 107.9 MHz, peaks at such frequencies are either due to noise sources or noise sources and the signal of a radio station. Furthermore, given that most FM receivers have a 10.7 MHz intermediate frequency, peaks at even tenth-MHz frequencies between 98.6 MHz and 118.6 MHz are either do to noise sources or noise sources and a radiated tuning signal.

The relative strength of signal peaks 78*a*, 78*b* to average noise power 78*d* indicates that they represent the signals of stations broadcasting with a carrier frequency of 101.1 MHz and 106.1 MHz, respectively. Signal peak 78*c* represents a radiated tuning signal of a broadcast receiver that is tuned to receive a broadcast signal with a 101.1 MHz carrier frequency. In a spectrogram, a radiated tuning signal appears like an un-modulated carrier or a sinusoid whose power is largely confined to a narrow segment of the spectrum and is surrounded and influenced by the spectral components of noise. A modulated signal appears as a wideband signal with power that is spread across a segment of the spectrum that is wider than that of an un-modulated carrier.

Since a radiated local tuning signal is essentially a carrier with energy that can be captured and represented in a frequency domain representation, SCU 61*e* produces at least one frequency domain representation to determine whether one or more radiated local tuning signals are present in the vicinity of tuning signal detector 60. Based upon the samples received from ADC 61*d*, in an embodiment, SCU 61*e* produces a frequency domain representation by performing an FFT on the samples. The FFT is a fast algorithmic routine for producing the DFT. In an embodiment, the FFT performed by SCU 61*e* results in a frequency domain representation of time domain signals in the band extending from 73 MHz to 146 MHz.

The forward discrete Fourier transform of N time samples $x_k$, where k=0, 1, 2, . . . N−1 is defined by the following expression:

$$X_n = \sum_{k=0}^{N-1} x_k e^{\frac{j2\pi kn}{N}}, n = 0, 1, 2 \ldots N-1 \qquad \text{E. 1}$$

The FFT decomposes a time domain signal into its spectral components. The value of the $X_0$ sample (or first sample) of the FFT of N time samples indicates whether during the time spanned by the N time samples a spectral component with relative zero frequency is present. The absolute frequency associated with the $X_0$ sample is determined by a simple transformation and accounting for any spectral reversal due to sampling or mixing, if any. The value of the $X_1$ sample (i.e., second sample) of the FFT of N time samples indicates whether a signal with a relative frequency approximately equal to $F_s/N$ occurred, where $F_s$ is the sampling rate at which the N samples were generated.

The FFT maps the spectral components of the bandpass filtered signal to the frequency range extending from 0 Hz to $F_s/2$. This mapping is inherent to the FFT algorithm and occurs irrespective of the absolute frequencies of the spectral components of the time domain signal. Consequently, unless the time domain signal originally occupies a band extending from 0 Hz to less than $F_s/2$ Hz, a simple transformation is necessary.

In an embodiment, SCU 61*e* performs an FFT using N samples received from ADC 61*d*, where N is equal to 4096. The FFT has a granularity of 35.64 KHz, meaning the samples of the FFT represent spectral components of the time domain signals at discrete frequencies that are separated by 146 MHz/4096 or 35.64 KHz. In an alternative embodiment, SCU 61e performs an N point FFT, where N can be an integer greater or less than 4096. An N point FFT is symmetric about N/2, which means the first (N/2−1) values of $X_n$ provide information about the 73 MHz to 146 MHz band and the values of $X_n$ for n>N/2 are redundant. Thus, $X_0$ represents a spectral component with frequency 73 MHz, $X_1$ represents a spectral component with frequency 73 MHz+$F_s$/N, and so forth up to $$X_{\frac{N}{2}-1}$$

which represents a spectral component with frequency 73 MHz+$F_s$(N/2−1)/N, or 145.964 MHz.

In an embodiment, after generating a frequency domain representation of the signals in the reception band, SCU 61e analyzes the frequency domain representation to determine whether one or more radiated tuning signals at even tenth-MHz frequency can be identified in the representation. SCU 61e determines the FFT samples that are associated with each even tenth-MHz frequency and examines the power in the FFT samples to determine whether a radiated tuning signal is present at the even tenth-MHz frequency. In an embodiment, SCU 61e determines the FFT samples associated with an even tenth-MHz frequency using the following expressions:

Upper_Bin=max[round(($F_{even}-F_{low}$)*N/$F_s$),floor(($F_{even}-F_{low}$)*N/$F_s$)]

Lower_Bin=round(($F_{even}-F_{low}$)*N/$F_s$)==floor(($F_{even}-F_{low}$)*N/$F_s$)+floor(($F_{even}-F_{low}$)*N/$F_s$, where $F_{even}$ is the even tenth-MHz frequency for which the closest two FFT samples are to be determined using the foregoing formulas, $F_{low}$ is the lowest frequency in the sampled time domain signal. The 'round' operation rounds the argument to the nearest integer. The 'floor' operation rounds the argument to the nearest integer towards negative infinity. The '==' operation is the Boolean equivalence operation and returns either 1 or 0 depending upon whether the argument is true or false, respectively.

Table 1 below presents the values of Upper_Bin and Lower_Bin for several even tenth-MHz frequencies, for a 4096 point FFT and a 146 MSPS sampling rate. The values of Upper_Bin indicate the number of the FFT sample that would have the greatest power if a radiated tuning signal were present at the even tenth-MHz frequency closest to the frequency associated with the Upper_Bin FFT sample. The values of Lower_Bin indicate the number of the FFT sample that would have the next greatest power if a radiated tuning signal were present at the closest even tenth-MHz frequency. Upper_Bin and Lower_Bin take on integer values between 0 and N/2−1.

When reference is made herein to "Upper_Bin FFT sample" or "Lower_Bin FFT sample," reference is being made to the FFT sample equivalents of the DFT samples $X_{Upper\_Bin}$ and $X_{Lower\_Bin}$, respectively.

In an alternative embodiment, SCU 61e includes memory (not shown in FIG. 7d) or alternatively is coupled to memory (not shown in FIG. 7d) that stores information such as that represented in Table 1.

TABLE 1

|  | Frequency (MHz) | | | | |
| --- | --- | --- | --- | --- | --- |
|  | 98.6 | 98.8 | 99.0 | 99.2 | 99.4 |
| Upper_Bin | 718 | 724 | 729 | 735 | 741 |
| Lower_Bin | 719 | 723 | 730 | 736 | 740 |

Figure 7G:
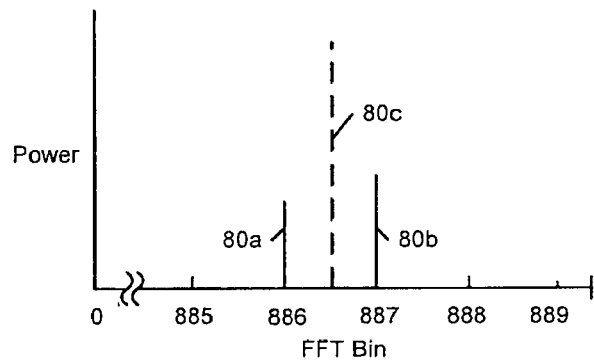
FIG. 7g illustrates a spectrogram including spectral samples of a sinusoid that is representative of a radiated tuning signal.

FIG. 7g illustrates a spectrogram including spectral samples of a sinusoid that is representative of a radiated tuning signal. For example, a 4096 point FFT of samples of signals in a band extending from 73 to 146 MHz that includes a radiated tuning signal at 104.6 MHz has a 886$^{th}$ FFT sample and a 887$^{th}$ FFT sample with a ratio of powers about 1.3:1 in favor of the 887$^{th}$ FFT sample. The relative power of the 886$^{th}$ FFT sample and the 887$^{th}$ FFT sample are shown in FIG. 7g. The discrete spectral components of the radiated tuning signal are shown by samples 80a, 80b. The 886$^{th}$ FFT sample 80a represents the 104.581 MHz spectral component of the 104.6 MHz signal. The 887$^{th}$ FFT sample 80b represents the 104.617 MHz spectral component of the 104.6 MHz signal. The true frequency is shown by dashed line 80c, and is the location of the peak spectral component of the 104.6 MHz radiated tuning signal. The length of dashed line 80c is roughly representative of the relative power in the peak spectral component at 104.6 MHz.

While in the illustration of FIG. 7g the peak spectral component falls almost exactly in between two samples, the peak spectral component of radiated tuning signals at frequencies other than 104.6 MHz may fall closer to one of two adjacent FFT samples. The FFT sample which is closer to the peak spectral component has greater power than the adjacent FFT samples which are further from the peak spectral component.

The values of Upper_Bin and Lower_Bin permit SCU 61e to determine which two samples to examine for presence of power due to a radiated tuning signal at an even tenth-MHz frequency. As indicated above, depending upon the embodiment, SCU 61e either calculates the values of Upper_Bin and Lower_Bin associated with each even tenth-MHz frequency for which it is to analyze the power, or, alternatively, SCU 61e retrieves the associated values from memory.

In an embodiment in which values of Upper_Bin and Lower_Bin are stored in memory, SCU 61e retrieves the values of Upper_Bin and Lower_Bin from the memory when it performs an analysis of the frequency domain representation. For example, to determine whether a radiated signal is present at 99.0 MHz, SCU 61e indexes into the Upper_Bin/Lower_Bin table in memory using the value 99.0, or an equivalent key, and retrieves the associated values "729" and "730" for Upper_Bin and Lower_Bin, respectively. SCU 61e determines the power in the 729$^{th}$ and 730$^{rd}$ FFT samples and stores a record in memory which includes the sum of the powers in one field and the associated frequency, 99.0, in another field. SCU 61e then indexes into the Upper_Bin/Lower_Bin table using 99.2 and retrieves the values "735" and "736" for Upper_Bin and Lower_Bin, respectively. SCU 61e determines the power in the 735$^{th}$ and 736$^{th}$ FFT samples and compares the sum of their power to the power sum stored for the 99.0 MHz signal. If the power sum associated with the 99.2 MHz signal exceeds the power sum associated with the 99.0 MHz signal, SCU 61e replaces the power sum of the 99.0 MHz signal with the power sum associated with the 99.2 MHz signal. If the power sum associated with the 99.0 MHz signal is greater than the power sum associated with the 99.2 MHz signal, the record stored for the 99.0 MHz signal remains unchanged. SCU 61e performs the forgoing power determination and comparison for any remaining even tenth-MHz frequencies at which a radiated tuning signal may reside. At the conclusion of the analysis, SCU 61e has stored a record which identifies the even tenth-MHz frequency whose power is greatest relative to the power in the other even tenth-MHz frequencies. In an alternative embodiment, SCU 61e maintains a list in memory which includes the power of the top w signals and their associated frequencies in descending order on the basis of power, where w is an integer greater than or equal to 2.

In an embodiment, SCU 61e considers the even tenth-MHz frequency signal whose associated FFT samples have the highest power relative to the power in the FFT samples of other even tenth-MHz frequency signals to be the frequency of the radiated tuning signal of interest or the one which is closest to antenna 61a. One of ordinary skill in the art would appreciate that other algorithms for identifying a radiated tuning signal are possible, and a few others are discussed herein. For instance, in an alternative embodiment, a condition(s) other than having the highest relative power at an even tenth-MHz frequency may need to be satisfied by a signal in order to be considered the radiated tuning signal that detector 60 is to identify.

In an embodiment, SCU 61e provides to control logic 61f a representation of the even tenth-MHz frequency at which it identified a radiated tuning signal that satisfied the condition it used in its analysis. Control logic 61f, based upon the representation of the frequency of the radiated tuning signal, provides an information identifier that is a basis for identifying information related to an item of programming presented by a receiver at the time the tuning signal was being radiated.

While in the above description SCU 61e retrieves values for Upper_Bin/Lower_Bin pairs from memory, in an alternative embodiment, SCU 61e calculates the values as needed when it is performing the analysis of the frequency domain representation. Those of ordinary skill in the art are familiar with the programming of DSP chips and other types of processors and the manipulation of data within and without processors, making it unnecessary to describe in greater detail these steps or operations for this alternative embodiment or any other embodiment in the present description.

One of ordinary skill in the art would appreciate that noise at antenna 61a may cause power at an Upper_Bin FFT sample to be actually less than the power at the adjacent Lower_Bin FFT sample. To reduce the influence of noise, in an alternative embodiment, SCU 61e performs at least two FFTs and averages them to produce an average FFT. Incoherent averaging using FFTs of overlapping samples or, alternatively, non-overlapping samples is well known in the art as is coherent averaging, and need not be discussed further herein. SCU 61e analyzes the average FFT, in the same manner that a single FFT is examined as described above, in order to identify a radiated tuning signal that meets one or more of the conditions described herein.

In an alternative embodiment, SCU 61e also examines the constituent FFTs that were used to produce the average FFT to determine whether the power in the FFT samples associated with even tenth-MHz frequencies fluctuated excessively. For example, SCU 61e examines the power in each FFT at the Upper_Bin/Lower_Bin FFT sample pair associated with a given even-tenth MHz frequency and produces a mean power and power variance for that even tenth-MHz frequency. SCU 61e produces similar statistics for other even-tenth MHz frequencies. SCU 61e then analyzes the mean and power at the even tenth-MHz frequencies to determine which signal at an even tenth-MHz frequencies is likely to be that of a radiated tuning signal. In making the determination, SCU 61e considers fluctuation substantially in excess of that attributable to ambient noise to be indicative of a signal other than a radiated tuning signal. Measuring the average power or noise floor and the variance of noise is well known in the art and need not be described herein. Consequently, in an alternative embodiment, SCU 61e rejects as a possible radiated tuning signal candidate an even tenth-MHz frequency signal whose associated FFT sample power fluctuates excessively even if its average power exceeds that of more stable even tenth-MHz frequencies.

While in an alternative embodiment SCU 61e implements a spectral estimation method that produces a continuous frequency domain representation, a discrete frequency domain representation such as that produced by an FFT produces equally spaced spectral components between 0 Hz and $F_s/2$. Each sample $X_n$ of the frequency space has an uncertainty of $F_s/N$, meaning that each FFT sample represents signals within a $F_s/N$ Hz wide frequency range. Consequently, the frequency of a radiated tuning signal that falls in between an Upper_Bin/Lower_Bin sample pair can have an associated uncertainty as great as $F_s/N$ Hz. However, benefits can be derived from determining the frequency of a radiated tuning signal to a lower degree of uncertainty.

For example, given that radiated tuning signals for FM broadcast receivers generally have a frequency within ±0-100 Hz of an even tenth-MHz frequency, estimating the frequency of the peak spectral component of a radiated tuning signal with an inaccuracy that is less than 100 Hz permits spurious signals to be rejected. While the power in an Upper_Bin/Lower_Bin FFT sample pair associated with an even tenth-MHz frequency may indicate that a radiated tuning signal is present, the frequency of the peak spectral component may indicate that a radiated tuning signal is not present. The frequency of the peak spectral component may indicate the absence of a radiated tuning signal because the frequency of the peak is substantially offset from the even tenth-MHz frequency associated with the Upper_Bin/Lower_Bin FFT sample pair by more than the cumulative error due to oscillator inaccuracy and frequency estimation error.

In the above description, the FFT has a granularity of 35.64 KHz. In the presence of strong noise, an FFT with a granularity of 35.64 KHz may make it difficult to determine reliably and consistently the frequency of the peak spectral component of a radiated tuning signal. Consequently, in alternative embodiments, tuning signal detector 60 estimates the peak spectral component frequency using at least one of the alternative techniques described herein.

It would be appreciated by one of ordinary skill in the art that increasing N by adding more time domain samples allows greater resolution of the frequency space. In an alternative embodiment, SCU 61e performs some FFTs for one value of N, and other FFTs for other greater and lesser values of N. Alternatively, zero valued samples can be added to N samples received from ADC 61d. Padding with zeros does not increase the resolution, but allows the FFT with resolution defined by N, to be sampled at shorter intervals.

Furthermore, in an alternative embodiment, SCU 61e performs frequency estimates for the peak spectral component based upon the power in the two adjacent samples between which an even tenth-MHz radiated tuning signal falls. One of ordinary skill in the art would appreciate, that unless a radiated tuning signal's frequency just happens to correspond with the frequency of an FFT sample, some portion of power of the signal will leak to other samples. Spectral leakage is a concept well understood in the art, and a phenomenon whose influence is accounted for using well known techniques in the art.

There are many techniques known in the art for estimating the frequency of a peak spectral component of a carrier. Estimation or interpolation techniques are generally specific to the window function applied to samples before an FFT is generated, and typically cannot be used interchangeably. The choice of window function is often a compromise between spectral leakage minimization, frequency/amplitude precision, side-lobe reduction, and main-lobe width increase. Examples of window functions include Hamming, Hanning, Blackman, Blackman-Harris, Rectangular (or no window), and Kaiser. Window functions that are applied to samples before performing an FFT on them are well known in the art, and need not be described in greater detail herein. According to an embodiment, SCU 61e applies a window function to the samples received from ADC 61d before performing an FFT. One of ordinary skill in the art would appreciate that the present invention is not limited to any particular window, or interpolation scheme.

Linear interpolation is a simple technique that can be implemented to estimate the frequency of the peak spectral component of a radiated tuning signal. By estimating the frequency of the peak spectral component, an estimate is effectively also made of the frequency of the radiated tuning signal.

Linear interpolation is acceptable when the granularity of the FFT is small enough that the errors in frequency estimates do not prevent SCU 61e from distinguishing between legitimate radiated tuning signals in the vicinity of an even tenth-MHz frequency and spurious signals or noise.

To estimate the frequency of an unmodulated carrier whose peak spectral component lies between adjacent Upper_Bin and Lower_Bin FFT samples, the following expression is evaluated by SCU 61e in an alternative embodiment:

$$F_{peak} = Freq_{Upper\_Bin} + \frac{P_{Lower\_Bin} * bin\_width}{P_{Lower\_Bin} + P_{Upper\_Bin}} \left( \frac{Lower\_Bin - }{Upper\_Bin} \right), \quad \text{E. 2}$$

where $F_{peak}$ is the estimated frequency of the radiated tuning signal whose peak spectral component lies between the FFT samples with numbers Upper_Bin and Lower_Bin. $Freq_{Upper\_Bin}$ is the frequency associated with the Upper_Bin FFT sample. $Freq_{Upper\_Bin}$ is equivalent to the sum of the lowest frequency in the sampled signal and Upper_Bin*$F_s$/N MHz. The lowest frequency sampled signal in an embodiment is 73 MHz. Consequently, $Freq_{Upper\_Bin}$ is equivalent to the sum of 73 MHz Lower Upper_Bin*$F_s$/N MHz. $P_{Lower\_Bin}$ is the power of the Lower_Bin FFT sample. $P_{Upper\_Bin}$ is the power of the Upper_Bin FFT sample, and bin_width is $F_s$/N. Thus, the frequency of the peak spectral component, $F_{peak}$, is either lower or greater than $Freq_{Upper\_Bin}$ depending upon whether Lower_Bin is less than or greater than Upper_Bin, respectively. Given that the maximum error for linear interpolation exceeds 10% of bin_width, linear interpolation is preferable when bin_width is less than a KHz rather than about tens of KHz.

As indicated above, some radiated tuning signals will have a frequency that is close to an even tenth-MHz frequency but not equivalent due to the effects of oscillator drift. Also, noise affects the values of $P_{Lower\_Bin}$ and $P_{Upper\_Bin}$ causing the estimate of the frequency of the peak spectral component to be different from the radiated tuning signal's true frequency. However, one of ordinary skill in the art would appreciate that a signal that appears to be in between an Upper_Bin/Lower_Bin FFT sample pair can be rejected by SCU 61e as a possible even tenth-MHz radiated tuning signal if the value for $F_{peak}$ that is calculated by SCU 61e is substantially different from the typical oscillator frequency of broadcast receivers that are being used even after the influence of noise and any errors due the linear approximation, among other errors, are taken into consideration.

For example, if the local oscillators of broadcast receivers in use typically generate a signal that is ±0-100 Hz off from the even tenth-MHz frequency that they are supposed to be generating, a signal with $F_{peak}$ can be rejected if it is removed from the even tenth-MHz frequency associated with the Upper_Bin and Lower_Bin FFT samples by more than the sum of 100 Hz and the total error in Hz due to noise and other factors arising from operations, including frequency estimation, performed in the receive chain extending from antenna 61a to SCU 61e. One of ordinary skill in the art would appreciate that the ±0-100 Hz difference indicated above is not a limitation of the present invention, but just a term used in illustrating that potential radiated tuning signals that are identified in a frequency domain representation can be rejected if they do not have frequencies that would be expected of received radiated tuning signals of typical local oscillators in receivers.

In an embodiment, SCU 61e stores in memory an acceptable_frequency_difference value which is indicative of the acceptable degree of difference between $F_{peak}$ calculated for an Upper_Bin/Lower_Bin FFT sample pair and the even tenth-MHz frequency associated with the Upper_Bin/Lower_Bin FFT sample pair. In an embodiment, the acceptable_frequency_difference is expressed in units of Hz, but other units are also possible in alternative embodiments. A value for acceptable_frequency_difference is determined by summing the most significant error sources that would lead to a radiated tuning signal to have a frequency other than exactly an even-tenth MHz frequency. Significant sources of error include, but are not limited to, the oscillator error of typical broadcast receivers, noise error, and peak spectral component frequency estimation error.

While analyzing the frequency domain representation, SCU 61e rejects signals whose associated frequency, $F_{peak}$ is not within acceptable_frequency_difference Hz of the nearest the even tenth-MHz frequency. In an alternative embodiment, the acceptable_frequency_difference value is stored in volatile memory which allows the value to be modified to accommodate changes in the stability of the frequency of tuning signals radiated by receivers or errors arising from the operations performed between antenna 61a and SCU 61e. In an alternative embodiment, one or more different acceptable_frequency_difference values are stored in memory and are used by SCU 61e. In one application, one acceptable_frequency_difference value may be used by SCU 61e in analyzing the frequency domain representation of the FM band, and another acceptable_frequency_difference value may be used for the frequency domain representation of the AM band, and so forth. In another application SCU 61e uses one acceptable_frequency_difference value when detecting the radiated tuning signal of receivers that have accurate and stable local oscillators and another acceptable_frequency_difference when detecting the radiated tuning signal of receivers with inaccurate and unstable local oscillators. Different values of acceptable_frequency_difference are used in an alternative embodiment to accommodate different noise power conditions: less offset is tolerated in low noise conditions than in high noise conditions. In an alternative embodiment, SCU 61e receives a signal from control logic 61f indicating which one of several stored acceptable_frequency_difference values SCU 61e is to use in performing its analysis.

In an alternative embodiment, to estimate the frequency of the peak spectral component of a radiated tuning signal, SCU 61e evaluates an expression that relates the power in the Upper_Bin and Lower_Bin FFT samples to the frequency of the peak spectral component.

Figure 7H:
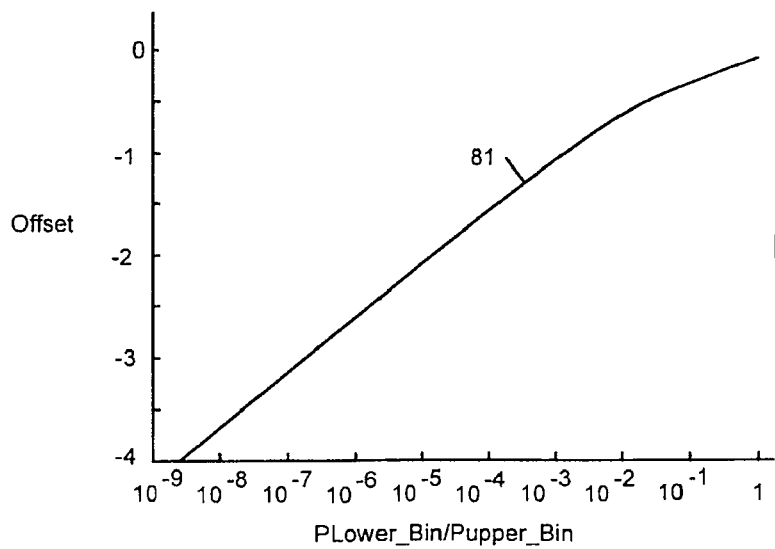
FIG. 7h illustrates a relationship between the frequency of a peak spectral component of a carrier whose frequency lies in between two adjacent FFT samples and the power in the adjacent FFT samples.

FIG. 7h illustrates a relationship between the frequency of a peak spectral component of a carrier whose frequency lies in between two adjacent FFT samples and the power in the adjacent FFT samples. Curve 81 represents a relationship between $\log(P_{Upper\_Bin}/P_{Lower\_Bin})$ and the log of the normalized frequency offset of the peak spectral component from the frequency associated with the Upper_Bin FFT sample. Curve 81 can be represented by the following expression:

$$\text{Norm\_offset} = a_0 + a_1 x^1 + a_2 x^2 + a_3 x^3 + a_4 x^4 + a_5 x^5, \qquad \text{E. 3}$$

where Norm_offset is the log of the peak spectral component's normalized offset from $P_{Upper\_Bin}$, $x = \log(P_{Upper\_Bin}/P_{Lower\_Bin})$ $a_5 = -5.5403 \times 10^{-5}$, $a_4 = -0.0015453$, $a_3 = -0.016975$, $a_2 = -0.092941$, $a_1 = 0.24166$, and $a_0 = 1.7488$.

While in the above description, a single expression is used for all possible values of $P_{Upper\_Bin}/P_{Lower\_Bin}$, one of ordinary skill in the art would appreciate that several piece-wise expressions for the offset, each of which is valid only for certain ranges of the ratio $P_{Upper\_Bin}/P_{Upper\_Bin}$, can also be used in alternative embodiments.

Norm_offset can be used to derive the absolute frequency offset in Hz by evaluating the following expression:

$$\text{Frequency\_offset} = \tfrac{1}{2}\text{bin\_width} * 10^{Norm\_offset} \qquad \text{E. 4}$$

The absolute frequency of the peak spectral component is provided by the following expression.

$$F_{peak} = \text{Freq}_{Upper\_Bin} + \text{Frequency\_offset} * (\text{Lower\_Bin} - \text{Upper\_Bin}), \qquad \text{E. 5}$$

One of ordinary skill in the art would appreciate that alternative embodiments with alternate window functions, would require alternative expressions to be derived. The above expression has a worst case accuracy of about 0.14% of bin_width, assuming no noise and floating point evaluation of expressions. One of ordinary skill in the art would appreciate that the absolute error can be decreased in alternative embodiments by using an FFT with a higher granularity, i.e., decreasing bin_width. In an alternative embodiment, SCU 61e evaluates expressions such as those in Eqs. 3, 4, and 5 in order to determine the frequency of the peak spectral component of a radiated tuning signal.

One of ordinary skill in the art would appreciate that in an alternate embodiment, Eq. 3 is be represented by a table in memory that stores the frequency offset for various values of $P_{Upper\_Bin}/P_{Lower\_Bin}$. In such an alternative embodiment, SCU 61e uses linear interpolation to determine the frequency offset for $P_{Upper\_Bin}/P_{Lower\_Bin}$ ratios that are between two adjacent table values of $P_{Upper\_Bin}/P_{Lower\_Bin}$.

In alternative embodiment in which a rectangular window is used with the time samples, SCU 61e finds the solution to the following system of equations to determine the absolute value of the frequency offset, $\delta$, and the ratio, $\alpha$, of the power in the peak spectral component, $P_{peak}$, to N/2:

$$\frac{\alpha \sin(\pi \delta)}{\pi \delta} - \frac{2 P_{Upper\_Bin}}{N} = 0, \qquad \text{E. 6}$$

$$\frac{\alpha \sin[\pi(\delta - 1)]}{\pi(\delta - 1)} - \frac{2 P_{Upper\_Bin}}{N} = 0, \qquad \text{E. 7}$$

where $2 * P_{Upper\_Bin}/N \leq \alpha \leq 1$, and $0 \leq \delta \leq 0.5$. Solving a system of expressions is well known in the art and need not be described further herein.

Furthermore, in an alternative embodiment, SCU 61e determines the absolute frequency of the peak spectral component, $F_{peak}$ by evaluating the following expression:

$$F_{peak} = \text{Freq}_{Upper\_Bin} + \delta * (\text{Lower\_Bin} - \text{Upper\_Bin}). \qquad \text{E. 8}$$

The power in the peak spectral component $P_{peak}$ at $F_{peak}$ is determined by evaluating the following expression:

$$P_{peak} = \frac{\alpha N}{2}, \text{ where } 2 * P_{Upper\_Bin}/N \leq \alpha \leq 1. \qquad \text{E. 9}$$

In an alternative embodiment, SCU 61e performs the frequency domain representation analysis using the values of $F_{peak}$ determined by way of expression E. 8 and the values of $P_{peak}$ determined by way of expression E. 9. The discussions elsewhere in the present description relating to the analysis performed by SCU 61e using $F_{peak}$, $P_{peak}$, or both, are incorporated herein by reference.

As indicated elsewhere herein, the power of the peak spectral component can be estimated by evaluating an expression rather than by summing the power in the Upper_Bin/Lower_Bin FFT sample pair. In an alternative embodiment SCU 61e determines the power by evaluating an expression that relates the power in the Upper_Bin/Lower_Bin FFT sample pair and the frequency of the peak spectral component to the power of the peak spectral component. To estimate the power of a peak spectral the following expression is evaluated by SCU 61e in an alternative embodiment:

$$P_{peak} = P_{Upper\_Bin} + 600\left(\frac{P_{Lower\_Bin} * f_{\Delta 1}}{f_{\Delta 2}}\right) + 0.0132\left(\frac{P_{Upper\_Bin} * f_{\Delta 1}}{f_{\Delta 2}}\right) \qquad \text{E. 10}$$

where $$f_{\Delta 1} = |\text{Freq}_{Upper\_Bin} - F_{peak}|,$$

$f_{\Delta 2} = \text{bin\_width} - |\text{Freq}_{Upper\_Bin} - F_{peak}|$, and $F_{peak}$ is the estimate of the frequency of the peak spectral component derived by any of the techniques described above. $P_{Lower\_Bin}$, $P_{Upper\_Bin}$, bin_width, and $F_{peak}$ have the definitions indicated above in connection with the peak spectral component frequency estimation description. In an alternative embodiment, SCU 61e calculates $P_{peak}$ using an expression as for each Upper_Bin/Lower_Bin FFT sample pair that is associated with an even tenth-MHz frequency. SCU 61e then selects the even tenth-MHz frequency associated with the Upper_Bin/Lower_Bin FFT sample pair with the highest associated $P_{peak}$ as the frequency of the radiated tuning signal tuning that signal detector 60 is supposed to detect. While expression E. 9 is for rectangular window time samples, similar expressions can be derived by one of ordinary skill in the art for other windows.

FIG. 7i illustrates a relationship between the power of a peak spectral component of a carrier whose frequency lies in between two adjacent FFT samples and a ratio of powers in the adjacent FFT samples. Curve 82 provides the multiplier for $P_{Upper\_Bin}$ as a function of the ratio $P_{Upper\_Bin}/(P_{Lower\_Bin}+P_{Upper\_Bin})$, where the ratio ranges between 1 and 0.9. Power of the peak spectral component is determined by the following expression multiplier*$P_{Upper\_Bin}$. Curve 82 indicates that the multiplier has a value of one when the peak spectral component frequency is the same as the frequency of the Upper_Bin FFT sample. As the peak spectral components frequency deviates from the Upper_Bin FFT sample frequency, the multiplier increases in value. The multiplier can be represented by the following expression:

$$\text{Multiplier}_{>0.9} = b_0 + b_1 p^1 + b_2 p^2 + b_3 p^3 + b_4 p^4, \quad \text{E. 11}$$

where $b_0 = -543.53$, $b_1 = 2324.3$, $b_2 = -3719.1$, $b_3 = 2645.3$, $b_4 = -706.02$, and $P = P_{Upper\_Bin}/(P_{Lower\_Bin}+P_{Upper\_Bin})$ for values between 0.9 and 1.

FIG. 7j illustrates another relationship between the power of a peak spectral component of a carrier whose frequency lies in between two adjacent FFT samples and a ratio of powers in the adjacent FFT samples. Curve 83 provides the multiplier for $P_{Upper\_Bin}$ as a function of the ratio $P_{Upper\_Bin+}P_{Upper\_Bin}$), where the ratio ranges between 0.5 and 0.9. Power of the peak spectral component is determined by the following expression multiplier*$P_{Upper\_Bin}$. Curve 83 indicates that the multiplier has a value of about 1.24 when the peak spectral component frequency is midway between the frequency of the Lower_Bin FFT sample and the frequency of the Upper_Bin FFT sample. The multiplier can be represented by the following expression:

$$\text{Multiplier}_{\leq 0.9} = c_0 + c_1 p^1 + c_2 p^2 + c_3 p^3 + c_4 p^4, \quad \text{E. 12}$$

where $c_0 = -0.8381$, $c_1 = 2.1828$, $c_2 = 4.4306$, $c_3 = 4.1577$, $c_4 = -1.7287$, and $p = P_{Upper\_Bin}/(P_{Lower\_Bin}+P_{Upper\_Bin})$ for values between 0.5 and 0.9.

One of ordinary skill in the art would appreciate that alternative curves may be obtained for alternative embodiments, and that in alternative embodiments, the curves are represented by expressions similar to the ones described herein. In such alternative embodiments, SCU 61e determines the power of the peak spectral component between an Upper_Bin/Lower_Bin FFT sample pair by evaluating an expression representative of curve 82 or curve 83 to determine the multiplier by which $P_{Upper\_Bin}$ is to be multiplied.

In an alternative embodiment, SCU 61e determines $P_{peak}$, by one of the techniques described herein, only for signals that have an associated $F_{peak}$ that satisfies the acceptable_frequency_difference constraint described above. By limiting the pool of candidate radiated tuning signals using the acceptable_frequency_difference constraint and then selecting the signal with greatest $P_{peak}$, SCU 61e avoids the risk of selecting a high power signal that does not have the frequency typically associated with tuning signals radiated by receivers. As indicated above, other conditions may also be used to reject or accept potential radiated tuning signals, and the above discussion is incorporated herein by reference.

Frequency and power estimate expressions such as those described above can be obtained, by analytical techniques or by curve fitting, for other sampling rates, values of N other than those identified herein, and windows other than a rectangular window. Curve fitting is especially useful where the window function has an expression that does not permit easy analytical derivation of estimate expressions. For example, to generate a frequency estimate expression, the logarithm of the ratio $P_{Upper\_Bin}/P_{Lower\_Bin}$ can be evaluated for various values of the logarithm of the frequency offset to produce a discrete representation of a curve. Curve fitting is then performed on the discrete representation to derive a continuous polynomial expression, or other expression, with a suitable order to minimize error. In an embodiment, neither SCU 61e nor control logic 61f derives continuous expressions for power or frequency estimation, but at least one of them has the capacity to evaluate one or more expressions. However, in alternative embodiments, either one or both of SCU 61e and control logic 61f derive continuous frequency and power estimate expressions as needed. One of ordinary skill in the art would appreciate that cost and similar design considerations affect whether or not flexibility will be embedded in any particular embodiment.

While the ratio $P_{Upper\_Bin}/P_{Lower\_Bin}$ is used to derive a continuous expression for frequency estimates, it would be appreciated by one skilled the art that other variables may also be used. Furthermore, in an embodiment, the log of the ratio $P_{Upper\_Bin}/P_{Lower\_Bin}$ is used because the relationship between the ratio $P_{Upper\_Bin}/P_{Lower\_Bin}$ and the frequency offset of the peak spectral component is exponential in nature. The log operation serves to linearize the relationship facilitating low order curve fitting.

Curve fitting is well understood in the art and need not be described in greater detail herein. Similar procedures for generating expressions that are well known in the art or, as indicated above, tables with values that relate the power in FFT samples to the peak spectral component frequency or the peak spectral component power may also be used.

In an alternative embodiment, SCU 61e performs an initial N point FFT to identify the frequencies of potential radiated tuning signals. SCU 61e then performs digital bandpass filtering filter on M sample points received from ADC 61d, where M is an integer greater than N. The digital bandpass filter has a much narrower bandpass than $f_{high}-f_{low}$ and is centered at one of the frequencies between 0 Hz and $F_s/2$ at which SCU 61e identified a potential radiated tuning signal and which corresponds to an even tenth-MHz frequency in the reception band. The digital bandpass filter has a 200 KHz wide passband, but in alternative embodiments passbands of other widths are also possible. After bandpass filtering, SCU 61e performs digital down conversion by multiplying the digitally bandpass filtered samples with the digital samples of a sinusoid with frequency $f_d$. SCU 61e specifies $f_d$ to have the value necessary to bring the filtered signal down to a frequency that is about ½ the bandwidth of the digital bandpass filter; so that when the samples are decimated the signal will not be corrupted due to aliasing. After down conversion, SCU 61e decimates the M samples by a factor d, where d is an integer. Values for d should be chosen so that $F_s/d \geq 2*BW_{baseband}$, where $BW_{baseband}$ is the bandwidth of the signal after down conversion.

While in the above description SCU 61e performs down conversion before decimation, one of ordinary skill in the art would appreciate that signals that are already close to 0 Hz may be decimated directly after bandpass filtering. After decimating, SCU 61e performs an FFT on the decimated samples. One of ordinary skill in the art would appreciate that, the foregoing described process allows an FFT with a resolution higher than that achieved with an N point FFT to be produced for appropriately chosen values for M, d, and bandwidth of the digital bandpass filter.

For example, a 4096 point FFT of samples produced at 146 MSPS results in a granularity of about 35.6 KHz. However, SCU 61e performs the above described process on M samples, where M has the value 24,576, and d has a value of 100, resulting in 245 samples for which an FFT is to be performed. Efficient algorithms for performing an FFT require $2^n$ samples as an input. The nearest power of 2 to 245 is 256, meaning SCU 61e pads the 245 samples with 11 zeros. Since, the new sampling rate after decimation is $F_s/d$, the granularity is $F_s/(N_d d)$, where $N_d$ is the number of samples after decimation and zero padding if any. For the foregoing example, the granularity is 5.7 KHz. Since many signal processing chips can performing filtering and down conversion much faster than they can perform an FFT for large values of N, this alternate embodiment allows higher granularity to be achieved with an FFT even when $N_d$ is much less than N. Frequency and power estimation is then performed by SCU 61e using one or more of the techniques described herein, adapted as necessary.

SCU 61e repeats the above process for another signal which SCU 61e identifies as being a potential radiated tuning signal. After performing the frequency and power estimation for all signals at the identified frequencies, SCU 61e analyzes, as described elsewhere herein, the frequency and power estimates for the signals at the identified frequencies, and selects one of the signals as the radiated tuning signal. SCU 61e then provides a representation of the frequency of the selected signal to control logic 61f.

While in the above description SCU 61e performs digital bandpass filtering of one signal at a time, in an alternative embodiment SCU 61e performs digital bandpass filtering of multiple signals. One of ordinary skill in the art would appreciate that in an alternative embodiment SCU 61e may include a digital down converter which is optimized to perform digital mixing and digital filtering. Digital down converters or digital receiver chips are well known in the art and need not be described in greater detail herein.

While in the above description SCU 61e performs digital bandpass filtering of the samples received from ADC 61d, one of ordinary skill in the art would appreciate that such filtering can be performed by analog bandpass filters that precede ADC 61d. In an alternative embodiment, BPF 61c includes a tunable filter which passes a segment of the spectrum between $f_{low}$ to $f_{high}$ that is indicated in a filter tuning signal provided by SCU 61e. SCU 61e indicates the segment to be passed to BPF 61c and then it accepts samples from ADC 61d for processing as described herein.

In an alternative embodiment, SCU 61e, after performing an initial FFT, provides to control logic 61f the result of its analysis of the FFT. Based upon the results of the analysis, control logic 61f applies a filter tuning signal to BPF 61c and provides control signals to SCU 61e instructing it as to the number of samples to filter, the digital oscillator frequency for performing down conversion, and the decimation factor, d.

In an alternative embodiment, BPF 61c includes a switched bank of analog filters each of which passes a narrow non-overlapping segment of the $f_{low}$ to $f_{high}$ reception band. The segments are each 3 MHz wide, but in alternative embodiments they can be larger or smaller than 1 MHz, and may overlap. Furthermore, in alternative embodiments the segments do not have uniform bandwidth. SCU 61e provides to BPF 61c an indication of the filter to use (i.e., signals in a segment of the spectrum to pass) and then it accepts samples from ADC 61d for processing as described herein. In an alternative embodiment, control logic 61f provides to BPF 61c the indication of which filter to use and instructs SCU 61e as to the manner in which it is to process the samples. Switched bank and tunable filters are well known in the art and need not be described in greater detail herein.

While in the above description SCU 61e performed frequency and power estimates for every even tenth-MHz frequency, it would be appreciated by one of ordinary skill in the art that depending upon the geographic location of tuning signal detector 60, SCU 61e in an alternative embodiment does not perform such tasks for certain even tenth-MHz frequencies. Specifically, even tenth-MHz frequencies which are associated with an odd tenth-MHz frequency for which no signal can be received at the location need not have frequency estimates performed nor is it necessary for SCU 61e to include them in its analysis. However, in an alternative embodiment SCU 61e makes power estimates for such frequencies in order to develop a set of average noise power, or noise floor, and noise variance for different segments of the reception band. Such power estimates may be performed while SCU 61e is performing frequency and power estimates pursuant to identifying a radiated tuning signal, or alternatively such power estimates may be performed separately.

In an alternative embodiment, SCU 61e includes memory that stores information indicative of the frequencies of stations that can be received in various locations and an indication of the location of tuning detector 60. DS 6 of FIG. 1c illustrates a data structure that includes information as to the frequencies that can be received in various regions. DS 6 also includes schedule field 7c whose entries are the schedule of broadcasters. A data structure (hereafter referred to as "geographic reception data structure") that includes fields 7a and 7b of DS 6, but not schedule field 7c or its entries, is stored in memory included in SCU 61e.

Techniques for determining and storing an indication of the location of tuning detector 60 are well known in the art, and, include, but are not limited to, control logic 61f storing in memory included in SCU 61e location data received from a global positioning system (GPS) receiver, a cellular network or cellular network device, or even accepting location information from the user of tuning detector 60 through a user interface (not shown in FIG. 7d) coupled to control logic 61f. Based upon the location data stored in memory and the geographic reception data structure, SCU 61e determines which frequencies can be received, and by elimination those that cannot be received.

While SCU 61e performs the frequency estimation and analysis in some embodiments, one of ordinary skill in the art would appreciate that control logic 61f performs the estimation and analysis in alternative embodiments. In yet other alternative embodiments, performance of the estimation and analysis is divided between control logic 61f and SCU 61e. Furthermore, as described below, a repetition of the estimation and analysis to be initiated by the unit control logic 61f in an embodiment, but in an alternative embodiment this repetition may be initiated by the unit SCU 61e. Furthermore, while memory in SCU 61e is described as storing certain information in some embodiments, one would appreciate that this information may be stored in other memory included in tuning signal detector 60. One of ordinary skill would appreciate that this flexibility exists in all the embodiments in the present description, and that absence of a description of a variation is not indicative that such embodiment is not encompassed by any invention described herein.

Consequently, in the interests of not obscuring the description of embodiments and efficiency of presentation, given that apportionment of tasks and information among units of an embodiment is a design consideration relating to matters of personal preference including cost, reference will not be made to alternatives that are based simply upon apportioning certain tasks or information to one unit of an embodiment and some of those same tasks or information to another unit of an alternative embodiment of the present invention, where such apportionment would be expected by one of ordinary skill in the art.

In an alternative embodiment, SCU 61e, based on the analysis of an initial frequency domain representation using any of the methods described above, provides one or more frequency estimates of potential radiated tuning signals and their associated power to control logic 61f. As indicated above, an initial frequency domain representation may be an average of several representations. Accordingly, reference to the word "initial" is not intended to be a reference to the word "single."

In an alternative embodiment, depending upon the frequencies and associated powers provided by SCU 61e, control logic 61e may require SCU 61e to perform additional data collection and analysis. For example, if the frequency and power estimates provided by SCU 61e prevent an accurate determination, control logic 61f requires SCU 61e to perform additional data collection, which may include generating a higher granularity frequency domain representation, and analysis.

While in an embodiment a radiated tuning signal is identified based on its higher power relative to other signals in the reception band, one of ordinary skill in the art would appreciate that in an alternative embodiment one or more optimal decision thresholds are used by control logic 61f to determine whether a signal in the reception band is a radiated tuning signal. An optimal decision threshold is the power threshold that causes control logic 61f to consider a signal a radiated tuning signal when the signal's power equals or exceeds the power threshold. Conversely, when a signal's power is less than the power threshold, control logic 61f considers the signal to be noise. In an alternative embodiment, the memory of control logic 61f stores multiple optimal decision thresholds. In an alternative embodiment, each even tenth-MHz frequency has its own optimal threshold.

One of ordinary skill in the art would appreciate the power threshold is selected so as to minimize the total error probability. The total error probability is a function of the probability ($P_{0|1}$) that a signal power is identified as being noise power when in reality it is the power of a radiated tuning signal and the probability ($P_{1|0}$) that a signal power is identified as being the power of a radiated tuning signal when in reality it is noise power.

It is common to model the probability distribution function of the power of a carrier as a Gaussian distribution with a non-zero mean and a variance equivalent to the variance of the noise power. Empirical measurements show that the actual radio environment is not as simple as this model suggests. Potential models for noise processes include Poisson process models and Poisson-Poisson models that can describe randomly occurring impulses, often generated by electronic processes. There are many other models known in the art and they can be used in the present invention to the extent their assumptions are applicable to the context in which an embodiment is placed or they can be adjusted to account for the peculiarities of the different contexts in which embodiments applied. Adapting models is something well known by those skilled in the art and need not be described in further herein.

In an alternative embodiment, a statistical model is used to set one or more optimal thresholds. A common model is to assume that the carrier power and the noise power both share the same variance. An enhancement to this model would be to allow the carrier power and the noise power to have different variances, but Gaussian distributions. An additional enhancement would be to allow the carrier power and the noise power to have different distributions. For example, the carrier power in the presence of noise has a Rician distribution while the noise power alone has a Rayleigh distribution when the noise passes through a filter that has a passband that is narrow relative to the center frequency of the filter. An additional enhancement would be to empirically determine the distributions and derive the optimal threshold(s) using the empirically determined distributions. In an alternative embodiment, SCU 61e or control logic 61f include one or more of the foregoing enhancements to the basic Gaussian distribution model in which the noise power and the radiated tuning signal power have the same variance.

In an alternative embodiment, SCU 61e identifies a radiated tuning signal in the reception band by using thresholds derived from empirical distributions determined during an initialization process of tuning signal detector 60. The initialization process produces a data structure that includes the Rician parameters of the radiated tuning signal power at some or all of the even tenth-MHz frequencies and the Rayleigh parameters of the noise power of noise at some or all of the even tenth-MHz frequencies. Alternatively, the initialization process produces a data structure that includes a discrete probability distribution for the power of the radiated tuning signal for each of some or all of the even tenth-MHz frequencies and a discrete probability distribution function for the noise power for each of some or all of the even tenth-MHz frequencies.

FIG. 7k illustrates probability distribution functions for noise and a radiated tuning signal in the presence of noise. Curve 105a is the Rayleigh probability distribution function of noise power. Curve 105b is the Rician probability distribution function of the power of a radiated tuning signal. The optimal threshold is the power threshold, $P_{th}$, which minimizes the probability of error. The probability of detecting a radiated tuning signal is the area under curve 105b for $P_{th} \leq power \leq \infty$. The probability of a false alarm is the area under curve 105a for $P_{th} \leq power \leq \infty$. Integrating the Rician pdf to determine the probability of detection requires numerical techniques or a series approximation because a closed form solution is not possible. Tables with sets of curves can be found in many textbooks dealing with detection and estimation. The curves typically show the probability of detection as a function of signal to noise ratio with each curve associated with a particular or desired false alarm probability. A signal-to-noise ratio (SNR) of about 13 dB results in a 90% probability of detection for a false alarm probability of $10^{-6}$. A 5.3 dB SNR results in about a 99.9% probability of detection for a false alarm probability of $10^{-3}$.

FIG. 7l illustrates probability distribution functions for noise and a radiated tuning signal in the presence of noise after post-detection integration. Curve 105d is the Rayleigh probability distribution function of noise power after post-detection integration. Curve 105e is the Rician probability distribution function of the power of a radiated tuning signal after integration. In comparison to curves 105a,b, curves 105d,e have little or no overlap meaning that integration can significantly improve probability of detection and false alarm probability.

Figure 7M:
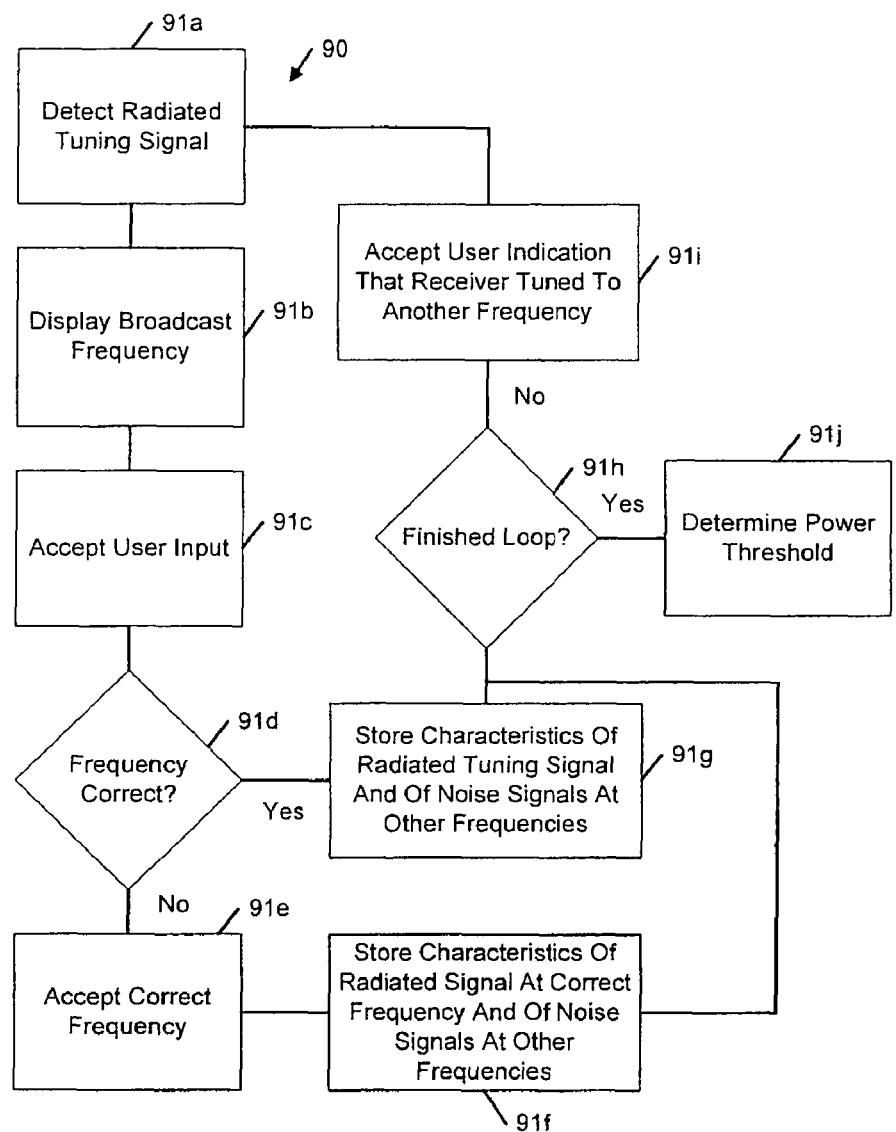
FIG. 7m illustrates a process for determining the probability distribution functions for a radiated tuning signal and noise according to an embodiment of the present invention.

FIG. 7m illustrates a process for determining the probability distribution functions for a radiated tuning signal and noise according to an embodiment of the present invention. The result of process 90 is a histogram of the noise power at even tenth-MHz frequencies in the absence of a radiated tuning signal and the power of a radiated tuning signal mixed with noise at those same frequencies. A histogram divides a power domain into bins of uniform finite width, and in each bin a count is kept of the number of times the noise power or alternatively the mixed radiated tuning signal and noise power had the value associated with the bin. In an embodiment, control logic 61f maintains in memory a histogram data structure (histogram in a data structure) of the noise and radiated tuning signal powers that are measured during an initialization process such as process 90. In an alternative embodiment, control logic 61f maintains a histogram of the noise and radiated tuning signal powers that are measured during the operation of tuning signal detector 60. The probability that the power associated with a bin will occur is simply the count divided by the total number of observations (i.e., the sum of all the counts in all the bins that keep track of the noise power).

Figure 7N:
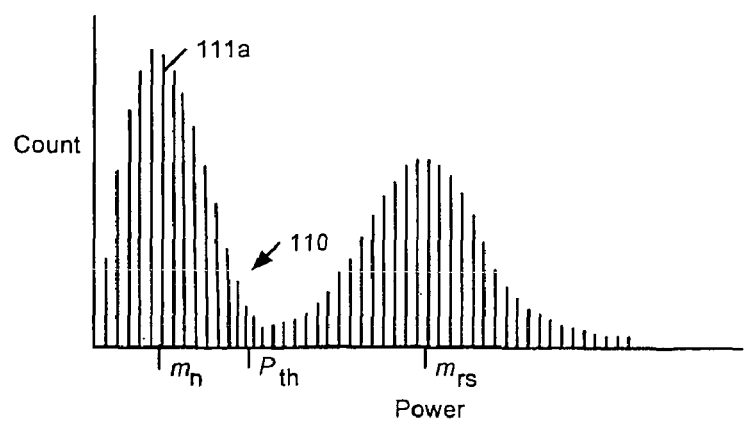
FIG. 7n illustrates a graphical representation of a histogram according to an embodiment of the present invention.

FIG. 7n illustrates a graphical representation of a histogram according to an embodiment of the present invention. Histogram 110 represents a power domain that is divided into bins, and the count of the number of times the radiated tuning signal had the power value associated with the bins is represented by a spike, such as spike 111a, whose length is proportional to the count. While histogram 110 appears to show that one set of bins is maintained for both noise power and the radiated tuning signal, control logic 61f maintains two separate sets of bins, one for each of the powers being tabulated. By maintaining two separate sets of bins, control logic 61f determines the $P_{th}$ that minimizes the probability of error even if the discrete probability distributions of the noise and the radiated tuning signal overlap. If one set of bins were maintained and the distributions overlapped, would be difficult to accurately select a $P_{th}$. Generating histograms is well understood by those skilled in the art and need not be described in greater detail herein.

In process 90, SCU 61e identifies 91a a radiated tuning signal at a certain frequency in accordance with one of the techniques described herein. The power of the radiated tuning signal and its frequency as well as the power of the noise at other frequencies in the reception band are measured and stored in temporary memory accessible to control logic 61f. In an embodiment, the radiated tuning signal is identified at an even tenth-MHz frequency and the noise is measured at other even tenth-MHz frequencies in the reception band. The broadcast frequency associated with the radiated tuning signal is presented 91b to a user of tuning signal detector 60 by way of a display (not shown in FIG. 7d) coupled to control logic 61f. User input indicating whether the displayed broadcast frequency is the same as the frequency of the receiver radiating the tuning signal is accepted 91c by control logic 61f by way of a user interface (not shown in FIG. 7d), such as a keypad or a voice recognition unit, coupled to control logic 61f. Control logic 61f then determines 91d whether the user input indicates that the displayed frequency is correct. When the displayed frequency is correct, control logic 61f retrieves the power and frequency information from temporary memory and populates 91g the appropriate bins in the histogram data structure it is maintaining in memory. In an embodiment, a histogram is maintained for each even tenth-MHz frequency. In an alternative embodiment, one common histogram (with one set of bins for noise power and another set of bins for radiated tuning signal power) is maintained for all the even tenth-MHz frequencies. Given that noise, especially man-made noise, is not likely to be uniformly distributed in all contexts in which embodiments of the present invention may be used, one of ordinary skill in the art would appreciated that there are benefits to having separate histograms for each frequency.

When control logic 61f determines 91d that the displayed frequency is incorrect, an indication of the proper frequency is accepted from the user by the user interface coupled to control logic 61f. Control logic 61f then retrieves the power and frequency information from the temporary memory and populates 91f the histogram data structure. The power estimate for the displayed frequency is placed among the bins for noise power, while the power estimate for the frequency provided by the user is placed among the bins for radiated tuning signal power.

After the histogram has been populated 91f, 91g, control logic 61f determines 91h whether a complete loop around the reception band has been performed. If a complete loop has not been completed, upon the user interface accepting 91i an indication that the receiver has been tuned to a new frequency, control logic 61f transitions to detect 91a the radiated tuning signal at the new frequency. If a complete loop has been completed, control logic 61f terminates the initialization process. While in an embodiment initialization process 90 terminates at the completion of one pass through the reception band, one of ordinary skill in the art would appreciate that in an alternative embodiment other termination conditions are used. In an alternative embodiment, a complete loop includes more than one pass through the reception band.

In an alternative embodiment, process 90 terminates when control logic 61f has measured the power of the radiated tuning signal at all the even tenth-MHz frequencies that are associated with broadcasters in the vicinity of the broadcast receiver. As indicated above, in an alternative embodiment, tuning signal detector 60 includes in memory accessible to control logic 61f a data structure that indicates what stations can be detected at different geographic locations.

At the completion of the initialization process, control logic 61f determines 91j the power threshold that minimizes the total error probability for any histogram that includes bins for the power of a radiated tuning signal and bins for the power of noise. As indicated above, depending upon the embodiment, the initialization process yields one or more histograms. During operation of tuning detector 60, control logic 61f uses the power threshold(s) to determine whether a potential radiated tuning signal's power at a certain even tenth-MHz frequency is indicative of an actual radiated tuning signal.

Having described the initialization process, one of ordinary skill in the art would appreciate that collecting power and frequency data and populating histogram(s) is also performed, in an alternative embodiment, during the normal course of operation of tuning signal detector 60. In an embodiment, control logic 61f displays the odd tenth-MHz frequency associated with the even tenth-MHz frequency of the detected radiated tuning signal and accepts an indication from the user whether the displayed frequency is equivalent to the frequency to which the broadcast receiver is tuned. One of ordinary skill in the art would appreciate that in an alternative embodiment, described in greater detail below, a determination as to whether the detected signal is in fact the radiated tuning signal of a receiver does not involve the user providing an indication.

FIG. 7o illustrates a tuning signal detector according to an alternative embodiment of the present invention. Detector 68 includes RCU 62, described above in connection with FIG. 7d, that provides power and frequency estimates to control logic 69a. Control logic 69a in an embodiment includes the features described above in connection with one or more of the following: initialization, higher granularity frequency domain representations, and histogram generation and maintenance. However, in an alternative embodiment, control logic 69a accepts one or more frequency and power estimates from RCU 62 and employs transmitter 69b to determine which of the one or more frequencies of potential radiated tuning signals provided by RCU 62 is the correct one. In an alternative embodiment, control logic 69a employs transmitter 69b to determine whether the frequency detected in the initialization process is correct, thereby obviating the need to display the frequency to the user and accept an indication of whether the detected frequency is correct.

After receiving one or more frequency estimates from RCU 62, control logic 69a determines, for each of the even tenth-MHz frequencies received from RCU 62, the associated odd tenth-MHz frequency. Control logic 69a then has transmitter 69b transmit a tone at one of the odd tenth-MHz frequencies. One of ordinary skill in the art would appreciate that the modulation scheme used by transmitter 69b depends upon the demodulation scheme employed by the receiver, and the present invention is not limited to any particular modulation scheme. For FM receivers, transmitter 69b transmits using frequency modulation. For AM receivers, transmitter 69b uses amplitude modulation. The tone's audio frequency can be anywhere in the audible range less than 15 KHz. Furthermore, the tone is transmitted for 1 or more milliseconds. Given the presence of noise in some environments such as an automobile, the tone duration in some instances may be tens or hundreds of milliseconds.

Transmitter 69b's radio frequency signal bearing the tone is radiated by antenna 69c to the antenna of the broadcast receiver. When the broadcast receiver in the vicinity of detector 60 is tuned to the odd tenth-MHz frequency at which the tone is transmitted a demodulated tone is presented by the receiver's speakers. The sound emanating from the speakers is received by microphone 69e which acts a transducer that transforms sound pressure into an electrical signal for analysis by audio detector unit 69d. Audio detector unit 69d includes a tone detector that produces a positive identification signal for application to control logic 69a indicating the presence of an audio tone. Audio detector unit 69d is set to detect an audio tone having the audio frequency of the transmitted tone and having a duration as long as the duration of the transmission of the tone. One of ordinary skill in the art would appreciate that in an alternative embodiment, transmitter 69b transmits a complex signal and audio detector 69d identifies the demodulated complex signal. The complex signal may be a pattern of bits transmitted using frequency shift keying, but other signals are also possible. In an alternative embodiment, audio detector 69d provides a positive identification signal if the pattern of bits received by microphone 69e is the same as the pattern of bits transmitted by transmitter 69b. Tone detectors, whether employing phase locked loops or frequency domain detection, and data slicers for detecting bit patterns are well known in the art and need not be described in greater detail herein. Antenna 69c, transmitter 69b, microphone 69e, and audio detector 69d are collectively referred to as radiated tuning signal frequency detector (hereafter frequency detector) 70d. Frequency detector 70d is described in additional detail in connection with information identifier generator 70b.

When control logic 69a does not receive a positive identification signal from audio detector 69d, control logic 69a has transmitter 69b transmit, depending upon the embodiment, a tone or bit pattern, at another one of the odd tenth-MHz frequencies. However, if control logic 69a does receive a positive identification signal, control logic 69a ceases transmission and provides a information identifier based upon the odd tenth-MHz frequency for which control logic 69a received a positive identification signal from audio detector 69d.

FIG. 7p illustrates an information identifier generator according to an alternative embodiment of the present invention. Information identifier (BII) generator 70b includes control logic 69h. Control logic 69h, in an embodiment, includes a microprocessor and memory containing instructions for execution by the microprocessor. Under control of the instructions, control logic 69h, applies a frequency control signal to transmitter 69b. The frequency control signal causes transmitter 69b to hop, within a transmission band extending from $f_{Low}$ to $f_{high}$, to certain frequencies to which a nearby receiver (not shown) may be tuned. In an embodiment, $f_{Low}$ is 87.9 MHz and $f_{High}$ is 107.9 MHz, but the transmission band limits are an implementation issue and not a limitation of the present invention. One of ordinary skill in the art would appreciate that in an alternative embodiment, the transmission band is at least part of the United States commercial AM band or some other band.

FIG. 7q illustrates a broadcast reception device with which embodiments of the present invention interact. Receiver 70c includes antenna 69m which receives RF signals that carry broadcast programming. RF section including tuner 69l receives a tuning signal from control logic 69k. The tuning signal determines which radio station's RF signal the RF section selects from the many that are received at antenna 69m to demodulate and make available ultimately in the form of an audio signal to the user. The tuning signal is derived from user input at control keys 69n. The frequency that the user wants the tuning signal to select is presented by control logic 69k on display 69o. Display 69o can be a liquid crystal display (LCD) or formed from light emitting diodes (LED). Display 69o may also be used to show the time and present choices to the user so that the user can program the radio such as assign or "preset" certain radio stations to certain keys (not shown) on control keys 69n.

Operations of receiver 70c such as programming the radio and accepting and processing user input for the tuning signal are performed by software in ROM 69p that is executed by control logic 69k which can be a general purpose microprocessor or microcontroller. Receiver 70c also includes RAM 69q for storing temporary variables that are produced by control logic 69k while it operates the display and other elements of receiver 70c. Part of RAM 69q may be non-volatile memory such as battery backed up memory or electrically eraseable programmable read only memory (EEPROM) in the event that some stored information needs to be saved even though power is removed from RAM 69q.

Receiver 70c includes input device 69r such as a tape drive, cd player, eight track player, MP3 player, or cd juke box. Depending on user input at keys, input device 69r can be controlled via control logic 69k such that audio information present on media (not shown) in device 69r can be sent to audio amp 69s for amplification and presentment via speaker 69t to the user.

To determine the channel to which a broadcast reception device such as receiver 70c is tuned, control logic 69h commands transmitter 69b to sweep a channel identification RF signal across the transmission band for reception by RF section 69l. The identification RF signal is radiated by antenna 69c. As the channel identification RF signal is being swept across the frequency band, the channel identification RF signal interacts with antenna 69m and RF section 69l. When the channel identification RF signal is transmitted at the frequency to which RF section 69l is tuned the channel identification RF signal will be demodulated and produced at speaker 69t of the broadcast reception device as an audio signal. The demodulated output at audio frequencies is provided via control logic 69k to audio amp 69s which outputs an audio signal at speaker 69t.

The audio signal emanating from speaker 69t is received by microphone 69e which acts as a transducer that transforms sound pressure into an electrical signal for analysis by audio detector unit 69d. Audio detector unit 69d includes a tone detector that produces a positive identification signal for application to control logic 69h indicating the presence of an audio tone. Audio detector unit 69d is set to detect an audio tone having the audio frequency of the transmitted tone and having a duration as long as the duration of the transmission of the tone. One of ordinary skill in the art would appreciate that in an alternative embodiment, transmitter 69b transmits a complex signal and audio detector 69d identifies the demodulated complex signal. The complex signal may be a pattern of bits transmitted using frequency shift keying, but other signals are also possible. In an alternative embodiment, audio detector 69d provides a positive identification signal if the pattern of bits received by microphone 69e is the same as the pattern of bits transmitted by transmitter 69d. Tone detectors, whether employing phase locked loops or frequency domain detection, data slicers and bit correlators for detecting bit patterns are well known in the art and need not be described in greater detail herein.

When control logic 69h does not receive a positive identification signal from audio detector 69d, control logic 69a has transmitter 69d transmit, depending upon the embodiment, a tone or bit pattern, at another one of the odd tenth-MHz frequencies. However, if control logic 69a does receive a positive identification signal, control logic 69a ceases transmission and provides a information identifier based upon the odd tenth-MHz frequency for which control logic 69a received a positive identification signal from audio detector 69d.

While in the above description the broadcast reception device of FIG. 7q was a terrestrial analog radio, it would be appreciated by one of ordinary skill in the art that the present invention may be practiced with other broadcast reception devices including but not limited to wireless broadcast and cable televisions in both analog and digital form, and satellite or terrestrial digital radio.

While in the above description transmitter 69b sweeps one band, it would be appreciated by one of ordinary skill in the art that transmitter 69b may include multiple transmitters that transmit multiple channel identification RF signals that sweep different bands. For example, a first channel identification RF signal sweeps a first band for a first type of broadcast reception device such as a television, a second channel identification RF signal sweeps a second band for a second type of broadcast reception device such as an FM radio, and a third channel identification RF signal sweeps a third band for a broadcast reception device such as an AM radio. Alternative embodiments may have more or less channel identification RF signals. The channel identification signals are chosen such that their audio signal representations are orthogonal, preventing interference or collisions in the event that there are several broadcast reception devices near transmitter 69b causing several audio signals to come back simultaneously. In other words, even if audio signals due to multiple transmitter 69b fall on microphone 69e, audio detector 69d coupled to microphone 69e will only look for the audio signal that would be produced as a consequence of the identification RF signal transmitted by its matching transmitter 69b and ignore the audio signals due to the other transmitters. In an alternative embodiment, transmitter 69b generates a wide band signal that is 400 KHz-5 MHz or more wide and that includes unique carriers that are 200 KHz apart and that fall on odd tenth-MHz frequencies. Each of the carriers bears a unique bit pattern, and each of the bit patterns is associated with a frequency. Detector 69d maintains in memory (not shown in FIG. 7o) a data structure (bit pattern-frequency data structure) containing records each of which contains a representation of one of the bit patterns borne by the carriers and the bit patterns associated frequency. When detector 69d decodes a bit pattern from the audio signal, detector 69d compares it to the representations of bit patterns in the bit pattern-frequency data structure. When a stored bit pattern representation matches the decoded bit pattern, detector 69d determines the frequency to which the broadcast reception device is tuned by identifying the frequency associated with the matching stored bit pattern.

FIG. 7r illustrates a process for determining the channel according to one embodiment of the present invention. In process 510 an RF signal is swept 511a across a frequency band. According to one embodiment, the RF signal is swept across a frequency band by a transmitter such as transmitter 69b. An audio signal representative of the RF signal is detected 511b. The detection is performed, according to one embodiment by a microphone and audio detector such as microphone 69e and audio detector 69d described above. The frequency of the RF signal in the frequency band when the audio signal was detected is determined 511c.

Figure 7S:
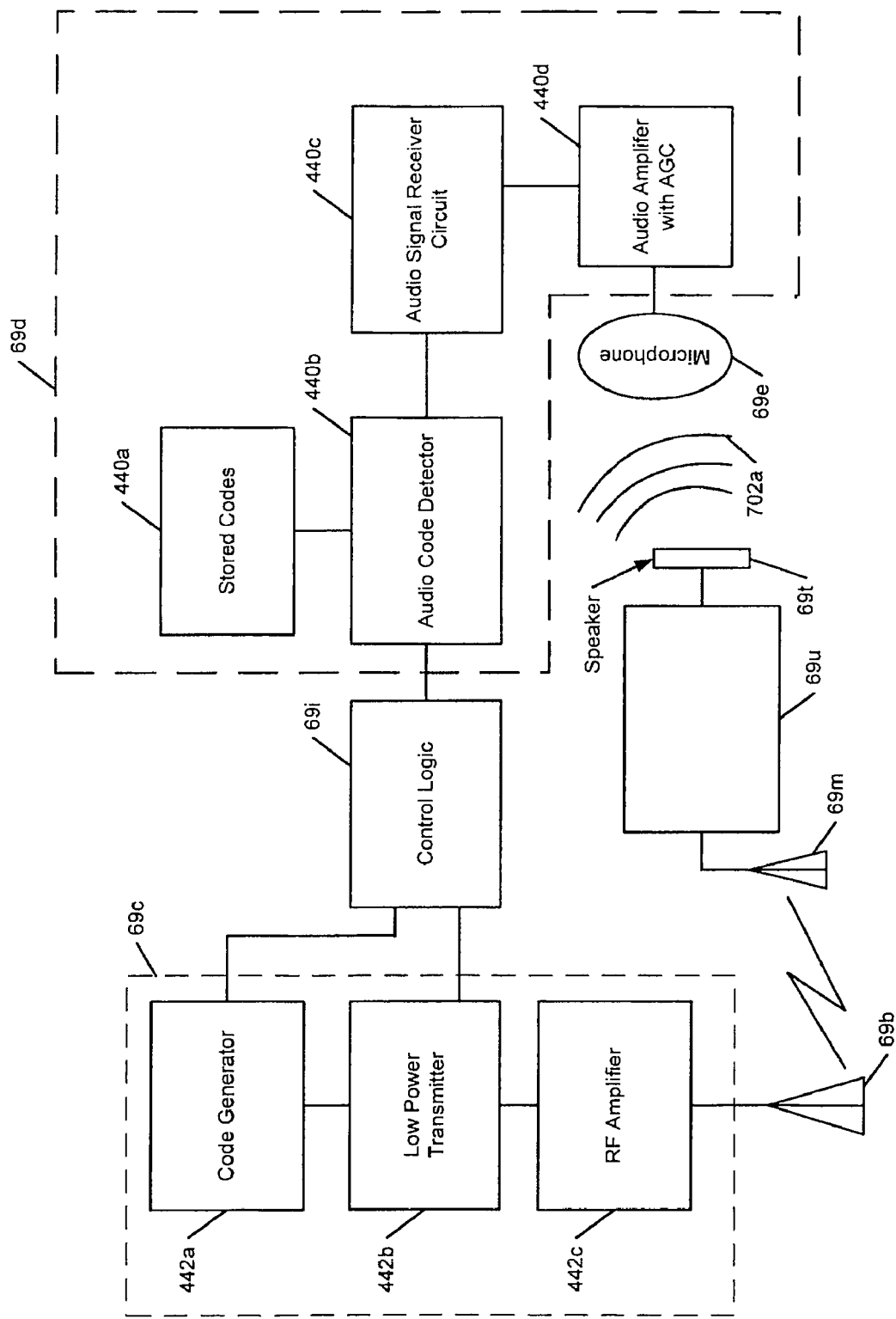
FIG. 7s illustrates a transmitter and audio detector for determining the tuned channel of a receiver according to an alternative embodiment of the present invention.

FIG. 7s illustrates a transmitter and audio detector for determining the tuned channel of a receiver according to an alternative embodiment of the present invention. Control logic 69i of FIG. 7s is, depending upon the embodiment, representative of either control logic 69h or control logic 69a. Control logic 69i sends an initiate frequency sweep signal to transmitter 442b and code generator 442a. In response to the initiate frequency sweep signal, code generator 442a and transmitter 442b generates a channel identification signal starting at 87.9 MHz. Code generator 442a produces a distinctive signal in the audio frequency range of approximately 100 Hz to 3500 Hz. According to one embodiment, the distinctive signal is a substantially square wave bit sequence of '1s' and '0s.' The code used by generator 442a is obtained from codes storage 440a that contains at least one code for generating a channel identification signal and later identifying an audio alias of the channel identification signal.

The bit rate chosen is influenced by the ambient noise around receiver 70c and other factors as described below. The higher the noise in the environment the lower the bit rate that is used. A bit rate as low as 150 bits works relatively well in noisy environments. In an alternative embodiment, the bit sequence may be composed of two trains of bits. The first train represents '1s' and the second train represents '0s.'

Amplifier 442c amplifies the output of transmitter 442b and applies the amplified channel identification signal to antenna 69b. Antenna 69m receives the channel identification signal and provides it to radio unit 69u which is illustrated in greater detail in FIG. 7q. When the channel identification signal reaches the frequency to which RF section 69l is tuned, (i.e., the tuned channel), the channel identification signal will be demodulated and produced at speaker 69t as an audio signal (hereafter referred as "audio identification signal") along with the broadcast programming to which the user is listening. The audio identification signal is received by microphone 69e and provided to audio amplifier 440d for amplification and application to receiver 440c. Receiver 440c demodulates the audio signal and recovers the bit pattern of the code used in creating the channel identification signal. The recovered bit pattern is provided to audio code detector 440b.

Detector 440b correlates the received bit pattern with a code retrieved from code storage 440a. When the bit pattern recovered from the audio signal is substantially the same as the bit sequence of the code used to generate the channel identification signal, detector 440b generates a signal indicating that there is match (hereafter "match signal") and provides it to control logic 69i which, in turn, stops the units of transmitter 69b from producing a channel identification signal. Depending upon the embodiment, control logic 69i either obtains from transmitter 442b the frequency (hereafter "identified channel frequency") at which low power transmitter 442*b* was last transmitting the channel identification signal or retrieves from memory included in control logic 69*i* the identified channel frequency. In the latter alternative embodiment, control logic 69*i* maintains in its memory an indication of the frequency at which transmitter 442*b* is transmitting.

Depending upon the embodiment, control logic 69*i* either instructs transmitter 442*b* to transmit at another frequency or transmitter 442*b* hops to another frequency without waiting for an instruction to arrive. When transmitter 442*b* does not receive a stop signal from control logic 69*i* within a certain predefined period after it commenced transmitting at a frequency, transmitter 442*b* hops to another frequency. The predefined period of time depends upon the speed with which transmitter 442*b* can settle on a frequency, and the bit rate, among other factors. Depending upon the embodiment, transmitter 442*b* transmits for as long as 1 millisecond before hopping to another frequency. However, in an alternative embodiment, the transmission period may be as high as 100 milliseconds.

FIG. 7*t* illustrates an information identifier generator according to an alternative embodiment of the present invention. BII generator 70*a* includes a frequency multiplexer 71*a* that is coupled to reception antenna 71*b* and transmission antenna 71*f*. In an alternative embodiment, a single antenna in series with a duplexer is used for both reception and transmission. Using a single antenna for both transmission and reception is well understood by those skilled in the art and need not be described in greater detail herein.

Frequency multiplexer 71*a* includes receiver 71*c* and transmitter 71*d*. Receiver 71*c* receives RF signals via antenna 71*b* and demodulates one of the RF signals for application to transmitter 71*d*. Receiver 71*c* selects an RF signal for demodulation based upon a control signal received from control logic 71*e*. The demodulated RF signal is applied to transmitter 71*d* which transmits at a frequency other than the frequency at which the RF signal is received. Control logic 71*e* maintains in memory an indication of the channel or frequency that transmitter 71*d* is transmitting. Based upon the channel or frequency indication, control logic 71*e* provides a information identifier.

In an embodiment, receiver 71*c* receives and demodulates signals in the FM broadcast band, but in an alternative embodiment one or more bands may be received, one of which may be the FM broadcast band. In an embodiment, transmitter 71*d* retransmits in the FM band, but on a frequency other than the one on which the demodulated signal is received. It would be appreciated by one of ordinary skill in the art that the signal transmitted by transmitter 71*d* is received by a nearby FM receiver when it is tuned to the frequency at which transmitter 71*d* is transmitting. Furthermore, transmitter 71*d* is typically set to one frequency while receiver 71*c* is tuned across the FM band, with the combination of the two acting as a frequency multiplexer. In an alternative embodiment, receiver 71*c* receives and demodulates signals in the AM broadcast band and transmitter 71*d* retransmits on a frequency in the FM band a demodulated AM broadcast band signal. In such an embodiment, the information identifier provided by control logic 71*e* would be a function of the frequency of the RF signal in the AM band that is demodulated by receiver 71*c* and then transmitted by transmitter 71*d*.

Referring to FIG. 7*b*, according to an alternative embodiment, control logic 51*c* includes a microprocessor and memory. The memory includes instructions which are executed by the microprocessor and which cause the microprocessor to store in the memory an indication of the number of times a search was made for the radiated local oscillator signal, Number_of_Searches, and an indication of the number of times two consecutive searches for the local oscillator signal resulted in the local oscillator signal being detected at the same frequency, Number_Consecutive_Duplicate_Results. When the Number_Consecutive_Duplicate_Results is greater than half the Number_of_Searches, control logic 51*c* begins a search for a radiated local oscillator signal at the frequency at which the local oscillator signal was detected in the immediately prior search. The Number_Consecutive_Duplicate_Results and the Number_of_Searches are updated after every search.

According to an alternative embodiment, control logic 51*c* includes a microprocessor and memory. The memory includes instructions which are executed by the microprocessor and which cause the microprocessor to store in the memory, in order of greatest likelihood, the four frequencies at which the radiated local oscillator signal is most likely to be found. One of ordinary skill in the art would appreciate that the foregoing description for control logic 51 is applicable, in an alternative embodiment, to other control logic described herein in connection with generating an information identifier.

FIG. 7*c* illustrates a data structure that represents frequencies at which a radiated local oscillator signal is most likely to be found. Data structure 52 includes frequency field 53*a* and number of detections field 53*b*. DS 52 includes four frequency rank records 53*c*, 53*d*, 53*e*, 53*f* each of which includes a pair of entries, an entry in frequency field 53*a* and an entry in number of detections field 53*b*. DS 52 represents the four most likely frequencies at which the radiated local oscillator signal may be found. For example, record 53*c* includes an entry of 107.3 MHz for frequency field 53*c* and an entry of 23 for number of detections field 53*d*, which indicates that the radiated local oscillator was found 23 times at 107.3 MHz. The entries for number of detections field 53*b* of records 53*d*, 53*e*, and 53*f* indicate that the radiated local oscillator signal was found less frequently at 101.1 MHz, 106.7 MHz, and 88.5 MHz, in the order indicated. The values in the records of DS 52 are merely illustrative values; one of ordinary skill in the art would appreciate that in actual operation a tuning signal detector will generate other values that change to reflect the actual number of detections arising within a certain period of time.

The microprocessor of control logic 51*c*, in the course of performing, with receiver 51*b*, searches for the radiated local oscillator signal, maintains in temporary memory information representing the four frequencies at which the radiated local oscillator signal is most frequently detected. The information is stored in the organization depicted by DS 52 and is updated after each search. The process of keeping track in a data structure the number of detections at each of N frequencies and sorting the information in the data structure is well understood in the art and need not be described herein. N is an integer that is greater than 1.

As described above, in an embodiment, control logic 51*c* may not complete a full cycle of hopping to and dwelling at each of frequencies within the reception band that are spaced apart by 200 KHz. Control logic 51*c* may instruct receiver 51*b* to stop hopping as soon as logic 51*c* detects a radiated local oscillator signal. However, one of ordinary skill in the art would appreciate that according to an alternative embodiment a full cycle through the reception band is completed in order to make a determination about the presence of a radiated local oscillator signal. A full cycle through the reception band may lessen the potential for error in the event there are multiple broadcast receivers each of which is radiating a local oscillator signal in the vicinity of tuning signal detector 50.

According to an alternative embodiment, control logic 51c receives a RSSI signal level for each frequency dwelled at in one cycle of passing through the reception band from 98.6 to 118.6 MHz. From among all the RSSI signal levels received during one cycle, control logic 51c identifies the RSSI signal level that is indicative of a radiated local oscillator signal. A RSSI signal level is indicative of a radiated local oscillator signal when it both exceeds a threshold and is greater than the other RSSI signal levels received during one cycle. Control logic 51c, based upon the frequency associated with the RSSI signal level that is indicative of a radiated local oscillator signal, provides an indication of the channel to which receiver 51b is tuned.

One of ordinary skill in the art that control logic 41f and any of the other control logic described herein are not limited to including a microprocessor and memory that stores instructions for execution by the microprocessor, but can be implemented, by among other things, a microcontroller, a digital signal processor, a field programmable gate array, an application specific integrated circuit, or other forms of integrated or discrete logic. One of ordinary skill in the art would also appreciate that for any of the embodiments of the present invention, the same features and operations may be performed by hardware alone, or a combination of software instructions and hardware for executing the software instructions. Accordingly, a particular implementation of control logic 41f will dictate whether software instructions or memory, or both, are needed.

One of ordinary skill in the art would appreciate that memory includes, but is not limited to, one or more of the following: flash memory, electrically erasable programmable read-only memory, random access memory (RAM), read-only memory (ROM), or discrete registers comprising flip-flops. Where an implementation includes a processor as part of control logic 41f, the memory may be included in the processor or it may be a separate discrete element coupled by a bus to the processor. References to memory in the description refer to volatile memory, or alternatively to a combination of volatile and non-volatile memory.

While according to an embodiment wireless network 26 is a cellular telephone network, it would be appreciated by one of ordinary skill in the art that the present invention may be used with other types of wireless and wired networks including, including but not limited to, two-way paging networks, and local wireless networks.

Figure 8D:
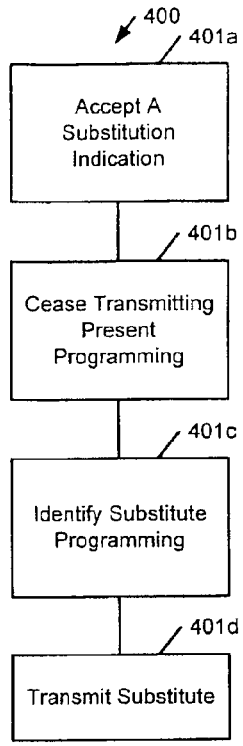
FIG. 8d illustrates a process for substituting programming according to one embodiment of the present invention.
Figure 8A:
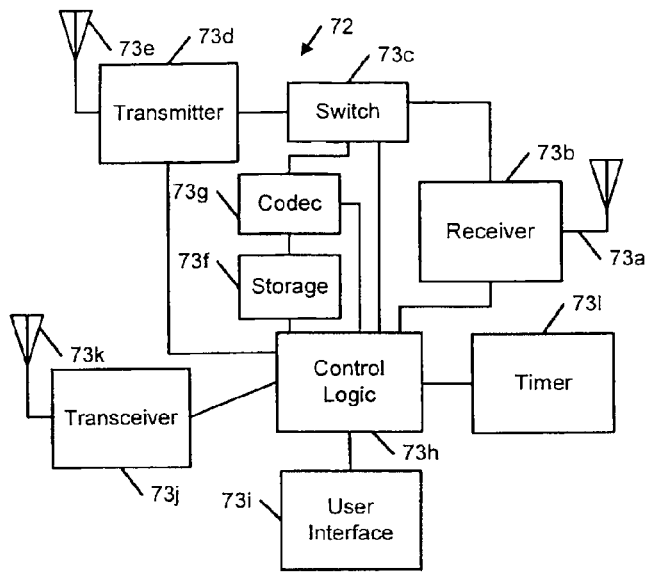
FIG. 8a illustrates a broadcast interactivity device according to an alternative embodiment of the present invention.

FIG. 8a illustrates a broadcast interactivity device according to an alternative embodiment of the present invention. BID 72 allows a user to interact with broadcast programming by generating, in one embodiment, an information identifier in response to a user activation of interface 73i. The information identifier, as described in greater detail elsewhere herein and depending upon the embodiment, allows the user to obtain additional information and services about an item of programming, interact with a disc jockey, etc. In an alternative embodiment, BID 72 behaves in accordance with an embodiment of a media presentation or customization device described elsewhere herein.

BID 72 enhances the user experience with programming by allowing the user to personalize the experience. For instance, in an embodiment, the user is allowed to substitute an item of programming with an alternative one. For example, if a song is unacceptable to the user, the user, by activating a substitute key on user interface 73i, is able to hear an alternative song without having to change channels on the radio. The same is true of advertisements. In an alternative embodiment, if an ad is not of interest to the user, simply by pressing the substitute key one or more alternative ads or one or more song samples are presented. The same can be done for other types of items besides songs and ads.

In an alternative embodiment, BID 72 also allows the user to have greater control over how often items of programming are presented relative to each other and how often they are presented within a predefined span of time. For instance, even when listening to broadcast programming, a user does not want to be bothered with having to change channels because a song is being heard for the second time in a very short span of time, or because some songs are heard too frequently relative to other songs that are more pleasing to the user.

In an alternative embodiment, BID 72 also allows the user to customize presentation of programming so that unacceptable items or items that are likely to be unacceptable are not presented, but, rather substituted with items that are known to be acceptable or are likely to be acceptable to the user. For instance, before allowing an item to be presented, BID 72 determines whether the item is acceptable to the user. An unacceptable item is substituted with one that is acceptable or is likely to be acceptable. An acceptable item is allowed to be presented.

In an alternative embodiment, while a user is being presented items, BID 72 captures information about the acceptability of the items to the user and uses that information to determine whether the user will find other items acceptable. For instance, in an alternative embodiment, BID 72 maintains statistics on user rankings of certain items and the similarity between users, or the similarity between items. The rankings and similarity are used to determine whether other items might be acceptable to the user. The rankings may be, depending upon the embodiment, implicit rankings, explicit rankings, or both. In alternative embodiments, information other than similarity between users is maintained to determine whether an item might be acceptable.

To facilitate understanding of the embodiments of the present invention, with reference to FIG. 8a, the units of BID 72 are first described below. Then various embodiments are described along with greater details about the units of BID 72. Any one of the embodiments described in connection with FIG. 8a may be combined with other embodiments described below and elsewhere herein. Furthermore, a feature of an embodiment need not be limited to the embodiment in whose context it is described. One of ordinary skill in the art would appreciate that a feature of an embodiment may be included in an alternative embodiment without requiring that all the features of the embodiment be included in the alternative embodiment. Additionally, one of ordinary skill in the art would appreciate that one or more features described in the context of an embodiment may not be essential to that embodiment, but are described in order to exhibit the power and extensibility of the fundamental building blocks in the embodiment.

BID 72 includes antenna 73a and receiver 73b which capture and demodulate RF signals. Depending upon the embodiment, the signals are either FM band signals, AM band signals, or both. However, in an alternative embodiment, other modulation schemes, including digital ones, or reception at other frequencies, besides the commercial AM or FM bands, are also used.

Receiver 73b provides its audio output to an input of switch 73c. Switch 73c includes two inputs, but an alternative embodiment may have more than two inputs each carrying a signal from which switch 73c selects one signal for passage to its output. Switch 73c also accepts a switch control signal from control logic 73h which causes switch 73c to select one of the signals applied at its inputs to pass through to its output that is coupled to transmitter 73*d*. The signal present at the output of switch 73*c* is transmitted by transmitter 73*d* and radiated as an RF signal by antenna 73*e*. A nearby receiver (not shown in FIG. 8*a*) would receive this signal.

Receiver 73*b* and transmitter 73*d* allow BID 72 to provide very powerful services that substantially enhance the user radio experience. Control logic 73*h* is coupled to receiver 73*b* and controls the frequency to which it is tuned by accepting, in one embodiment, indications of user activations via interface 73*i*. Furthermore, control logic 73*h* is coupled to transmitter 73*d* and controls the frequency to which it is tuned by accepting, in one embodiment, indications, of user activations via interface 73*i*. Control logic 73*h* includes memory (not shown in FIG. 8*a*) in which control logic 73*h* stores a representation of the channel or frequency to which receiver 73*b* is tuned. Control logic 73*h* also stores the channel or frequency to which transmitter 73*d* is tuned in an alternative embodiment in which transmitter 73*d* tunes more than one frequency.

Figure 8R:
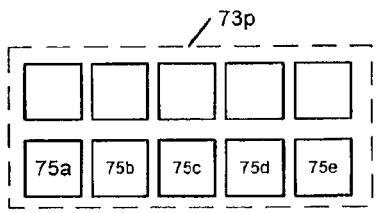
FIG. 8r illustrates in greater detail input keys of a user interface according to an alternative embodiment of the present invention.
Figure 8B:
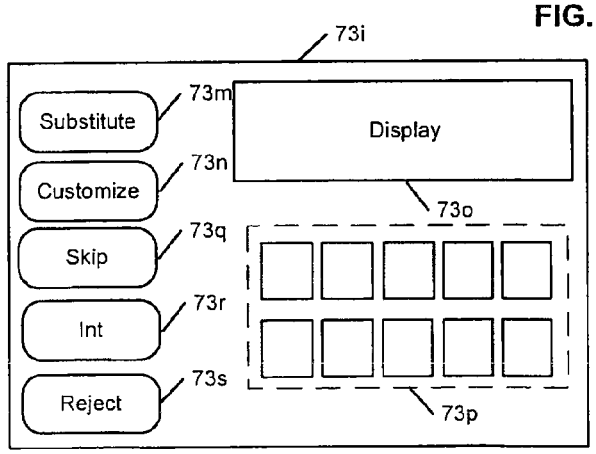
FIG. 8b illustrates in greater detail a user interface according to one embodiment of the present invention.

FIG. 8*b* illustrates in greater detail a user interface according to one embodiment of the present invention. User interface 73*i* includes keys 73*p* and display 73*o*. Keys 73*p* allow a user of BID 72 to indicate to control logic 73*h* the reception frequency or channel for receiver 73*b* and the transmission frequency for transmitter 73*d*. Control logic 73*h* provides confirmation of the selected reception frequency and transmission frequency and communicates visual feedback to the user via display 73*o*. One of ordinary skill in the art would appreciate that user interface 73*i* in an alternative embodiment is a voice recognition interface with visual or aural feedback. In an alternative embodiment in which aural feedback is used, a speaker (not shown in FIG. 8*a*) is coupled to control logic 73*h*. In an alternative embodiment in which voice commands are accepted as user activations, a microphone (not shown in FIG. 8*a*) (or other transducer) is coupled to control logic 73*h* which includes a voice recognition engine. The microphone converts the sound of the user's voice into an electrical signal that is digitized and analyzed by the voice recognition engine.

One of ordinary skill in the art would appreciate that the user interface is one or more of the following in an alternative embodiment: a remote control, a communications device such as cell phone or personal digital assistant, a computer, and a vehicle telematics interface. One of ordinary skill in the art would appreciate the there is no limit to the techniques and apparatus that may be used to accept activations: including, but not limited to, voice recognition, touch screen, cursor pads, mice, keypads, or transceiver 73*j*, described below.

BID 72 also includes transceiver 73*j* which allows control logic 73*h* to communicate information to networks and devices and to receive information from them. Depending upon the embodiment, transceiver 73*j* communicates by one or more of the following techniques: wirelessly, infrared, and wire cable. Thus, reference to transceiver 73*j* does not limit transceiver 73*j* to including a single transceiver that communicates in accordance with one communication scheme or protocol. Depending upon the embodiment, transceiver 73*j* may include one or more of the following: infrared transceiver, wired or wireless serial communications transceiver, local wireless communications transceiver, cellular communications transceiver, and parallel communications transceiver. Thus, that transceiver 73*j* is shown coupled to antenna 73*k* in FIG. 8*a* does not mean that transceiver 73*j* is limited to communicating wirelessly or that every embodiment, must contain a wireless transceiver and an antenna. The foregoing and other descriptions of transceiver 73*j* are applicable to any wired or wireless transceiver described herein including the transceivers of BID 11 and computer 31.

Additionally, at least some of the information that is described as being received by BID 72 via transceiver 73*j* is received in an alternative embodiment via receiver 73*b*, and provided to control logic 73*h*. Furthermore, at least some of the information that is being described as being received or transmitted by transceiver 73*j* may be removed and obtained, depending upon the embodiment, by use of physical media such as floppy disks, hard disks, rewritable compact disc, writable compact disc, memory sticks, smart cards, or memory cards, etc. One of ordinary skill in the art would appreciate that depending upon the embodiment, control logic 73*h* includes, but is not limited to including, one or more of the following: storage device controller, storage device, and external memory communication interface. Furthermore, in an alternative embodiment, control logic 73*h* is coupled to a removable or fixed storage device (not shown).

As indicated, BID 72, in an embodiment, generates an information identifier. Control logic 73*h* is coupled to both transmitter 73*d* and receiver 73*b* and generates an information identifier in accordance with the discussion provided above in connection with FIG. 7*p*. Control logic 73*h* includes memory in which a representation of the receiver frequency or channel being transmitted by transmitter 73*d* is stored. BID 72 also includes timer 73*l* from which control logic 73*h* obtains a time indication when interactivity (Int) key 73*r* is activated. In one embodiment, control logic 73*h*, in response to activation of Int key 73*r* obtains a time indication indicative of the time when Int key 73*r* is activated and retrieves from memory the frequency or channel representation. Control logic 73*h* composes based upon the time indication and frequency or channel representation an information identifier. The information identifier is, depending upon the embodiment, used advantageously as described elsewhere herein. In an alternative embodiment, the information identifier is supplemented with one or more of, but not limited to, the following: a geographic location indication, user identifier, broadcast interactivity device identifier (e.g., including but not limited to any of the following: serial number of operating system, microprocessor, etc.), payment information, etc.

As indicated above, BID 72 allows the user to personalize the programming experience. Personalization has many facets and is expressed in a variety of embodiments described herein. In an embodiment, personalization allows the user to substitute an item being presented by BID 72 via transmitter 73*d* with a substitute item. Depending upon the embodiment, the item being presented may be one received by receiver 73*b* and transmitted by transmitter 73*d*, or alternatively, it may be one that is produced by an alternative source of programming and transmitted by transmitter 73*d*. Regardless of the source of the item being presented, in an embodiment, BID 72 allows the user to have the item being presented interrupted and a substitute item presented in its place. For substitution to take place, an alternative source of items of programming is needed. Alternative sources of items of programming are described below.

One source of programming is storage 73*f* that stores, among other things, items in the form of digital media clips that are decoded by codec 73*g*. When codec 73*g* is decoding an item retrieved from storage 73*f*, it produces a signal that is applied to an input of switch 73*c*. When switch 73*c* is set by control logic 73*6* to select the output of codec 73*g*, transmitter 73*d* transmits the item retrieved from storage 73*f*. The foregoing is described in greater detail below.

In an alternative embodiment, control logic 73*h* controls the transmitter power of transmitter 73*d*. In such an embodiment, control logic 73h has transmitter 73d transmit at a predetermined initial power level a predetermined power setting signal at a frequency to which a nearby broadcast reception device is tuned. The power setting signal is a predefined bit pattern in an alternative embodiment. However, another signal including tones as described above in connection with FIG. 7o, 7p are used in an alternative embodiment.

Depending upon the embodiment, the initial power level is the maximum power level permitted by the appropriate regulatory agency, or alternatively, a negligible power level (e.g., including but not limited to ½, ⅒, ¹⁄₁₀₀ of the maximum power level). In such an embodiment, control logic 73h is coupled to an audio detector unit such as that described above in connection with FIG. 7o, 7p. The audio alias of the power setting signal is detected by the audio detector unit and, depending upon the embodiment, the audio detector unit provides the bit error rate or correlation coefficient for the audio alias signal to control logic 73h. When the bit error rate is, depending upon the embodiment, excessive or acceptable, control logic 73h, depending upon the embodiment, increases the initial power level or alternatively decreases it, respectively. The amount by which the power is increased or decreased is implementation dependent (e.g., speed with which the right power level is to be determined to satisfy users) and influenced by environmental factors (e.g., including but not limited to how close antenna 73e is to the broadcast reception device).

Control logic 73h then has transmitter 73d transmit, a power setting signal at the new power level. Control logic 73h then determines again as just described whether the transmitter power needs to be adjusted. In an embodiment in which the starting power level is the maximum power level permitted, control logic 73h stops the process as soon as the power level results in an unacceptable error rate or correlation coefficient. Control logic 73h assigns as the transmitter power level of transmitter 73d the power level before the one that resulted in unacceptable performance. One of ordinary skill in the art would appreciate that where a negligible power level is the initial power level, the power is increased until acceptable performance is achieved.

Figure 8C:
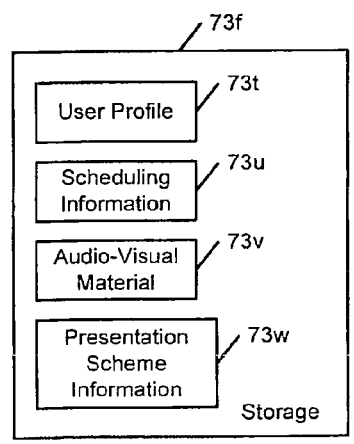
FIG. 8c illustrates information maintained in the storage of a broadcast interactivity device according to one embodiment of the present invention.

FIG. 8c illustrates information maintained in the storage of a broadcast interactivity device according to one embodiment of the present invention. Storage 73f of FIG. 8a is shown in greater detail in FIG. 8c. Storage 73f includes user profile audiovisual material 73v. Audiovisual material 73v includes, but is not limited to, one or more of the following: audio clips, audiovisual clips, graphics, broadcast programming related data, lyrics, advertisement clips, playlists, and, without limitation, other types of information that are related to audiovisual entertainment or digital media. A unit of information in audiovisual material 73v is referred to as an item. Items include, but are not limited to, an audio or video clip.

Referring again to FIG. 8b, user interface 73i includes substitute key 73m, customize key 73n, skip key 73q, and reject key 73s. When a user of BID 72 activates substitute key 73m, control logic 73h receives an indication of the activation from interface 73i. Activation of the substitute key 73m indicates that the programming currently being broadcast by transmitter 73d is to be replaced with substitute programming. In one embodiment, when switch 73c is selecting the output of receiver 73b for application to transmitter 73d, activation of substitute key 73m causes control logic 73h to substitute the programming provided by receiver 73b with a substitute item identified in storage 73f.

Control logic 73h provides the identified item of audiovisual material 73v to codec 73g which decodes the item to produce digital samples that are applied to an digital-to-analog converter (DAC) which is part of codec 73g. The DAC converts the discrete time digital samples into a continuous analog signal which is applied to switch 73c. The control signal applied to switch 73c by control logic 73h causes switch 73c to select the analog signal from codec 73g for application to transmitter 73d. Transmitter 73d produces a RF signal based upon the analog signal and radiates it using antenna 73e.

That BID 72 is described as having novel features is not to be understood that BID 72 is not capable of, depending upon the embodiment, conventional operation as well. For example, in an embodiment, control logic 73h also accepts user input via keys 73p of interface 73i, and based upon the user input, control logic 73h retrieves an item of audiovisual material 73v and has codec 73g decode it and transmitter 73d transmit it. Conventional operation is left out from the present description where it would obscure the present invention, even though an embodiment might be capable of such operation.

In an embodiment, control logic 73h includes program and data memory (not shown) and a microprocessor (not shown). The program and data memory and the microprocessor are not shown in order to emphasize that hardware and software are polar endpoints on a continuum, and as one of ordinary skill in the art would appreciate, features that can be implemented in specialized hardware can be also implemented using software executed by general purpose hardware such as a microprocessor or microcontroller.

In one embodiment, via transceiver 73j, control logic 73h obtains scheduling information for the programming of at least one broadcaster. Depending upon the embodiment, the scheduling information is located in one or more of the following devices: server 29a, 29c, computer 31, or a communications device such as a Conventional cell phone 15, wireless personal digital assistant, or pocket personal computer (PC). One of ordinary skill in the art would appreciate that given the many potential sources of scheduling information, transceiver 73j can take many different forms, and depending upon the embodiment, transceiver 73j retrieves the scheduling information by one or more of the following mechanisms: wirelessly, infrared, and wire cable.

With respect to wireless communication, depending upon the embodiment, transceiver 73j includes the capacity to communicate with cellular networks, local area networks based on WiFi (wireless fidelity, wireless local area network) or similar technology, and short range networks such as those based on Bluetooth. In one embodiment, transceiver 73j communicates with server 29a, 29c by communicating via Bluetooth with a cell phone which provides a link to server 29a, 29c via cellular network 26. In an alternative embodiment, transceiver 73j includes a cellular transceiver that communicates directly with a cellular network. In an alternative embodiment, transceiver 73j communicates with computer 31 via Bluetooth, WiFi, or similar wireless local area networks.

With respect to infrared communication, a popular standard is the IrDA standard for asynchronous serial infrared communication, but other protocols may be used. In an alternative embodiment, transceiver 73j includes an IrDA transceiver that allows transceiver 73j to communicate with computer 31 or cell phone 15.

With respect to wire cable communication, depending upon the embodiment, transceiver 73j includes the capacity to communicate in accordance with one or more of the following protocols: Universal Serial Bus (USB), RS-232 or TIA/EIA-232 serial asynchronous communication, parallel "Centronics" interface, IEEE Std. 1284-1994 Standard Signaling Method for a Bi-directional Parallel Peripheral Interface for Personal Computers, IEEE Std. 1394 (Firewire), IEEE Std. 1394b, Ethernet, V.90, V.34 or V.32 modem standards, and I²C synchronous serial communication. In one embodiment, transceiver 73*j* includes a USB controller that allows transceiver 73*j* to communicate with USB enabled computer 31 or server 29*a*, 29*c* by way of computer 31.

In an alternative embodiment, transceiver 73*j* includes an Ethernet controller that allows transceiver 73*j* to communicate with server 29*a*, 29*c* by way of a cable or digital subscriber line modem, or local area network server. In an alternative embodiment, a conventional analog or digital modem allows transceiver 73*j* to communicate with server 29*a*, 29*c* via public switched telephone network (PSTN) 32.

FIG. 8*d* illustrates a process for substituting programming according to one embodiment of the present invention. In process 400, control logic 736 accepts 401*a* a substitution indication from user interface 73*i*. In response to the substitution indication, control logic 73*h* terminates 401*b* the transmission of programming received by receiver 73*b* by activating switch 73*c* to select for transmission another input to switch 73*c*. In one embodiment, the other input to switch 73*c* is coupled to codec 73*g*. Control logic 73*h* identifies 401*c* a substitute item in audiovisual material 73*v* and has codec 73*g* decode it Transmitter 73*d* then transmits 401*d* the substitute item of programming decoded by codec 73*g*.

Users often have certain expectations about how frequently some items are presented and how often some items are presented relative to other items. This is especially true, when the items are songs. Some users may even have extremely strong expectations. One of these expectations is confronted in the substitution context described above. For example, consider the case in which broadcast programming is being presented to the user. Depending upon the embodiment, broadcast programming is not limited to programming received via receiver 73*b* or transceiver 73*j*, but also includes items from audiovisual material 73*v* that are presented in accordance with a play list or other type of presentation instructions received via receiver 73*b* or transceiver 73*j*, where the play list or other type of presentation instructions are not composed in accordance with the user's expectations.

Referring again to the substitution context, when one of the songs presented is unacceptable and the user activates substitute key 73*m*, most users do not expect to hear, nor do they desire to hear, as a substitute song a song that was heard recently before the unacceptable item was presented. Similarly, when one of the songs about to be received by receiver 73*b* is the same as a substitute song or other song (e.g., one received by receiver 73*b* on the same channel or another channel) recently heard by the user, the user would rather that the song about to be received be substituted without the user having to press the substitution key.

Depending upon the embodiment, BID 72 addresses this expectation. In an alternative embodiment, a substitute item is required to meet one or more conditions before it is selected for presentation. In an embodiment, one condition is minimum time spacing between repetitions of the same item.

To prevent items recently heard from being heard again, in an embodiment, control logic 73*h* also includes temporary storage or memory which stores a value for minimum time span between repetitions (hereafter referred to as "minimum_ time_spacing") indicative of the minimum time spacing between repetitions of the same item, alternatively the minimum time spacing value is stored in storage 73*f*. Control logic 73*h* also maintain in its temporary storage or memory, or alternatively in storage 73*f*, for each potential substitute item an indication of the last time the item was presented.

Figure 8I:
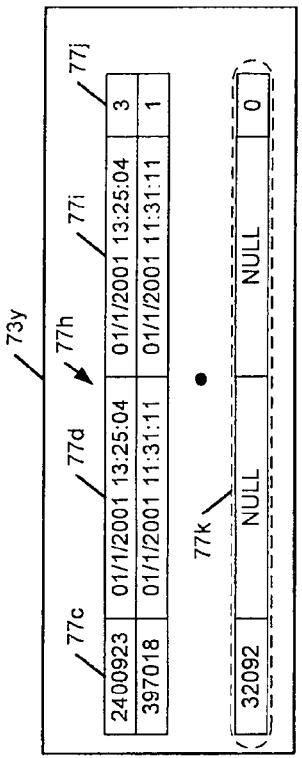
FIG. 8i illustrates a temporary storage space that includes information related to time that items of programming are presented according to an alternative embodiment of the present invention.
Figure 8H:
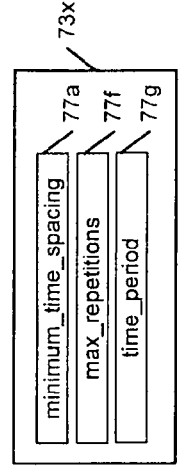
FIG. 8h illustrates temporary storage space including information for constraining presentation of items of programming according to an alternative embodiment of the present invention.
Figure 8G:
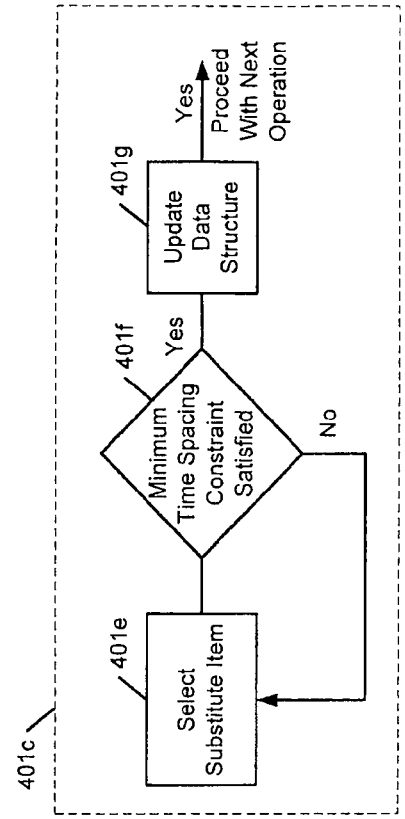
FIG. 8g illustrates in greater detail the operation of identifying a substitute item of FIG. 8d according to an alternative embodiment of the present invention.
Figure 8M:
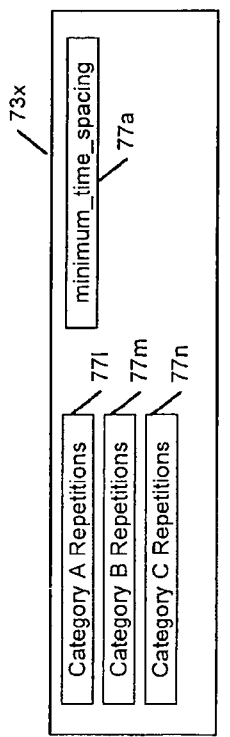
FIG. 8m illustrates temporary storage space including information for constraining presentation of items of programming according to an alternative embodiment of the present invention.
Figure 8E:
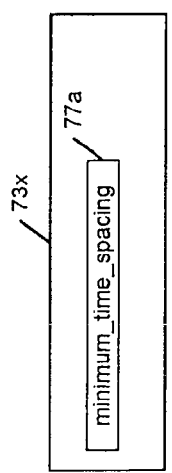
FIG. 8e illustrates temporary storage space including information for constraining presentation of items of programming according to an alternative embodiment of the present invention.

FIG. 8*e* illustrates temporary storage space including information for constraining presentation of items of programming according to an alternative embodiment of the present invention. Temporary storage space 73*x* includes minimum_ time_spacing 77*a* which holds a representation of the minimum amount of time between repetitions of items. Temporary storage space 73*x* is implemented as memory space located in control logic 73*h* in one embodiment, but in an alternative embodiment, it may be located in storage 73*f*. Temporary storage space 73*x* may also be implemented in a memory device (not shown in FIG. 8*a*) coupled to control logic 73*h*. The value in minimum_time_spacing 77*a* is user definable by way of interface 73*i* and control logic 73*h* and ranges from zero to the largest time that can be represented by control logic 73*h*, which depends on design considerations rather than a limitation of the present invention. However, users often desire that certain songs not be presented more than once in say a 3 hour time span, a span of a day or two, or even a week or more.

Figure 8F:
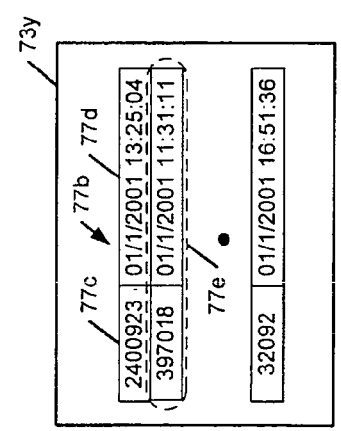
FIG. 8f illustrates a temporary storage space that includes information related to time that items of programming are presented according to an alternative embodiment of the present invention.

FIG. 8*f* illustrates a temporary storage space that includes information related to time that items of programming are presented according to an alternative embodiment of the present invention. Timing information storage space 73*y* depending upon the embodiment, is located in one or more of the following: memory space included in control logic 73*h*, memory space accessible to control logic 73*h*, separately in storage 73*f*, or in one or more of the other information spaces in storage 73*f*, including but not limited to, user profile 73*t*, audiovisual material 73*v*, scheduling information 73*u*, or presentation scheme information 73*w*. Timing information 73*y* includes timing data structure 77*b* that has item indicator field 77*c* and last playtime field 77*d*. Item indicator field 77*c* includes item identification entries for potential substitute items in audiovisual material 73*v*. Each identification entry contains a code that is associated with a potential substitute item in audiovisual material 73*v*, and control logic 73*h* retrieves the substitute item based upon the identification entry. Last playtime field 77*d* includes entries that contain a representation of the last time the item associated with the identification entry was presented. DS 77*b* includes multiple records one of which is identified as substitute item indicator record 77*e*. The entry for item indicator field 77*c* indicates that the item identified by code "397018" was last played on Jan. 1, 2001 at 11:31:11, which is the entry for last play time field 77*d* of record 77*e*. When control logic 73*h* creates a record for a substitute item, the item identification entry is populated with an indication that points to the substitute item, and the entry for last play time field 77*d* is initialized to NULL or any other value indicating that the substitute item has not yet been presented.

One of ordinary skill in the art would appreciate that DS 77*b* is not limited to the three records shown in FIG. 8*f*, and that an implementation including DS 77*b* may have tens, hundreds, thousands, or even millions of records. Furthermore, one of ordinary skill in the art would appreciate that in an alternative embodiment, identification entries are one or more of the following: alpha-numeric label, text label, link, or pointer. Instead of a code, the name of the item is used. In the case of a song item, the name can be, but is not limited to being, the title of the song. So long as control logic 73*h* can retrieve the substitute item based upon a record's entry for item indicator field 77*c*, the format of the entry does not matter.

FIG. 8*g* illustrates in greater detail the operation of identifying a substitute item of FIG. 8*d* according to an alternative embodiment of the present invention. In an alternative embodiment, in process 400, identifying 401*c* a substitute item includes control logic 73h selecting 401e a record in DS 77b. Selecting 401e a record is tantamount to selecting a substitute item in audiovisual material 73v, and records can be selected at random, sequentially, or in accordance with other rules to achieve certain presentation objectives desired by the user. Control logic 73h then determines 401f whether the substitute item satisfies the minimum time spacing constraint. To make the minimum time spacing constraint determination, control logic 73h determines the presentation time for the substitute item. In an embodiment in which the substitute item is to be presented immediately, control logic 73h determines the presentation time by obtaining a representation of the current time from timer 73l. Control logic 73h then retrieves the record's entry for last play time field 77d. Control logic 73h then determines whether the presentation time for the substitute item exceeds the record's entry for last play time field 77d (i.e., substitute item's last play time) by at least the value in minimum_time_spacing 77a (i.e., meets the minimum time spacing constraint). When the presentation time of the substitute item exceeds the substitute item's last play time by at least the value in minimum_time_spacing 77a or the entry for last play time field 77d is NULL, control logic 73h updates 401g DS 77b by storing the substitute item's presentation time in the entry for last play time field 77d, and then proceeds with the next operation.

When the last play time of the substitute item does not exceed the last play time of the substitute item by at least the value in minimum_time_spacing 77a, control logic 73h selects 401e another substitute item and repeats the minimum time spacing constraint determination.

One of ordinary skill in the art would appreciate that there are many techniques for achieving the objective of selecting an item that satisfies a minimum time spacing constraint, and that the present invention is not limited to any one technique whether described or not described herein. Nevertheless, other techniques are described elsewhere herein. Furthermore, one of ordinary skill in the art would appreciate that, in an alternative embodiment, control logic 73h imposes different minimum time spacing constraints for different substitute items or different groups of substitute items. While only one minimum time spacing value is illustrated in storage space 73x one of ordinary skill in the art would appreciate that, in an alternative embodiment, there may be more than one minimum time spacing value stored each of which is different, and each of which governs the presentation of a group of substitute items that is a subset of the entire set of potential substitute items. Alternatively, each potential substitute item is associated with its own value for minimum time spacing.

The former, is achieved, in an alternative embodiment by adding a minimum time spacing pointer field in DS 77b. Each record's entry in the minimum time spacing pointer field points to a minimum time spacing value, one of several different values, in space 73x. The entries in some records in DS 77b point to one minimum time spacing value and the entries of other records point to another minimum time spacing value, and so forth with respect to yet other groups of records.

The latter is achieved, in an alternative embodiment, by adding a minimum time spacing field in DS 77b. Each record's entry in the minimum time spacing field indicates the minimum time spacing allowed for the record's associated substitute item.

As indicated above, in addition to or instead of minimum time spacing between repetitions of items, users also often have strong expectations about how often some substitute items are presented relative to other items. This is achievable simply by having each group of items have a different minimum time spacing constraint. For example, a first group of items includes 50 items which have a cumulative running time of 300 minutes, and a second group of items includes 60 items which have a cumulative running time of 240 minutes. The first group of items is to have a 1:2 ratio of presentation in favor of the second group of items. If all the items were presented sequentially without interruption, the total running time would be 780 minutes. Since the 50 items are only presented once during this time, the minimum spacing time for group one items is (total running time)/(total effective number of items in group one) which is 15.6 minutes. The total effective number of items in group one is the product of the number of items in group one and the number of repetitions that occur during the total running time. For group one the number of repetitions is one. Similarly the minimum spacing time for group two items is (total running time)/(total effective number of items in group two) which is 6.5 minutes.

In order to have all items experience the proper number of repetitions, in an alternative embodiment, DS 77b includes a repetitions field and a number of presentations field. A record's entry in the repetitions field indicates the maximum number of repetitions allowed the record's associated substitute item during the "total running time." A record's entry for the number of presentations field indicates the number of times the record's associated substitute item has been presented. Records can be selected at random so long as for each presentation of a substitute item in group one there is the corresponding number of presentations of a substitute item in group two. Each record's entry for the number of presentations field is initialized to 1 and the appropriate maximum number of repetitions plus 1 is stored in the record's repetitions field. When a record is selected, the entry for the number of presentations field is incremented. The increment operation rolls over to zero when the increment operation occurs while the number of presentations field equals the maximum number of repetitions plus 1. When the number of presentations field is zero the record is no longer available for selection. One of ordinary skill in the art would appreciate that there are other possible techniques that may be used to achieve relative rates of presentation based upon the minimum spacing time.

Depending upon the embodiment, BID 72 allows a user to have the user's expectations enforced even when the user is experiencing items of programming which were chosen and placed in a sequence without taking the user's expectations into account. The user experience is enhanced when the user's expectations as to relative frequency of presentation of songs are enforced even when the user is experiencing items of programming whether received by receiver 73b, retrieved from audiovisual material 73v, or both.

FIG. 8h illustrates temporary storage space including information for constraining presentation of items of programming according to an alternative embodiment of the present invention. Temporary storage space 73x, in an alternative embodiment, includes minimum_time_spacing 77a, described above, max_repetitions 77f that holds a representation of the maximum number of repetitions for substitute items during a certain period of time. Temporary storage space 73x includes time_period 77g that holds a representation of the certain period of time. The description of temporary storage space 73x that was made in connection with FIG. 8e is incorporated herein by reference. The value held by max_repetitions 77f ranges from 0 to the maximum integer value that can be represented by control logic 73h. The value for time_period can range from 0 to positive infinity. Just as minimum_time_spacing 77a is described above as being definable by the user via interface 73i and control logic 73h, time_period 77g and max_repetitions 77f are also definable.

FIG. 8*i* illustrates a temporary storage space that includes information related to time that items of programming are presented according to an alternative embodiment of the present invention. Timing information space 73*y* includes timing data structure 77*h* that has item indicator field 77*c*, last play time field 77*d*, both of which are described above, and initial presentation time field 77*i*, and number of presentations field 77*j*. The description of timing information space 73*y* that was made in connection with FIG. 8*f* is incorporated herein by reference. The entries for number of presentations field 77*j* indicate the number of times the item identified by the entry for item indicator field 77*c* has been played. The entries for initial presentation time field 77*i* indicate the time at which the item identified by the item indicator entry 77*c* was first presented.

Substitute item indicator record 77*k* is representative of a record in timing information space 73*y* that is created by control logic 73*h* for a potential substitute item in audiovisual material 73*v*. When control logic 73*h* creates a record it populates the entry for indicator field 77*c* with an identifier that points to the associated substitute item, initializes both the entry for last play time field 77*d* and the entry to initial presentation time field 77*i* to NULL, and the entry in the number of presentations field 77*j* is initialized to zero. In alternative embodiment, the entry for initial presentation time field 77*i* is initialized to a representation for time that represents the greatest possible value for time (max_time) in the numbering system used for representing time in the embodiment. In an embodiment, a value for max_time is stored in temporary storage space 73*x*.

FIG. 8*j* illustrates in greater detail the operation of identifying a substitute item of FIG. 8*d* according to an alternative embodiment of the present invention. In an alternative embodiment, in process 400, identifying 401*c* a substitute item includes control logic 73*h* selecting 401*e* a record in DS 77*b*. Selecting 401*e* a record is tantamount to selecting a substitute item in audiovisual material 73*v*, and records can be selected at random, sequentially, or in accordance with other rules to achieve certain presentation objectives desired by the user.

Control logic 73*h* then determines 401*h* whether the selected substitute item has never been selected before. If the item has never been selected before, the item satisfies both the minimum time spacing constraints and the maximum repetitions constraint. A NULL value in the entry for last play time field 77*d* indicates to control logic 73*h* that the substitute item has never been selected and that implicitly the substitute item's presentation time exceeds the last play time of the substitute item by at least the value in minimum_time_spacing 77*a* and that the maximum repetitions constraint is satisfied. When the entry for last play time field 77*d* has a NULL value, control logic 73*h* updates 401*i* DS 77*b* by incrementing the record's entry for number of presentations field, stores the substitute item's presentation time in the record's entry for initial presentation time field, and stores the substitute item's presentation time in the record's entry for last play time field 77*d*.

When the value for the entry for last play time field 77*d* is not NULL, control logic 73*h* determines 401*j* whether a new repetition cycle is commencing. Control logic 73*h* determines 401*j* that a new repetition cycle is commencing by determining whether the difference between the substitute item's presentation time and the record's entry in initial presentation time field 77*i* is at least as great as the value for time_period 77*g*. When the foregoing condition is satisfied, control logic 73*h* sets 401*k* the entry to number of presentations field 77*j* to 0, and then determines 401*m* whether the minimum time spacing constraint is satisfied. When the foregoing condition is not satisfied, control logic 73*h* determines 401*l* whether the maximum repetitions constraint is satisfied.

Control logic 73*h* determines 401*m* whether the minimum time spacing constraint is satisfied in the manner discussed above in connection with FIG. 8*g*, and such discussion is incorporated herein by reference. When the minimum time spacing constraint is satisfied, control logic 73*h* updates 401*n* DS 77*b* by incrementing the entry for number of presentations field 77*j*. Control logic 73*h* also updates by setting both the entry for initial presentation time field 77*j* and the entry for last play time field 77*d* to the substitute item's presentation time if, after incrementing the entry for number of presentations field 77*j* is equal to 1. If after incrementing the entry for number of presentations field 77*j* is not equal to 1, control logic 73*h* only sets the entry for last play time field 77*d* to the substitute item's presentation time. When the minimum time spacing constraint is not satisfied, control logic 73*h* selects 401*e* another substitute item and repeats the constraint satisfaction determination process.

Control logic 73*h* determines 401*l* whether the maximum repetitions constraint is satisfied by determining whether the entry for number of presentations field 77*j* is less than the value of max_repetitions 77*f*. When the maximum repetitions constraint is not satisfied, control logic 73*h* selects 401*e* another substitute item and repeats the constraint satisfaction determination process. When the maximum repetitions constraint is satisfied, control logic 73*h* determines 401*m* whether the minimum time spacing constraint is satisfied in the manner discussed above.

As indicated earlier there are many possible algorithms for enforcing minimum time spacing or maximum repetitions constraints, but they all involve as described above, initializing at least one data structure, selecting a substitute item, determining whether basic conditions, depending upon the embodiment, of spacing or repetitions are satisfied for the selected substitute item, selecting another substitute item if necessary, and updating the data structure when a satisfactory substitute item has been selected. Thus, the present invention is not limited to just the techniques for enforcing constraints described herein.

One of ordinary skill in the art would appreciate that, in an alternative embodiment, potential substitute items do not share the same value for max_repetitions 77*f*, and that different items may be subject to different maximum repetitions values. There are many techniques for enforcing different repetition constraints on items, including having each potential substitute item be associated with its own value for maximum repetitions or for each of several groups of items to be associated with its own value for maximum repetitions. The former is achieved, in an alternative embodiment, by adding a maximum repetitions field in DS 77*b*. Each record's entry in the maximum repetitions field indicates the repetitions allowed to the record's associated substitute item. The latter, is achieved, in an alternative embodiment by adding a maximum repetitions pointer field in DS 77*b*. Each record's entry in the maximum repetitions pointer field points to a maximum repetitions value, such as the value of max_repetitions 77*f* in space 73*x* that holds more than just one value.

Furthermore, one of ordinary skill in the art would appreciate that, in an alternative embodiment, potential substitute items are subject to different values of time_period 77*g*. The techniques for achieving this are described above in the discussion relating to having items subject to different maximum repetitions values. As indicated earlier, in an alternative embodiment, potential substitute items are subject to different values of minimum_time_spacing 77*a*.

From the foregoing, one of ordinary skill in the art would appreciate that different relative rates of presentation may be achieved by having potential substitute items be subject to one or more of the following: different repetitions rates, different time periods, or different minimum time spacing constraints. In other words, some substitute items will be presented more frequently than others. Greater control over presentation is achieved by using more than one control variable (i.e., repetition values, repetition time period, minimum time spacing).

The relative rates of presentation are faithfully produced in accordance with the user requirements when the non-user specified items of programming (i.e., the ones that are chosen and sequenced without the user's expectations being taken into consideration) are different from the substitute items. When there is overlap, and especially when there is significant overlap, the repetitions constraint, or, depending upon the embodiment, relative rates constraint or minimum time spacing constraints may not be satisfied.

One of ordinary skill in the art would appreciate that in an alternative embodiment overlap is taken into consideration in maintaining the data structure used for substitution. In the foregoing description the data structure was updated in response to substitution requests. However, one of ordinary skill in the art would appreciate that other events may trigger the need to update the data structure. Other events include, but are not limited to: a match between a non-user specified item of programming that is about to be presented and a substantially identical substitute item of programming; a substitute item (or substantially identical one) being presented due to a reason other than activation of a substitute button; and addition of new items to the set of substitute items. In an alternative embodiment, Control logic 73$h$ reacts to a user request to add an item to the set of substitute items by populating a record with information about the added item. Additionally, depending upon the embodiment, when the addition of an item affects the minimum spacing time of other items, control logic 73$h$ recalculates the minimum spacing time for the different groups of items.

Reasons, other than activation of a substitute button, for a substitute item being presented include, but are not limited to: a user requesting via interface 73$i$ that control logic 73$h$ retrieve a specific substitute item from audiovisual material 73$v$ and have transmitter 73$d$ present it; and a user requesting via interface 73$i$ that control logic 73$h$ present a sequence of items specified in a play list retrieved from presentation scheme information 73$w$.

With respect to the event mentioned above regarding a match between non-user specified item of programming that is about to be presented and a substantially identical substitute item of programming, for a match to be detected, in an alternative embodiment, the identity of the non-user specified item of programming is determined before determining whether there is a match. This means that the identity of the non-user specified item of programming should be available ideally before the non-user specified item of programming is presented, but potentially as late as shortly after presentation starts. It does not matter how the identity information arrives so long as it arrives in time to be of use in controlling presentation in accordance with user expectations.

With respect to the two scenarios in the event involving substitute item presentation without activation of substitute key and the event involving addition of items to the set of substitute items, control logic 73$h$ obtains the identity information from server 29$a$ via wired or wireless networks 26, 28 and transceiver 73$j$ or from storage 73$f$; depending upon the embodiment, in audiovisual material 73$v$, presentation scheme information 73$w$, or elsewhere. For the user to select an item for immediate play back, compose a play list, or add items to the set of substitute items control logic 73$h$ presents item-related information via interface 73$i$ that allows the user to select an item for playback, compose a play list, or to add an item to the set of substitute items. The item-related information is itself the identity information or corresponds with information stored in storage 73$h$ that allows control logic 73$h$ to obtain, in response to user activations of interface 73$i$, the identity information from storage 73$h$ or an external resource, such as a server, communications device, or storage device.

Consequently, control logic 73$h$ either attempts the update at the time of the selection, stores information about the selection to allow updating later, or includes sufficient information in the play list as it is being composed by the user so that when play list items are being presented identity information (congruent with that in the data structure to be updated) for the items can be retrieved from wherever it is stored in storage 73$f$ or external resource and used in updating the data structure.

Depending upon the embodiment, the identity information is contained in, but not limited to, one or more of the following: a schedule obtained from a broadcaster or someone acting on the behalf of the broadcaster; a broadcaster composed play list that specifies the play time for items including substitute items that are to be retrieved for presentation from audiovisual material 73$v$; a user composed play list; or a user initiated request that identifies an item and directly or indirectly its associated identity information. A user initiated request includes, but is not limited to, a request to play back an item or add an item to the set of substitute items.

With respect to the first three sources, in an alternative embodiment, via transceiver 73$j$, control logic 73$h$ obtains scheduling information including identity information for items of programming. Depending upon the embodiment, the scheduling information is obtained from one or more of the following devices: server 29$c$, computer 31, or a communications device such as a conventional cell phone 15, wireless personal digital assistant, pocket personal computer (PC), or temporary removable storage that is coupled to control logic 73$h$. One of ordinary skill in the art would appreciate that given the many potential sources of scheduling information, transceiver 73$j$ can take many different forms, and depending upon the embodiment, transceiver 73$j$ retrieves the scheduling information by one or more of the following mechanisms: wirelessly, infrared, and wire cable. Transceiver 73$j$ is also described in greater detail elsewhere herein. With respect to the first two sources, in one embodiment, via receiver 73$b$, control logic 73$h$ obtains scheduling information including identity information for items of programming. Techniques for receiving such information via receiver 73$b$ are well known in the art and are described elsewhere herein.

With respect to the last two sources, in an alternative embodiment, via interface 73$i$ and identity information stored in storage 73$f$, control logic 73$h$ presents to a user item choices for selection for play back or for play list composition. Control logic 73$h$ obtains the identity information as a consequence of the selection or obtains the identity information based upon information placed in the play list during composition or because control logic 73$h$ composes and stores separately the information and associates it with the play list. When the play list's items are presented, control logic 73$h$, based upon the association previously made, retrieves the separately stored information and uses it to access the identity information.

A schedule of broadcaster programming is described below. One of ordinary skill in the art would appreciate that a schedule or play list may have many features in common with respect to information content. Typically a schedule has an absolute start time and end time specified by someone other than the user, and items described in a schedule typically have an associated absolute timeslot. On the other hand items in a play list may be presented at a start time specified by the user, and presentation may, depending upon the embodiment, be terminated at the user's option. Consequently, an item described in a play list may not have an associated absolute timeslot until presentation commences. However, depending upon the embodiment, the absolute timeslot may only be tentative, on account of the user being able to 'fast-forward' through or 'skip' items. Furthermore, play lists may either be invoked only once or they may invoked more than once. One of ordinary skill in the art would appreciate these and other differences and that the embodiments of the present invention apply to schedules and play lists generally and not limited to only those described herein. As indicated elsewhere herein schedules and play lists need not be descriptive of a day's or an hour's worth of programming, and, depending upon the embodiment, even a description of a single item that arrives at BID 72 via just before the item is presented is considered a schedule encompassed by an embodiment of the present invention. One of ordinary skill in the art would appreciate that a schedule, depending upon the embodiment, may describe items received in a digital stream from an online or Internet-based radio station.

FIG. 9a illustrates, according to an alternative embodiment of the present invention, a data structure for information descriptive of non-user specified items of programming that may be presented. DS 150 includes channel field 151a whose entry indicates the channel with which the schedule entries in DS 150 are associated. Entry for channel date field 151b indicates the date (mm,dd,yy) for which the records in DS 150 are relevant. DS 150 includes user preference incorporation field 160a that indicates whether the items identified in the schedule were included in accordance with the user's presentation preferences. As indicated elsewhere herein, DS 150 is also representative of play lists that are presented by control logic 73h, even though all the fields in DS 150 may not be in the fields of a play list. However, in an alternative embodiment, a play list does not include presentation rules incorporation field 160a that indicates whether the items identified in the play list were included in accordance with the user's presentation preferences. While the entry for field 160a is 'N' indicating that the schedule was not composed in accordance with any of the user's presentation preferences, entries other than 'N' may also be used. The entry for field 160a is used by control logic 73h to determine whether presentation rules should be enforced so as to substitute items in a schedule with other items or whether to let the item be presented unimpeded. For instance, when a user explicitly selects via interface 73i an item from audiovisual material 73v for presentation, control logic 73h determines whether the item is associated with a user preference incorporation field. When the item is not associated with a user preference incorporation field, the item is presented by control logic 73h. However, where either a play list of items or schedule of items that were not composed in accordance with presentation rules are being presented, control logic 73h, depending upon the entry in a presentation rules incorporation field, either enforces or does not enforce either some or all of the presentation rules. In an alternative embodiment, after non real-time customization of DS 150 to produce DS 152, or DS 154 as the case may be, both described in greater detail below, control logic sets the entry for field 160a of DS 152, or DS 154 to "S" to indicate that the items identified in DS 152, or DS 154 are acceptable to the user, but that before they are presented control logic 73h is to determine whether presentation rules other than acceptability (e.g., minimum spacing, relative frequency of repetition) are satisfied when they are presented. Alternatively, control logic 73h sets field 160a to "Y" to indicate that the items are presented without first determining whether they satisfy any presentation rules.

DS 150 includes n records were n is an integer greater than 1. Records 151j, 151k are examples of two consecutive records each of which has entries for fields in DS 150. In one embodiment, the first record of DS 150 is the record with the time slot with the earliest start time. The last record or $n^{th}$ record is the record with the time slot with the latest start time. Each record has a record number which indicates its relative position in DS 150. An entry for record number field 151d indicates the position or record number of a record, a record's entry for record number field 151d is referred to herein as its "RecordNumber." An entry for time field 151c indicates the starting time of an item identified in another field of a record. In an alternative embodiment, time field 151c, indicates the running time or duration of an item identified in another field of a record. In an alternative embodiment, time field 151c, indicates the start time and ending time of an item identified in another field of a record.

Where DS 150 is representative of a play list, DS 150, depending upon the embodiment, may have all or may not have one or more of the following fields described so far in connection with DS 150: channel field 151a, date field 151b, time field 151c, and record number field 151d.

An entry for artist field 151e provides the identity of the artist or source of the item of programming identified in an entry in program name field 151f. An entry for program name field 151f identifies the name by which the item of programming is referred to. An entry for program type field 151g indicates the music, news, ad, or show genre associated with the program identified in an entry in field 151f. There are several hundred genre types for music alone.

An entry for common user group field 151h indicates a code for one of several groups into which the audience members of the items are divided. In an alternative embodiment, audience members refers to people who experience the items and whose preferences regarding the items are known to a preference analysis computing system so as to allow groups of members with shared preferences to be identified. In an alternative embodiment, a preference analysis computing system includes a collaborative filtering or recommender system. Depending upon the embodiment, the preference analysis computing system is one or more of the following: included in BID 72, resides partly in BID 72 and partly on a separate computing platform, selectively coupled to but completely separate from BID 72, capable of exchanging information regarding preferences and/or group codes with BID 72, and capable of providing but not exchanging information regarding preferences and/or group codes with BID 72.

In one embodiment, group field 151h has one group code entry for each record, but there is no limit to the number of group codes in an entry in group field 151h of a record. An item is associated with a group code if one or more users express an interest in the item or there is great likelihood that users within the group will find the item acceptable. Associating an item with a group code even though some users within the group associated with the group code have not expressed an interest in the item is well understood by those skilled in the art of collaborative filtering.

As described in greater detail below, in an alternative embodiment, user profile 73t includes a list of group codes indicative of the groups with which the user shares common preferences or interest. If a non-user specified item of programming is not in a list of unacceptable items stored in user profile 73t, control logic 73h determines whether to allow the item to be presented by determining whether the entry in group field 151g that is associated with the item of programming includes at least one group code which is among a list of user specific group codes in user profile 73t. Depending upon the embodiment a non-user specified item of programming refers to a scheduled item of broadcast programming which is received by receiver 73b. However, non-user specified item of programming, depending upon the embodiment, is not limited to broadcast programming or programming received by receiver 73b.

In an alternative embodiment, a scheduled item has one or more group codes in an entry in field 151h and an associated ranking for each of the group codes in an entry in a ranking field (not shown in FIG. 9a) in a data structure, such as structure 150 in scheduling information 73u. The ranking associated with a group code indicates either the ranking that users associated with the group code have assigned the scheduled item or ranking that is predicted by a collaborative filtering system given past user rankings known to the collaborative filtering system.

In an alternative embodiment, a scheduled item of programming has one or more group codes in an entry in field 151h and one or more associated group item quality rankings for each of the group codes. The group item quality rankings for each of the group codes are in an entry in a group item quality ranking field (not shown in FIG. 9a) in a data structure in scheduling information 73u. Each group item quality ranking associated with a group code indicates either the ranking that users associated with the group code have assigned a quality of a scheduled item or ranking for a quality of the item that is predicted by a collaborative filtering system given past user rankings known to the collaborative filtering system. Examples of item qualities include, but are not limited to: lyrics, music, originality, production, beat, timeliness, newsworthiness, reliability, trustworthiness, bias, educational value, difficulty of understanding, complexity, age group targeted, etc.

The method by which a collaborative filtering system produces ranking, group codes, or group item quality rankings is immaterial to the present invention. Generating group codes, rankings, and group item quality rankings, associating users with group codes, and associating items with group codes are operations performed by a collaborative filtering system that is not part of one or more embodiments of BID 72 described herein. In such embodiments, control logic 73h and storage 73f receive none, or one or more of the following but control logic 73h does not generate them: group codes, rankings, and item quality ranking. However, one of ordinary skill in the art would appreciate that in an alternative embodiment, due to subjective division of labor implementation decisions, one or more collaborative filtering system operations or sub-operations are performed by control logic 73h of BID 72. In such an alternative embodiment, depending on the collaborative filtering system implemented, of which there are many known in the art, control logic 73h produces one or more of the following: group codes, rankings, group item quality rankings. In such an alternative embodiment, control logic 73h performs one or more of the following: associate one or more users with group codes, and associates items with group codes.

Referring to FIG. 9a, DS 150 includes item identifier field 151i that contains item identifier entries that uniquely identify the item described by an entry for field 151f. One of ordinary skill in the art would appreciate that in an alternative embodiment DS 150 does not include an item identifier field 151i, and control logic 73h refers to entries in program name field 151f to determine the unique identity of an item.

The duration of the time slot occupied by the item of programming of a record is determined by control logic 73h by calculating the time difference between the entry for starting time field 151c of the record and the entry for starting time field 151c of the following record. For example, the time slot for the item of programming of record 151j is determined by control logic 73h by calculating the difference between the entry for starting time field 151c of record 151j, 00:05:03, and the entry for starting time field 151c of record 151k, 00:09:43. The difference is 00:04:40. Control logic 73h determines time remaining in a time slot by calculating the difference between the time indication received from timer 73l and the entry for starting time field 151c of the record that follows the record associated with the time slot.

While in the above description the data structure described is for a schedule for one channel, one of ordinary skill in the art would appreciate that in an alternative embodiment a data structure stored in scheduling information 73u includes multiple schedules for multiple channels.

DS 150, which as indicated above is representative of broadcast schedules as well as play lists, is used below in describing an alternative embodiment. In this alternative embodiment, presentation of some scheduled items causes control logic 73h to update a data structure that facilitates enforcement of user expectations regarding presentation of items. One of ordinary skill in the art would appreciate that use of DS 150 to facilitate description of the alternative embodiment, does not mean that all the fields of DS 150 are necessary elements of the alternative embodiment.

Depending upon the embodiment, the data structure that is updated by control logic 73h includes one of DS 77b and DS 77h. However, in an alternative embodiment, equivalent structures may also be employed. The data structure updating technique described below is not limited to use with DS 77b or DS 77h, but may be used with equivalent data structures or alternative data structures. However, the updating technique is described in the context of an alternative data structure which facilitates illustration of relative rates of repetition, among other features. The alternative data structure and updating technique are described below.

FIG. 8k illustrates a data structure, according to an alternative embodiment of the present invention, which facilitates enforcement of rules regarding presentation of items. DS 139 includes category fields 140a, 140b, and 140c which are organized as circular buffers. Each category field has an associated frequency of repetition relative to the other category fields. Each entry in category fields 140a, 140b, and 140c is a substitute item record. DS 139 includes records 141d-141o, each of which is in an entry in one of category fields 140a, 140b, and 140c. Each record includes an item indicator which refers to an item in audiovisual material 73v. In one embodiment, item indicator entries include labels by which items are commonly known. In an alternative embodiment, item indicator entries are codes that uniquely identify the item. For digital song items, the songs often include metadata that contains artist, album, or song title among other information. Information from the metadata is used in one embodiment as an item indicator.

Figure 8L:
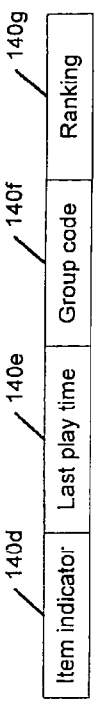
FIG. 8l illustrates several different types of records for data structures used in enforcing rules regarding presentation of items, in accordance with various embodiments of the present invention.

FIG. 8l illustrates several different types of records for data structures used in enforcing rules regarding presentation of items, in accordance with various embodiments of the present invention. Depending on the embodiment, records 141*d*-141*o* have either one field (item indicator field 140*d*), two fields (item indicator field 140*d*, last play time field 140*e*), three fields (item indicator field 140*d*, last play time field 140*e*, group code field 140*f*), or four fields (item indicator field 140*d*, last play time field 140*e*, group code field 140*f*, ranking field 140*g*). The information in the fields corresponds to the information in the fields of the same type in DS 150. However, while DS 150 is described, in an alternative embodiment, as having a group ranking field one is not shown in FIG. 9*a*. Ranking field 140*g* includes entries for group ranking for the item identified in an entry for indicator field 140*d*. The form of entries for item indicator field 140*d*, have already been described above in connection with FIG. 8*k*. Entries for last play time field 140*e* indicate the last play time for the item identified in an entry for indicator field 140*d*. Entries for group code field 140*f* includes, depending on the embodiment, one, or one or more group codes each of which is indicative of a group (of users) that is known or is predicted to have a high affinity to the item identified by an entry for item indicator field 140*d*. Any of the fields and information described in connection with DS 150 and DS 156, whether in the initial embodiments or alternative embodiments including such data structures, are also fields and information reflected in the records of alternative embodiments of DS 139. For example, item category indicators are included in an alternative embodiment that includes one of or both of DS 150, DS 160, and such indicators are also included in an alternative embodiment that includes DS 139.

Referring to FIG. 8*k*, each category field has an associated repetition rate relative to other category fields. For example, an item identified in an entry in category field 140*a* is presented x times for every y presentations of an item identified in an entry in category field 140*b*, and an item identified in an entry in category field 140*c* is presented z times for every y presentations of an item identified entries in category field 140*b*. One of ordinary skill in the art would appreciate that the present invention is not limited to three category fields or any specific repetition numbers, x, y, and z, and that more or fewer fields and other repetition numbers may be also be used. Furthermore, DS 139 is just one of many organizational structures that may be used to achieve different repetition rates for different items.

FIG. 8*m* illustrates temporary storage space including information for constraining presentation of items of programming according to an alternative embodiment of the present invention. Temporary storage space 73*x*, in an alternative embodiment, includes minimum_time_spacing 77*a*, described above, and category A repetitions 77*l*, category B repetitions 77*m*, category C repetitions 77*n* each of which holds a representation of the number of repetitions of items identified in the respective category relative to repetitions of items identified in the other categories. While only three category repetition numbers are shown as being stored in space 73*x*, one of ordinary skill in the art would appreciate that the invention is not limited to an particular number of category repetition numbers.

For purposes of illustration, consider the variables x, y, and z as having the values stored in category A repetitions 77*l*, category B repetitions 77*m*, and category C repetitions 77*n*, respectively. The values stored in repetitions 77*l*, 77*m*, and 77*n*, are 1, 2, and 3, respectively.

The top most entry in category field 140*a* is record 141*d*. The top most entry in each category field 140*a*, 140*b*, 140*c*, points to an item which has not been presented in the longest time relative to the items associated with the other records in category field 140*a*, 140*b*, 140*c*, respectively. Record 141*f* is the bottom-most entry in category field 140*a*. The bottom-most entry in each category field 140*a*, 140*b*, 140*c*, points to an item which has been presented most recently relative to the items pointed to by the other records in category field 140*a*, 140*b*, 140*c*, respectively. Records 141*d*-141*o* are ordered in the reverse chronological order of the last presentation time of the items to which they point. However, one of ordinary skill in the art would appreciate that ordering is a design consideration and not a limitation of the present invention and that in an alternative embodiment chronological order is implemented. In one embodiment, records 141*d*-141*o* include entries that identify a musical audio clip or song clip in audiovisual material 73*v*. However, one of ordinary skill in the art would appreciate that in an alternative embodiment the entries are identifiers for, without limitation, other types of media and information.

When substitute key 73*m* is activated for the first time after DS 139 is populated with records and entries, control logic 73*h* selects one of the topmost records in one category field in DS 139 and retrieves the substitute item pointed to by the selected topmost record. One of ordinary skill in the art would appreciate that it doesn't matter which category field is chosen as the first category field from which a record is selected in order to identify a substitute item for presentation. As indicated above, the values stored in repetitions 77*l*, 77*m*, and 77*n*, (1, 2, and 3, respectively) indicate that for each substitute item presented due to identification information from one category 140*a* record two substitute items are presented using identification information from two category 140*b* records, and that for every two substitute items presented using identification information category 140*b* records three substitute items are presented using identification information from three category 140*c* records. The choice of category for the first identifier just affects the order of presentation of all the items that are pointed to by the identifiers in DS 139. After a record is selected and a substitute item is presented due to the selected record, control logic 73*h* reorders the record relative to other records in the category field from which the record was selected. Reordering is described below.

Assuming control logic 73*h* starts to select records with category 140*a*, control logic 37*h* selects the record for the second substitute key 73*m* activation from category 140*b*. Control logic 73*h* selects the third record for the third substitute key 73*m* activation from category 140*c*. For repetitions 77*l*, 77*m*, and 77*n* equal to 1, 2, and 3, respectively, the repeating sequence is as follows: category 140*a*, category 140*b*, category 140*c*, category 140*b*, category 140*c*, and category 140*c*. Different values for repetitions 77*l*, 77*m*, and 77*n* and different starting category field would result in other sequences.

DS 139 is described below in the context of process 400 of FIG. 8*d*. Alternative embodiments of DS 139 are also described in the context of other processes that involve DS 139 being updated in order to enforce certain user expectations regarding presentation of items.

FIG. 8*n* illustrates in greater detail the operation of identifying a substitute item of FIG. 8*d* according to an alternative embodiment of the present invention. In an alternative embodiment, in process 400, identifying 401*c* a substitute item includes control logic 73*h* selecting 402*a* a record from one of category fields 140*a*, 140*b*, and 140*c* in DS 139 in accordance with a predefined sequence. As indicated above, the sequence followed depends upon among other things a) upon the number of times items in categories are repeated relative to each other and the b) the category field at which the sequence first commences. In an embodiment, the sequence commences with the category field with the lowest number of repetitions. With respect to the example given above, the category field with the lowest number of repetitions is category field 140*a*. Regardless of the category field with which control logic 73*h* commences, control logic 73*h* keeps an indication in memory in control logic 73*h* of where it is in the sequence.

In an embodiment, the record selected is the topmost record in one of category fields 140*a*, 140*b*, and 140*c*. Selecting 402*a* a record is tantamount to selecting a substitute item in audiovisual material 73*v*, and records can be selected at random, sequentially, or in accordance with other rules to achieve certain presentation objectives desired by the user. Control logic 73*h* then recorders 402*b* the selected record in the category field from which it was chosen. Reordering is described below in greater detail.

FIG. 8*o* illustrates the state of a field in a data structure, according to one embodiment, after a substitution of an item of programming. FIG. 8*o* illustrates category field 140*a* after control logic 73*h* performed a substitution operation based upon record 141*d*. In other words, in response to activation of substitute key 73*m*, control logic 73*h* selected 402*a* record 141*d*. After the substitution operation is performed, control logic 73*h* places identifier 141*d* at the bottom of field 140*a* and shifts the remaining entries up one position. Consequently, identifiers 141*e*, 141*f* are the top-most and second from the top entries, respectively, as shown in FIG. 8*O*. Control logic 73*h* then advances 402*c* to the next category in the sequence and stores in memory in control logic 73*h* or in storage 73*f* an indication of the next category from which a record is to be selected upon the user's next activation of substitute key 73*m*.

In an alternative embodiment, selecting 402*a* a record includes determining whether the selected record's entry for last play time field 140*e* satisfies a minimum time spacing constraint defined by minimum_time_spacing 77*a* and the presentation time of the substitute item identified by the record's entry for item indicator field 140*d*. If the selected record's entry for last play time field 140*e* does not satisfy the minimum time spacing constraint, control logic 73*h* selects, depending upon the embodiment, a record from another category field or a different record from the same category field of the originally selected record, and the minimum time spacing constraint determination is repeated. If the selected record's entry for last play time field 140*e* satisfies a minimum time spacing constraint, control logic 73*h* stores the substitute item's presentation time in the record's entry for last play time field 140*d*.

In one embodiment, a user of BID 72 divides at least some of the items in audiovisual material 73*v* into categories using interface 73*i*. In such an embodiment, control logic 73*h* presents on display 73*o* a label associated with an item that is to be categorized and provides choices as to categories that are selected using keys 73*p*. A label is an alphanumeric identifier by which an item is referred to, and is a song name in some cases, but other labels are also used depending upon the nature of the item. Alternatively, a list of items in audiovisual material 73*v* is provided by control logic 73*h* to a computer such as computer 31 via transceiver 73*j*. Music management software on computer 31 accepts user input at computer 31 and categorizes the items in the list accordingly. Computer 31 then provides the categorized list of items to control logic 73*h* by way transceiver 73*j* for storing in storage 73*f* in the form of DS 139.

As indicated above, in an alternative embodiment, substitution due to user activations is not the only event that requires a data structure such as DS 139 to be updated. In an alternative embodiment, control logic 73*h* updates DS 139 whenever an item to be presented is related enough to a substitute item which is pointed to by a record in DS 139 as to affect the presentation rules that control logic 73*h* enforces via DS 139.

Figure 8P:
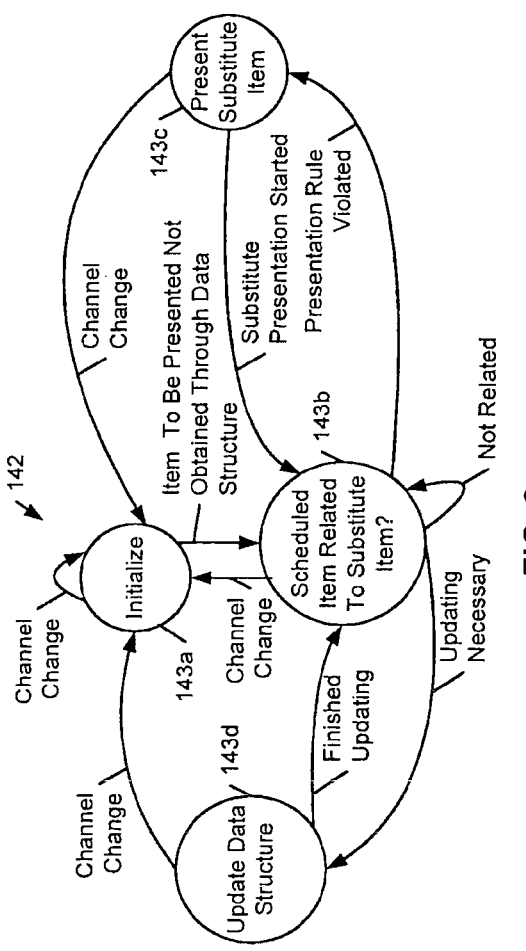
FIG. 8p illustrates, according to an alternative embodiment of the present invention, a state machine for a process that updates a data structure used by control logic to enforce rules regarding presentation of items.

FIG. 8*p* illustrates, according to an alternative embodiment of the present invention, a state machine for a process that updates a data structure used by control logic to enforce rules regarding presentation of items. In state machine 142, when user or non-user specified items of programming are being presented by transmitter 73*d*, control logic 73*h* determines the identity of the items of programming. Based upon the identity of the items of programming and information in a data structure that is used to enforce rules regarding presentation of items, control logic 73*h* determines whether the data structure is to be updated and updates the data structure if necessary. In an alternative embodiment, the items of programming are received by receiver 73*b* and transmitted by transmitter 73*d*. In an alternative embodiment, the items of programming originate in storage 73*f* and are transmitted by transmitter 73*d* after decoding by codec 73*g*. The former case is used in the description of state machine 142, but one of ordinary skill in the art would appreciate that state machine 142 is equally applicable to the case where items are presented in accordance with a user or non-user composed play list or item presentation instructions stored in storage 73*f* or memory of control logic 73*h*, or in accordance with one or more user requests for presentation of items that control logic 73*h* receives from interface 73*i* or transceiver 73*j*.

In state machine 142 at state 143*a*, control logic 73*h* initializes a FirstBeginningUpdatingProcess software construct or variable to TRUE. Software constructs or variables are stored in memory in control logic 73*h* or in storage 73*f*. In an alternative embodiment, FirstBeginningUpdatingProcess is a variable stored in memory in control logic 73*h*, but in an alternative embodiment, FirstBeginningUpdatingProcess is held in a register or another type of temporary storage. One of ordinary skill in the art would appreciate that variables or software constructs may be stored or represented in a variety of ways in hardware and software and that describing a variable or software construct as being stored in random access memory should not be understood as being the only way in which the variable or other variables and software constructs described herein are stored. The foregoing description of software constructs or variables will not be repeated each time a variable or construct is introduced herein.

When an item of programming is about to be presented and the item is not one whose presentation is known to satisfy the presentation rules enforced in part by DS 139, state machine 142 transitions to state 143*b*. In an embodiment, the transition to state 143*b* occurs on account of receiver 73*b* being tuned to a channel and starts receiving scheduled items (i.e., non-user specified items of programming). In an alternative embodiment the transition to state 143*b* occurs on account of items of programming being retrieved from storage 73*f* and presented.

When state 143*b* is entered with FirstBeginningUpdatingProcess set to TRUE, control logic 73*h*, based upon a stored indication of the channel, identifies the channel's associated schedule in storage 73*f*. In an alternative embodiment, the schedule is stored in a data structure in scheduling information 73*u*. Control logic 73*h* identifies the appropriate schedule in order to obtain an item indicator for the scheduled item that is being received or about to be received by receiver 73*b*. At state 143*b*, control logic 73*h* also determines whether the item indicator for the scheduled item being received is related in such a manner to a substitute item indicator in DS 139 that presentation of the scheduled item would affect the presentation rules enforced by DS 139. In an alternative embodiment, a relationship warranting update of DS 139 exists when the substitute item indicator points to a substitute item that is substantially a copy of the scheduled item being transmitted. As indicated in FIG. 8p, state machine 142 reenters state 143b when a scheduled item is related to a substitute item.

To make this relationship determination, after having identified the appropriate schedule, control logic 73h obtains a present time indication from timer 73l. Then, based upon the present time indication, control logic 73h identifies the record in the schedule that is associated with the timeslot in which the time indication falls. Control logic 73h then sets a software construct or variable UpdatingProcessRecordNumber to the entry in field 151d of DS 150.

Depending upon the embodiment, control logic 73h then obtains the record's entry for the item identifier field or the entry for the program name field. Depending upon the embodiment in which a schedule is organized in the manner described in connection with DS 150, control logic 73h obtains a record's entry for item identifier field 151i, or alternatively a record's entry for program name field 151f. One of ordinary skill in the art would appreciate that the field is irrelevant so long as the scheduled items and the substitute items have common labeling or identification information so as to allow control logic 73h to make the relationship determination. Consequently, instead of referring to an item identifier or item program name, reference is made herein to an item indicator which depending upon the embodiment is an item identifier, program name, or some other common indicator of item identity.

Control logic 73h then determines whether the scheduled item indicator matches a substitute item indicator in DS 139. When the scheduled item indicator doesn't match any substitute item indicator in DS 139 and FirstBeginningUpdatingProcess is TRUE, control logic 73h sets FirstBeginningUpdatingProcess to FALSE, and state machine 142 reenters state 143b. When the scheduled item indicator doesn't match any substitute item indicator in DS 139 and FirstBeginningUpdatingProcess is FALSE, control logic 73h determines whether switch 73c is selecting the output of codec 73g. When switch 73c is not selecting the output of codec 73g, state machine 142 reenters state 143b after the start time of the scheduled item arrives.

When switch 73c is selecting the output of codec 73g, control logic 73h has switch 73c select the output of receiver 73b for application to transmitter 73d when the scheduled item's start time arrives as indicated by the entry for time field 151c. In an alternative embodiment, control logic 73h decreases the volume on the output of codec 73g to perform a fadeout, and then after the switchover to the output of receiver 73b, control logic 73h increases the volume of the output of receiver 73b from a low level to a higher level in order to perform a fade in.

When the scheduled item indicator matches a substitute item indicator in DS 139, control logic 73h then determines whether the scheduled item satisfies a presentation rule being enforced via DS 139. Depending upon the embodiment, more than one presentation rule is enforced, in which case control logic 73h determines whether each rule is satisfied by the scheduled item. In an alternative embodiment, control logic 73h determines whether the minimum time spacing constraint is satisfied. In such an embodiment, records in DS 139 include last play time field 140e. In an alternative embodiment, control logic 73h determines whether the relative presentation rate constraint is satisfied. In such an embodiment, control logic 73h determines whether category field 140a, 140b, 140c in which the matched substitute item indicator is found has contributed as many items as it is permitted in a cycle. As indicated above, for each cycle through category fields 140a, 140b, 140c, category fields 140a, 140b, 140c each contributes repetitions 77l, 77m, 77n, respectively. When in the current state of the cycle the category field in which the matched substitute item indicator is found has exhausted its permissible presentations, the relative presentation rate constraint would be violated if the scheduled item were allowed to be presented.

When control logic 73h determines that there is a match between a scheduled item indicator and a substitute item indicator in DS 139 and that a presentation rule is violated, state machine 142 transitions to state 143c. When FirstBeginningUpdatingProcess is TRUE and control logic 73h determines that there is a match between the scheduled item indicator and a substitute item indicator in DS 139 and that a presentation rule is not violated, control logic 73h sets FirstBeginningUpdatingProcess to False, and state machine 142 transitions to state 143d.

When FirstBeginningUpdatingProcess is FALSE and control logic 73h determines that there is a match between the scheduled item indicator and a substitute item indicator in DS 139 and that a presentation rule is not violated, control logic 73h determines whether switch 73c is selecting the output of codec 73g. When switch 73c is not selecting the output of codec 73g, state machine 142 transitions to state 143d when the scheduled item's start time arrives as indicated by the entry for time field 151c. When switch 73c is selecting the output of codec 73g, control logic 73h has switch 73c select the output of receiver 73b for application to transmitter 73d when the scheduled item's start time arrives as indicated by the entry for time field 151c. In an alternative embodiment, control logic 73h decreases, a short time before the start time arrives, the volume on the output of codec 73g to perform a fadeout, and then after the switchover to the output of receiver 73b, control logic 73h increases the volume of the output of receiver 73b from a low level to a higher level in order to perform a fade-in. Depending upon the embodiment, after the switchover to the output of receiver 73b or the fade-in is completed, state machine 142 transitions to state 143d.

When a change channel event occurs at state 143d, state machine 142 transitions to state 143a. At state 143d, when FirstBeginningUpdatingProcess is FALSE, control logic 73h reorders the category field in DS 139 in which the matched substitute item indicator resides. Control logic 73h places the record whose entry for field 151d equals UpdatingProcessRecordNumber at the bottommost entry of the category field, and each of the records that were below the UpdatingProcessRecordNumber record are moved up one entry from their present entry in the category field. The result of this operation is described in greater detail below.

FIG. 8q illustrates the state of a field in a data structure, according to an alternative embodiment, after updating due to presentation of an item of programming that corresponds to a substitute item subject to presentation rules. FIG. 8q illustrates category field 140c after control logic 73h reordered the records because it determined that receiver 73b is presenting an item of programming which is substantially similar to a substitute item pointed to by a record in field 140c. For the case illustrated by FIG. 8k and FIG. 8p, control logic 73h determines that record 141h has an entry for item indicator field 140d that matches the scheduled item indicator of the scheduled item being received by receiver 73b and transmitted by transmitter 73d. Consequently, control logic 73h places record 141h in the bottom-most entry of field 140b and shifts records 141i, 141j up one entry. The resulting state of field 140b after reordering is as illustrated in FIG. 8p. One of ordinary skill in the art would appreciate that FIGS. 8k, 8n, and 8*p* illustrate hypothetical examples to facilitate description of the present invention and details such as the number of category fields and the number of record entries in the fields mentioned in the description are not limitations of the present invention.

When a change channel event occurs at state 143*c*, control logic 73*h* terminates the transmission, instructs switch 73*c* to select the output of receiver 73*b* for application to transmitter 73*d*, and state machine 142 then transitions to state 143*a*. When state 143*c* is entered with FirstBeginningUpdatingProcess being TRUE, control logic 73*h* identifies a substitute item for presentation in accordance with the presentation rules using records in DS 139. Identifying a substitute item is described elsewhere herein and such description is incorporated here by reference. After identifying a substitute item, control logic 73*h* sets FirstBeginningUpdatingProcess to FALSE, and then has codec 73*g* decode the substitute item and transmitter 73*d* transmit the decoded substitute item. One of ordinary skill in the art would appreciate that the substitute item may be transmitted starting at an intermediate point in the substitute item. This is desirable when substitution is occurring at an intermediate point in the timeslot of the scheduled item that is being substituted. Such an event happens when receiver 73*b* is turned on or switched to an intermediate point in the reception of the scheduled item. When the substitute item presentation starts, state machine 142 transitions to state 143*b*.

When state 143*c* is entered with FirstBeginningUpdatingProcess being FALSE, control logic 73*h* identifies a substitute item for presentation. In an alternative embodiment, the substitute item is identified in accordance with presentation rules and using records in DS 139. Control logic 73*h* then determines whether switch 73*c* is selecting the output of codec 73*g*. When switch 73*c* is selecting the output of codec 73*g* and the substitute item's start time arrives, control logic 73*h* has codec 73*g* decode the substitute item and transmitter 73*d* transmit the decoded substitute item. The start time of the substitute item is, depending upon the embodiment, the start time of the scheduled item that is being substituted. The scheduled item's start time is indicated by UpdateProcessRecordNumber record's entry for time field 151*c*. UpdateProcessRecordNumber record refers to the record in DS 150 whose entry for record number field 151*d* is equivalent to the value of UpdateProcessRecordNumber. After presentation of the substitute item begins, state machine 142 transitions to state 143*b*.

In an alternative embodiment, a FirstBeginningUpdatingProcess variable or software construct is not used. Rather, at state 143*c* control logic 73*h* determines whether the UpdateProcessRecordNumber record's entry for time field 151*c* is less than a present time indication retrieved from timer 73*l*. When the record's entry for start time is less than the present time indication, control logic 73*h* immediately has transmitter 73*d* transmit the identified substitute item. When the record's entry for start time is greater than or equal to the present time indication, control logic 73*h* waits until the start time arrives before it has transmitter 73*d* transmit the identified substitute item.

One of ordinary skill in the art would appreciate that any of the variables or the software constructs described herein are implementation dependent. Accordingly, even though an alternative embodiment's description includes certain variables or constructs, not every implementation requires they be used. To the contrary, they can be eliminated, substituted, or combined to suit design considerations.

However, in an alternative embodiment, when switch 73*c* is selecting the output of codec 73*g*, control logic 73*h*, a few seconds before the substitute item's start time arrives as indicated by UpdateProcessRecordNumber record's entry for time field 151*c*, control logic 73*h* decreases the volume on the output of codec 73*g* to perform a fadeout. When the substitute item's start time arrives, control logic 73*h* has codec 73*g* decode the substitute item, and transmitter 73*d* begin to transmit the decoded substitute item. In the first few seconds after the start time of the substitute item arrives, control logic 73*h* increases the volume of the output of codec 73*g* from a low level to a higher level in order to perform a fade in. After presentation of the substitute item begins, state machine 142 transitions to state 143*b*.

When switch 73*c* is not selecting the output of codec 73*g* and the item's start time arrives, control logic 73*h* has switch 73*c* select the output of codec 73*g* for application to transmitter 73*d*, has codec 73*g* decode the substitute item and transmitter 73*d* transmit the decoded substitute item. After presentation of the substitute item begins, state machine 142 transitions to state 143*b*. In an alternative embodiment, control logic 73*h* decreases the volume on the output of receiver 73*b* a few seconds before the start time arrives to perform a fadeout, and then when the start item arrives control logic 73*h* has switch 73*c* select the output of codec 73*g* for application to transmitter 73*d*. After the switchover to the output of codec 73*g*, control logic 73*h* increases the volume of the output of codec 73*g* from a low level to a higher level in order to perform a fade-in. After presentation of the substitute item begins, state machine 142 transitions to state 143*b*.

When state 143*b* is entered with FirstBeginningUpdatingProcess set to FALSE, control logic 73*h* increments UpdatingProcessRecordNumber. Control logic 73*h* then identifies the record with an entry for record number field 151*d* that is equivalent to the value of UpdatingProcessRecordNumber. Control logic 73*h* then determines whether the scheduled item indicator entry in the identified record matches a substitute item indicator in DS 139. Control logic 73*h* then continues with the remainder of the operations described above, and state machine 142 also performs the transitions described above and associated with state 143*b*.

In the above description of an alternative embodiment at substitution state 143*c*, the alternative programming source is codec 73*g*, and control logic 73*h* selects a substitute item from audiovisual material 73*v* for codec 73*g* to decode. However, in another alternative embodiment, the alternative programming source may be another channel that is received by receiver 73*b* and that is about to play an acceptable item. In an alternative embodiment, receiver 73*b* receives multiple bands (e.g., one or more of the following AM, FM, satellite, cell broadcast, WiFi, Bluetooth), and control logic 73*h* has receiver 73*b* switch to a channel in another band.

While state machine 142 is described as having a substitution state 143*c*, in an alternative embodiment, state machine 142 does not include a substitution state. In an alternative embodiment not including a substitution state, violations of presentation rules are taken into account by adjusting the sequence of presentation of items from the category fields of DS 139. For example, consider a scheduled item that has a matching substitute item which is referenced by a record in DS 139. The substitute item is governed by a rule that indicates its relative rate(s) compared to other items. When a scheduled item is presented despite a rule being violated, in memory or storage 73*f*, control logic 73*h* stores, separately for each associated scheduled item indicator, an indication or count of the number of times the scheduled item's presentation violated a presentation rule. The scheduled item's corresponding or matching substitute item is not presented the same number of times that the scheduled item violated a presentation rule. In other words, when the substitute item's turn comes up for presentation due to a substitute key activation, control logic 73h determines whether a matching scheduled item has violated a presentation rule. If a presentation rule has been violated, control logic 73h selects another substitute item and decrements the counter keeping count of the number of times the scheduled item violated a presentation rule.

One of ordinary skill in the art would appreciate that the state machines described herein can be supplemented with additional states and transition rules or substitute states and that such additional states and rules are design details that depend upon the context in which an embodiment is applied. Consequently, one of ordinary skill in the art would not infer that the lack of a description is an indication that the states and rules not described are not within the scope of the present invention. Accordingly, in an alternative embodiment, each of one or more of state machine 142 and the other state machines described herein is supplemented with additional states and transition rules. Furthermore, one of ordinary skill in the art would appreciate that two or more of the state machines described herein may be combined in an alternative embodiment.

To enhance the user's programming experience, an alternative embodiment lessens the burden on the user to have an unacceptable item substituted. In such an alternative embodiment, control logic 73h determines whether an item being presented is unacceptable to the user and performs the substitution at the appropriate time. A process that includes anticipatory substitution determination is referred to herein as a customization process.

In an alternative embodiment, while receiver 73b is tuned to a channel, a customization indication is accepted from the user via activation of customize key 73n. The customization indication is provided to control logic 73h, and in response, control logic 73h executes a state machine which customizes the programming transmitted by transmitter 73d. Customization is similar to substitution, but occurs automatically without the user having to activate substitute key 73m each time an unacceptable scheduled item is being received. Customization involves control logic 73h causing unacceptable scheduled items to be substituted by acceptable items retrieved from audiovisual material 73v. In an alternative embodiment, a customization state machine is executed in real-time, and involves making determinations as to acceptable substitute items only when an unacceptable scheduled item is about to be transmitted. In an alternative embodiment, customization includes identifying a substitute item that satisfies the presentation rules enforced by control logic 73h as described above in connection with state machine 142 of FIG. 8p and process 400 of FIG. 8d. States 135b, 137b, and 139b in customization state machines described below include, in the alternative embodiments of their respective state machines, operations that enforce presentation rules. However, as indicated below, in alternative embodiments, states 135b, 137b, and 139b do not enforce presentation rules. One of ordinary skill in the art would appreciate that the foregoing description of enforcement of presentation rules may be incorporated in other state machines described herein, including customization state machines.

In an alternative embodiment, a customization state machine includes two component state machines only one of which runs in real-time. A first component state machine does not run in real-time. The first component state machine operates on a schedule or a fraction thereof to produce a custom schedule for the channel associated with the schedule. To produce a custom schedule, control logic 73h executes the first component state machine and parses a received schedule. The first component state machine examines each scheduled item in turn and determines whether the scheduled item is an acceptable scheduled item (i.e., would interest the user). Whenever the first component state machine encounters an unacceptable scheduled item in the schedule, it selects an acceptable substitute item. A pointer to an acceptable substitute item is added, in one embodiment, to the record of the scheduled item to produce the custom schedule. The output of the first component state machine is one or more customized schedules, because it need not be limited to customizing the schedule for just one channel. A second component state machine uses the customized schedule to present in real-time a stream of scheduled items of programming and substitute items of programming. The foregoing is described in greater detail below.

Since customization, real-time and non-real-time, involves determining whether a scheduled item is acceptable to the user, acceptability determination processes for various embodiments are described herein. The acceptability determination process for an embodiment depends upon the information provided in a received schedule that is stored in storage 73f and depends upon information provided in user profile information 73t. Depending upon the embodiment, the schedule provided information includes, but is not limited to, one or more of the following: item indicator (either label, code, or both), group code, group item ranking, reference item category or categories with which the scheduled item has some similarity, and similarity indication of the scheduled item to each of the reference item category or categories. Depending upon the embodiment, the user profile provided information includes, but is not limited to, one or more of the following: acceptable items, unacceptable items, acceptable item indicators, unacceptable item indicators, user ranking of items ranked by groups, user group codes, user-group correlation(s) or similarity coefficient(s), item rankings provided by user and other users, weights between user(s) of an implementation of an alternative embodiment and other users of implementations of alternative embodiments or other devices whether or not encompassed by the present invention, user item rankings, item similarity coefficients, item category or categories with which user is affiliated, user average ranking of items in each category with which user is affiliated, and item category similarity coefficients. The foregoing terms are discussed in greater detail below.

Before item acceptability determination is described in greater detail than already described, some of the information used in various embodiments that support item acceptability determination is described. This information is either generated by control logic 73h or is received by control logic 73h via receiver 73b, transceiver 73d, or physical media. The manner in which the information is generated or received is immaterial to the present invention. That the information is available for processing by control logic 73h is all that matters. The source of the information is also immaterial.

As indicated above, items indicators are received by control logic 73h whether they are embedded in a schedule, play list, or identification meta-data that comes with an item itself (e.g., user purchases an item and has it stored in storage 73f). The exact manner of reception is irrelevant. So long as control logic 73h is able to associate an item indicator with an item being presented that's all that matters. Depending upon the embodiment, as described in greater detail below, control logic 73h determines whether the user has explicitly or implicitly rejected or accepted items. Control logic 73h, depending upon the embodiment, stores item indicators in either an unacceptable item indicator data structure or an acceptable item indicator data structure. This stored information is used later by control logic 73h to make item acceptability determinations.

In an alternative embodiment, control logic 73h receives along with each item indicator one or more group codes and an associated ranking for each group code. Each group code is associated with a group of members that have similar interests or preferences. Each group code has an associated group ranking indicative of the average ranking given the item identified by at least some of the members of the group. Based upon the received group-related information, as the user is experiencing items associated with various groups and implicitly or explicitly ranking them, control logic 73h produces and stores in storage 73f a weight or similarity coefficient between the user and each group associated with an item. This stored information is used later by control logic 73h to make item acceptability determinations. In an alternative embodiment, control logic 73h does not produce the user-group weight or similarity coefficient locally but rather receives it. In such an embodiment, control logic 73h stores user implicit or explicit rankings in storage 73f or in memory in control logic 73h and provides them to a computing system that produces the user-group similarity coefficient. Given the numerous information transfer methods in the art and the above description of transceiver 73b, how control logic 73h provides the user rankings to a computing system is immaterial to the present invention. Depending upon the embodiment, the computing system is one or more of the following: server 29a, server 29c, and computer 31.

The term similarity coefficient is used herein to refer to weights. One of ordinary skill in the art would appreciate that similarity coefficient is context dependent and that it is not necessarily referring to user-group similarity but may instead refer to item-item similarity or some other similarity depending upon the context. For ease of expression, similarity coefficient is used herein. Whether similarity coefficients are received or generated locally, control logic 73h uses this information to make item acceptability determinations.

In an alternative embodiment, control logic 73h receives the item rankings of other users. Based upon the received information, as the user is experiencing items and implicitly or explicitly ranking them, control logic 73h produces and stores in storage 73f a similarity coefficient between the user and each of the other users who has already ranked the item. This stored information is used later by control logic 73h to make item acceptability determinations. In an alternative embodiment, control logic 73h does not produce the similarity coefficient locally but rather receives it for each user who has ranked an item identified in a schedule or play list. In such an embodiment, control logic 73h stores user implicit or explicit rankings in storage 73f or in memory in control logic 73h and provides them to a computing system that produces the similarity coefficient. Whether similarity coefficients are received or generated locally, control logic 73h uses this information to make item acceptability determinations. In an alternative embodiment, control logic 73h generates group codes and group rankings from the item rankings of other users. The group codes and group rankings are used by control logic 73h in making predictions.

In an alternative embodiment, control logic 73h receives the item rankings of other users who have a similarity coefficient with the user that exceeds a threshold L. Based upon the received information, as the user is experiencing items and implicitly or explicitly ranking them, control logic 73h produces and stores in storage 73f a similarity coefficient between the user and each of the other users who has already ranked the item. This stored information is used later by control logic 73h to make item acceptability determinations. In an alternative embodiment, control logic 73h does not produce the similarity coefficient locally but rather receives it for each user who has ranked an item identified in a schedule or play list. In such an embodiment, control logic 73h stores user implicit or explicit rankings in storage 73f or in memory in control logic 73h and provides them to a computing system that produces the similarity coefficient. Whether similarity coefficients are received or generated locally, control logic 73h uses this information to make item acceptability determinations.

In an alternative embodiment, control logic 73h receives the item similarity coefficients for multiple items. Based upon the received information, control logic 73h makes item acceptability determinations. In such an embodiment, control logic 73h stores user implicit or explicit rankings in storage 73f or in memory in control logic 73h and provides them to a computing system that produces the item similarity coefficient. In an alternative embodiment, control logic 73h produces the similarity coefficient based upon item rankings of users that are received by control logic 73h. In such an embodiment, control logic 73h also stores user implicit or explicit rankings in storage 73f or in memory in control logic 73h and provides them to a computing system that produces the item similarity coefficient. Whether similarity coefficients are received or generated locally, control logic 73h uses this information to make item acceptability determinations.

In an alternative embodiment, control logic 73h receives the item category similarity coefficients for multiple item categories. Control logic 73h also receives item indicators each of which has one or more associated item categories. Based upon explicit or implicit ranking of items associated with the item indicators, control logic 73h generates user average rankings for the item categories. Based upon the received information and the locally generated user average rankings for the item categories, control logic 73h makes item acceptability determinations. In such an embodiment, control logic 73h stores user implicit or explicit rankings in storage 73f or in memory in control logic 73h and provides them to a computing system that produces the item category similarity coefficients. In an alternative embodiment, control logic 73h produces the item category similarity coefficients based upon item rankings of users that are received by control logic 73h. Whether similarity coefficients are received or generated locally, control logic 73h uses this information to make item acceptability determinations.

Figure 9C:
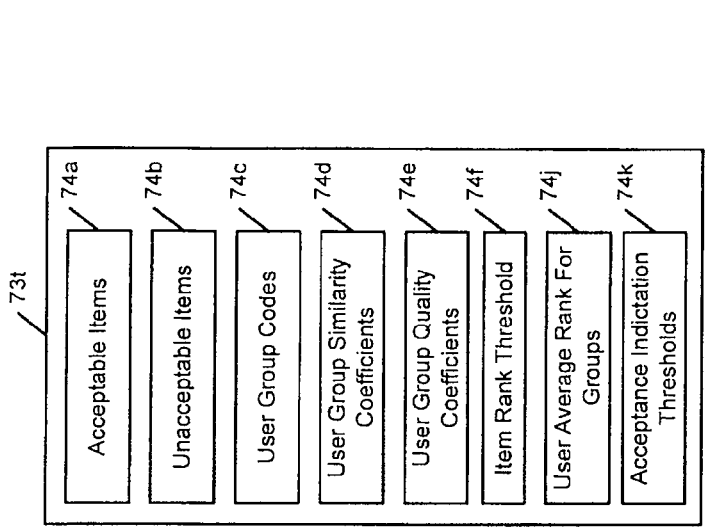
FIG. 9c illustrates user profile information in greater detail according to one embodiment of the present invention.
Figure 9T:
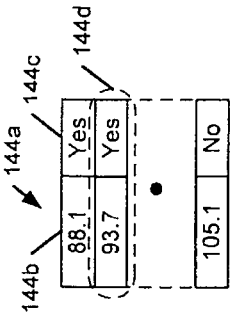
FIG. 9t illustrates, according to an alternative embodiment of the present invention, a data structure for information representative of user preferences.
Figure 9M:
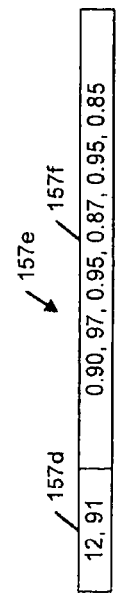
FIG. 9m illustrates elements of a data structure that includes information for determining acceptability of an item to the user according to an alternative embodiment of the present invention.
Figure 9O:
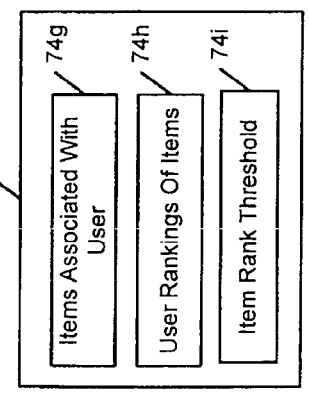
FIG. 9o illustrates user profile information in greater detail according to one embodiment of the present invention.
Figure 9B:
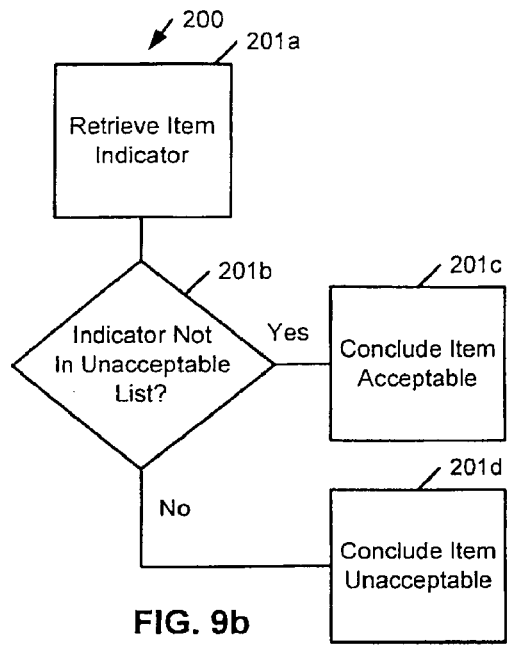
FIG. 9b illustrates an acceptability determination process according to one embodiment, of the present invention.

FIG. 9b illustrates an acceptability determination process according to one embodiment, of the present invention. In process 200, control logic 73h retrieves 201a an item indicator for an item whose acceptability to the user is to be determined. In one embodiment, the item indicator is an entry in a field such as program name field 151f. In an alternative embodiment, the item indicator is an entry in a field such as item identifier field 151i. In an alternative embodiment, the item indicator is an entry in a field such as program name field 151f or an entry in a field such as item identifier field 151i. Control logic 73h then determines 201b whether the retrieved item indicator is not among unacceptable item indicators stored in user profile 73t.

FIG. 9c illustrates user profile information in greater detail according to one embodiment of the present invention. User profile information 73t includes a data structure of unacceptable item indicators 74b.

FIG. 9d illustrates user item-unacceptability related information in greater detail according to an alternative embodiment of the present invention. Unacceptable item indicators 74b, according to an alternative embodiment, is shown in FIG. 12c as including a list of item identifiers such as those found in item identifier field 151i and in item identifier entries in DS 139. As indicated above, in an alternative embodiment, record entries in DS 139 include codes each of which identifies an item in audiovisual material 73t.

FIG. 9e illustrates user item-unacceptability related information in greater detail according to an alternative embodiment of the present invention. Unacceptable item indicators 74b, according to an alternative embodiment, is shown in FIG. 9d as including a list of item identifiers such as those found in program name field 151f and item identifier entries in DS 139 which are labels. As indicated above, in an alternative embodiment, entries in DS 139 include labels each of which identifies an item in audiovisual material 73v. In an alternative embodiment, unacceptable item indicators 74b includes one or more item indicators such as those found in entries in a field such as program name field 151f or one or more item indicators such as those found in entries in a field such as item identifier field 151i.

Referring again to process 200, control logic 73h concludes 201c that the item is acceptable to the user when the retrieved item indicator is not among unacceptable item indicators 74b. Control logic 73h concludes 201d that the item is unacceptable to the user when the retrieved item indicator is among unacceptable item indicators 74b. Based upon the conclusion, control logic 73h proceeds with the remainder of the customization process described elsewhere herein.

Figure 9F:
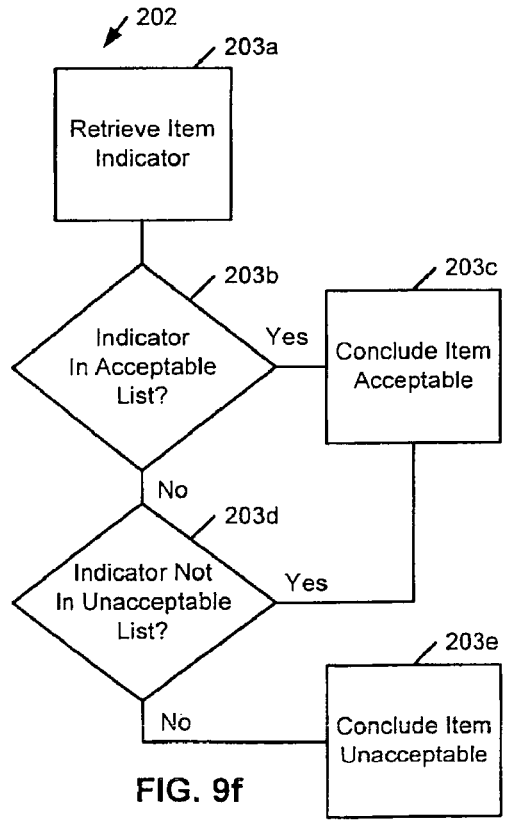
FIG. 9f illustrates an acceptability determination process according to an alternative embodiment, of the present invention.

FIG. 9f illustrates an acceptability determination process according to an alternative embodiment, of the present invention. In process 202, control logic 73h retrieves 203a an item indicator for an item whose acceptability to the user is to be determined. In one embodiment, the item indicator is an entry in a field such as program name field 151f. In an alternative embodiment, the item indicator is an entry in a field such as item identifier field 151i. In an alternative embodiment, the item indicator is an entry in a field such as program name field 151f or an entry in a field such as item identifier field 151i. Control logic 73h then determines 203b whether the retrieved item indicator is among acceptable item indicators stored in user profile 73t. User profile information 73t includes a data structure of acceptable item indicators 74a.

FIG. 9g illustrates user item-acceptability related information in greater detail according to an alternative embodiment of the present invention. Acceptable item indicators 74a, according to an alternative embodiment, is shown in FIG. 9g as including a list of item indicators such as those found in item identifier field 151i and in item identifier entries in DS 139. As indicated above, in an alternative embodiment, entries in DS 139 include codes each of which identifies an item in audiovisual material 73t.

FIG. 9h illustrates user item-acceptability related information in greater detail according to an alternative embodiment of the present invention. Acceptable item indicators 74a, according to an alternative embodiment, is shown in FIG. 9h as a list of item identifiers such as those found in program name field 151f and those associated with substitute items in audiovisual material 73t. As indicated above, in an alternative embodiment, entries in DS 139 include labels each of which identifies an item in audiovisual material 73t. In an alternative embodiment, acceptable item indicators 74a includes one or more item indicators such as those found in entries in a field such as program name field 151f or one or more item indicators such as those found in entries in a field such as item identifier field 151i.

Referring again to process 202, control logic 73h concludes 203c that the item is acceptable to the user when the retrieved item indicator is among acceptable item indicators 74a. When the retrieved item indicator is it not among acceptable item indicators 74a, control logic 73h determines 203d whether the retrieved item indicator is among unacceptable item indicators 74b. When the retrieved item indicator is not among unacceptable item indicators 74b, control logic 73h concludes 203c that the item is acceptable to the user. One of ordinary skill in the art would appreciate that in process 202 there is a possibility that items about which the user has not yet provided an indication of acceptability are considered to be acceptable. When the retrieved item indicator is among unacceptable item indicators, control logic 73h concludes 203e that the item is unacceptable to the user. Based upon the conclusion, control logic 73h proceeds with the remainder of a customization process described elsewhere herein.

Figure 9I:
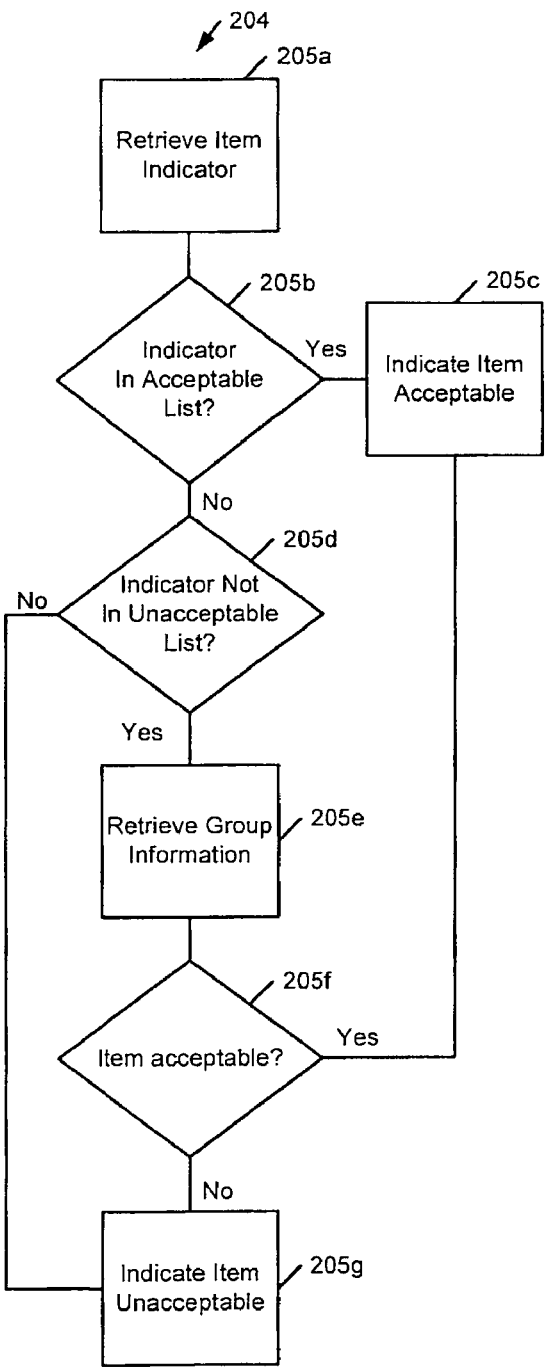
FIG. 9i illustrates an acceptability determination process according to an alternative embodiment, of the present invention.
Figure 9I:
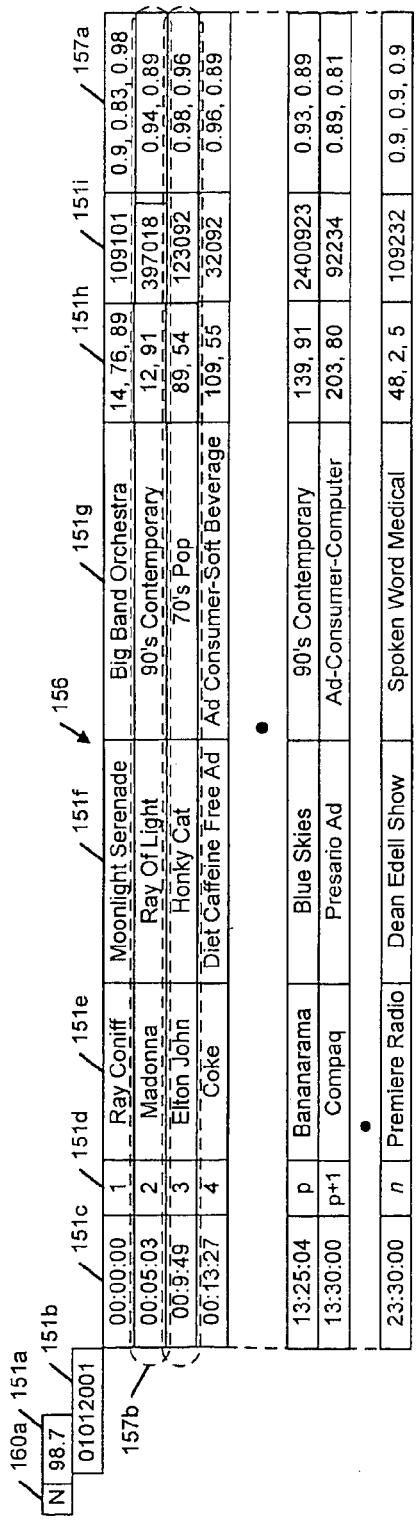

FIG. 9i illustrates an acceptability determination process according to an alternative embodiment, of the present invention. In process 204, control logic 73h retrieves 205a an item indicator for an item whose acceptability to the user is to be determined. In one embodiment, the item indicator is an entry in a field such as program name field 151f. In an alternative embodiment, the item indicator is an entry in a field such as item identifier field 151i. In an alternative embodiment, the item indicator is an entry in a field such as program name field 151f or an entry in a field such as item identifier field 151i. Control logic 73h then determines 205b whether the retrieved item indicator is among acceptable item indicators stored in user profile 73t. Control logic 73h concludes 205c that the item is acceptable to the user when the retrieved item indicator is among acceptable item indicators 74a. When the retrieved item indicator is it not among acceptable item indicators 74a, control logic 73h determines 205d whether the retrieved item indicator is among unacceptable item indicators 74b. When the retrieved item indicator is among unacceptable item indicators 74b, control logic 73h concludes 205g that the item is unacceptable to the user.

When the retrieved item indicator is not among unacceptable item indicators 74b, control logic 73h retrieves 205e schedule group information. In one embodiment, schedule group information includes an entry in a field such as group code field 151h. As indicated elsewhere herein, an entry for group code field 151h includes one or more group codes indicative of groups which find the item acceptable or that a collaborative filtering has predicted would find the item acceptable. User profile information 73t of FIG. 9c includes a data structure of user group codes 74c. Entries for user group codes 74c indicate the groups with which the user shares common preferences.

FIG. 9j illustrates user group-affiliation related information in greater detail according to an alternative embodiment of the present invention. Group codes 74c is shown in FIG. 9j as a list of group codes such as those found in group codes field 151h or an embodiment in which a record entry in DS 139 includes a group code(s) that is associated with a substitute item referenced by the record's item indicator entry.

Referring again to process 204, control logic 73h then determines 205f whether the item is acceptable by determining whether there is at least one match between the retrieved group codes associated with the scheduled item and one of the user group codes in profile information 73t. When the one of the retrieved group codes matches a user group code, control logic 73h concludes 205c that the item is acceptable to the user. When none of the retrieved group codes and user group codes match, control logic 73h concludes 205g that the item is unacceptable to the user. One of ordinary skill in the art would appreciate that other than economic or hardware limitations there is no limit to the number of group code entries in group codes 74c. Furthermore, one of ordinary skill in the art would appreciate that other than economic or bandwidth considerations there is no limit to the number of group code entries in field 151*h*.

In an alternative embodiment, the retrieved schedule group information includes one or more group codes and a group item ranking for each of the group codes. In such an alternative embodiment, control logic 73*h* determines 205*f* whether there is a match by predicting a user ranking for the item and comparing the predicted user ranking to threshold 74*f*. In such an alternative embodiment, user profile information 73*t* includes a data structure of user group codes 74*c* and for each of the group codes there is an associated user-group correlation 74*d*.

FIG. 9*k* illustrates user group weight-related information in greater detail according to an alternative embodiment of the present invention. User-group correlation are also referred to herein as user-group weight information. User-group weights 74*d* is shown in FIG. 9*k* as including data structure 76*h*. DS 76*h* includes group code field 76*i* which has as an entry a group code such as that found in field 151*h* of DS 150 or, depending upon the embodiment, in record entries in DS 139. While DS 76*h* includes the user group weight information for three groups, the ones identified by group codes "14," "76," and "91," one of ordinary skill in the art would appreciate that DS 76*h* is not limited to representing the information for three groups, but may have any number of records each of which describes the weight relationship between a user and a group, and each of which has entries for fields 76*j*, 76*k*. Entries for field 76*j* are described in greater detail below. Entries for field 76*k* indicate the weight between the user and the group identified by the associated group code entry in field 76*i*.

The user-group correlation provides an indication of the degree to which the items in which a group is interested are also of interest to the user. Alternatively, the user group correlation provides an estimate of the probability that the user is in the group. Item rank threshold 74*f* indicates the threshold that the item's predicted rank must equal or exceed in order for control logic 73*h* to conclude that the item is acceptable.

In an alternative embodiment, control logic 73*h* determines the predicted ranking for scheduled item i by evaluating the following expression:

$$R_{u,i} = \frac{\sum_{j=1}^{s} GC_{u,j} \in SGC_i(W_{u,GC_{u,j}} * SGR_{i,GC_{u,j}})}{\sum_{j=1}^{n} GC_{u,j} \in SGR_{i,GC_{u,j}}}$$ E. 13 where $R_{u,i}$ is ranking predicted for scheduled item i for user u, s is the number of user group codes that group codes 74*c* and scheduled item i's entry for field 151*h* have in common, $GC_{u,j}$ are the group codes that are common to group codes 74*c* and item i's group codes in its entry for field 151*h*, $SGC_i$ are the group code(s) in the entry for field 151*h*, $W_{u,GCu,j}$ is the weight (or similarity indication) indication for user u and the group represented by group code $GC_{u,j}$, and $SGR_{i,GCu,j}$ is the ranking for item i by the group represented by group code $GC_{u,j}$. As indicated above, in an alternative embodiment, a received schedule includes group codes and group item rankings that are associated with the group codes.

In an alternative embodiment, control logic 73*h* determines the predicted ranking for scheduled item i using user-group similarity coefficients by evaluating the following expression:

$$PRG_{u,i} = \overline{r_{u,GC}} + \frac{1}{a}\sum_{g=1}^{m}(r_{g,i} - \overline{r_g})W_{u,g}$$ E. 14 where, $$\alpha = \sum_{M_{u,g}} W_{u,g}$$

$PRG_{u,i}$ is the user's predicted ranking for the item i based upon user-group similarity coefficients, $\overline{r_{u,GC}}$ is the average rating of items ranked by the user for groups that have ranked item i, m is the number of groups who have ranked item i, $r_{g,i}$ is the $g^{th}$ groups's ranking of item i, $\overline{r_g}$ is the average rating of items ranked by the $g^{th}$ group, and $W_{u,g}$ is the similarity coefficient between the user and the $g^{th}$ group. $M_{u,g}$ is the universe of all groups who have provided rankings and α is the sum of the similarity coefficients between the user and all the other groups who have ranked item i. In an alternative embodiment, user profile information 73*t* of FIG. 9*c* includes group average ranks 74*j* which control logic 73*h* uses in its evaluation of expression E. 14.

FIG. 9*l* illustrates a data structure for a schedule used for determining what items of programming to present to a user of a broadcast interactivity device according to an alternative embodiment of the present invention. DS 156, in one embodiment, includes the same fields as DS 150 and one additional field, group item rankings field 157*a* whose entries provide the rankings that groups identified in an entry in group codes field 151*h* have given the item identified in an entry in fields 151*e* or 151*i*. While the entries in group item rankings field 157*a* range from 0 to 1, one of ordinary skill would appreciate that another predefined range is used in an alternative embodiment. $R_{u,i}$ is similarly restricted to a predefined range. One of ordinary skill in the art would appreciate that other than economic or bandwidth considerations there is no limit to the number of group code entries in field 157*a*.

After determining $R_{u,i}$ for a scheduled item, logic 73*h* then determines 205*f* whether the item is acceptable by determining whether $R_{u,i}$ equals or exceeds item rank threshold 74*f*. When $R_{u,i}$ exceeds or equals threshold 74*f*, control logic 73*h* concludes 205*c* that the item is acceptable to the user. When $R_{u,i}$ is less than threshold 74*f*, control logic 73*h* concludes 205*g* that the item is unacceptable to the user.

In an alternative embodiment, profile information 73*t* includes user group item quality correlations 74*e*. In such an embodiment, each group is associated with several qualities with which the group members assess whether an item is acceptable. The user's affinity to each of the qualities of a group is referred to as a user group quality correlation. For example, qualities ranked by a group can include, but are not limited to, one or more of the following: importance of lyrics, music, originality, tempo, beat, trustworthiness, educational value, ease of understanding, reliability, and other concrete and abstract qualities of items for which group members are expressing a preference. Furthermore, in such an embodiment, the data structure for a received schedule includes a field which, for at least some of the records in the data structure, has entries for group item quality rankings for each group code in an entry in field 151*h*. For example, consider record 157*b* of FIG. 9*l* which has group codes 12 and 91 as the entry for field 151*h*. In an alternative embodiment, group code 12 would have one or more associated group item quality correlations, as would group code 91.

FIG. 9*m* illustrates elements of a data structure that includes information for determining acceptability of an item to the user according to an alternative embodiment of the present invention. Data structure section 157e includes the entry for group code field 151h of record 157b of DS 156, and the entry is referred to a group code entry 157d. Moreover, data structure section 157e includes group item quality correlations entry 157f for a group item quality correlations field that is absent from DS 156. The first three values, 0.90, 095, and 0.97, in entry 157f are associated with group code 12, and the next three values are associated with group code 91. In an alternative embodiment, a data structure such as DS 156 includes a group item quality correlations field, and at least some of the records in the data structure have entries for the group item quality correlations field.

In such an alternative embodiment, control logic 73h determines the predicted item quality rankings by evaluating the following expression for each item quality:

$$R_{u,i,q} = \frac{\sum_{j=1}^{n} GC_{u,j} \in SGC_i (W_{u,GC,q} * SGR_{i,GC_{u,j},q})}{\sum_{j=1}^{n} GC_{u,j} \in SGC_i SGR_{i,GC_{u,j},q}} \quad \text{E. 15}$$

where $W_{u,GC,q}$ is the weight (or similarity coefficient) between user u and the group represented by group code $GC_{u,j}$ with respect to the $q^{th}$ item quality, n is the number of user group codes that group codes 74c and scheduled item i's entry for field 151h have in common, $SGR_{i,GC_{u,j},q}$ is the ranking that the group represented by group code $GC_{u,j}$ gave the $q^{th}$ item quality of item i, and m is an integer greater than or equal to one and indicates the number of item qualities for which rankings are provided. While in the above description m=3, the present invention is not limited to any specific integer value for m. In an alternative embodiment, m may be greater than 3, or alternatively may be less than 3.

After determining each $R_{u,i,q}$ for a scheduled item, control logic 73h models the item quality rankings as a Bayesian network and determines the probability of acceptability given the predicted item quality rankings. The probability of acceptability given $R_{u,i,1}, R_{u,i,2}, \ldots R_{u,i,m}$ is evaluated by control logic 73h as follows:

$$p(Acc \mid R_{u,i,1}, R_{u,i,2}, \ldots R_{u,i,m}) = \frac{p(Acc, R_{u,i,1}, R_{u,i,2}, \ldots R_{u,i,m})}{p(R_{u,i,1}, R_{u,i,2}, \ldots R_{u,i,m})} \quad \text{E. 16}$$

$$= \frac{p(Acc, R_{u,i,1}, R_{u,i,2}, \ldots R_{u,i,m})}{\sum_{Unacc} p(Unacc, R_{u,i,1}, R_{u,i,2}, \ldots R_{u,i,m})}$$

where Acc represents item acceptability to the user, and Unacc represents item unacceptability to the user. Where any of the variables exhibit conditional independencies, the evaluation is made more efficient because the joint probability can be expressed at last partially as the product of individual probabilities and one or more conditional probabilities, if not the product of individual probabilities. Where the predicted item quality rankings are modeled as a Bayesian network, item rank threshold 74f is the minimum acceptable value for $p(Acc \| R_{u,i,1}, R_{u,i,2}, \ldots R_{u,i,m})$. One of ordinary skill in the art would appreciate that Bayesian networks is just one of many techniques used for decision making, and that the present invention is not limited to Bayesian networks, and that, in an alternative embodiment, frequentist statistical methods or other similar or competing methods are used.

In an alternative embodiment, control logic 73h determines the average of the $R_{u,i,q}$ and then determines 205f, as described above, whether the item is acceptable to the user and concludes either that the item is 205c acceptable, or is 205g unacceptable. In an alternative embodiment, item rank threshold 74f includes q item quality rank thresholds (not shown in FIG. 9c) in profile information 73t, one for each item quality. In such an alternative embodiment, control logic 73h determines item acceptability by comparing each $R_{u,i,q}$ to its corresponding item quality rank threshold. One of ordinary skill in the art would appreciate that a variety of user-specific rules are used in alternative embodiments in determining item acceptability. Rules include, but are not limited to, the number of thresholds that must be satisfied, which thresholds must be satisfied, which thresholds may be satisfied, and which thresholds do not have to be satisfied if other thresholds are satisfied.

One of ordinary skill in the art would appreciate that in some embodiments the item acceptability determination process does not depend upon information produced by a collaborative filtering algorithm. However, in an alternative embodiment, the item acceptability determination process does depend upon information produced by either a memory-based collaborative filtering algorithm, a model-based collaborative filtering algorithm, or both types of algorithm.

In the foregoing description, the group correlations may be obtained either by a memory-based collaborative filtering algorithm or a model-based collaborative filtering algorithm. However, in an alternative embodiment, the acceptability determination is made using item correlations or similarity indications. Item correlations or similarity indications are a product of a class of item-based collaborative filtering algorithms. Unlike user-based collaborative filtering, item-based collaborative filtering examines items rated by the user and computes their similarity to a proposed item i, and then determines the expected rating for item i by computing the weighted average of the user's rankings of items that are similar to item i.

FIG. 9n illustrates an acceptability determination process according to an alternative embodiment, of the present invention. In process 206, control logic 73h retrieves 207a schedule item similarity information for an item whose acceptability to the user is to be determined. In one embodiment, the schedule item similarity information includes a list of item indicators that refer to items which are similar to the item for which user acceptability is to be determined. The list of item indicators includes in one embodiment a list of entries for a field such as program name field 151f. In an alternative embodiment, the list of item indicators includes a list of entries for a field such as item identifier field 151i. In one embodiment, the list of item indicators is an entry in field 151h.

For purposes of illustration only, an example of a list of item indicators could include a list of numerical item identifiers each of which is associated with an item that is similar to the item for which user acceptability is to be determined, or a list of program names each of which is associated with an item that is similar to the item for which user acceptability is to be determined. In an alternative embodiment, the list of item indicators includes a list of item categories each of which is associated with several items. For example, an item category includes items that are very similar to each other. Determining similarity is well known in the art and need not be described in greater detail than is described elsewhere herein.

Control logic 73h then determines 207b whether all of the indicators in the retrieved list of item indicators are not among unacceptable item indicators stored in user profile 73t. As indicated above, user profile information 73t includes a data structure of unacceptable item indicators 74b. Control logic 73h concludes 207c that the item is acceptable to the user when all the retrieved item indicators in the list are not among unacceptable item indicators 74b. Control logic 73h concludes 201d that the item is unacceptable to the user when one or more of the indicators in the list are among unacceptable item indicators 74b. Based upon the conclusion, control logic 73h proceeds with the remainder of the customization process described elsewhere herein.

In the alternative embodiment in which the list of item indicators includes a list of item categories each of which is associated with several items, unacceptable item indicators 74b in user profile information 73t include item category indicators that are unacceptable to the user. The unacceptable item category indicators are included in item indicators 74b instead of unacceptable item indicators in one embodiment, but, alternatively, indicators 74b includes both unacceptable item category indicators and unacceptable item indicators. In an alternative embodiment, entries for field 151h include one or more item category indicators with which the item identified in fields 151e or 151i is associated. One of the item category indicators is both associated with the item identified in fields 151e or 151i or in a record in DS 139 and points to a category which includes the item. When a user provides, as described below, a ranking for the item, control logic 73h updates the user average rank for the category which includes the item. Alternatively, control logic 73h updates the user average rank for the category which includes the item and the categories which are pointed to by the remaining item category indicators associated with the user ranked item. Alternatively, entries for field 151i include one or more item category indicators instead of an item identifier. The user acceptability determination is made by control logic 73h as described above, but based upon whether any of the retrieved category indicators is present among the unacceptable category indicators in indicators 74b.

In an alternative embodiment, the retrieved schedule item information includes one or more item indicators and for each of the item indicators a corresponding similarity indication indicative of the similarity between the item indicator and item i for which user acceptability is to be determined. User profile information 73t includes user item indicators indicative of items acceptable to the user and their associated rankings.

In such an embodiment, the one or more item indicators are entries for a field such as program name field 151f. However, alternatively, the list of item indicators is a list of entries for a field such as item identifier field 151i. In one embodiment, instead of an entry of group codes, the list of item indicators is stored as an entry in field 151h. In one embodiment, instead of an entry of group code rankings, the similarity indications are an entry in field 157a. One of ordinary skill in the art would appreciate that in an alternative embodiment field 151h includes a list of item indicators and group codes.

FIG. 9o illustrates user profile information in greater detail according to one embodiment of the present invention. Profile information 73t includes item indicators 74g which includes item indicators acceptable to the user. Profile information 73t includes user item rankings 74h which include a ranking for each of the item indicators in item indicators 74g.

FIG. 9v illustrates user item-acceptability related information in greater detail according to an alternative embodiment of the present invention. Acceptable item indicators 74g, according to an alternative embodiment, is shown in FIG. 9v as including a list of item indicators such as those found in item identifier field 151i and in item identifier entries in DS 139. As indicated above, in an alternative embodiment, entries in DS 139 include codes each of which identifies an item in audiovisual material 73v. User item rankings 74h, according to an alternative embodiment, is shown in FIG. 9v as including user item rankings having values between 3-5. One of ordinary skill in the art would appreciate that item ranking values used in implementation of an embodiment can vary and are not themselves a limitation of the present invention.

FIG. 9x illustrates user item-acceptability related information in greater detail according to an alternative embodiment of the present invention. Acceptable item indicators 74g, according to an alternative embodiment, is shown in FIG. 9x as a list of item identifiers such as those found in program name field 151f and those associated with substitute items in audiovisual material 73t. As indicated above, in an alternative embodiment, entries in DS 139 include labels each of which identifies an item in audiovisual material 73t. In an alternative embodiment, acceptable item indicators 74g includes one or more item indicators such as those found in entries in a field such as program name field 151f or one or more item indicators such as those found in entries in a field such as item identifier field 151i. User item rankings 74h, according to an alternative embodiment, is shown in FIG. 9x as including user item rankings having values between 3-5. One of ordinary skill in the art would appreciate that item ranking values used in implementation of an embodiment can vary and are not themselves a limitation of the present invention.

After retrieving the schedule item information for an item i, control logic 73h determines 207b whether the item is acceptable to the user. To make the determination, in an alternative embodiment, control logic 73h predicts the user ranking for item i. Control logic 73h determines the predicted ranking for the item by evaluating the following expression:

$$SR_{u,i} = \frac{\sum_{j=1}^{n} UItem_{u,j} \in SItem_i (UR_{u,j} * SItemSim_{i,UItem_{u,j}})}{\sum_{j=1}^{n} UItem_{u,j} \in SItem_i SItemSim_{i,UItem_{u,j}}} \qquad \text{E. 17}$$

where $SR_{u,i}$ is ranking predicted for scheduled item i for user u, n is the number of user item indicators common to item indicators 74g and the item indicators associated with scheduled item 1, $UItem_{u,j}$ are the item indicators that are common to item indicators 74g and the item indicators associated with scheduled item i, $SItem_i$ are the item indicators associated with scheduled item i, $SItemSim_{i,UItem_{u,j}}$ is the similarity indication between scheduled item i and the item identified by $UItem_{u,j}$, and $UR_{u,j}$ is the user ranking for the item identified by $UItem_{u,j}$.

When enough similarity coefficients are negative, there is a possibility that the predicted rating will also be negative. Where $SR_{u,i}$ is negative and the utilized rating scale only permits positive values, they may degrade the system's performance. To get around this problem, it is preferable to assign the prediction the lowest value permitted by the utilized rating scale.

After determining $SR_{u,i}$ for a scheduled item, logic 73h then determines 207b whether the item is acceptable by determining whether $SR_{u,i}$ exceeds a user's item rank threshold. User profile information 73t includes in an alternative embodiment, as illustrated in FIG. 9o, an item rank threshold 74i indicative of the rank that predicted items are to exceed in order to be considered acceptable. When $SR_{u,i}$ exceeds or equals threshold 74i, control logic 73h concludes 207c that the item is acceptable to the user. When $SR_{u,j}$ is less than threshold 74i, control logic 73h concludes 207d that the item is unacceptable to the user.

In an alternative embodiment, the acceptability determination is made using one or more item category indicators each of which has an associated category similarity indication indicative of the similarity between the category identified by the item category indicator and the scheduled item i for which the user acceptability is to be determined. In such an embodiment, the item category indicators are an entry in field 151h, and the category similarity indications are an entry in field 157a. In an alternative embodiment, category similarity indications are not included in a schedule or play list. Rather, in such an embodiment, control logic 73h receives the category similarity indications via transceiver 73b or physical storage media which is coupleable to control logic 73h via a drive or connector.

FIG. 10c illustrates user profile information in greater detail according to one embodiment of the present invention. Profile information 73t of FIG. 10c includes categories associated with user indicators 74l which includes category indicators for categories for which there is a corresponding average user ranking in user average rankings of categories 74m. Population and updating of indicators 74l and user average rankings of categories 74m is described in greater detail below in connection with updating profile 73t as a consequence of implicit and explicit rankings.

Returning to predicting the user ranking for an item i based upon item category similarity coefficients, control logic 73h predicts the user ranking for item i by evaluating the following expression:

$$SCR_{u,i} = \frac{\sum_{j=1}^{n} UCategory_{u,j} \in SCategory_i \left( UCR_{u,j} * SCategorySim_{i,UItem_{u,j}} \right)}{\sum_{j=1}^{n} UCategory_{u,j} \in SCategory_i SCategorySim_{i,UItem_{u,j}}} \quad \text{E. 18}$$

where $SCR_{u,i}$ is ranking predicted for scheduled item i for user u based upon category similarity coefficients, n is the number of user category indicators common to category indicators 74l and the category indicators associated with scheduled item i $UCategory_{u,j}$ are the category indicators that are common to category indicators 74l and category indicators associated with scheduled item i, $SCategory_i$ are the item indicators associated with scheduled item i, $SCategorySim_{i,UItem_j}$ is the similarity indication between scheduled item i and the category identified by $UCategory_{u,j}$, and $UCR_{u,j}$ is the user ranking for the category identified by $UCategory_{u,j}$.

A category's similarity with a scheduled item is based on the average of the similarity of each item in the category to the scheduled item. In an alternative embodiment, user profile information 73t includes item categories associated with the user in items associated with user 74g, and user item category rankings in user item rankings 74h.

FIG. 9p illustrates an acceptability determination process according to an alternative embodiment, of the present invention. In process 208, control logic 73h retrieves 209a schedule group information for an item for which user acceptability is to be determined. The schedule group information is as described above in connection with process 204 of FIG. 9i. Control logic 73h then determines 209b whether the item is acceptable to the user based upon the retrieved schedule group information and information in user profile information 73t. The information in user profile information 73t is as described above in connection process 204 of FIG. 9j. Depending upon the embodiment, control logic 73h makes the determination using one of the techniques described above in connection with process 204 of FIG. 9i. Depending upon the embodiment, control logic 73h concludes 203c that the item is acceptable when it either determines there is a match between retrieved group information and user specific group information or determines that a predicted ranking exceeds or equals a user ranking threshold. Depending upon the embodiment, control logic 73h concludes 203d that the item is unacceptable when it either determines there is no match between retrieved group information and user specific group information or determines that a predicted ranking is less than a user ranking threshold.

FIG. 9q illustrates an acceptability determination process according to an alternative embodiment, of the present invention. In process 210, control logic 73h retrieves 211a an item indicator for an item whose acceptability to the user is to be determined. As discussed above, the format of the item indicator depends upon the embodiment, and such discussion is incorporated herein by reference. Control logic 73h then determines 211b whether the retrieved item indicator is among acceptable item indicators 74a stored in user profile 73t. In an alternative embodiment, user profile 73t of FIG. 9c includes acceptable item indicators 74a. Control logic 73h concludes 211c that the item is acceptable to the user when the retrieved item indicator is among acceptable item indicators 74a. When the retrieved item indicator is it not among acceptable item indicators 74a, control logic 73h determines 211d whether the retrieved item indicator is among unacceptable item indicators 74b. In an alternative embodiment, user profile 73t of FIG. 9c includes acceptable item indicators 74b. When the retrieved item indicator is among unacceptable item indicators 74b, control logic 73h concludes 211g that the item is unacceptable to the user.

When the retrieved item indicator is not among unacceptable item indicators, control logic 73h retrieves 211e schedule similar item information. Control logic 73h then determines 211f whether the scheduled item interests the user in accordance with, depending upon the embodiment, one of the techniques described above in connection with FIG. 9n. Depending upon the embodiment, control logic 73h concludes 211c that the item is acceptable when it either determines there is a match between retrieved item information and user specific item information or determines that a predicted ranking exceeds or equals a user ranking threshold. Depending upon the embodiment, control logic 73h concludes 211g that the item is unacceptable when it either determines there is no match between retrieved item information and user specific item information or determines that a predicted ranking is less than a user ranking threshold.

FIG. 10a illustrates an acceptability determination process according to an alternative embodiment, of the present invention. In process 212, control logic 73h retrieves 213a an item indicator for an item i whose acceptability to the user is to be determined. As discussed above, the format of the item indicator depends upon the embodiment, and such discussion is incorporated herein by reference. Control logic 73h then determines 213b whether the item is acceptable based on user-user similarity coefficients. In an alternative embodiment, user profile 73t of FIG. 9c includes the item rankings of numerous users which facilitate the generation of user-user similarity coefficients. Relevant information regarding user profile 73t according to an alternative embodiment is described below.

FIG. 10b illustrates user profile information in greater detail according to an alternative embodiment of the present invention. Profile information 73t according to an alternative embodiment is illustrated in FIG. 10b. Information 73t includes other user item rankings 220a which include the rankings that people other than the user have given items, where the rankings are sorted by user and item. Profile information 73t includes user item rankings 220b which include a ranking for each of the items that the user has ranked. In an alternative embodiment, rankings 220a and 220b are commingled in one data structure. Profile information 73t includes user-user similarity coefficients or weights 220c each of which indicates the similarity between the preferences of the user and others who have expressed preferences to a similarity coefficient computing system described above. In an alternative embodiment, control logic 73h generates locally user-user similarity coefficients using the rankings 220a, 220b. However, in an alternative embodiment, user-user similarity coefficients 220c are received from a computing system. In such an embodiment, control logic 73h sends user rankings to the computing system so that it may generate the user-user similarity coefficients. Profile information 73t includes average user rank 220d, and item rank threshold 220e.

After retrieving the item indicator for an item i, control logic 73h then determines 213b whether the item is acceptable based on user-user similarity coefficients. To make the determination, in an alternative embodiment, control logic 73h predicts the user ranking for item i using user-user similarity coefficients whether received or locally generated. Control logic 73h determines the predicted ranking for the item by evaluating the following expression:

$$PR_{u,i} = \overline{r_u} + \frac{1}{\alpha}\sum(r_{a,i} - \overline{r_a})W_{u,a} \text{ where, } \alpha = \sum_{M_{u,a}} W_{u,a} \quad \text{E. 19}$$

$PR_{u,i}$ is the user's predicted ranking for the item i based upon user-user similarity coefficients, $\overline{r_u}$ is the average rating of items ranked by the user, $r_{o,j}$ is the $a^{th}$ user's ranking of item i, $\overline{r_a}$ is the average rating of items ranked by the $a^{th}$ user, and $W_{u,a}$ is the similarity coefficient between the user and the $a^{th}$ user. $M_{u,a}$ is the universe of all users who have provided rankings and a is the sum of the similarity coefficients between the user and all other users who have ranked item i. In an alternative embodiment, $M_{u,a}$ is the universe of all users who have provided rankings and who share a similarity coefficient with the user that exceeds a threshold L. Ranking predictions based on nearest-neighbors are well understood in the art and need not be described in greater detail herein.

After determining a user's predicted ranking for item i, control logic 73h determines whether the predicted ranking equals or exceeds the value of threshold 220e. When the predicted ranking equals or exceeds the value of threshold 220e, control logic 73h concludes 213c that the item is acceptable. When the predicted ranking is less than the value of threshold 220e, control logic 73h concludes 213c that the item is unacceptable.

One or more of the above acceptability determination processes described herein is included in control logic 73h in an alternative embodiment that provides customization. As indicated above, the selection of substitute items that is part of the customization process is performed, depending upon the embodiment, in real-time or non-real time.

FIG. 9r illustrates a state machine, according to one embodiment of the present invention, for real-time customization of the presentation of programming. State machine 134 enters into state 135a when control logic 73b receives a customization indication from user interface 73i. As indicated above, in an alternative embodiment, a customization indication is generated as a consequence of a user activating customize key 73n.

In response to the customization indication, control logic 73h sets a LatestRecord software construct to a NULL value. LatestRecord is used in state machine 134 to keep track of the latest record that has been processed by state machine 134. As indicated elsewhere herein, one of ordinary skill in the art would appreciate that implementations of embodiments can have fewer or more variables than described herein, and that despite such difference from this disclosure the particular implementation is still encompassed by an applicable embodiment of the present invention.

After LatestRecord is set to NULL, control logic 73b determines whether a scheduled item is unacceptable to the user and needs to be substituted or is acceptable to the user and is to be presented. The scheduled item for which the determination is made depends upon the schedule associated with the channel to which receiver 73b is tuned, the value of LatestRecord and the record number of the record pointed to by the time indication that control logic 73h obtains from timer 73l. At state 135a, when a change channel event takes place due to receiver 73b being tuned to a new channel, control logic 73h terminates state machine 134. Alternatively, state machine 134 re-enters state 135a and control logic 73h performs the tasks described above. One of ordinary skill in the art would appreciate that in a case where an alternative embodiment is presenting items from audiovisual material 73v which are chosen without first making sure that they satisfy the user expectations, state machine 134 of FIG. 9r is also applicable with minor adjustments. In such a case, change of play list event, skip item event or fast forwarding through item to a next one correspond to the channel change event of state machine 134. These and other minor adjustments are not repeated herein, because one of ordinary skill in the art would appreciate that the embodiments of the present invention may be implemented in a variety of contexts, not just those described herein, and that implementations details would obscure the description of the invention.

In an alternative embodiment, the source of the scheduled item is receiver 73b, but the present invention is not limited by the number and type of sources. In such an embodiment, control logic 73h identifies a scheduled item by obtaining from timer 73l a time indication and retrieving from memory an indication of the channel being presently tuned by receiver 73b. Based on the channel indication, control logic 73h identifies a schedule that is associated with the channel in scheduling information 73v. Control logic 73h then identifies the record for the time slot containing the time indication obtained from timer 73l by indexing into the schedule using the time indication and obtains the record's RecordNumber which is the position of the record relative to other records in the schedule. Control logic 73h then compares the RecordNumber with LatestRecord. When the record number and LatestRecord match, control logic 73h sets Match to TRUE and increments RecordNumber and assigns its value to LatestRecord. When RecordNumber and LatestRecord do not match, control logic 73h sets Match to FALSE, and assigns the value of RecordNumber to LatestRecord. Match is a software construct or variable in one embodiment that is maintained in temporary storage or memory in control logic 73h. In an alternative embodiment, Match is maintained in a register which can be set to hold various values temporarily. Control logic 73h then determines whether the scheduled item associated with the record with the value of LatestRecord as its entry in field 151d is acceptable to the user. Depending upon the embodiment, one of the user acceptability determination processes described above is performed by control logic 73h at state 135a. The discussion above is incorporated herein by reference and need not be restated.

When control logic 73h determines that the scheduled item is acceptable, control logic 73h sets a SwitchedToReceiver software construct to True. SwitchedToReceiver is used in state machine 134 to determine whether switch 73c is to switch from a substitute programming source, such as codec 73g, to receiver 73b, or vice versa. When switch 73c is not set to select the output of receiver 73b, Control logic 73h sets switch 73c to select the output receiver 73b for application to transmitter 73d. Whatever channel receiver 73b was last tuned to will have its programming transmitted by transmitter 73b. When receiver 73b is off control logic 73h turns it on in response to receipt of the customization indication and sets it to receive a channel in accordance with a LastChannel value stored as variable or software construct in temporary storage or in memory in control logic 73h. When switch 73c is already set to select the output of receiver 73b, control logic 73h does not change the setting. State machine 134 then transitions to state 135c. When control logic 73h determines that the item is unacceptable control logic 73h sets SwitchedToReceiver to False, and state machine 134 transitions to state 135b.

At state 135c, when a change channel event takes place due to receiver 73b being tuned to a new channel, state machine 134 transitions to state 135a. As indicated above, activation of one or more keys 73p provides a frequency or channel control indication to control logic 73h which then applies a channel control signal to receiver 73b.

When state machine 134 enters state 135c while Match is True and SwitchedToReceiver is True, control logic 73h sets LastRecord to the value of the RecordNumber associated with the next scheduled item. When state machine 134 enters state 135c while Match is False, control logic 73h sets Match to True and sets LastRecord to the value of RecordNumber associated with the next scheduled item. Control logic 73h then determines, before the scheduled item ends, whether the next scheduled item is acceptable. When control logic 73h determines that the next scheduled item is unacceptable, state machine 134 transitions to state 135b. When control logic 73h determines that the next scheduled item is acceptable, state machine 134 re-enters state 135c.

When state machine 134 enters state 135c while Match is True and SwitchedToReceiver is False, control logic 73h sets SwitchedToReceiver to True. Match is True and SwitchedToReceiver is False when state machine 134 transitions from 135b to 135c. SwitchedToReceiver being False indicates that switch 73c is selecting the output of an alternative programming source other than receiver 73b. In one embodiment the alternative programming source is codec 73g which is presenting a substitute item obtained from audiovisual material 73v. When the substituted item's time slot expires, control logic 73h sets switch 73c to select the output of receiver 73b for application to transmitter 73d for transmission. In an alternative embodiment, control logic 73h controls the volume of the output signal of codec 73g and fades the output signal two or more seconds before the substituted item's time slot expires. When the scheduled item's start time arrives control logic 73h controls the volume of receiver 73b so that the output signal slowly increases in volume over a two or more second time span until it reaches a predefined volume setting.

When the scheduled item is about to finish, control logic 73h then sets LastRecord to the value of the RecordNumber associated with the next scheduled item and determines whether the next scheduled item is acceptable. When control logic 73h determines that the next scheduled item is unacceptable, state machine 134 transitions to state 135b. In an alternative embodiment when control logic 73h determines that the next scheduled item is unacceptable, control logic 73h controls the volume of the output signal of receiver 73b and fades the output signal two or more seconds before the scheduled item's time slot expires. When control logic 73h determines that the next scheduled item is acceptable, state machine 134 re-enters state 135c.

At state 135b, when Match is False, control logic 73h identifies in audiovisual material 73v a substitute item for presentation to the user, and then determines the duration in time of the substitute item. Control logic 73h then has decoder 73g start presenting the substitute item at an intermediate point so that the substitute item ends just before the next scheduled item's start time. Control logic 73h has transmitter 73d transmit the output of decoder 73g. Just before the next scheduled item's start time, control logic 73h sets Match to True, and sets LastRecord to the value of RecordNumber associated with the next scheduled item. Control logic 73h then determines whether the next scheduled item is acceptable. When the next scheduled item is acceptable, state machine 134 transitions to state 135c. In one embodiment, before the transition to state 135c, control logic 73h controls the volume of the output signal of codec 73g and fades the output signal two or more seconds before the scheduled item's start time arrives. In an alternative embodiment, the fade-out and a fade-in (i.e., slow increase of the volume of the scheduled item) are performed at state 135c. When the next scheduled item is unacceptable, state machine 134 re-enters state 135b. In an alternative embodiment, control logic 73h commences a volume fade-out, as described above, before state machine 134 re-enters state 135b. Alternatively, as described below the fade-out and fade-in are preformed after state machine 134 enters state 135b.

At state 135b, when Match is True and SwitchedToReceiver is False, control logic 73h identifies in audiovisual material 73v a substitute item for presentation to the user. In an alternative embodiment, the substitute item selected has a run time that is close to the run time of the scheduled item that is being substituted. In an alternative embodiment, control logic 73h and codec 73g expand or compress the substitute item so that it can fit into the scheduled item's time slot. Fitting one or more substitute items into a scheduled item's timeslot is an alternative feature for any of the embodiments herein and will not be explicitly restated each time substitution is mentioned in any of the embodiments described herein, whether described above or below.

Control logic 73h, at the start time of the scheduled item that is being substituted, has decoder 73g decode the substitute item for transmission by transmitter 73d. The scheduled item that is being substituted is the item associated with the record whose entry in record number field 151d is LatestRecord. In one embodiment, the start time of the scheduled item being substituted is an entry in start time field 151c of the scheduled item's record.

In an alternative embodiment, control logic 73h controls the volume of the output signal of codec 73g and fades the output signal two or more seconds before the scheduled start time arrives. When the substituted scheduled item's start time arrives control logic 73h controls the volume of the output signal of codec 73g so that the output signal slowly increases in volume over a two or more second time span until it reaches a predefined volume setting.

When state 135b is entered while Match is True and SwitchedToReceiver is False, control logic 73h, after performing the substitution described above and just before the substituted scheduled item's time slot ends, sets LastRecord to the value of the RecordNumber associated with the next scheduled item. Control logic 73h then determines whether the next scheduled item is acceptable. When the next scheduled item is acceptable, state machine 134 transitions to state 135c. In one embodiment, before the transition to state 135c, control logic 73h controls the volume of the output signal of codec 73g and fades the output signal two or more seconds before the scheduled item's start time arrives. In an alternative embodiment, the fade-out and a fade-in (i.e., slow increase of the volume of the scheduled item) are performed at state 135c. When the next scheduled item is unacceptable, state machine 134 re-enters state 135b. In an alternative embodiment, control logic 73h commences a volume fade-out before state machine 134 re-enters state 135b.

When state 135b is entered with Match being True and SwitchedToReceiver being True, control logic 73h identifies a substitute item in audiovisual material 73v for presentation to the user. At the start time of the substituted scheduled item, control logic 73h has codec 73g start presentation of the identified substitute item, sets switch 73c to select the output of codec 73g for application to the input of transmitter 73d, and has transmitter 73d transmit the substitute item. The substituted scheduled item is the item associated with the record whose entry in record number field 151d is LatestRecord. In one embodiment, the start time of the scheduled item is an entry in start time field 151c of the scheduled item's record. Control logic 73h also sets SwitchedToReceiver to False.

In one embodiment, before the start time of the substituted scheduled item arrives, control logic 73h controls the volume of the output signal of receiver 73d and fades the output signal two or more seconds before the scheduled start time arrives. When the substitute scheduled item's start time arrives control logic 73h sends a signal to switch 73c to select the output of codec 73g for application to transmitter 73d, and control logic 73h controls the volume of the output signal of codec 73g so that the output signal slowly increases in volume over a two or more second time span until it reaches a predefined volume setting.

When state 135b is entered while Match is True and SwitchedToReceiver is True, control logic 73h, after performing the substitution described above and just before the substituted scheduled item's time slot ends, sets LastRecord to the value of the RecordNumber associated with the next scheduled item. Control logic 73h then determines whether the next scheduled item is acceptable. When the next scheduled item is acceptable, state machine 134 transitions to state 135c. In one embodiment, before the transition to state 135c, control logic 73h controls the volume of the output signal of codec 73g and fades the output signal two or more seconds before the scheduled item's start time arrives. In an alternative embodiment, the fade-out and a fade-in (i.e., slow increase of the volume of the scheduled item) are performed at state 135c. When the next scheduled item is unacceptable, state machine 134 re-enters state 135b. In one embodiment, control logic 73h commences a volume fade-out before state machine 134 re-enters state 135b.

As indicated above, a substitute item is selected at state 135b. In one embodiment, the substitute item is selected at random from among the items stored in audiovisual material 73v. In an alternative embodiment, the substitute item is selected at random from among a subset of the items stored in audiovisual material 73v. In an alternative embodiment, items in audiovisual material 73v are divided into two or more subsets of the set of all items in audiovisual material 73v. In one embodiment, a first subset includes audio clips of advertisements acceptable to the user. In one embodiment, a second subset includes songs clips acceptable to the user. In an alternative embodiment, a third subset may include audio clips of talk shows or news shows. In an alternative embodiment, a fourth subset includes audio clips of jokes, trivia, a late-night comedian's "top 10 list" or one of innumerable other subjects. In an alternative embodiment, one or more subsets includes video clips. While in the description audio clips are used in explaining the operation of an embodiment, one of ordinary skill would appreciate that in an alternative embodiment video clips are presented. As described elsewhere herein, it is immaterial how the video clips arrive for storage at a broadcast interactivity or media presentation device (described elsewhere herein).

While in the foregoing description the potential substitute items themselves are divided into subsets, in an alternative embodiment the substitute items are represented by item identifiers that are themselves organized into subsets and that point to corresponding substitute items. In such an alternative embodiment, it is immaterial where or how the substitute items are stored so long as control logic 73h is able to retrieve them based upon the selected item identifier.

In an alternative embodiment, control logic 73h determines the program type of the scheduled item that is unacceptable to the user. In one embodiment, control logic 73h determines the program type by examining the entry for program type field 151g of the record with RecordNumber as its entry in field 151d. When the program type is an advertisement, control logic 73h selects an advertisement audio clip from the first subset of audiovisual material 73v. When the program type is a song, control logic 73h selects a song clip from the second subset of audiovisual material 73v. When the program type is a talk show, control logic 73h selects an audio clip from the third subset of audiovisual material 73v. When the program type is miscellaneous material, control logic 73h selects an audio clip from the fourth subset of audiovisual material 73v. One of ordinary skill in the art would appreciate that in an alternative embodiment, scheduled items of a certain type are substituted with items of a different type selected from audiovisual material 73v. For example, an unacceptable scheduled song item is substituted with an acceptable advertisement item.

In an alternative embodiment, control logic 73h identifies a substitute item by selecting a record entry from DS 139. In an alternative embodiment, control logic 73h reorders the selected record and the other record entries in whatever category field 140a-140c the selected item identifier resides. In an alternative embodiment, control logic selects, from one of category fields 140a-140c, the item identifier which points to the item in audiovisual material 73v whose turn it is to be presented according to the presentation rules implemented by control logic 73h. Presentation rules are described above in connection with FIG. 8k, and need not be repeated here. While in one embodiment control logic 73h selects record entries from a data structure organized into categories such as DS 139 in order to achieve different rates of presentation for the corresponding items in audiovisual material 73u, one of ordinary skill in the art would appreciate that in an alternative embodiment, control logic 73h selects a record from a data structure that is limited to one category field.

In an alternative embodiment, each of the subsets of records described above is organized in its own separate data structure such as DS 139. As indicated elsewhere herein, DS 139 and any of the other data structures described herein may have more or different fields, records, and entries than described herein. In an alternative embodiment, two or more of the subsets described above are organized into a single data structure such as DS 139. In an alternative embodiment, two or more of the subsets described above are organized into a single data structure limited to two or less category fields.

In an alternative embodiment substitute items (or their identifier depending upon the embodiment) are organized by channel, meaning that when a certain channel is tuned by receiver 73*b* unacceptable scheduled items are replaced by substitute items specific to that tuned channel. For example, song clips (or their identifiers, depending upon the embodiment) are organized by channel and when a certain channel is tuned by receiver 73*b* unacceptable scheduled songs are substituted with songs specific to that tuned channel. In an alternative embodiment, the foregoing channel specificity applies to advertisements. In an alternative embodiment, the foregoing channel specificity applies to news shows or talk shows. In an alternative embodiment, the foregoing channel specificity applies to miscellaneous material.

In an alternative embodiment, having control logic 73*h* impose channel specificity is an option that is selected or deselected by a user via input through interface 73*i*. In an alternative embodiment, channel specificity is an option that is selected by a broadcaster or other third party. For example, a broadcaster (or other party) associated with a certain channel that is tuned by receiver 73*b* may provide substitute items for storage in audiovisual material 73*v*, and such substitute items have corresponding codes that indicate whether channel specificity is to be enforced with regards to the substitute items when control logic 73*h* is identifying a substitute item to present. In an alternative embodiment, multiple broadcasters share common substitute items which are channel specific to the set of the channels associated with the broadcasters, meaning that the common substitute items are not presented on a channel not associated with the broadcasters who are sharing substitute items.

One of ordinary skill in the art would appreciate that in an alternative embodiment control logic 73*h* performs the customization without the user being required to activate customize key 73*n*. In such an embodiment, the user is allowed to indicate that customization is a default operation performed for one or more channels identified by the user. Under the control of control logic 73*h*, user interface 73*i* presents to the user via display 73*o* an option to have control logic 73*h* automatically execute a customization process for one, multiple, or all channels that receiver 73*b* receives. Under the control of control logic 73*h*, user interface 73*i* accepts via keys 73*p* an indication(s) to invoke the option for one or more channels, and a representation of such indication(s) is stored in memory included in control logic 73*h*. By invoking the option, the user is no longer required to press customize key 73*n* to have the channel programming to be customized.

FIG. 9*s* illustrates a state machine, according to an alternative embodiment of the present invention, for real-time customization of the presentation of programming. In state machine 136, states 137*b* and 137*c* operate in accordance with the description for states 135*b* and 135*c*, respectively, provided herein in connection with FIG. 9*r* and such description is incorporated here by reference. State machine 136 begins at state 137*a* at which control logic 73*h* performs, as necessary, the tasks described above in connection with state 135*a*. However, at state 137*a*, control logic 73*h* performs, as necessary, additional tasks not described above. In one embodiment, state 137*a* is entered when the output of receiver 73*b* is first selected by switch 73*c* for application to transmitter 73*d*. The selection occurs for a variety reasons including but not limited to: when BID 72 and radio 73*b* are turned on; and BID 72 switches to presenting the output of receiver 73*b* instead of presenting the output of an alternative programming source (e.g., codec 73*g*, or a tape player (not shown) coupled to control logic 73*h* and switch 73*c*).

At state 137*a*, when receiver 73*b* is tuned to a particular channel and the output of receiver 73*b* is selected by switch 73*c* for application to transmitter 73*d*, control logic 73*h* determines whether an indication for default customization for that particular channel is stored in memory. A data structure for storing default customization indications is described below.

FIG. 9*t* illustrates, according to an alternative embodiment of the present invention, a data structure for information representative of user preferences. Data structure 144*a* includes channel field 144*b* and customization indication field 144*c*. DS 144*a* includes multiple records of which only three are shown, one of which is highlighted as channel customization record 144*d*. Channel customization record 144*d* has channel "93.7" as an entry for channel field 144*b* and "Yes" as an entry for customization indication field 144*c*. This indicates that whenever receiver 73*b* is tuned to "93.7" customization is to be performed without the user having to activate customize key 73*n*. One of ordinary skill in the art would appreciate that "Yes" need not be stored in an entry in field 144*c* and that another indication representative of "Yes" may be used in an actual implementation. The foregoing is true of all entries of all data structures described herein.

In an alternative embodiment, at state 137*a* control logic 73*h* using an indication of the channel to which receiver 73*b* is tuned indexes into DS 144*a* and determines whether the record with the channel indication as an entry in channel field 144*b* has "Yes" as an entry in its customization indication field 144*c*. When such an indication is not stored, state machine 136 transitions to state 137*d*.

When such an indication is stored, control logic 73*h* performs the tasks described above in connection with state 135*a* beginning with setting LastRecord to NULL. However, above references to transitions to state 135*b* correspond to transitions to state 137*b* in state machine 136. References to transitions to state 135*c* correspond to transitions to state 137*c* in state machine 136.

At state 137*d*, switch 73*c* applies the output of receiver 73*b* to transmitter 73*d* for transmission without customization. At state 137*d*, when a change channel event occurs or customization indication is accepted by control logic 73*h*, control logic 73*h* transitions to state 137*a*.

The customization processes described above involved determining item acceptability for the user. Depending upon the embodiment, item acceptability determinations depend upon user acceptability data collected in, but not limited to, one or more of the following contexts in which the user interacts with: BID 72; phone 11; BID 72 and computer 31; and computer 31. From the description below of user acceptability data collection at BID 72 one of ordinary skill in the art would appreciate that similar collection may be done at computer 31, or alternatively, at both computer 31 (or some other communications device that is capable of presenting items, including, but not limited to, phone 11) and BID 72. The data collected may be used at computer 31, or phone 11, in the same manner that the data is used at BID 72, or the data may be sent to server 29*c* where the data is analyzed and used to derive user group codes, user-group weights, and item similarity coefficients among other items of information involved in a process of determining user item acceptability. Thus, while data collection is described in context of user action at BID 72, one of ordinary skill in the art would appreciate that user acceptability data may be collected at one or more other devices and provided to BID 72, at one or more devices and combined with data collected by BID 72. One of ordinary skill in the art would appreciate that data collection at other devices can be implemented given the description herein of data collection at BID 72.

Furthermore, one of ordinary skill in the art would appreciate that one or more of the state machines described herein include, in an alternative embodiment, an additional state or additional states, if required, in which data related to user acceptability is collected and stored in storage 73*f* or in temporary storage in control logic 73*h*. In such an embodiment, control logic 73*h* collects data related to user acceptability as a consequence of one or more activations being accepted by user interface 73*i* while a scheduled or substitute item is being presented by transmitter 73*d*: substitution activations, customization activations, ranking activations, rejection activations, and channel change activations.

Referring again to interface 73*i* of FIG. 8*b*, one or more different types of user acceptability indications are provided to control logic 73*h* via interface 73*i*. Depending upon the embodiment, interface 73*i* accepts all, some or none of the user acceptability indication types described herein. One of ordinary skill in the art would appreciate that an alternative embodiment has less, other, or more keys than those shown in interface 73*i* of FIG. 8*b*, and that of the keys it does have it may not support all the features of the keys that are described herein.

A single activation of substitute key 73*m* indicates to control logic 73*h* that the item being presented is to be substituted with a substitute item retrieved from audiovisual material 73*v*. However, in an alternative embodiment, a single activation of substitute key 73*m* causes control logic 73*h* to substitute the item being presented and to update user item acceptability-related information stored in user profile 73*t*.

Control logic 73*h*, depending upon the embodiment, performs, but is not limited to performing, one or more of the following: updates the user's item rank threshold, updates the user's group correlation for the group associated with the presented item, updates the user's group item quality correlation(s) for the group associated with the presented item, places, if appropriate, an item indicator associated with the presented item in unacceptable items 74*b* or acceptable items 74*a*, and places, if appropriate, the group code(s) associated with the item in group codes 74*c*.

In an alternative embodiment, control logic 73*h* places an item indicator in unacceptable items 74*b* after the number of times the item (associated with the item indicator) was indicated to be unacceptable satisfies a condition. In such an embodiment, in memory in control logic 73*h*, control logic 73*h* keeps a count of the number of times the item was indicated to be unacceptable. When the count exceeds or equals a threshold, control logic 73*h* places an item indicator associated with the unacceptable item in unacceptable items 74*b*. The threshold is an integer greater than equal to one. In an alternative embodiment, the threshold is set by the user by way of activating keys 73*p* on user interface 73*i* that provides an indication of the requested threshold setting to control logic 73*h* for storage in memory.

In an alternative embodiment, multiple activations of substitute key 73*m* performed rapidly communicate to control logic 73*h* a user ranking indication of the item being presented. In an alternative embodiment, multiple activations performed rapidly communicate both user ranking indications and a substitution indication. Depending upon the embodiment, acceptable rankings range from 0 to n or from −m to +n, where m and n are integers greater than or equal to 1. In an alternative embodiment, multiple activations performed rapidly communicate substitution and ranking indications for activations less than or equal to k, and communicate ranking indications for activations greater than k, where k is an integer less than or equal to, depending upon the embodiment, n, n+1, or n+2.

Substitute key activations and their associated indications are shown below:

TABLE 2

Substitute Key Activation-Indication

| Activations | Substitute Indication Set 1 | Substitute Indication Set 2 | Substitute Indication Set 3 |
|---|---|---|---|
| 1 | Substitute | Substitute and Rank 0 | Substitute and Rank 0 |
| 2 | Rank 0 | Rank 1 | Substitute and Rank 1 |
| 3 | Rank 1 | Rank 2 | Substitute and Rank 2 |
| 4 | Rank 2 | Rank 3 | Rank 3 |
| 5 | Rank 3 | Rank 4 | Rank 4 |
| 6 | Rank 4 | Rank 5 | Rank 5 |

As shown in Table 2 above, in Substitute Indication Set 1, multiple (i.e., two or more activations) activations only indicate user rankings of an item being presented. In Substitute Indication Set 2, a single activation communicates both a substitution indication and Rank 0 for the item. In Substitute Indication Set 3, activations between 1 and 3 indicate both a substitution indication and a rank corresponding to the number of activations less 1. However, activations greater than 3 only communicate user rankings for the item being presented. While indications only for activations ranging from 1 to 6 activations are shown in Table 2, one of ordinary skill in the art would appreciated that the present invention is not limited to any particular number of activations. An alternative embodiment, includes the capacity for, but is not limited to, one or more of the following: single substitute key activation, Substitute Indication Set 1, Substitute Indication Set 2, and Substitute Indication Set 3. One of ordinary skill in the art would appreciate that "one or more" does not necessarily mean that an alternative embodiment is selectively capable of or selectively includes "one or more" of what is being described. One of what is being described may exist singly in an alternative embodiment, but may exist in combination with other things described in yet another alternative embodiment. This qualification for "one or more" will not be repeated herein, but should be understood as applying elsewhere herein.

Furthermore, one of ordinary skill in the art would appreciate that some keys described herein may be divided into two keys or implemented differently in order to communicate information efficiently to control logic 73*h*. In an alternative embodiment, substitute key 73*m* is divided into substitute key A and substitute key B. Substitute key A counts in increments of 1, and substitute key B counts in increments of 2. The increments are stored in memory in control logic 73*h* or in storage 73*f*. However, in alternative embodiments, the increments may be different from those specified above. Furthermore, the increments may be set by the user via interface 73*i* and control logic 73*h*.

Furthermore, one of ordinary skill in the art would appreciate that, in an alternative embodiment, substitute key 73*m* may be used to enter more than one ranking for a single item. For example, a user may be allowed to enter rankings for item qualities including, but not limited to, originality, music, lyrics, easy listening, beat, and energetic (i.e., suitable for exercising), and cheery (i.e., suitable for cheering one up). For example, when one ranking is entered via multiple activations, control logic 73h presents a first audible indication via a speaker coupled to control logic 73h indicating that the ranking was accepted and that another ranking may be entered. After the first audible indication, control logic 73h accepts another ranking and presents a second audible indication. Control logic 73h accepts in this manner as many rankings as the item quality rankings supported by embodiment, or alternatively, as many as the user has indicated via user interface 73i that the user is willing to supply. In the latter embodiment, the user selects via interface 73i a subset of the quality item rankings supported by an embodiment, and control logic 73h stores in memory in control logic 73h or in storage 73f an indication of the selection. Later control logic 73h uses the stored item quality selection indication to present audible indications and to associate a user supplied ranking with a particular item quality ranking.

In an alternative embodiment, each of the audible indications is speech descriptive of the item quality for which the user is to provide a ranking, but tones of various durations or frequency may also be used. For instance, control logic 73h may present via a speaker the words "lyrics ranking, please," but other words are used for other item qualities. In such an alternative embodiment, the user doesn't hear an audible indication for the first item quality. However, in an alternative embodiment, activation of a ranking prompt key (not shown) on interface 73i causes control logic 73h to present a first audible indication, and the remaining are presented after each user ranking entry provided by the user as described above. In an alternative embodiment, the user is allowed to record via a microphone coupled to codec 73g one or more audible indications which control logic 73h stores and organizes in storage 73f or in temporary storage in control logic 73h. It is the user made audible indications that are used as prompts in such an alternative embodiment.

In an alternative embodiment, pressing substitution key 73m and keeping it pressed for one second or longer causes the first audible indication to be presented via the speaker and after each ranking is entered by the user the next audible indication associated with the next item quality ranking is presented to the user. In an alternative embodiment, pressing customize key 73m and keeping it pressed for one second or longer and then pressing multiple activations causes control logic 73h to consider the multiple activations to be indicative of a negative ranking.

In an alternative embodiment, control logic 73h is coupled to a speaker (not shown) and provides aural feedback for the ranking entered by the user. In an alternative embodiment, via display 73o control logic 73h provides visual feedback for the ranking entered by the user.

A single activation of customize key 73n indicates to control logic 73h that the stream of items being presented from a particular source of programming should be customized using items retrieved from audiovisual material 73v. The source of programming is receiver 73b in one embodiment and is codec 73g in an alternative embodiment. The exact nature of the source of programming is irrelevant so long as the items provided by the source for presentation were not selected to satisfy the user's expectations.

However, in an alternative embodiment, a single activation of customize key 73n causes control logic 73h to customize the item stream being presented and to update user item acceptability-related information stored in user profile 73t. The description of updating activities described above in connection with substitute key 73m is incorporated herein by reference.

In an alternative embodiment, multiple activations of customize key 73n performed rapidly communicate to control logic 73h a user ranking indication of the item being presented. In an alternative embodiment, multiple activations performed rapidly communicate both user ranking indications and a customization indication. Depending upon the embodiment, acceptable rankings range from 0 to n or from −m to +n, where m and n are integers greater than or equal to 1. In an alternative embodiment, multiple activations performed rapidly communicate customization and ranking indications for activations less than or equal to k, and communicate ranking indications for activations greater than k, where k is an integer less than or equal to, depending upon the embodiment, n, n+1, or n+2.

Customize key activations and their associated indications are shown below:

TABLE 3

Customize Key Activation-Indication

| Activations | Customize Indication Set 1 | Customize Indication Set 2 | Customize Indication Set 3 |
|---|---|---|---|
| 1 | Customize | Customize and Rank 0 | Customize and Rank 0 |
| 2 | Rank 0 | Rank 1 | Customize and Rank 1 |
| 3 | Rank 1 | Rank 2 | Customize and Rank 2 |
| 4 | Rank 2 | Rank 3 | Rank 3 |
| 5 | Rank 3 | Rank 4 | Rank 4 |
| 6 | Rank 4 | Rank 5 | Rank 5 |

As shown in Table 3 above, in Customize Indication Set 1, multiple activations only indicate user rankings of an item being presented. In Customize Indication Set 2, a single activation communicates both a customization indication and Rank 0 for the item. In Customize Indication Set 3, activations between 1 and 3 indicate both a customization indication and a rank corresponding to the number of activations less 1. However, activations greater than 3 only communicate user rankings for the item being presented. While indications only for activations ranging from 1 to 6 activations are shown in Table 3, one of ordinary skill in the art would appreciated that the present invention is not limited to any particular number of activations. An alternative embodiment, includes the capacity for, but is not limited to, one or more of the following: single customize key activation, Customize Indication Set 1, Customize Indication Set 2, and Customize Indication Set 3.

Furthermore, one of ordinary skill in the art would appreciate that some keys described herein may be divided into two keys or implemented differently in order to communicate information efficiently to control logic 73h. In an alternative embodiment, customize key 73n is divided into customize key A and customize key B. Customize key A counts in increments of 1, and customize key B counts in increments of 2. The increments are stored in memory in control logic 73h or in storage 73f. However, in alternative embodiments, the increments may be different from those specified above. Furthermore, the increments may be set by the user via interface 73i and control logic 73h.

Furthermore, one of ordinary skill in the art would appreciate that, in an alternative embodiment, customize key 73n may be used to enter more than one ranking for a single item. For example, a user may be allowed to enter rankings for item qualities including, but not limited to, originality, music, lyrics, easy listening, beat, and energetic (i.e., suitable for exercising), and cheery (i.e., suitable for cheering one up). For example, when one ranking is entered via multiple activations, control logic 73h presents a first audible indication via a speaker coupled to control logic 73h indicating that the ranking was accepted and that another ranking may be entered. After the first audible indication, control logic 73h accepts another ranking and presents a second audible indication. Control logic 73h accepts in this manner as many rankings as the item quality rankings supported by an embodiment, or alternatively, as many as the user has indicated via user interface 73i that the user is willing to supply. In the latter embodiment, the user selects via interface 73i a subset of the quality item rankings supported by an embodiment, and control logic 73h stores in memory in control logic 73h or in storage 73f an indication of the selection. Later control logic 73h uses the stored item quality selection indication to present audible indications and to associate a user supplied ranking with a particular item quality ranking.

In an alternative embodiment, each of the audible indications is speech descriptive of the item quality for which the user is to provide a ranking, but tones of various durations or frequency may also be used. For instance, control logic 73h may present via a speaker the words "lyrics ranking, please," but other words are used for other item qualities. In such an alternative embodiment, the user doesn't hear an audible indication for the first item quality. However, in an alternative embodiment, activation of a ranking prompt key (not shown) on interface 73i causes control logic 73h to present a first audible indication, and the remaining are presented after each user ranking entry provided by the user using customize key 73n as described above. In an alternative embodiment, the user is allowed to record via a microphone coupled to codec 73g one or more audible indications which are stored in storage 73f or in temporary storage in control logic 73h. It is the user made audible indications that are used as prompts in such an embodiment.

In an alternative embodiment, pressing customize key 73n and keeping it pressed for one second or longer causes control logic 73h to present the first audible indication via the speaker and after each ranking is entered by the user the next audible indication associated with the next item quality ranking is presented to the user. In an alternative embodiment, pressing customize key 73n and keeping it pressed for one second or longer and then pressing multiple activations causes control logic 73h to consider the multiple activations to be indicative of a negative ranking. A single activation of key 73n after pressing it down one second or longer is considered by control logic 73h a ranking of 0, in an alternative embodiment. Alternatively, a single activation without depression first for a second or more, is considered by control logic 73h a ranking of 0.

In an alternative embodiment, control logic 73h is coupled to a speaker (not shown) and provides aural feedback for the ranking entered by the user. In an alternative embodiment, via display 73o control logic 73h provides visual feedback for the ranking entered by the user.

A single activation of skip key 73q indicates to control logic 73h that the item being presented is to be skipped and the next item that follows is to be presented. In one embodiment, the next item is retrieved from audiovisual material 73v. However, in an alternative embodiment, a single activation of skip key 73q causes control logic 73h both to skip the item being presented and to update user item acceptability-related information stored in user profile 73t. The description of updating activities described above in connection with substitute key 73m is incorporated herein by reference.

In an alternative embodiment, multiple activations of skip key 73q performed rapidly communicate to control logic 73h a user ranking indication of the item being presented. In an alternative embodiment, multiple activations performed rapidly communicate both user ranking indications and a skip indication. Depending upon the embodiment, acceptable rankings range from 0 to n or from −m to +n, where m and n are integers greater than or equal to 1. In an alternative embodiment, multiple activations performed rapidly communicate skip and ranking indications for activations less than or equal to k, and communicate ranking indications for activations greater than k, where k is an integer less than or equal to, depending upon the embodiment, n, n+1, or n+2.

Skip key activations and their associated indications are shown below:

TABLE 4

Skip Key Activation-Indication

| Activations | Skip Indication Set 1 | Skip Indication Set 2 | Skip Indication Set 3 |
|---|---|---|---|
| 1 | Skip | Skip and Rank 0 | Skip and Rank 0 |
| 2 | Rank 0 | Rank 1 | Skip and Rank 1 |
| 3 | Rank 1 | Rank 2 | Skip and Rank 2 |
| 4 | Rank 2 | Rank 3 | Rank 3 |
| 5 | Rank 3 | Rank 4 | Rank 4 |
| 6 | Rank 4 | Rank 5 | Rank 5 |

As shown in Table 4 above, in Skip Indication Set 1, multiple (i.e., two or more activations) activations only indicate user rankings of an item being presented. In Skip Indication Set 2, a single activation communicates both a skip indication and Rank 0 for the item. In Skip Indication Set 3, activations between 1 and 3 indicate both a skip indication and a Rank corresponding to the number of activations less 1. However, activations greater than 3 only communicate user rankings for the item being presented. While indications only for activations ranging from 1 to 6 activations are shown in Table 4, one of ordinary skill in the art would appreciated that the present invention is not limited to any particular number of activations. An alternative embodiment, includes the capacity for, but is not limited to, one or more of the following: single skip key activation, Skip Indication Set 1, Skip Indication Set 2, and Skip Indication Set 3.

Furthermore, one of ordinary skill in the art would appreciate that some keys described herein may be divided into two keys or implemented differently in order to communicate information efficiently to control logic 73h. In an alternative embodiment, skip key 73q is divided into skip key A and skip key B. Skip key A counts in increments of 1, and skip key B counts in increments of 2. The increments are stored in memory in control logic 73h or in storage 73f. However, in alternative embodiments, the increments may be different from those specified above. Furthermore, the increments may be set by the user via interface 73i and control logic 73h.

Furthermore, one of ordinary skill in the art would appreciate that, in an alternative embodiment, skip key 73q may be used to enter more than one ranking for a single item. For example, a user may be allowed to enter rankings for item qualities including, but not limited to, originality, music, lyrics, easy listening, beat, and energetic (i.e., suitable for exercising), and cheery (i.e., suitable for cheering one up). For example, when one ranking is entered via multiple activations, control logic 73h presents a first audible indication via a speaker coupled to control logic 73h indicating that the ranking was accepted and that another ranking may be entered. After the first audible indication, control logic 73h accepts another ranking and presents a second audible indication. Control logic 73h accepts in this manner as many rankings as the item quality rankings supported by'embodiment, or alternatively, as many as the user has indicated via user interface 73i that the user is willing to supply. In the latter embodiment, the user selects via interface 73i a subset of the quality item rankings supported by an embodiment, and control logic 73h stores in memory in control logic 73h or in storage 73f an indication of the selection. Later control logic 73h uses the stored item quality selection indication to present audible indications and to associate a user supplied ranking with a particular item quality ranking.

In an alternative embodiment, each of the audible indications is speech descriptive of the item quality for which the user is to provide a ranking, but tones of various durations or frequency may also be used. For instance, control logic 73h may present via a speaker the words "lyrics ranking, please," but other words are used for other item qualities. In such an alternative embodiment, the user doesn't hear an audible indication for the first item quality. However, in an alternative embodiment, activation of a ranking prompt key (not shown) on interface 73i causes control logic 73h to present a first audible indication, and the remaining are presented after each user ranking entry provided by the user as described above. In an alternative embodiment, the user is allowed to record via a microphone coupled to codec 73g one or more audible indications which control logic 73h stores and organizes in storage 73f or in temporary storage in control logic 73h. It is the user made audible indications that are used as prompts in such an alternative embodiment.

In an alternative embodiment, pressing skip key 73q and keeping it pressed for one second or longer causes the first audible indication to be presented via the speaker and after each ranking is entered by the user the next audible indication associated with the next item quality ranking is presented to the user. In an alternative embodiment, pressing skip key 73q and keeping it pressed for one second or longer and then pressing multiple activations causes control logic 73h to consider the multiple activations to be indicative of a negative ranking.

In an alternative embodiment, control logic 73h is coupled to a speaker (not shown) and provides aural feedback for the ranking entered by the user. In an alternative embodiment, via display 73o control logic 73h provides visual feedback for the ranking entered by the user.

A single activation of reject key 73s indicates to control logic 73h that user item acceptability-related information stored in user profile 73t is to be updated to reflect that the item being presented has been rejected. Depending upon the embodiment, control logic 73h as a consequence of receiving a rejection indication, also performs, but is not limited to performing, one or more of the following replacement actions: skip to the next item in the stream of items, present a substitute item, change channels, change play lists. The description of updating activities described above in connection with substitute key 73m is incorporated herein by reference.

In an alternative embodiment, multiple activations of reject key 73s performed rapidly communicate to control logic 73h a user ranking indication of the item being presented. In an alternative embodiment, multiple activations performed rapidly communicate both user ranking indications and a replacement indication. Depending upon the embodiment; acceptable rankings range from 0 to −m where m is an integer greater than or equal to 1. In an alternative embodiment, multiple activations performed rapidly communicate replacement and ranking indications for activations greater than or equal to k and less than r, and communicate ranking indications for activations less than k, where k is an integer less than or equal to m+1, and r is equal to m+1.

Reject key activations and their associated indications are shown below:

TABLE 5

Reject Key Activation-Indication

| Activations | Reject Indication Set 1 | Reject Indication Set 2 | Reject Indication Set 3 |
| --- | --- | --- | --- |
| 1 | Rank 0 | Rank 0 | Rank 0 |
| 2 | Rank −1 | Rank −1 | Rank −1 |
| 3 | Rank −2 | Rank −2 | Rank −2 |
| 4 | Rank −3 | Rank −3 | Replace and Rank −3 |
| 5 | Rank −4 | Rank −4 | Replace and Rank −4 |
| 6 | Rank −5 | Replace and Rank −5 | Replace and Rank −5 |

As shown in Table 5 above, in Reject Indication Set 1, multiple (i.e., two or more activations) activations only indicate user rankings of an item being presented. In Reject Indication Set 2, a single activation communicates both a reject indication and Rank 0 for the item. In Reject Indication Set 3, activations between 4 and 6 indicate both a reject indication and a rank corresponding to 1—the number of activations. However, activations less than 4 only communicate user rankings for the item being presented. While indications only for activations ranging from 1 to 6 activations are shown in Table 5, one of ordinary skill in the art would appreciated that the present invention is not limited to any particular number of activations. An alternative embodiment, includes the capacity for, but is not limited to, one or more of the following: single reject key activation, Reject Indication Set 1, Reject Indication Set 2, and Reject Indication Set 3.

Furthermore, one of ordinary skill in the art would appreciate that some keys described herein may be divided into two keys or implemented differently in order to communicate information efficiently to control logic 73h. In an alternative embodiment, reject key 73s is divided into reject key A and reject key B. Reject key A counts in decrements of −1, and reject key B counts in decrements of −2. The decrements are stored in memory in control logic 73h or in storage 73f. However, in alternative embodiments, the increments may be different from those specified above. Furthermore, the increments may be set by the user via interface 73i and control logic 73h.

Furthermore, one of ordinary skill in the art would appreciate that, in an alternative embodiment, reject key 73s may be used to enter more than one ranking for a single item. For example, a user may be allowed to enter rankings for item qualities including, but not limited to, originality, music, lyrics, easy listening, beat, and energetic (i.e., suitable for exercising), and cheery (i.e., suitable for cheering one up). For example, when one ranking is entered via multiple activations, control logic 73h presents a first audible indication via a speaker coupled to control logic 73h indicating that the ranking was accepted and that another ranking may be entered. After the first audible indication, control logic 73h accepts another ranking and presents a second audible indication. Control logic 73h accepts in this manner as many rankings as the item quality rankings supported by embodiment, or alternatively, as many as the user has indicated via user interface 73i that the user is willing to supply. In the latter embodiment, the user selects via interface 73i a subset of the quality item rankings supported by an embodiment, and control logic 73h stores in memory in control logic 73h or in storage 73f an indication of the selection. Later control logic 73*h* uses the stored item quality selection indication to present audible indications and to associate a user supplied ranking with a particular item quality ranking.

In an alternative embodiment, each of the audible indications is speech descriptive of the item quality for which the user is to provide a ranking, but tones of various durations or frequency may also be used. For instance, control logic 73*h* may present via a speaker the words "lyrics ranking, please," but other words are used for other item qualities. In such an alternative embodiment, the user doesn't hear an audible indication for the first item quality. However, in an alternative embodiment, activation of a ranking prompt key (not shown) on interface 73*i* causes control logic 73*h* to present a first audible indication, and the remaining are presented after each user ranking entry provided by the user as described above. In an alternative embodiment, the user is allowed to record via a microphone coupled to codec 73*g* one or more audible indications which control logic 73*h* stores and organizes in storage 73*f* or in temporary storage in control logic 73*h*. It is the user made audible indications that are used as prompts in such an alternative embodiment.

In an alternative embodiment, pressing reject key 73*s* and keeping it pressed for one second or longer causes the first audible indication to be presented via the speaker and after each ranking is entered by the user the next audible indication associated with the next item quality ranking is presented to the user.

In an alternative embodiment, control logic 73*h* is coupled to a speaker (not shown) and provides aural feedback for the ranking entered by the user. In an alternative embodiment, via display 73*o* control logic 73*h* provides visual feedback for the ranking entered by the user.

One of ordinary skill in the art would appreciate that the above functionality is not limited to the keys above. The same functionality can be added to a channel change key among keys 73*p*. Repeated activation of the channel key also communicates to control logic 73*h* a ranking indication.

FIG. 8*r* illustrates in greater detail input keys of a user interface according to an alternative embodiment of the present invention. Input keys 73*p* include ranking keys 75*a*-75*e*. Each of keys 75*a*-75*e* has a one-to-one correspondence with a ranking value indicative of acceptability of an item being presented. In one embodiment, key 75*a*, 75*b*, 75*c*, 75*d*, and 75*e* are associated with the values "1," "2," "3," "4," and "5," but other values and orders are possible in an alternative embodiment. Alternatively, the ranking key is a slider which when moved to a certain position indicates to control logic 73*h* the ranking the user desires to communicate. Alternatively, user interface 73*i* includes multiple sliders each of which is associated with an item quality for which a ranking can be made using the slider. One of ordinary skill in the art would appreciate the there is no limit to the techniques and apparatus, including voice recognition or touch screen, that may be used to accept activations.

Figure 10G:
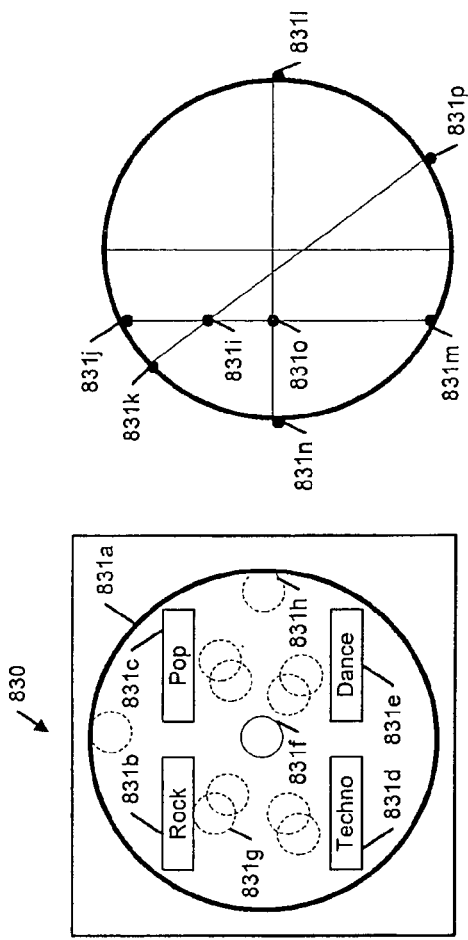
FIG. 10g illustrates a play list or schedule customization interface according to an alternative embodiment of the present invention.

FIG. 10*g* illustrates a play list or schedule customization interface according to an alternative embodiment of the present invention. In an alternative embodiment, user interface 73*i* includes customization interface (CI) 830. CI 830 allows, depending upon the embodiment, a user to rapidly change the composition of a play list or schedule or to create a play list from items whose genre is the same as one of the genres specified in genre fields 831*b*, 831*c*, 831*d*, 831*e*: Depending upon the embodiment, items stored in audiovisual material 73*v* include meta data (described in greater detail elsewhere herein) that identifies the genre associated with the item. Control logic 73*h* allows, via activation of keys 73*p*, the user to specify the genre entries for fields 831*b*, 831*c*, 831*d*, 831*e*. CI 830 includes touch screen 831*a*, but alternatively may include a joystick and customizable displays (liquid crystal display or light emitting diode or some other technology known in the art) for genre fields 831*b*, 831*c*, 831*d*, 831*e*.

In its quiescent state, screen 831*a* displays a composition indication 831*f* that is resting in a default position that is equidistant between the genre fields. The position of composition indication 831*f* is accessible and indicates to control logic 73*h* that items in audiovisual material 73*v* with the genres specified in genre fields 831*b*, 831*c*, 831*d*, 831*e* are to be presented with equal relative frequencies. However, the user is allowed to move the circle representing the composition indication, and illustrative positions are depicted by the circles with dashed lines, including composition indication 831*g*. Depending upon the embodiment, different positions translate into different relative frequencies of items from the various genres. For example, composition indication 831*h* indicates that no rock items and no techno items are to be played. However, other interpretations of positions are also possible. Composition indication 831*g* indicates that rock items are to be presented with about a 3:1 ratio in favor of rock items over items from the other three genres. The ratio of rock items to pop items is the ratio of the distance between point 831*n* and point 831*l* to the distance between point 831*m* to point 831*o*. The ratio of rock items to techno items is the ratio of the distance between point 831*m* and point 831*i* to the distance between point 831*j* to point 831*i*. The ratio of rock items to dance items is the ratio of the distance between point 831*p* and point 831*i* to the distance between point 831*k* to point 831*i*.

Control logic 73*h* presents items retrieved from material 73*v* based upon the relative frequency indication provided by the position of a customization indication on screen 831*a*. As indicated above ratios can easily be calculated by control logic 73*h* given the position of a composition indication and the diameter of screen 831*a*. The diameter of screen 831*a* is stored in memory in or memory accessible to control logic 73*h*.

One of ordinary skill in the art would appreciate that the number of genre fields is implementation dependent and not a limitation of embodiments of the present invention. Furthermore, the position of genre fields in CI 830 is an implementation detail and need not be placed on screen 831*a*, but, rather may occupy their own display areas outside of screen 831*a*, separate from screen 831*a*, or both. Additionally, more than one composition indication may be used in an alternative embodiment.

While in the above description explicit indications of acceptability are described, one of ordinary skill in the art would appreciate that in an alternative embodiment implicit indications of acceptability are also possible. Implicit indications of acceptability include occurrence of implicit acceptance events and implicit non-acceptance events. An implicit acceptance event occurs when the end time of an item is about to arrive without an unacceptability indication being received; this implies that the item is acceptable to the user. An implicit non-acceptance event occurs when before the item ends, control logic 73*h* accepts from user interface 73*i*, depending upon the embodiment, one of the following: a change channel activation, a skip key activation, a fast forward activation, a change play list activation.

According to an alternative embodiment, in reaction to an implicit acceptance event, control logic 73*h* assigns a default ranking to the item. Depending upon the embodiment, the default ranking depends upon the range of rankings used in an implementation or the distribution of rankings made by the user. If the user consistently ranks around a high average ranking then the default value for that user will be higher than the default value for a user who consistently ranks around a low ranking. Control logic 73*h* retrieves the default ranking from a software construct or variable stored in user profile 73*t* in storage 73*f* or in memory in control logic 73*h*. According to an alternative embodiment, control logic 73*h* accepts from user interface 73*i* an indication of a value for a default ranking and stores a representation of the value in a software construct or variable in user profile 73*t* or in memory in control logic 73*h*.

Figure 9U:
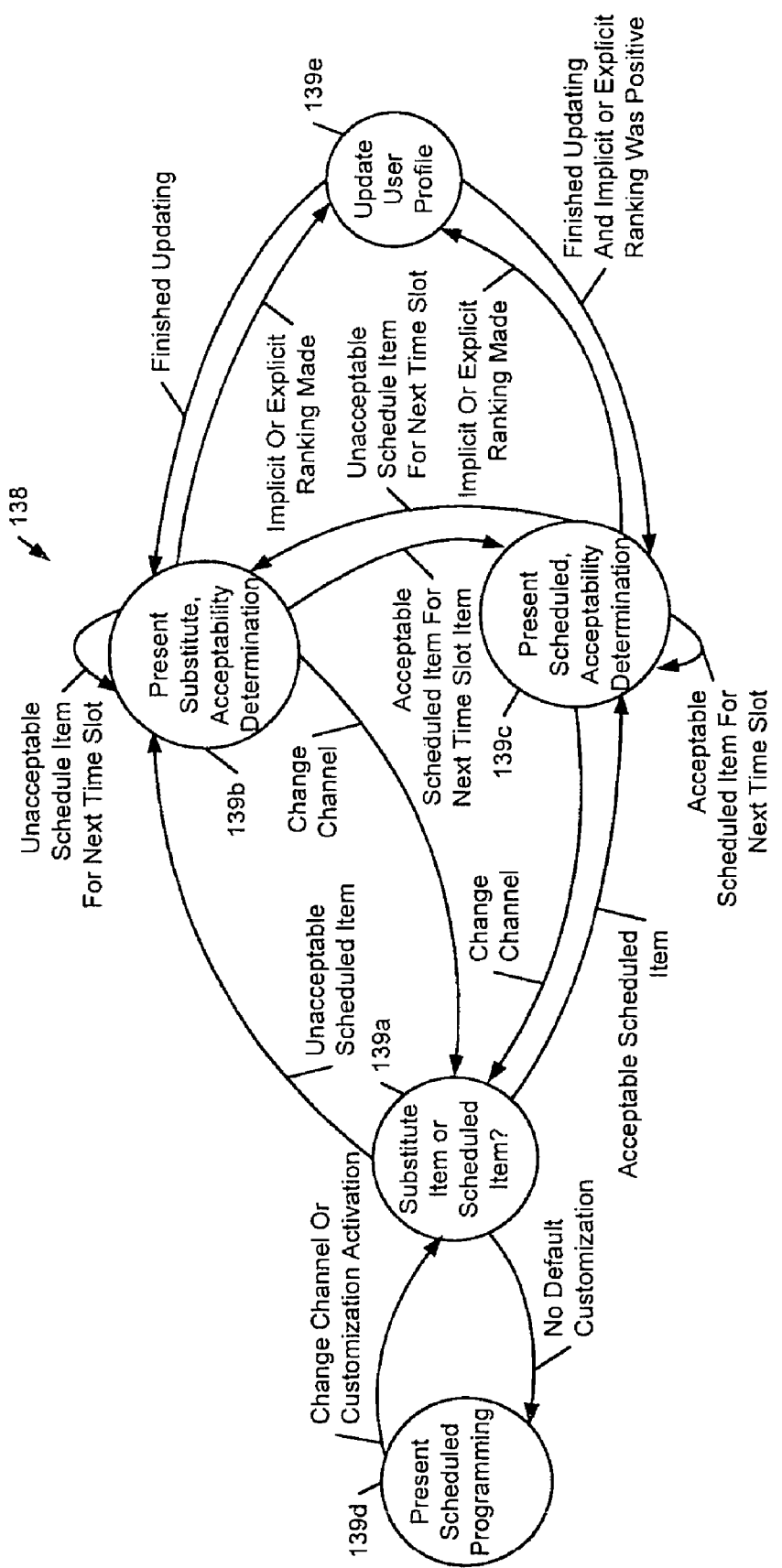
FIG. 9u illustrates a state machine, according to an alternative embodiment of the present invention, for real-time customization of the presentation of programming and for the collection of data related to user acceptance of items.

FIG. 9*u* illustrates a state machine, according to an alternative embodiment of the present invention, for real-time customization of the presentation of programming and for the collection of data related to user acceptance of items. In state machine 138, states 139*a* and 139*d* operate in accordance with the description for states 137*a* and 137*d*, respectively, provided herein in connection with FIG. 9*s* and such description is incorporated here by reference. State machine 138 begins at state 139*a* and transitions from state 139*a* to states 139*b*, 139*c* under the same conditions that state machine 136 transitions to states 137*b*, 137*c* as described above. However, above references to transitions to state 137*b* correspond to transitions to state 139*b* in state machine 138. References to transitions to state 137*c* correspond to transitions to state 139*c* in state machine 138. Furthermore, state machine 138 performs the same operations at states 139*b*, 139*c* that state machine 136 performs at states 137*b*, 137*c*. However, state machine 138 also performs additional operations at states 139*b*, 139*c*, and includes an additional state, state 139*e*, to which state machine 138 transitions to from states 139*b*, 139*c*. These additional operations and additional transitions are described below.

Before transitions of states 139*b*, 139*c* are described in greater detail, collection of data related to user acceptance (i.e., explicit or implicit ranking) of items at state 139*e* is introduced. Given the many different user acceptability determination processes that have been described herein, there are correspondingly many different data collection processes as well. One of ordinary skill in the art would appreciate that given a description of one group of determination processes a corresponding group of data collection processes can be derived, and vice versa. While this is true, it does not necessarily mean that an embodiment that uses a simple acceptability determination process is limited to a correspondingly simple data collection process.

When state machine 138 arrives at state 139*e*, it is arriving because either there has been an explicit ranking event or an implicit ranking event at one of states 139*b*, 139*c*. An explicit ranking may indicate the user's acceptance or non-acceptance of the item. An explicit ranking involves activation of a key on user interface 73*i* as described above. As indicated above, depending upon the embodiment, the explicit ranking may be as simple as a single activation of reject key 73*s*, or it may be one that covers a range of values depending upon the nature of the activation(s).

An implicit ranking may also indicate the user's acceptance and non-acceptance of the item. Depending upon the embodiment, an implicit ranking occurs when an item is about to end without a ranking indication being received (this implies that the item is acceptable to the user), or when user interface 73*i* accepts one of, but is not limited to, the following: change channel activation, skip key activation, fast forward activation, and change play list activation.

Control logic 73*h* considers an item to have been ranked as acceptable when the user through interface 73*i*, gives an item, as described above, one or more of, but not limited to the following: a rank that equals or exceeds a threshold, explicit acceptance not involving assignment of a rank, or there is an implicit acceptance. In an alternative embodiment, a threshold is assigned for each of the keys described above that are capable of accepting user rank activations. In an alternative embodiment, the assigned threshold is the same for all of the keys. A threshold's value can be any value in between the maximum and minimum value of the rank range allowed for the embodiment. The threshold(s) values are stored in acceptance indication thresholds 74*k* in user profile information 73*t*, and are accessible to control logic 73*h*. In an alternative embodiment, the threshold(s) is assigned by the user via interface 73*t* and control logic 73*h* stores it in indication thresholds 74*k*.

Explicit acceptance not involving a rank may be the activation of an acceptance key (not shown) on user interface 73*i*. Alternatively explicit acceptance may be signaled by pressing down two of the keys described above simultaneously.

Depending upon the embodiment, the user is allowed to provide, via interface 73*i*, only one, only two or all three of the foregoing three acceptance indications to control logic 73*h*. Control logic 73*h* considers an item to have been ranked as unacceptable when the item is given by a user through interface 73*i*, as described above, one or more of, but not limited to the following: a rank that is less than a threshold, explicit rejection not involving assignment of a rank, or there is an implicit non-acceptance Depending upon the embodiment, the user is allowed to provide, via interface 73*i*, only one, only two or all three of the foregoing three non-acceptance indications to control logic 73*h*.

The user item ranking referred to in connection with updating item acceptability determination related data structures is provided by user interface 73*i* to control logic 73*h* in response to an activation(s) by the user. However, one of ordinary skill in the art would appreciate that in an alternative embodiment item rankings are received by transceiver 73*b* and provided to control logic 73*h*. In an alternative embodiment, user item ranking is binary: acceptance or rejection, each of which is associated with a different value. Binary rankings can be used advantageously in any of the embodiments described herein. Depending upon the application though, binary rankings may result in noisy statistics. The foregoing description of how user item ranking is provided to control logic 73*h* is to be incorporated in any other description of user item ranking made in connection with updating item acceptability determination data related structures.

While in the description below explicit and implicit indications are described as triggering transitions from state 139*b*, 139*c* to state 139*e*, alternative embodiments may only support transitions for one of the two types of indications. An alternative embodiment may only support transitions from one of states 139*b*, 139*c* but not both, or alternatively from both states 139*b*, 139*c*.

Data collection processes use data structures in which information can be stored for later retrieval by an acceptability determination process. Data collection processes will be described in the context of the data structures described above in connection with FIGS. 9*c*, 9*o*, 10*b*, 10*c* and the acceptability determination processes. One of ordinary skill in the art would appreciate that just because a data structure is included in an embodiment, this doesn't mean that the embodiment supports both a data collection process and an acceptability determination process using that data structure. Depending upon the embodiment, a data collection process may store more or different information, or both, than is used by an acceptability determination process. Depending upon the embodiment, a data collection process may store less or different information, or both, than is used by an acceptability determination process. However, as indicated above, other alternative embodiments handle differently previously stored information for an item for which the user has just expressed another preference. The descriptions of this operation and the operations of other alternative embodiments are not repeated in each of the descriptions of state 139e, but their descriptions are to be regarded as alternative embodiments of the embodiment described elsewhere herein in connection with state 139e.

For each acceptability determination process, the commensurate data collection operations that are performed at state 139e to support the acceptability determination process will be described. One of ordinary skill in the art would appreciate that when information has already been collected and processed for an item for which the user has indicated acceptance or non-acceptance, updating is not performed at state 139e in an alternative embodiment, because the user has already indicated a preference. However, in an alternative embodiment, the latest user indication of acceptance or non-acceptance replaces a previously stored indication and any necessary calculations of coefficients or other information is performed using the previously stored indication. In an alternative embodiment, the latest user indication of acceptance or non-acceptance is averaged, where appropriate, with a previously stored indication, and any necessary calculations performed. The foregoing descriptions of operations dealing with handling two or more user indications of preference for the same item are not repeated in each of the descriptions of state 139e, but their descriptions are to be regarded as alternative embodiments of each of the embodiments described elsewhere herein in connection with state 139e.

Referring to process 200 of FIG. 9b, process 200 involves use of unacceptable item indicators 74b. For an embodiment in which process 200 is the item acceptability determination process, state machine 138 transitions from states 139b, 139c to state 139e upon the occurrence of an explicit or implicit indication of non-acceptance of an item at states 139b, 139c. At state 139e, control logic 73h stores in unacceptable item indicators 74b the item indicator for the item that was being presented at state 139b or the item that was being presented at state 139c. The item indicator is obtained from, as appropriate, DS 150 or DS 139. In an embodiment, in which the indicator is stored in data structure(s) other than DS 150 or DS 139, the indicator is obtained from the other data structure(s): The foregoing is to be understood to apply to other information retrieved and stored as part of an updating process. When the transition to state 139e occurs due to an explicit indication of non-acceptance, after the item indicator is stored in indicators 74b, state machine 139e transitions to state 139b, irrespective from which one of states 139b, 139c the transition to state 139e was made. When the transition to state 139e occurs from state 139c due to an implicit indication of non-acceptance, after the item indicator is stored in indicators 74b, state machine 139e transitions to state 139c. In an alternative embodiment, at state 139b, control logic 73h presents another substitute item in the time remaining in the timeslot for the substitute item or scheduled item as the case may be. Presenting a substitute item in the time remaining in the timeslot is an operation performed at state 139b in an alternative embodiment. This operation that is performed at state 139b is in an alternative embodiment of the embodiments described in connection with other descriptions of state 139b, and will not be repeated herein.

There are several distinct and separate alternatives to the above transitions from state 139e. These alternative embodiments are being described next and will not be repeated for each description of state 139e even though they are alternative embodiments of the embodiment being described in connection with other descriptions of state 139e, other than the one just described in connection with process 200.

When state 139e is entered from state 139c due to an explicit indication of non-acceptance, in an alternative embodiment, at state 139e, control logic 73h determines whether there is an appreciable amount of time remaining in the unacceptable item's timeslot. When there is an appreciable amount of time remaining in the unacceptable item's timeslot, state machine 138 transitions to state 139b. Appreciable amount of time remaining is a design implementation, and the present invention is not limited to any particular value between 1% to 99% of the item's time slot duration. In an alternative embodiment, appreciable amount of time remaining is an amount of time greater than or equal to 5% of the unacceptable item's time slot duration. However, in an alternative embodiment, appreciable amount of time remaining is an amount of time greater than or equal to 20% of the unacceptable item's time slot duration.

In an alternative embodiment, the user is allowed to set via interface 73i a value for a software construct AppreciableTime that control logic 73h stores in memory in control logic 73h, storage 73f, or user profile information 73t. In an alternative embodiment, at state 139b before the transition to state 139e, control logic 73h determines whether the next scheduled item is acceptable. When the next scheduled item is unacceptable, control logic 73h sets a software construct or variable SubstituteNext to TRUE. When the next scheduled item is acceptable, control logic 73h sets SubstituteNext to FALSE. In such an embodiment, at state 139e, when SubstituteNext is TRUE, state machine 138 transitions to state 139b after the updating of item indicators 74b. One of ordinary skill in the art would appreciate that in other embodiments, state machine 138 transitions after updating the embodiment's appropriate data structure that is being described in connection with the embodiment's state 139e. When SubstituteNext is FALSE, state machine 138 transitions to state 139c after the updating of item indicators 74b. One of ordinary skill in the art would appreciate that in other embodiments, state machine 138 transitions after updating the embodiment's appropriate data structure. In an alternative embodiment, the next scheduled item determination of acceptability is just as easily preformed in state 139e, and there is no need for SubstituteNext. Any necessary housekeeping operations (for example, but not limited to, setting values of software constructs or variables before transitioning) that are performed at state 139b, in an embodiment in which SubstituteNext is not used, are performed at state 139e. Alternatively, the housekeeping operations are performed at state 139b before making the transitions to state 139e. The foregoing description related to housekeeping operations will not be repeated elsewhere herein, and one of ordinary skill in the art would appreciate would be incorporated in the description of alternative embodiments to the embodiment described in connection with states 137b, 137c.

In an alternative embodiment, before state machine 138 transitions from state 139b to state 139e, control logic 73h determines whether the next scheduled item is acceptable. When the next scheduled item is acceptable, control logic 73h sets a software construct or variable ScheduledNext to TRUE. When the next scheduled item is not acceptable, control logic 73h sets ScheduleNext to FALSE. In such an embodiment, at state 139e, when ScheduledNext is TRUE, state machine 138 transitions to state 139c after the updating of item indicators 74b. One of ordinary skill in the art would appreciate that in other embodiments, state machine 138 transitions after the updating of the embodiment's appropriate data structure that is being described in connection with the embodiment's state 139e. When ScheduledNext is FALSE, state machine 138 transitions to state 139b after the updating of item indicators 74b. One of ordinary skill in the art would appreciate that in other embodiments, state machine 138 transitions after updating the embodiment's appropriate data structure. In an alternative embodiment, the next scheduled item determination of acceptability is just as easily preformed in state 139e, and there is no need for ScheduledNext. Any necessary housekeeping operations (for example, but not limited to, setting values of software constructs or variables before transitioning) that are performed at state 139c, in an embodiment in which ScheduledNext is not used, are performed at state 139e. Alternatively, the housekeeping operations are performed at state 139c before making the transitions to state 139e. The foregoing description related to housekeeping operations will not be repeated elsewhere herein, and one of ordinary skill in the art would appreciate would be incorporated in the description of alternative embodiments to the embodiment described in connection with states 137b, 137c.

When state 139e is entered on account of an implicit acceptance, after updating of item indicators 74b, control logic 73h determines whether the next scheduled item is acceptable. One of ordinary skill in the art would appreciate that in other embodiments, state machine 138 transitions after the updating of the embodiment's appropriate data structure that is being described in connection with the embodiment's state 139e. When the next scheduled item is acceptable, irrespective of whether the determination is made at state 139b or 139e, state machine 138 transitions to state 139c. When the next scheduled item is unacceptable, irrespective of whether the determination is made at state 139b or 139e, state machine 138 transitions to state 139b.

The foregoing operations or equivalently similar ones may be performed anywhere in any state machine described herein. Transitions are a design implementation and there is much choice as to the states in which certain operations are to be made and whether software constructs or variables are used. The foregoing alternative embodiments for state 139e are not repeated below but should be considered to be alternative embodiments of other state 139e embodiments that are described herein.

Referring to process 202 of FIG. 9f, process 202 involves use of acceptable item indicators 74a and unacceptable item indicators 74b. For an embodiment in which process 202 is the item acceptability determination process, state machine 138 transitions from states 139b, 139c to state 139e upon the occurrence of an explicit or implicit indication of either acceptance or non-acceptance of an item at states 139b, 139c. When the transition is due to explicit or implicit indication of non-acceptance of an item, at state 139e, control logic 73h stores in unacceptable item indicators 74b the item indicator for the substitute item that was being presented at state 139b or the item that was being presented at state 139c. In an alternative embodiment, after the item indicator is stored in indicators 74b, state machine 139e transitions to state 139b, irrespective from which one of states 139b, 139c the transition to state 139e was made.

When the transition is due to explicit or implicit indication of acceptance of an item, at state 139e, control logic 73h stores in acceptable item indicators 74a the item indicator for the substitute item that was being presented at state 139b or the item that was being presented at state 139c. If the transition to state 139e occurred from state 139c, after the item indicator is stored in indicators 74a, state machine 139e transitions to state 139c. If the transition to state 139e occurred from state 139b, after the item indicator is stored in indicators 74a, state machine 139e transitions to state 139b.

Referring to process 204 of FIG. 9f, as indicated above process 204 has more than one alternative embodiment. In an alternative embodiment, process 204 involves use of acceptable item indicators 74a, unacceptable item indicators 74b, and group codes 74c. In an alternative embodiment, process 204 involves use of acceptable item indicators 74a, unacceptable item indicators 74b, group codes 74c, user group similarity coefficients or correlations 74d, and item rank threshold 74f.

For an embodiment in which process 204 is the item acceptability determination process, state machine 138 transitions from states 139b, 139c to state 139e upon the occurrence of an explicit or implicit indication of either acceptance or non-acceptance of an item at states 139b, 139c. When the transition is due to explicit or implicit indication of non-acceptance of an item, at state 139e, control logic 73h stores in unacceptable item indicators 74b the item indicator for the substitute item that was being presented at state 139b or the item that was being presented at state 139c. In an alternative embodiment, if the transition to state 139e occurred from state 139c, after the item indicator is stored in indicators 74b, state machine 139e transitions to state 139b. If the transition to state 139e occurred from state 139b, after the item indicator is stored in indicators 74b, state machine 139e transitions to state 139b.

However, in an alternative embodiment, after the item indicator is stored in indicators 74b, state machine 138 doesn't transition to states 139b, 139c until control logic 73h has updated user-group related information. In such an alternative embodiment, for each of the group code(s) associated with the item deemed unacceptable, control logic 73h determines a user-group correlation or similarity coefficient for the user and the group associated with the group code. This operation is described in greater detail below in connection with transitions to state 139e on account of an explicit or implicit indication of acceptance. However, in an alternative embodiment, for each of the group code(s) associated with the item deemed unacceptable, control logic 73h determines the user group item quality similarity coefficients for the user and the group item qualities associated with the group code. This operation is described in greater detail below in connection with transitions to state 139e on account of an explicit or implicit indication of acceptance.

When the transition is due to explicit or implicit indication of acceptance of an item, at state 139e, control logic 73h stores in acceptable item indicators 74a the item indicator for the item that was being presented at state 139b or the item that was being presented at state 139c. Control logic 73h also stores the group code(s) associated with the item in user group codes 74c. The group code(s) is obtained from, as appropriate, DS 150 or DS 139. In an embodiment, in which the group code(s) is stored in data structure(s) other than DS 150 or DS 139, the group code(s) is obtained from the other data structure(s). The foregoing is to be understood to apply to other information retrieved and stored as part of any updating process described herein. If the transition to state 139e occurred from state 139c, after the item indicator and group code(s) are stored, state machine 139e transitions to state 139c. If the transition to state 139e occurred from state 139b, after the item indicator and group code(s) are stored, state machine 139e transitions to state 139b.

In an alternative embodiment, when the transition is due to explicit or implicit indication of acceptance of an item, at state 139e, control logic 73h stores in acceptable item indicators 74a the item indicator for the substitute item that was being presented at state 139*b* or the item that was being presented at state 139*c*. Control logic 73*h* also stores the group code(s) associated with the item in user group codes 74*c* and for each of the groups associated with the group code(s) control logic 73*h* determines a user-group correlation or similarity coefficient. In an alternative embodiment, control logic 73*h* also stores the group code(s) associated with the item in user group codes 74*c* and for each of the groups associated with the group code(s) control logic 73*h* determines the user group item quality similarity coefficients.

In an alternative embodiment, to determine a user group similarity coefficient control logic 73*h* receives the rankings of items of each member of the group, some of whom may have not yet ranked the acceptable item ranked by the user. Given the computational and storage load in cases where there are millions of users, it may be desirable, in an alternative embodiment, to provide control logic 73*h*, via transceiver 73*d*, receiver 73*b*, or physical storage media coupled to control logic 73*h*, for the particular item presented at states 139*b*, 139*c* each associated group's average ranking of the item.

The group rank provides an indication of the group's preference for item i, the item being presented at states 139*b*, 139*c* as the case may be. At state 139*e*, control logic 73*h* determines the weight between the user and the group using the rankings that the user has given items for which the group's rankings have been received by evaluating the following expression:

$$W_{u,GC} = \frac{1}{|\text{items}|} \sum_{items} \frac{(r_{g,n} - \overline{r_g})(r_{u,n} - \overline{r_u})}{\sqrt{\sum_{items}(r_{g,n} - \overline{r_g})^2}\sqrt{\sum_{items}(r_{u,n} - \overline{r_u})^2}} \quad \text{E. 20}$$

where GC is a group code in the group code field associated with the item which the user found acceptable or unacceptable, as the case may be, items is the set of items that which are associated with the substitute item's or scheduled item's group code and for which the user has provided an implicit or explicit ranking, and ||items|| is the number of items in the set, $r_{g,n}$ is the group ranking for item n. When there are multiple group codes associated with an item, control logic 73*h* calculates a $W_{u,GCu,j}$ for each group associated with an item, where j=1 .... s, and s is an integer greater than or equal to 1.

FIG. 9*k* illustrates user group similarity coefficient-related information in greater detail according to an alternative embodiment of the present invention. User group similarity coefficients 74*d* is shown in FIG. 9*k* as including data structure 76*h*. DS 76*h* includes group code field 76*i* which has as an entry a group code such as that found in field 151*h* of DS 150 or item identifier entries in DS 139. While DS 76*h* includes the user group weight information for three groups, the ones identified by group codes "14," "76," and "91," one of ordinary skill in the art would appreciated that DS 76*h* is not limited to representing the information for three groups, but may have multiple records each of which describes the weight relationship between a user and a group, and each of which has entries for fields 76*j*, 76*k*.

For each item that is presented at states 139*b*, 139*c* that is ranked by a group and for which the user provides an implicit or explicit ranking at states 139*b*, 139*c* control logic 73*h* calculates a corresponding $W_{u,GC}$ at state 139*e*. For example, if an item is associated with group codes "14" and "91" and the user provides a ranking for the item, control logic 73*h* calculates $W_{u,14}$ and $W_{u,91}$ as described below.

One of ordinary skill in the art would appreciate that $W_{u,GC}$ are calculated, depending upon the embodiment, using running statistics, or by storing both the user rankings and the group rankings for the group associated with group code GC and then determining $W_{u,GC}$ by retrieving each of the rankings to evaluate the expression. One of ordinary skill in the art would appreciate that running statistics are a more efficient use of computational power and memory. To use running statistics $W_{u,GC}$ is broken down into its constituent parts. As information becomes available, control logic 73*h* evaluates new values for each part and stores them in temporary storage in control logic 73*h* or storage 73*f*. The parts are such that when item i is about to be presented and an acceptability determination is to be made by control logic 73*h*, each part is retrieved from temporary storage and used to determine $W_{u,GC}$, if $W_{u,GC}$ was not already evaluated at the time the parts were updated. Furthermore, when new information about item i becomes available due to an implicit or explicit ranking each part is updated by control logic 73*h* based upon the new information.

One of ordinary skill in the art would appreciate that $W_{u,GC}$ may be broken down into the following constituent parts each of which can be updated by simple and relatively quick mathematical operations.

$$\beta_1 = \sum_{items} r_{g,n}^2$$

$$\beta_2 = \sum_{items} r_{u,n}^2$$

$$\beta_3 = \sum_{items} r_{g,n} r_{u,n}$$

$$\beta_4 = \sum_{items} r_{g,n}$$

$$\beta_5 = \sum_{items} r_{u,n}$$

In terms of the above parts, $W_{u,GC}$ can be written as:

$$W_{u,GC} = \frac{1}{|\text{items}|} \frac{\beta_3 - \frac{\beta_4 \beta_5}{|\text{items}|}}{\sqrt{\beta_1 - \beta_4^2}\sqrt{\beta_2 - \beta_5^2}} \quad \text{E. 21}$$

Referring again to FIG. 9*k*, DS 76*h* includes three records, one record for each of group codes "14," "76," "91." Each record has two fields: weight parts field 76*j* and weight field 76*k*. Weight parts field 76*j* includes 6 subfields: each of which has entries that correspond to one of the 5 corresponding parts described above and ||items||. Entries for weight field 76*k* hold values for the weight, $W_{u,GC}$, calculated using entries for the 6 subfields of the record. Whenever the user makes an implicit or explicit ranking, control logic 73*h* updates the entries in each of the 6 subfields using the new ranking and then calculates a new value for weight entry, $W_{u,GC}$, in weight field 76*k*. In an alternative embodiment in which the user average rank for a group is needed to determine a user predicted ranking for an item, control logic 73*h* determines the user average rank for a group by determining the quotient of $\beta_5$ and ||items|| using the respective values in the group's record in DS 76*h*.

In an alternative embodiment, after updating $\beta_5$ and ||items|| for each group code record in DS 76*h*, control logic 73*h* stores the quotient of $\beta_5$ and ||items|| in user average rank for groups 74*j*. The quotient is stored in groups 74*j* in a manner such that the quotient is accessible to control logic 73h based upon the associated group code. Control logic 73h accesses the appropriate quotient(s) when it determines a user predicted ranking for an item in an alternative embodiment.

FIG. 9y illustrates user group similarity coefficient-related information in greater detail according to an alternative embodiment of the present invention. User group similarity coefficients 74d is shown in FIG. 9y as including data structure 76l. DS 76l includes group code field 76m which has as an entry a group code such as that found in field 151h of DS 150 or records in DS 139. While DS 76l includes the user group weight information for three groups, the ones identified by group codes "14," "76," and "91," one of ordinary skill in the art would appreciated that DS 76l is not limited to representing the information for three groups, but may have multiple records each of which describes the similarity between a user's ranking for an item quality and a group's ranking for an item quality, and each of which has entries for fields 76n, 76o, 76p, 76q, 76r, 76s. An entry for item quality 1 parts field 76n has the same fields as an entry for field 76j. The parts in an entry for quality 1 parts field 76n are used by control logic 73h to determine the entry for user-group item quality 1 similarity coefficient field 76q, $W_{u,GC,q1}$. Each $W_{u,GC,q1}$ is determined by control logic 73h by evaluating expression E. 20 using only the group item quality 1 rankings of the group associated with group code GC and the user's item quality 1 rankings for items that were ranked by the group associated with group code GC.

An entry for item quality 2 parts field 76o has the same fields as an entry for field 76j. The parts in an entry for quality 2 parts field 76o are used by control logic 73h to determine the entry for user-group item quality 2 similarity coefficient field 76r, $W_{u,GC,q2}$. The parts in an entry for quality 3 parts field 76p are used by control logic 73h to determine the entry for user-group item quality 3 similarity coefficient field 76s, $W_{u,GC,q3}$.

For each item that is presented at states 139b, 139c that is ranked according to item qualities by a group and for which the user provides an implicit or explicit ranking for item qualities at states 139b, 139c control logic 73h calculates a corresponding $W_{u,GC,qv}$ at state 139e, where $q_v=q_1, \ldots q_w$ and w is an integer greater than or equal to 2. For example, if an item is associated with group codes "14" and "91" and the user provides a ranking for one or more item qualities, control logic 73h calculates for each item quality ranked the similarity coefficient between the user's item quality ranks and the group's item quality ranks. Assuming all three item qualities are ranked, control logic 73h calculates $W_{u,14,q1}$, $W_{u,14,q2}$, $W_{u,14,q3}$, $W_{u,10,q1}$, $W_{u,19,q2}$, and $W_{u,19,q3}$.

One of ordinary skill in the art would appreciate that $W_{u,GC,qv}$ are calculated, depending upon the embodiment, using running statistics, or by storing both the user rankings and the group rankings for the group associated with group code GC and then determining $W_{u,GC,qv}$ by retrieving each of the rankings to evaluate the expression. One of ordinary skill in the art would appreciate that running statistics are a more efficient use of computational power and memory. To use running statistics $W_{u,GC,qv}$ is broken down into its constituent parts. As information becomes available, control logic 73h evaluates new values for each part and stores them in temporary storage in control logic 73h or storage 73f.

The parts are such that when item i is about to be presented and an acceptability determination is to be made by control logic 73h, each part is retrieved from temporary storage and used to determine $W_{u,GC,qv}$ if $W_{u,GC,qv}$ had not already been determined at the time of updating. Furthermore, when new information about item i becomes available due to an implicit or explicit ranking each part is updated by control logic 73h based upon the new information.

FIG. 9z illustrates user group similarity coefficient-related information in greater detail according to an alternative embodiment of the present invention. User group weights 74d is shown in FIG. 9z as including data structure 76a. DS 76a includes group code field 76b which has as an entry a group code such as that found in field 151h of DS 150 or item identifier entries in DS 139. While DS 76a includes the user correlation information for one group, identified by group code "14," one of ordinary skill in the art would appreciate that DS 76a is not limited to representing the information for one group. DS 76a is capable of holding multiple records each of which has entries for fields 76c, 76d, 76e, and depending on the embodiment, one or more of the following: field 76f, and field 76g. DS 76a includes group positive indications field 76c, group negative indications field 76d, indication quotient 76e, sum of user ranks 76f, sum of group ranks 76g. In an alternative embodiment, DS 76a does not include sum of user ranks 76f. In an alternative embodiment, DS 76a does not include sum of group ranks 76g. In an alternative embodiment, DS 76a does not include either of ranks 76f, 76g.

In an alternative embodiment, user group similarity coefficient is simply the percentage of items ranked by a group that the user found acceptable. In such an embodiment, at state 139e, control logic 73h obtains from DS 150 (or similar data structure) the item indicator associated with the implicitly or explicitly ranked item that was presented at one of states 139b, 139c. When the item is ranked as acceptable, control logic 73h determines whether the item indicator matches one in acceptable items 74a. This operation is described here to illustrate that at state 139e in an alternative embodiment, initially stored information for an item is not replaced by a user's later preference indication. However, as indicated above, other alternative embodiments handle differently previously stored information for an item for which the user has just expressed another preference. The descriptions of this operation and its related operations described below, and the operations of other alternative embodiments are not repeated in each of the descriptions of state 139e, but their descriptions are to be regarded as alternative embodiments of the embodiment described elsewhere herein in connection with descriptions of state 139e.

When there is a match, state machine 138 transitions to state 139b, 139c from which state 139e was entered, because a match indicates that the item's influence on group weight information has already been factored in. When there is no match, control logic 73h obtains the group code(s) associated with the item from a field such as field 151h of DS 150 or from the item's associated record in DS 139. Control logic 73h indexes into DS 76a based upon each group code associated with the item. When the item is ranked as acceptable, for each group code, control logic 73h increments the associated value in the entry for group positive indications field 76c. When the item is ranked as non-acceptable, for each group code, control logic 73h increments the associated value in the entry for group negative indications field 76d. In an embodiment, in which variable valued ranks are given by the user, control logic 73h sums the rank given by the user the value present in sum 76f and stores the new sum in 76f. In an embodiment, in which group codes have associated group ranks, control logic 73h indexes into DS 76a based upon each group code associated with the item. Irrespective of the acceptability of the item, for each group code, control logic 73h sums the group rank with the value present in sum 76g.

DS 76a includes field 76e which holds the quotient of the entry in field 76c and the sum of the entries in fields 76c, 76d.

The quotient is simply the fraction of items associated with the group that were found to be acceptable by the user. For each group code associated with the item, after incrementing the value in field 76c or field 76d, as appropriate, control logic 73h stores in field 76e the new value of the quotient that is calculated using the incremented value in field 76c. For the case illustrated by FIG. 9z, after control logic 73h increments field 76c, 76d, as appropriate, control logic 73h evaluates 30/45 and stores 0.66 as the entry in field 76e.

After determining the new quotient value for field 76e, when the item is ranked as unacceptable, if the transition to state 139e occurred from state 139b, in an alternative embodiment, state machine 138 transitions to state 139b. When the item is ranked as acceptable, if the transition to state 139e occurred from state 139b, in an alternative embodiment, state machine 138 transitions to state 139b.

When the item is ranked acceptable, if the transition to state 139e occurred from state 139c, in an alternative embodiment, state machine 138 transitions to state 139c. When the item is ranked unacceptable, if the transition to state 139e occurred from state 139c, in an alternative embodiment, state machine 138 transitions to state 139b.

In an alternative embodiment, control logic 73h uses the value in indication quotient 76e as a user-group similarity coefficient in the expressions described above. In an alternative embodiment, for determining item acceptability in process 204, or alternatively process 208, control logic 73h also uses group rank sum 76g and user rank sum 76f in evaluating expression E. 14 described above to predict the user's rank for an item. In such an embodiment, the user average rank for a group is simply the ratio of the entry in user rank sum 76f to the sum of the entries in fields 76c, 76d. $\overline{r_{u,GC}}$ is simply the average of the user average rank for the groups whose group codes are associated with the item. $\overline{r_g}$ is simply the ratio of a group's entry in group rank sum 76g to the sum of the entries in fields 76c, 76d.

$$PRG_{u,i} = \overline{r_{u,GC}} + \frac{1}{\alpha}\sum (r_{g,i} - \overline{r_g})W_{u,a} \text{ where, } \alpha = \sum_{M_{u,g}} W_{u,g} \quad \text{E. 14}$$

Referring to process 206 of FIG. 9n, as indicated above process 206 has more than one alternative embodiment. In an alternative embodiment, process 206 involves unacceptable item indicators 74b. In an alternative embodiment, process 206 involves unacceptable item category indicators stored in item indicators 74b instead of unacceptable item indicators. In an alternative embodiment, process 206 involves both unacceptable item indicators and unacceptable item category indicators in item indicators 74b. In an alternative embodiment, process 206 involves user associated items 74g and user item rankings 74h. In an alternative embodiment, process 206 involves item categories associated with user 74j and user category rankings 74l.

Referring to process 206 of FIG. 9n, process 206 involves use of unacceptable item indicators 74b. For an embodiment in which process 206 is the item acceptability determination process, state machine 138 transitions from states 139b, 139c to state 139e upon the occurrence of an explicit or implicit indication of non-acceptance of an item at states 139b, 139c. At state 139e, control logic 73h stores in unacceptable item indicators 74b all item indicators for the item that was being presented at state 139b or the item that was being presented at state 139c, as the case may be. In an alternative embodiment, process 206 involves use of item category indicators. In such an alternative embodiment, at state 139e, control logic 73h stores item category indicators in item indicators 74b. These item category indicators are obtained from field 151h or field 151i or records in DS 139, or DS 156. In an alternative embodiment, process 206 involves use of item category indicators and item indicators. In such an alternative embodiment, at state 139e, control logic 73h stores item category indicators and item indicators in item indicators 74b. After the item indicators, category indicators, or both are, depending upon the embodiment, stored in indicators 74b, state machine 139e transitions to state 139b, irrespective from which one of states 139b, 139c the transition to state 139e was made.

In an alternative embodiment of process 206 of FIG. 9n, process 206 involves user category indicators 74l and user average category rank 74m. Where this alternative embodiment of process 206 is used for item acceptability determination, state machine 138 transitions from states 139b, 139c to state 139e upon the occurrence of an explicit or implicit indication of non-acceptance or an explicit or implicit indication of acceptance of an item at states 139b, 139c. In an alternative embodiment, the item for which acceptance (or non-acceptance) indication was given has its associated item category indicators in an entry in field 151h or in a record entry in DS 139. However, irrespective of where the item's associated item category indicators are stored, control logic 73h retrieves the category indicators and stores them in user category indicators 74l. One of the item category indicators is both associated with the item identified in fields 151e or 151i or in a record in DS 139 and points to a category which includes the item. Using the user item ranking control logic 73h updates in user average category rank 74m the user average rank for the category which includes the item. Alternatively, control logic 73h updates in user average category rank 74m the user average rank for the category which includes the item and the categories which are pointed to by the remaining item category indicators associated with the user ranked item. In an alternative embodiment, the item's associated category similarity indications which are stored in field 157a, or in a record in DS 139 or DS 150 are retrieved by control logic 73h and stored in a category similarity indications data structure in profile information 73t. After the updating is performed, state machine 138 transitions to the state 139b, 139c from which state 139e was entered except when state 139e is entered from state 139c due to an explicit or implicit indication of non-acceptance; in which case state 138 transitions to state 139b.

In an alternative embodiment, process 206 involves items associated with user 74g and user item rankings 74h. Where this alternative embodiment of process 206 is used for item acceptability determination, state machine 138 transitions from states 139b, 139c to state 139e upon the occurrence of an explicit or implicit indication of non-acceptance or an explicit or implicit indication of acceptance of an item at states 139b, 139c. At state 139e, control logic 73h stores in user rankings of items 74h the user ranking and stores in items associated with the user 74g the item indicator of the item. After the updating is performed, state machine 138 transitions to the state 139b, 139c from which state 139e was entered except when state 139e is entered from state 139c due to an explicit or implicit indication of non-acceptance; in which case state 138 transitions to state 139b.

For an embodiment in which process 208 is the item acceptability determination process, the updating process alternative embodiments are the same as the updating process alternative embodiments described in connection with process 204, but limited to the operations involving updating information used in predictions involving user group similarity coefficients.

For an embodiment in which process 210 is the item acceptability determination process, the updating process alternative embodiments are the same as the updating process alternative embodiments described in connection with process 204, but without the operations involving updating information used in predictions involving user group similarity coefficients and including the updating process alternative embodiments described in connection with process 208.

In an alternative embodiment of process 212 of FIG. 10*a*, process 212 involves user item rankings 220*b* and user-user similarity coefficients 220*c*. User item rankings have the form of 74*g* and 74*h* of FIG. 9*v*, 9*x*. Where this alternative embodiment of process 212 is used for item acceptability determination, state machine 138 transitions from states 139*b*, 139*c* to state 139*e* upon the occurrence of an explicit or implicit indication of non-acceptance or an explicit or implicit indication of acceptance of an item at states 139*b*, 139*c*. At state 139*e*, control logic 73*h* stores in user item rankings 220*b* the item indicator and the user ranking for the item that was being presented at state 139*b* or the item that was being presented at state 139*c*, as the case may be. The item indicators are obtained from, as appropriate, DS 150, DS 156, or DS 139. In an alternative embodiment, control logic 73*h* starts the user-user correlation coefficient calculation using item rankings of users other than device user 220*a* and the user item rankings 220*b* before state machine 139 transitions to one of states 139*b*, 139*c*. In an alternative embodiment, the user-user coefficient calculation is performed at a later time, after state machine 139 transitions to one of states 139*b*, 139*c*. In an alternative embodiment, the user-user coefficient calculation is performed at a later time after several user item ranks have been stored in user item rankings 220*b*. When state 139*e* is entered from state 139*b*, after the storing operation is performed and the coefficient calculation requirement is satisfied in accordance with one of the foregoing alternative embodiments, state machine 139 transitions to state 139*b*. When state 139*e* is entered from state 139*c* and the user rank for the item indicates acceptance, after the storing operation is performed and the coefficient calculation requirement is satisfied in accordance with one of the foregoing alternative embodiments, state machine 139 transitions to state 139*c*. When state 139*e* is entered from state 139*c* and the user rank for the item indicates non-acceptance, after the storing operation is performed and the coefficient calculation requirement is satisfied in accordance with one of the foregoing alternative embodiments, state machine 139 transitions to state 139*b*.

For an embodiment in which process 212 is the item acceptability determination process, the updating process alternative embodiments are the same as the updating process alternative embodiments described in connection with: process 206 or 204, but limited to the operations involving updating information used in predictions involving item similarity coefficients; and alternative embodiments described in connection with process 204, but limited to the operations involving updating information used in predictions involving user group similarity coefficients.

The updating process does not have much impact on operations at states 139*b*, 139*c*. When an implicit indication of acceptance occurs at either one of states 139*b*, 139*c*, state machine 138 transitions to state 139*e* and then returns to the state 139*b*, 139*c* from which the transition was made. After state machine 138 returns, control logic 73*h* performs any remaining operations that have been described in connection with states 137*b*, 137*c*, and state machine 138 makes future transitions as described above. When a change channel event occurs at state 139*e*, the update process is performed at state 139*e* and upon the return, as appropriate, to state 139*b*, 139*c*, state machine 138 performs the change channel triggered transitions from, as appropriate, state 139*b*, 139*c*.

When an implicit indication of non-acceptance occurs at state 139*c*, state machine 138 transitions to state 139*e* and then returns to state 139*c*. Upon its return to state 139*c*, state machine 138 transitions to state 139*a*. When an implicit indication of non-acceptance occurs at state 139*b*, state machine 138 transitions to state 139*e* and then returns to state 139*b*. Upon its return to state 139*b*, state machine 138 transitions to state 139*a*.

When an explicit indication of non-acceptance occurs at state 139*b*, upon return to state 139*b* from state 139*e*, control logic 73*h* presents a substitute item. The substitute item runs either for the time remaining in the unacceptable item's timeslot or for the time remaining in the unacceptable item's (the one whose user ranking led to the transition to state 139*e*) timeslot and the time of the next scheduled item when the item is determined to be unacceptable to the user.

When an explicit indication of non-acceptance occurs at state 139*c*, state machine 138 transitions to state 139*e* and does not return to state 139*c*, as described above, in an alternative embodiment. However, in an alternative embodiment, state machine 138 returns to state 139*c*, also as described in an alternative embodiment.

The updated information in user profile 73*t* is sent to one of server 29*a*, 29*c* so that a collaborative filtering system may determine the user preferences and items in which the user might be interested. Whenever control logic 73*h* is coupled to one of servers 29*a*, 29*c* newly updated information that has not yet been sent to one of servers 29*a*, 29*c* is sent to one of servers 29*a*, 29*c*. The updated information, depending upon the embodiment, exists in, but is not limited to, one or more of the following: item indicators 74*a*, 74*b*, group codes 74*c*, the item indicators 74*g* and rankings 74*h*, user rankings of items 220*b*, and categories associated with user 74*l*. Techniques that control logic 73*h* can use to keep track of what has been sent and has not yet been sent is well know in the art and need not be described in greater detail herein.

Based upon the information sent and other information such as, but not limited to, the metadata described below, servers 29*a*, 29*c* select items that are likely to be of interest to the user and send them via networks 26, 28 to BID 72. The items include, but are not limited to, songs and ads.

As indicated above, part of the customization process may be performed in non-real time. A non-real time process produces a customized schedule or play list that may or may not be used by control logic 73*h* when scheduled items are being received or when items in a play list are being presented. The following description is described in terms of a schedule, but one of ordinary skill in the art would appreciate that it is also applicable to a play list.

Figure 10F:
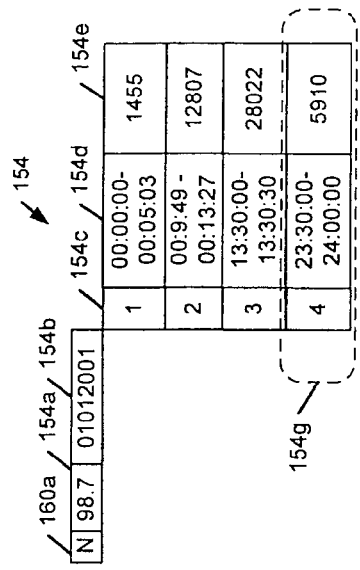
FIG. 10f illustrates a data structure produced by a customization process according to an alternative embodiment of the present invention.
Figure 10D:
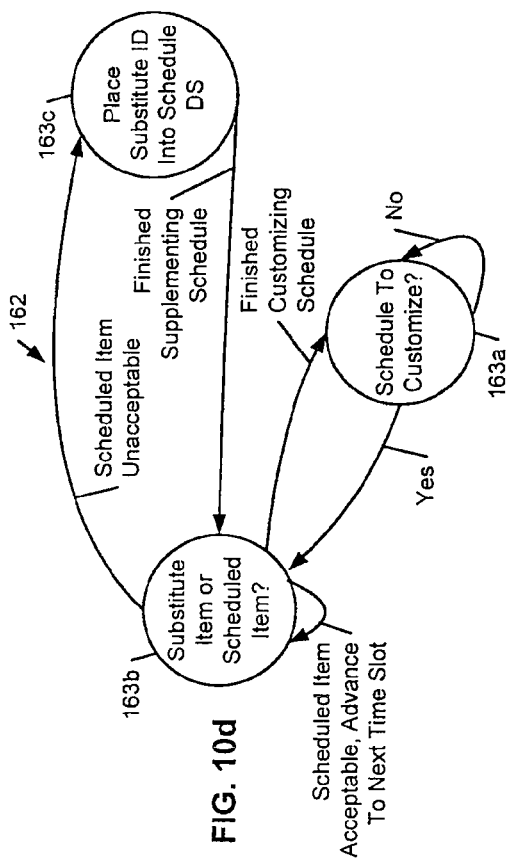
FIG. 10d illustrates a state machine for producing a customized schedule according to one embodiment of the present invention.

FIG. 10*d* illustrates a state machine for producing a customized schedule according to one embodiment of the present invention. In state machine 162, at state 163*a*, control logic 73*h* determines whether there are schedules to customize in scheduling information 73*u*. When there are no schedules to customize, state machine 162 remains in state 163*a*. When there are schedules to customize, control logic 73*h* selects a schedule for customization and state machine 162 advances to state 163*b*.

In one embodiment, the schedule selected has the organization of DS 150. However, one of ordinary skill in the art would appreciate that in an alternative embodiment, state machine 162 operates on data structures organized differently. Control logic 73*h* then retrieves the scheduled item identifier of the first record in the selected schedule. Control logic 73*h* determines whether the scheduled item identifier corresponds to an item that is acceptable to the user. Determining acceptability may be performed in accordance with any of the techniques described herein or known in the art.

FIG. 9*w* illustrates a data structure produced by a customization process according to one embodiment of the present invention. DS 152, in one embodiment, includes the same fields as DS 150 and one additional field, substitute item pointer field 151*o* whose entries provide a pointer to a substitute item stored in audiovisual material 73*v*. When control logic 73*h* determines that the scheduled item identifier corresponds to an unacceptable item, state machine 162 transitions to state 163*c*. At state 163*c*, control logic 73*h* identifies a suitable substitute item in audiovisual material 73*t* and stores a substitute item pointer in pointer field 151*o*. After DS 152 is supplemented with a pointer to a substitute item, state machine 162 returns to state 163*b* where control logic advances to the next record and performs the acceptability determination operation described above. In an alternative embodiment, control logic 73*h* places a pointer to a substitute item in any of the fields 151*e*-151*i* of a record whose item is to be substituted, and DS 152 does not have a substitute item pointer field 151*o*. So long as the pointers to substitute items are mutually exclusive with information originally contained in fields 151*e*-151*i* control logic 73*h* is able to distinguish and identify the pointers to substitute items. When control logic 73*h* determines that the scheduled item identifier corresponds to an acceptable item, state machine 162 re-enters state 163*b* and examines the next record or item acceptability as described above. When the schedule has been completely customized because control logic 73*h* has processed the last record, control logic 73*h* sets field 160*a* to "S" and state machine 162 returns to state 163*a*. In an alternative embodiment, control logic 73*h* sets field 160*a* to "Y." When there is another schedule to customize, state machine returns to state 163*b* where the next schedule customization begins, otherwise it remains at state 163*a*.

Figure 10E:
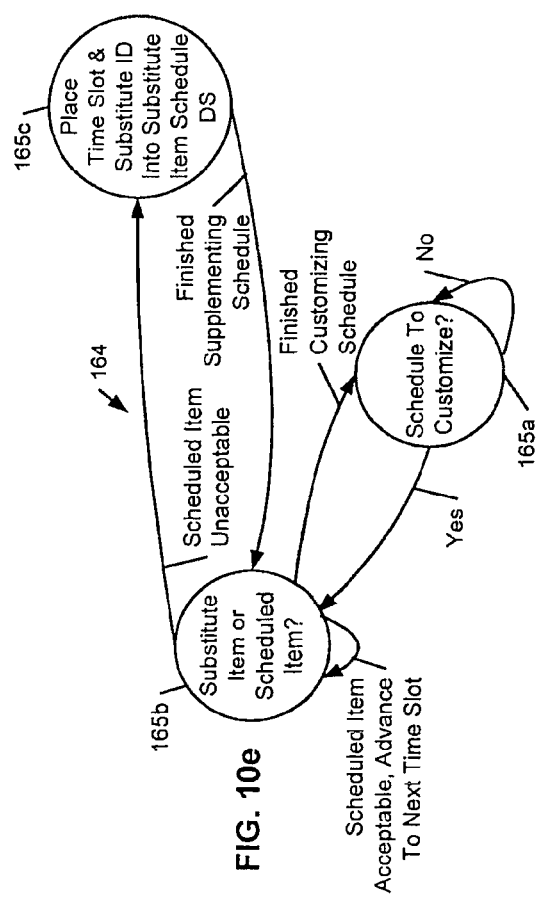
FIG. 10e illustrates a state machine for producing a customized schedule according to an embodiment of the present invention.

FIG. 10*e* illustrates a state machine for producing a customized schedule according to one embodiment of the present invention. In state machine 164, at state 165*a*, control logic 73*h* determines whether there are schedules to customize in scheduling information 73*v*. When there are no schedules to customize, state machine 164 remains in state 165*a*. When there are schedules to customize, control logic 73*h* selects a schedule for customization and state machine 164 advances to state 165*b*.

In one embodiment, the schedule selected has the organization of DS 150. However, one of ordinary skill in the art would appreciate that in an alternative embodiment, state machine 164 operates on data structures organized differently. Control logic 73*h* then retrieves the scheduled item identifier of the first record in the selected schedule. Control logic 73*h* determines whether the scheduled item identifier corresponds to an item that is acceptable to the user. Determining acceptability may be performed in accordance with any of the techniques described herein or known in the art.

FIG. 10*f* illustrates a data structure produced by a customization process according to an alternative embodiment of the present invention. DS 153 includes user preference incorporation field 160*a* that indicates whether the items identified in the customization schedule were included in accordance with the user's presentation preferences, and channel field 154*a* whose entry indicates the channel with which the schedule entries in DS 153 are associated. Entry for channel date field 154*b* entry indicates the date (mm,dd,yy) for which the remaining entries in the remaining fields are relevant. An entry in record field 154*c* indicates the record number of the record associated with the item identified in item pointer field 154*e*. An entry for time slot field 154*d* indicates the time slot occupied by a substitute item identified in field 154*e*. An entry in item identifier field 154*e* is a pointer to a substitute item stored in audiovisual material 73*v*.

When control logic 73*h* determines that the scheduled item identifier corresponds to an unacceptable item, state machine 164 transitions to state 165*c*. At state 165*c*, control logic 73*h* identifies a suitable substitute item in audiovisual material 73*v* and stores a substitute item pointer in item pointer field 154*e*. After DS 154 is populated with record including an entry for record field 154*c*, an entry for time slot field 154*d*, and a pointer to a substitute item in item pointer field 151*e*, state machine 164 returns to state 165*b* where control logic advances to the next record and performs the acceptability determination operation described above. When the schedule has been completely customized because control logic 73*h* has processed the last record, control logic 73*h* sets field 160*a* to "S" and state machine 164 returns to state 165*a*. In an alternative embodiment, control logic 73*h* sets field 160*a* to "Y." When there is another schedule to customize, state machine returns to state 165*b* where the next schedule customization begins, otherwise it remains at state 165*a*.

In an alternative embodiment where schedules are customized in non-real-time, control logic 73*h* performs a process similar to that described above in connection processes 134, 136, 138. As indicated above, process 134 is initiated, in one embodiment, by the activation of customize key 73*n*. However, given that the schedules have already been customized and substitute items identified, control logic 73*h* determines at states 135*a*, 135*b* whether an item is acceptable by determining whether a substitute identifier is present in substitute item identifier field 151*o*. There is no need for control logic 73*h* to perform the determination based on examination of information stored in user profile information 73*t* and information in DS 150 because the result of that determination has been placed, depending upon the embodiment, in an entry in field 151*o* of the appropriate record in DS 152 or in an entry in field 154*e* of the appropriate record in DS 154. However, in an alternative embodiment, based upon the entry in field 160*a*, control logic 73*h* determines whether the substitute item at the time of presentation satisfies the presentation rules it enforces. When the rules are not satisfied, control logic 73*h* identifies another substitute item, other than the one identified during the non real-time customization process. When the rules are satisfied, control logic 73*h* presents the substitute item identified during the non real-time customization process. As indicated herein, in an alternative embodiment a substitute item identifier is not an entry in a new field but rather a replacement of an existing entry in, depending upon the embodiment, one of fields 151*e*-151*i*.

While state machines 134, 136, 138 are described as being executed in real-time as items are being presented or about to be presented, one ordinary skill in the art would appreciate that, in an alternative embodiment, a state machine is executed to process an entire schedule or fraction thereof in advance of items identified in the schedule being received and transmitted. In one embodiment, control logic 73*h* accepts from transceiver 73*j* schedules for one or more broadcasters for storage in scheduling information 73*u* in storage 73*f*.

In an alternative embodiment schedules or fractions thereof are received by receiver 73*b* via data transmitted on a subcarrier channel tuned by receiver 73*b*. In one embodiment, the demodulated subcarrier data signal is provided by receiver 73*b* to control logic 73*h* for decoding. Control logic 73*h* stores the decoded scheduling data in scheduling information 73*u* in storage 73*f*. In an alternative embodiment, receiver 73*b* itself decodes the data transmission and provides the decoded data to control logic 73*h* for processing and storage in scheduling information 73*u*. Transmitting, receiving, and decoding data transmission on a subcarrier channel are operations that are understood well by those skilled in the art and need not be described in greater detail herein.

In an alternative embodiment, receiver 73*b* receives scheduling data over a digital data channel that is part of a digital audio broadcast (DAB) in accordance with a DAB standard. Scheduling data is provided to control logic 73*h* for storage in scheduling information 73*u* in storage 73*f*. Examples of a DAB standard include Europe's Eureka, and the United States In-Band-On-Channel (IBOC) standard. However, receiver 73*b* is not limited to operating in accordance with these two DAB standards or any other DAB standard. How, in an alternative embodiment, receiver 73*b* would receive, demodulate, and decode a DAB data channel is well understood in the art and need not be described in greater detail herein. One of ordinary skill in the art would appreciate that scheduling data need not be received by receiver 73*b* on a data channel that is exclusive to a certain broadcaster, but may received on a channel that is shared by multiple broadcasters in a digital broadcasting system. One of ordinary skill in the art would also appreciate that scheduling information may also be received by receiver 73*b* as program-associated-data (PAD) that is received along with a coded audio data stream. How, in an alternative embodiment, receiver 73*b* receives, demodulates, and decodes PAD and provides it to control logic 73*h* is well understood by those skilled in the art and need not be described in greater detail herein.

One of ordinary skill in the art would appreciate that scheduling data may also be stored in the coded digital audio stream itself. In such an alternative embodiment, the decoding of the audio stream yields the scheduling data. One of ordinary skill in the art would appreciate how receiver 73*b*, in an alternative embodiment, decodes the audio stream and extracts the scheduling information.

In an alternative embodiment, receiver 73*b* receives data for a schedule via sub-audible tones that are transmitted along with the digital or analog programming signal produced by a broadcaster's transmission system. Generation of sub-audible tones and decoding of sub-audible tones is well understood by those skilled in the art and need not be described in greater detail herein.

In an alternative embodiment, receiver 73*b* receives scheduling data via an audio spread spectrum signal that is added to the audio programming signal before transmission of the combined signal. In such an embodiment, receiver 73*b* includes a spread spectrum audio receiver that extracts the scheduling data signal that is hidden in the audio signal. Receiver 73*b* provides the scheduling data to control logic 73*h* for storage in scheduling information 73*u* in storage 73*f*. While the audio programming signal is analog according to one embodiment, one of ordinary skill in the art would appreciate that a spread spectrum digital signal may also be added to a digital audio signal in an alternative embodiment. Addition of an audio spread spectrum signal to broadcast signals is well known in the art.

In an alternative embodiment in which receiver 73*b* is a DAB receiver, transmitter 73*d* is a DAB transmitter. In an alternative embodiment in which receiver 73*b* is a DAB receiver, transmitter 73*d* is an analog transmitter. In an alternative embodiment in which receiver 73*b* is an analog receiver, transmitter 73*d* is a DAB transmitter.

Control logic 73*h* then customizes one or more of the received schedules or fraction(s) thereof in anticipation of the user tuning receiver 73*b* to a channel associated with one of the received schedules. In an alternative embodiment in which a schedule is received as part of a digital broadcast rather than a digital one-on-one transmission, the schedule includes scheduling information for the next item about to be broadcast. In an alternative embodiment, the schedule includes scheduling information for at least two items that are about to be broadcast. For example, scheduling information is received by receiver 73*b* while a scheduled item is being presented, and the scheduling information relates to one or more scheduled items that follow the scheduled item currently being presented. In one embodiment, the received scheduling information relates to one or more scheduling items that immediately follow the scheduled item currently being presented. In an alternative embodiment, the received scheduling information relates to one or more scheduling items that do not immediately follow the scheduled item currently being presented.

In an alternative embodiment, the received scheduled items are stored in scheduling information 73*u* and used by control logic 73*h* to effectuate real-time customization such as that described above. In an alternative embodiment, the received scheduled items are stored in scheduling information 73*u* and used by control logic 73*h* to effectuate a non real-time customization.

Irrespective of the technique by which schedules arrive at storage 73*f*, depending upon the embodiment, no customization is performed, only real-time customization is performed, only non real-time customization is performed, or both real-time customization and non real-time customization are performed. One of ordinary skill in the art would appreciate that customization, of any type, is optional in some of the embodiments described herein.

Many music fans have a library of songs stored on their hard disk drives coupled to their computers or in their handheld media player or jukebox (collectively "media player") such as the iPod™ made by Apple, Inc. of Cupertino, Calif. or the Zen™ by Creative Labs of Milpitas, Calif. The library may be nothing more than a directory containing discrete files or it could be a data structure that operates in conjunction with a media player application being executed by a computer or handheld media player. The songs in a fan's library are a good indicator of what appeals to the music fan. In an alternative embodiment, a broadcast interactivity device or a media (or programming) customization device includes as a feature the ability to collect information from the user's library that can be provided to a server to facilitate its provision of a recommender service. Instead of having to wait for a user to hear and then rate songs already owned by the user, information about what songs appeal to the user are provided to the server before the user listens to the songs.

One of ordinary skill in the art would appreciate that the embodiment being described need not be limited to songs but can be performed for any presentable material which is subject to personalization or customization and which can be identified to a server or other device in a manner that would allow them to participate in providing a customization or personalization service. Customization as defined herein involves a media presentation device substituting items being offered to the user that do not interest the user with items that are more likely to reflect a user's preferences. Personalization involves recommending items to the user based upon the predictions of a recommender system.

In an alternative embodiment, the songs in a user's library are identified by a tag extractor which is executed by the processor in a computer, media player, broadcast interactivity device, or media customization device. In an embodiment, the tag extractor is a software application, but hardware extractors are also possible. The tag extractor retrieves metadata or meta information from either the beginning or end of a song file. There are many tag types known in the art and more are likely to be developed in the future. One of the first tag types is the ID3v1 that is associated with MP3 files (formally known as Motion Picture Experts Group (MPEG) I, Layer III).

Figure 11B:
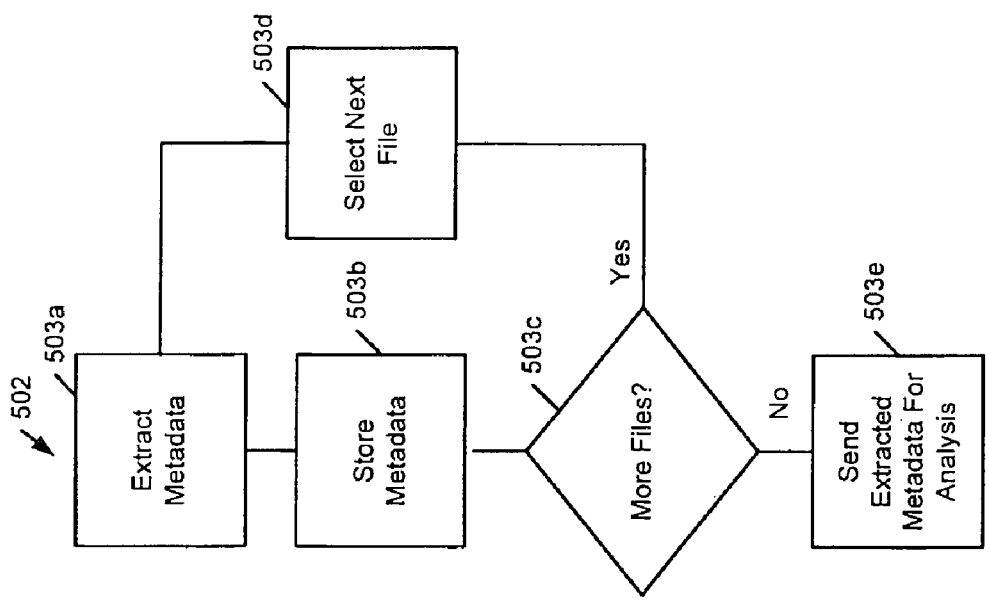
FIG. 11b illustrates a process for generating for analysis identification information for items of interest to a user according to an embodiment of the present invention.
Figure 11A:
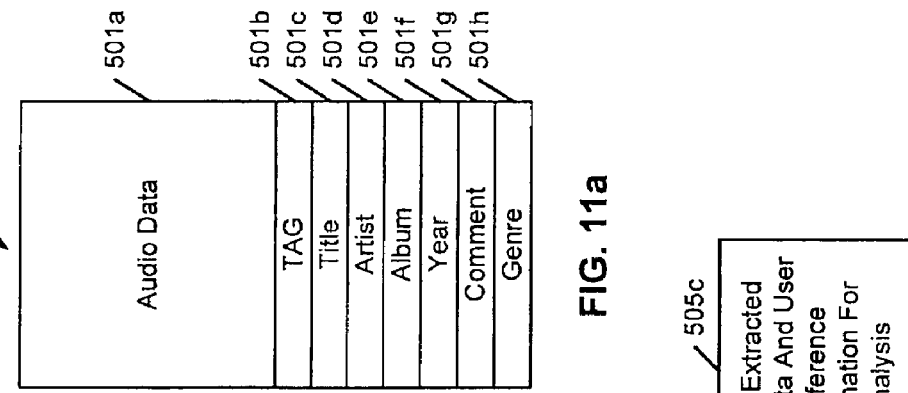
FIG. 11a illustrates an ID3v1 tag that is located at the end of an MP3 audio file.

FIG. 11a illustrates an ID3v1 tag that is located at the end of an MP3 audio file. MP3 file 500 includes audio data 501a, and the following ID3v1 tag information: tag identifier 501b indicative of beginning of tag, song title 501c (30 characters), artist 501d (30 characters), album 501e (30 characters), year 501f (4 characters), comment 501g (30 characters), and genre 501h (1 byte). ID3v2 is a more recent format that allows additional information to be stored such as lyrics, pictures, volume, balance, equalizer and reverb settings, copyright message, and encryption information among other things. Furthermore, the ID3v2 tag is placed at the beginning of the audio file rather than at the end.

FIG. 11b illustrates a process for generating for analysis identification information for items of interest to a user according to an embodiment of the present invention. Process 502, depending upon the embodiment, is executed by control logic 73h on BID 72, BID 700, BID 800, BID 11, or alternatively by a media player, media customization device, computing device, or communications device. Process 502 is described in connection with control logic 73h, and MP3 files stored in storage 73f, but one of ordinary skill in the art would appreciate that process 502 may be performed by many other types of electronic, computing, or communications devices and for other types of files. Process 502 is not limited to any particular tag format including ID3v2 and ID3v1 mentioned above.

Process 502 is used, in an alternative embodiment, to process one or more, but is not limited to, the following files: audio files generally including Windows Media Video (WMV)™ from Microsoft, Inc. of Redmond, Wash., Advanced Audio Coding (AAC)™ from Lucent Technologies, Inc. of Murray Hill, N.J., and video files generally. In process 502, control logic 73h extracts 503a the metadata of an MP3 file and stores 503b it in a metadata compilation file in storage 73h. Control logic 73h then determines 503c whether there are more files for which metadata is to be extracted. When there are more files to be extracted control logic 73h selects 503d another file and repeats 503a the metadata extraction operation. When there are no more files for which metadata is to be extracted, control logic 73h closes the metadata compilation file and sends 503e it for analysis. In an embodiment, the file is sent to server 29a to perform the analysis. In an alternative embodiment, control logic 73h performs the analysis. In an alternative embodiment, server 29c performs the analysis. The compilation file may be sent immediately when the server and control logic 73h are coupled via transceiver 73j, but also may be sent later, or may be provided to an intermediate device to provide it to the server for analysis. Any one of, but not limited to, the following may be used as an intermediate device: cell phone 11, 15, computer 31, personal digital assistant, media player, pocket computer, or some type of storage device including magnetic or electronic memory storage.

Figure 11C:
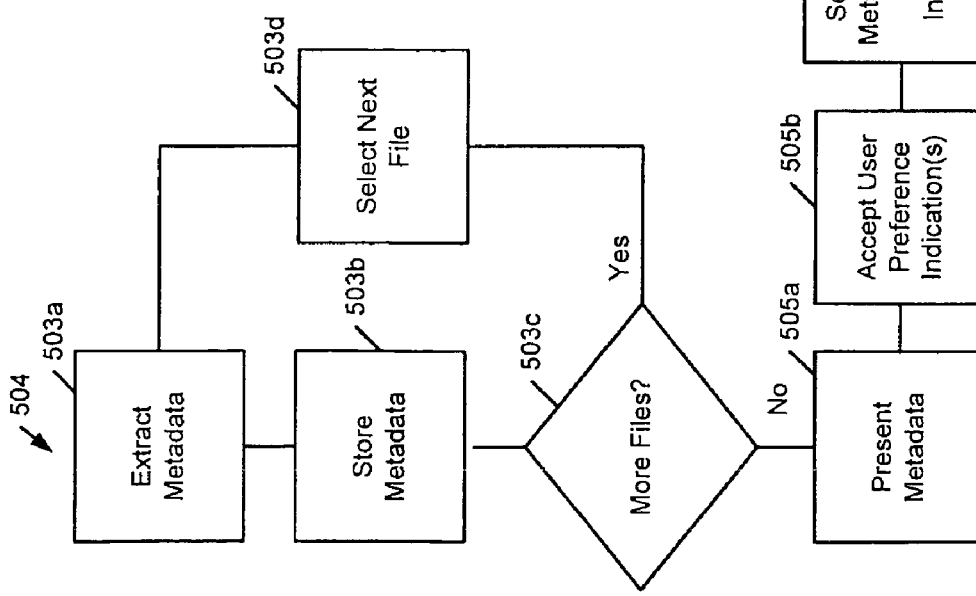
FIG. 11c illustrates a process for generating for analysis identification information for items of interest to a user according to an alternative embodiment of the present invention.

FIG. 11c illustrates a process for generating for analysis identification information for items of interest to a user according to an alternative embodiment of the present invention. The above description of process 502 is incorporated but not with respect to the timing of sending 503e for analysis the compilation file and the information that is included in the compilation file. Process 504 and process 502 diverge in operation after control logic 73h determines 503c that there are no more files for which metadata is to be extracted. When there are no more files for which metadata is to be extracted, control logic 73h presents 505a on display 73o in segments the extracted information. In an alternative embodiment, the user is allowed via interface 73i to select 505b items and place them in categories each of which is associated with a rank.

FIG. 11d illustrates a display presenting items for association with ranks according to an alternative embodiment of the present invention. Screen shot 506 illustrates item identification units 507a each of which includes information that identifies an MP3 file. Control logic 73h accepts user activations via interface 74i and based upon indications of the activations moves an item identification unit to one of categories 507b, 507c, 507d, 507e, and 507f. Each of categories 507b, 507c, 507d, 507e, and 507f is associated with a rank 5, 4, 3, 2, 1, respectively. In an alternative embodiment, item identification units 507a is organized by genre, artist, album, song title and item identification units can be selected more efficiently in terms of all artist titles or all songs on an album instead of individually. During the category assignment process, control logic 73h associates with each item identification unit that is assigned to a category either a ranking or a category indication indicative of the assignment, and the associated ranking or category indication is stored along with the item's extracted information in the metadata compilation file. When the category assignment process is complete, control logic 73h closes the metadata compilation file enhanced with user preference information and sends 503e it for analysis. In an embodiment, the file is sent to server 29a performs the analysis. In an alternative embodiment, server 29c performs the analysis. In an alternative embodiment, the analysis is performed by control logic 73h or, depending upon the embodiment, whatever device is performing the identification information extraction. The compilation file may be sent immediately when the server and control logic 73h are coupled via transceiver 73j, but also may be sent later, or may be provided to an intermediate device to provide it to the server for analysis. Any one of, but not limited to, the following may be used as an intermediate device: cell phone 11, 15, computer 31, personal digital assistant, media player, pocket computer, or some type of storage device including magnetic or electronic memory storage.

While server 29c is described as performing a collaborative filtering operation, in an alternative embodiment server 29a performs this operation. In an alternative embodiment, both server 29a, and 29c perform this operation. Thus, even though the description of an embodiment is made in connection with server 29c, one of ordinary skill in the art would appreciate that the same operation is performed at server 29a in either one of two alternative embodiments. Furthermore, one of ordinary skill in the art would appreciate that collaborative filtering is one technique for implementing a recommender system and that other techniques, without limitation, including rule based ones, may also be used.

Server 29c uses advantageously the metadata compilation file or the enhanced metadata compilation file that it receives from the user and other users. The users' rankings for items that are received later are also used by server 29c to provide useful services to users as described herein. In an alternative embodiment, server 29c uses the metadata and later users' rankings (collectively "rankings") to provide an item-item similarity recommendation or collaborative filtering function. The present invention is not limited to item-based collaborative filtering, and in an alternative embodiment user-user based collaborative filtering and other collaborative filtering techniques known in the art are used. However, item-based collaborative filtering has benefits in that the similarity coefficients tend to be relatively stable over time compared to user-user similarity coefficients. Due to the stability, item similarity coefficients have a relatively long validity period after server 29c provides them to control logic 73h for storage in storage 73f. Collaborative filtering at server 29c is described below as being item-based, however one of ordinary skill in the art would appreciate that the present invention is not limited to item-based collaborative filtering or to such filtering being performed at server 29c rather than some other server.

FIG. 2b illustrates in greater detail a server according to an embodiment of the present invention. Server 35 is representative of servers 29a, 29c. Server 35 includes control logic 36a that includes one or more general purpose or specialized processors. Control logic 36a executes application and operating system (OS) instructions stored in memory 36b. The instructions are obtained from OS & applications 36c that is a disk drive controller and disk drive that also stores the applications and operating system instructions. Based upon instructions from control logic 36a, applications and operating system instructions are transferred to memory 36b for later retrieval and execution by control logic 36a.

Server 35a communicates with BID 11, phone 15, computer 31, media player 33, and multimedia recording device 34 (collectively communications devices). Server 35a communicates using TCP/IP networking protocol 36e which is the primary networking protocol of the Internet, but the present invention is not limited to any particular protocol. Server 35a includes communication unit 36f which translates electrical signals bearing requests and information from communications devices into units of information that are stored in memory 36b and manipulated and processed by control logic 36a. Similarly, communications unit 36f translates requests, replies, and information that control logic 36a wants to send to communications devices into electrical signals that can be received, and retransmitted and transferred by network 26, 28 or PSTN 32.

Server 35a includes storage controller 36d that allows control logic 36a to obtain data from and store data in storage 29d. Data processed by control logic 36a and stored in storage 29d, includes but is not limited user rankings, user identity, user device type, purchase details, payment details, and address and delivery details.

The information from each user is stored in storage 29d from where control logic 36a retrieves it for analysis based upon instructions of a collaborative filtering program in applications 36c. In an embodiment, the collaborative filtering program when executed performs item-based collaborative filtering. Item-based collaborative filtering includes control logic 36a computing the similarity between items. Based on the computed similarity information control logic 36a identifies items that are similar to those a user already has in the user's library or that the user has ranked favorably but which the user does not presently have. At least some of the identified items are then sent to the user's media player or broadcast interactivity device. Item similarity is determined at least partly on the rankings that users have given the items. Where the user does not separate the items in the user's library into categories each associated with a rank, control logic 36a assigns a default rank to each item. If the user later sends a rank, the default rank is replaced by the later received rank. The default rank may be the highest rank permitted by the collaborative filtering system. Alternatively, it may be the average rank of all items ranked by all the users. Alternatively, it may be the average rank given to items by those with taste (i.e., similarity or correlation coefficient greater than some threshold) that is similar to that of the user's taste in items or some other intermediate value.

Figures 5A, 5B, 6:
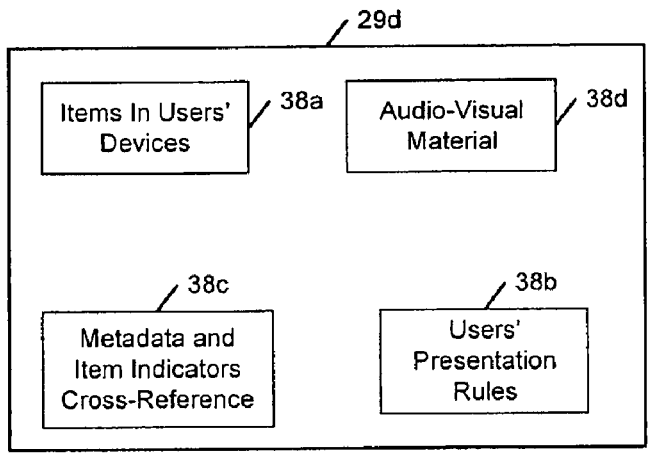
FIG. 5a illustrates a custom play list composed for a user according to an alternative embodiment of the present invention.
FIG. 5b illustrates a customized schedule composed for a user according to an alternative embodiment of the present invention.
FIG. 6 illustrates in greater detail information used by a server in making item recommendations to users, according to an alternative embodiment of the present invention.

FIG. 5a illustrates a custom play list composed for a user according to an alternative embodiment of the present invention. Play list 417 includes songs such as song 418a and advertisements such as advertisement 418b. Depending upon the embodiment, song 418a and other songs are selected by control logic 36a so as to achieve certain rates of repetition, minimum spacing between repetitions, and high level of item acceptability to the user. Furthermore, depending upon the embodiment, control logic 36a selects advertisement 418b and other advertisements based upon certain rates of repetition, minimum spacing requirements and how well it relates (i.e., acceptable) to the user.

FIG. 5b illustrates a customized schedule composed for a user according to an alternative embodiment of the present invention. Schedule data structure 419 includes time field 420a and song field 420b. DS 419 is produced by server 35 in an alternative embodiment. DS 419 represents a mixture of scheduled items that control logic 36a determined as being acceptable to the user and substitute items that control logic 36a identified as being suitable replacements for unacceptable scheduled items. Entries 420c indicate that the originally scheduled item was not acceptable to the user for whom DS 419 is composed. Entries 420d indicate that the originally scheduled item is acceptable to the user. Entry 420e indicates that the originally scheduled ad is not acceptable and that a replacement ad is to be presented. Where control logic 36a determines acceptability of scheduled items and replaces them with substitute items, control logic 36a performs a non real-time customization process such as one of those described herein.

In an alternative embodiment, entries 420c are populated with a code indicating that the device (e.g., any of the devices described herein) that receives DS 419 is to identify a substitute item in storage to fit the timeslot indicated by the substitute item. In an embodiment, "L" is the code but some other letter or symbol can also be used.

Figure 12A:
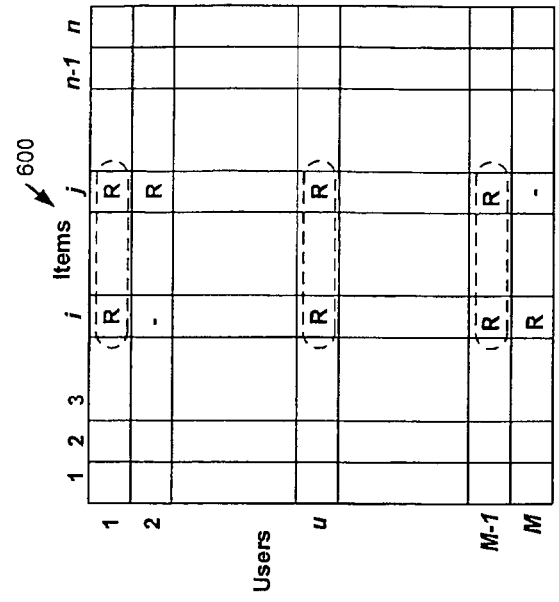
FIG. 12a illustrates the user ranking data in a matrix form to facilitate description of the process of item similarity computation according to an alternative embodiment of the present invention.

FIG. 12a illustrates the user ranking data in a matrix form to facilitate description of the process of item similarity computation according to an alternative embodiment of the present invention. To determine the similarity, $s_{i,j}$, between items i and j, control logic 36a identifies the users who have ranked both items and then a one of several methods for (not all of which must be present or used in an embodiment) similarity computation is performed by control logic 36a. Ranking matrix 600 is organized into rows and columns, where the rows represent users and the columns represent items. "R" in a matrix cell indicates that a rank was made by a user identified by the row number of the row in which the "R" resides, while "–" indicates lack of a ranking. By comparing the ranks in each of columns i, j, control logic 36a determines that users 1, u, and m−1 have ranked both item i and item j. Having isolated the users, the similarity coefficient is computed by control logic 36a. The similarity coefficient is computed by one of three methods at least one of which is used in an embodiment: cosine-based similarity, correlation-based similarity, and adjusted cosine similarity.

For cosine-based similarity, the items are considered to be two vectors in m dimensional user-space. The similarity between them is determined by control logic 36a computing the cosine of the angel between these two vectors. Formally, in the m×n ratings matrix in FIG. 12a, similarity between items i and j, denoted by sim(i,j), is given by $$sim(i, j) = \cos(\vec{i}, \vec{j}) = \frac{\vec{i} \cdot \vec{j}}{\|\vec{i}\|_2 * \|\vec{j}\|_2} \qquad \text{E. 22}$$

where "•" denotes the dot product of the two vectors.

For correlation-based similarity, control logic 36a also uses only the rankings provided by users who ranked both item i and item j. Their correlation-based similarity is determined by control logic 36a by computing the Pearson-r correlation $corr_{i,j}$. Where the set of users who both rated item i and item j are denoted by U, correlation similarity is given by $$sim(i, j) = \frac{\sum_{u \in U}(R_{u,i} - \overline{R_i})(R_{u,j} - \overline{R_j})}{\sqrt{\sum_{u \in U}(R_{u,i} - \overline{R_i})^2} \sqrt{\sum_{u \in U}(R_{u,j} - \overline{R_j})^2}} \qquad \text{E. 23}$$

Here, $R_{u,i}$ denotes the ranking of user u on item i, $\overline{R_i}$ is the average rating of the i-th item.

Given that some users rank consistently high and others consistently low, an alternative method that offsets this drawback in ranking is used to determine similarity. The adjusted cosine-similarity computation offsets this drawback by subtracting the corresponding user average from each co-rated pair. The similarity between items i and item j is given by the following expression:

$$sim(i, j) = \frac{\sum_{u \in U}(R_{u,i} - \overline{R_u})(R_{u,j} - \overline{R_u})}{\sqrt{\sum_{u \in U}(R_{u,i} - \overline{R_u})^2} \sqrt{\sum_{u \in U}(R_{u,j} - \overline{R_u})^2}} \qquad \text{E. 24}$$

Here $\overline{R_u}$ is the average of the $u^{th}$ user's rankings.

In an alternative embodiment, control logic 73h determines sim(i,j) for every possible i,j pair of n items. Where n is in the 10,000's the number of similarity coefficients to be computed easily exceeds 4.5 million. Computing the number of similarity pairs for n items is a familiar application of the binomial coefficient $$\binom{n}{r} = \frac{n!}{r!(n-r)!},$$

where r=2.

Given the relatively static nature of similarity coefficients, the computation can be done periodically and be pre-computed for all items rather than be computed in real-time for users of communication devices which are communicating with control logic 36a and are expecting new items or new item samples to be recommended within seconds of being coupled to control logic 36a. However, even though the similarity coefficients may be relatively static, there are millions of coefficients that have to be stored. Where storage space and/or bandwidth are not at a premium this is not an issue. However, a technique is described for decreasing the number of pairs for which a similarity coefficient is stored to l*n, where l is the number of items which are most similar to each item j.

Once similarity coefficients by one of the above methods are determined, control logic 36a is able to predict the rankings that a user might give to items with which the user is not familiar. Using the similarity coefficients control logic 36a identifies the set of items (potentially acceptable items set) which are quite similar to the items which the user has ranked but which the user does not have, possess, or hasn't rejected. Control logic 36a receives from time-to-time from communication devices the users' ranking including explicit indication of items that have been rejected or implicit indications due to low ranking, and also any newly acquired items that may have been acquired independently from the collaborative filtering system. The collaborative filtering system also keeps track of music purchases made by each user through the sales unit of the collaborative filtering system or an associated sales unit. Every user is associated with a user identifier that is used in making purchases via the collaborative filtering system's sales unit or associated sales unit.

Control logic 36a then predicts the user's ranking for the items in the potentially acceptable items set, one by one. To predict the user's ranking for an item i, control logic 36a identifies the N items the user has ranked and the similarity coefficients between each item of the N items and item i. Control logic 36a then evaluates the following expression:

$$P_{u,i} = \frac{\sum_{\text{all similar items},N}(S_{i,N} * R_{u,N})}{\sum_{\text{all similar items},N}(|S_{i,N}|)} \qquad \text{E. 25}$$

When enough similarity coefficients are negative, there is a possibility that the predicted rating will also be negative. Where $P_{u,i}$ is negative and the utilized rating scale only permits positive values, negative similarity coefficients may degrade the system's performance. To get around this problem, it is preferable to assign the prediction the lowest value permitted by the utilized rating scale.

Items whose predicted rankings exceed the $u^{th}$ user's ranking threshold (hereafter referred to as "predicted acceptable items") are identified to the $u^{th}$ user's communications device by control logic 36a, in an alternative embodiment, sending an item indicator indicative of the predicted acceptable item(s) to the device whether via network 26, network 28, or PSTN 32. In an alternative embodiment, control logic 36a retrieves an item or a sample of the item from data storage 29d and sends it to the user. Control logic 36a stores, for each user, in data storage 29d a ranking threshold.

In an alternative embodiment, the item similarity information is used to construct a schedule or play list such as that described herein. In an alternative embodiment, the group ranks and group codes are used in constructing the schedule or play list. One of ordinary skill in the art would appreciate that user category rankings and item-category similarity coefficients are used in an alternative embodiment.

In an alternative embodiment, the threshold is a function of the average user rating. For instance, control logic 36a sets it to be 80% of the average user rating or some other fraction. In an alternative embodiment, the threshold is a function of the average item rating for all users that have rated item i. Similarly, control logic 36a sets the threshold to be a fraction of the average item rating. In an alternative embodiment, the threshold is a function of both the average user rating and the average item rating for all users that have rated item i. In an alternative embodiment, to set a user threshold, control logic 36a subtracts $\alpha\sigma_u$ from the average user rating, where a ranges from about 1.1 to 2 and $\sigma_u$ is the standard deviation of the user's ratings.

In an alternative embodiment, the threshold is a function of the average user rating, the standard deviation of the user's ratings, and the mean absolute error (MAE) between ratings and predictions. MAE is a measure of the deviation of the predicted ratings and their true user-specified values. For each ratings-prediction pair $<P_{u,i},q_i>$ the absolute error is the difference $|P_{u,i}-q_i|$. Sarwar et al., "Item-based collaborative filtering recommendation algorithms," In $10^{th}$ International World Wide Web Conference (WWW10), Hong Kong, 2001. Assuming there are N ratings-prediction pairs, $MAE_u$ for user u is evaluated by the following expression:

$$MAE_u = \frac{\sum_{i=1}^{N} |P_{u,i} - q_i|}{N} \quad \text{E. 26}$$

In such an embodiment, to set a user threshold, control logic 36a subtracts both $\alpha\sigma_u$ and $MAE_u$ from the average user rating, where a ranges from about 1.1 to 2 and $\sigma_u$ is the standard deviation of the user's ratings.

Alternatively, the threshold is chosen to achieve a certain decision accuracy metric by using a global receiver operating characteristic (GROC) curve or customer receiver operating characteristic curve (CROC). The threshold chosen affects metrics that evaluate how effective a recommender system is at helping a user select high-quality items. The metrics, referred to as decision support accuracy metrics, are based on the observation that the magnitude of the ranking is not as important as the relationship of the ranking to a threshold that is inherent in the user's perception and binary reaction to items. The user either likes it or does not like an item, and it is irrelevant whether the score was 4 or greater than 4 on a 5 point scale when the user only likes items whose associated prediction is 3.5 or higher. Similarly, it is irrelevant if the prediction is 2 or 3 in such a situation.

Commonly used decision support accuracy metrics are reversal rate, and receiver operating characteristic (ROC) sensitivity, but other metrics are also known in the art. Reversal rate is a measure of how often the system makes big mistakes that might undermine the confidence that a user has in the recommendation system. Low reversals refer to cases where the user strongly dislikes an item (i.e., gives a rating lower than a threshold L) and the system strongly recommends it with a high recommendation score (i.e., above a threshold H). High reversals are cases where the user strongly likes the item, but the system recommendation is poor (i.e., user rating >H, system recommendation <L). (Using Filtering Agents to Improve Prediction Quality in the GroupLens Research Collaborative Filtering System, Sarwar et. al., ACM 1998).

ROC sensitivity is a measure of the diagnostic power of a filtering system. Operationally, it is the area under the receiver operating characteristic (ROC) curve—a curve that plots the sensitivity and specificity of the test. Sensitivity refers to the probability of a randomly selected good item being accepted by the filter. Specificity is the probability of a randomly selected bad item being rejected by the filter. The ROC curve plots sensitivity (from 0 to 1) and 1-specificity (from 0 to 1), obtaining a set of points by varying the recommendation score above which the item is accepted. The area under the curve increases as the filter is able to retain more good items while accepting fewer bad items. The user's ratings are taken as being indicative of what is good and what is bad. On a five point scale, a rating of 4 or 5 is deemed to be indicative of an acceptable item while 1, 2, and 3 are deemed to be indicative of an unacceptable item. The ROC sensitivity measure therefore is an indication of how effectively the system can steer people towards highly-rated items and away from low-rated ones. Particularly important values are 1.0, the perfect filter, and 0.5 a random filter.

Where items are classified in a binary manner, predictions for user rank fall into one of four categories: true positives (tp), true negatives (tn), false positives (fp) and false negatives (fn). The true positive rate is referred to as the sensitivity, and the false positive rate or false alarm rate is also referred to as 1-specificity. These rates can be expressed by the following expressions:

$$tp \text{ rate} = \frac{tp}{tp + fn} \quad \text{E. 27}$$

$$fp \text{ rate} = \frac{fp}{fp + tn} \quad \text{E. 28}$$

It is clear that as the true positive rate approaches 1, fewer acceptable items are being rejected unjustifiably by the recommender system when they should be offered to the user. Furthermore, as the false positive rate approaches 0, fewer unacceptable items are being offered unjustifiably to the user. Control logic 36a chooses a threshold in the region nearest to a false positive rate close to 0 that meets certain design criteria. For example, a system designer may want to provide 90% of the items that the user would find acceptable and only 5% of the items that the user would find unacceptable. Some systems may not achieve such levels of performance. Methods of generating CROC or GROC curves and then selecting an operating point so as to achieve a system wide objective (hit/miss rate) or a user-specific objective (hit/miss rate) are well known in the art and need not be described herein.

Furthermore, one of ordinary skill in the art would appreciate that the experimental technique most commonly described in the art for determining system performance should be referred to as 'weak generalization' because the ratings of each user are divided into two sets: 1) set used for training the filtering system; and 2) a set for comparison with the filtering system's predicted ratings and classification (i.e., acceptable to the user or not acceptable) to determine the accuracy of the ratings or classifications (hit/miss rate). This technique attempts to mimic what happens when a prediction is made for an item that is under consideration for being offered to the user. Given that the user's ranking is already known, it is relatively simple to determine whether the system would have succeeded in its recommendation/prediction.

Another technique is referred to as 'strong generalization' because the users are split into two groups: 1) ratings of the first group of users is used to train the filtering system; and 2) ratings of the second group of users is used for comparison with the predictions of the filtering system. The ratings of a user in the second group are used to determine the user's nearest neighbors, and the ratings for some of the items are used in making predictions for other items. This technique attempts to mimic what happens when a prediction is made for a user who has recently joined the system. Given that the user's ratings are already known, it is relatively simple to determine whether the system would have succeeded in its recommendation/prediction.

With respect to item-based filtering, the items are split into two groups: 1) first group of items is used for training the system; and 2) the second group of items is used for comparison with the predictions of the trained system. This technique attempts to mimic what happens when a prediction is made for an item that has been recently added to the system. A fraction of the item's ratings are used in determining similarity coefficients with items in the training set. The similarity coefficients are then used to determine the predicted ratings of users who have ranked the item but whose ratings were not used in determining similarity coefficients.

As indicated above, the number of pairs for which a similarity coefficient is stored is decreased in an alternative embodiment to l*n, where l is the number of items which are most similar to each item j. There is no fixed value for l that is applicable to all applications of embodiments described herein. Rather, an empirical approach is necessary to determine a value for l that satisfies certain criteria such as mean absolute error (MAE), coverage, or even ROC sensitivity (the area under the ROC curve). The criteria are determined for various values of l ranging from 25 to 200 or 400 in steps of 20. Usually, a tradeoff is necessary because there is not likely to be a value for l that results in the smallest observed value for MAE, largest observed value for coverage, and the largest observed value for ROC sensitivity. Methods of determining the foregoing criteria for various values of l are known in the art and some results are described in the following: Sarwar et al., "Item-based collaborative filtering recommendation algorithms," In $10^{th}$ *International World Wide Web Conference* (*WWW*10), Hong Kong, 2001.

In an alternative embodiment, control logic 36*a* generates custom play lists for users and stores them in either memory 36*b* or storage 29*d* before it provides them to a broadcast interactivity device or media customization device via network 26, 28 or PSTN 32. Depending upon the embodiment, the broadcast interactivity device is one or more, but not limited to, the following: BID 72, BID 700, BID 800, BID 11, phone 15, media player 33, personal digital assistant, and pocket personal computer. BID 700, 800 and media customization devices are described in greater detail elsewhere herein.

FIG. 6 illustrates in greater detail information used by a server in making item recommendations to users, according to an alternative embodiment of the present invention. Control logic 36*a* generates a custom play list for a user u by selecting item indicators in accordance with presentation rules associated with the user in presentation rules 38*b*. Rules that are associated with a user and that are stored in presentation rules 38*b* are, depending upon the embodiment, either identical to the user presentation rules stored in storage 37*f* or are different. Control logic 36*a* selects the item indicators partly based upon the item indicators that are associated with user u in items in users' devices 38*a* and that indicate what items are already stored in audio visual material 73*v*. The item indicators do not just point to songs, or talk shows, but also point to ads that are already stored in audio visual material 73*v*. The ads are ones that are known to relate to user u or that control logic 36*a* has predicted would be acceptable in accordance with any of the user item rating prediction techniques described herein.

When items are added to audio visual material 73*v* but are not obtained from server 29*c*, control logic 37*h* sends identification information about the added items to control logic 36*a* via transceiver 73*j*, and control logic 36*a* stores item indicators associated with the added items in the item indicators that are associated with user u in items in users' devices 38*a*. If only metadata is received from control logic 37*h*, control logic 36*a* maps the metadata to the appropriate item indicators using metadata and item indicators cross-reference 38*c* which contains pairs of metadata and its associated item indicator. When control logic 36*a* selects for inclusion in a play list item indicators for items that are not stored in material 73*v*, control logic 36*a* retrieves from audiovisual material 38*d* the items that are not stored in material 73*v* and sends them to control logic 37*h* for storage in material 73*v*. When control logic 36*a* sends items to control logic 37*h* for storage in audio visual material 73*v*, control logic 36*a* updates the item indicators associated with the appropriate user in items in users' device 38*a* to reflect the additional items that are now available in material 73*v*. The above described custom play list creation process is also performed by control logic 37*h*, in an alternative embodiment, and given the foregoing description one of ordinary skill in the art would appreciate the structure and operation of such an alternative embodiment, making additional description superfluous.

FIG. 12*b* illustrates a broadcast interactivity device according to an alternative embodiment of the present invention. Broadcast interactivity device (BID) 800 includes a receiver frequency determination unit (RFDU) 801*b*. Depending upon the embodiment, RFDU 801*b* is one of RCU 42, 52, 62, 66, frequency detector 70*d*. Alternatively, RFDU 801*b* is frequency detector 70*d* and one of RCU 42, 52, 62, 66, such as tuning signal detector 68 of FIG. 7*o* which has both an RCU and a frequency detector.

Control logic 801*a* of BID 800 generates an information identifier in response to receiving an interactivity indication due to an interactivity activation. Depending upon the embodiment, an interactivity activation is the activation of a key on a keypad of interface 801*c*, the receipt of a voice command at a voice recognition engine that is part of interface 801*c*, or the receipt of an interactivity indication from communication unit (CU) 801*f*. With respect to the latter, a remote control (not shown) may send an indication of an interactivity activation to transceiver 801*f* to provide to control logic 801*a*. The foregoing description of interactivity activations is to be incorporated by reference into the description of other embodiments described in connection with FIG. 1*a*, 1*b*, 1*c*, 9*a*, 9*w*, 9*l*.

Depending upon the embodiment, CU 801*f* communicates by one or more of the following techniques: wirelessly, infrared, wire cable, and ultrasonic. Thus, reference to transceiver CU 801*f* does not limit CU 801*f* to including a single transceiver that communicates in accordance with one communication scheme, protocol, or physical media. Depending upon the embodiment, CU 801*f* may include one or more of the following: infrared transceiver, wired or wireless serial communications transceiver, network interface card, network controller, local wireless communications transceiver, cellular communications transceiver, and parallel communications transceiver. Thus, that CU 801*f* is shown coupled to antenna 801*g* does not mean that CU 801*f* is limited to communicating wirelessly or that every embodiment, must contain a wireless transceiver and an antenna. As suggested by the dashed lines, CU 801*f*, depending upon the embodiment, may not be coupled to antenna 801*g*.

Furthermore, at least some of the information that is being described as being received or transmitted by CU 801*f* may be provided to and transferred from control logic 801*a*, depending upon the embodiment, by use of physical media such as floppy disks, hard disks, rewritable compact disc, writable compact disc, memory sticks, memory cards, or smart cards, etc. . . . . Such information is later transferred to server 29*a*, 29*c*, BID 11, phone 15, and computer 31. One of ordinary skill in the art would appreciate that depending upon the embodiment, control logic 801*a* includes, but is not limited to, one or more of the following: storage device controller, and external memory communication interface. Furthermore, in an alternative, embodiment control logic 801*a* is coupled to a removable or fixed storage device 801*d*. In alternative embodiment, BID 800 does not include storage device 801*d*, but such a device is coupleable to control logic 801*a*.

In response to receiving an interactivity activation, control logic 801*a* generates an information identifier based upon a frequency indication received from RFDU 801*b*. In an alternative embodiment, in response to receiving an interactivity activation control logic 801*a* requests RFDU 801*b* to detect the frequency to which a nearby receiver is tuned and to provide a frequency indication to control logic 801*a*. In an alternative embodiment, in response to receiving an interactivity activation, control logic 801*a* obtains from timer 801*e* an indication of present time. Control logic 801*a* also bases the information identifier on the present time indication. Depending upon the embodiment, the information identifier is stored in memory in control logic 801*a* or in storage 801*d*. Depending upon the embodiment, the information identifier is provided in real-time or non real-time to another device. Depending upon the embodiment, the information identifier is provided to one or more other communication or computing devices so that a service may be performed on behalf of the user of BID 800 or on behalf of another party that is able to use the information identifier for purposes including, but not limited to, marketing or market analysis purposes. Depending upon the embodiment, control logic 801*a* provides, via CU 801*f*, the information identifier to one or more of, but not limited to, the following devices: server 29*a*, server 29*c*, computer 31, BID 11, phone 15. Depending upon the embodiment, as a consequence of providing the information identifier to one of the foregoing devices, control logic 801*a* receives information or causes an action to be performed. The information received and the actions performed in various embodiments are described in greater detail elsewhere herein.

Depending upon the embodiment, control logic 801*a* via CU 801*f* sends the information identifier to one or more of server 29*a*, 29*c* via BID 11, phone 15 which is used as a modem by control logic 801*a* to communicate with network 26. Depending upon the embodiment, the information identifier is sent to computer 31.

Depending upon the embodiment, the information identifier is provided by control logic 801*a* via CU 801*f* to an application running on one of BID 11, phone 15, and computer 31, and the receiving application provides the information identifier to one or more of server 29*a*, 29*c*. Depending upon the embodiment, one or more of the following happens as a consequence of providing the information identifier to the application: control logic 801*a* receives information; BID 11, phone 15, or computer 31 receives information; or an action is performed. The information received and the actions performed in various embodiments are described in greater detail elsewhere herein. In an alternative embodiment, the information identifier composed by control logic 801*a* and provided by CU 801*f* includes a representation of geographic location.

In an alternative embodiment, a device that receives from control logic 801*a* the information identifier also receives from MPC 27*d* a representation of geographic location. In an alternative embodiment, a device that receives from control logic 801*a* the information identifier also receives, not necessarily from control logic 801*a*, a user identifier including a telephone local exchange number that is associated with the user and BID 800.

Where control logic 801*a* composes an information identifier including a representation of geographic location, depending upon the embodiment, control logic 801*a* bases the representation of geographic location on an indication received from interface 801*c*, on an indication of geographic location received from MPC 27*d* by way of station 27*b*, antenna 27*a*, antenna 801*g*, and CU 8011, on an indication received from a nearby communications device with the capacity to provide an indication because it is able to obtain one from a wireless (e.g., including but not limited to network 26) or wired network (e.g., including but not limited to network 28), is able to obtain one from a GPS receiver included in the communications device, or it is a GPS receiver that is coupled to control logic 801*a* via CU 801*f*. Examples of the latter communications device include, but are not limited to, BID 11, phone 15, computer 31, a broadcast reception device (not shown) that obtains positioning data from a broadcast signal, and a global positioning system receiver (not shown).

With respect to the indication of geographic location that control logic 801*a* receives from interface 801*c* on account of user activations at interface 801*c*, the indication of geographic location is provided to control logic 801*a* at the time of the interactivity activation, is provided at a time that is much earlier than the time of the interactivity activation, or is provided at a time that is much later than the time of the interactivity activation. Much earlier may be anything from a few seconds earlier to days, weeks or months earlier. Much later may be anything from a few seconds later to days weeks or months later. In an alternative embodiment, an indication of geographic location is provided by the user to a device other than BID 800, and the indication of geographic location and its associated information identifier are used to provide a service or perform an action as described in greater detail elsewhere herein.

In an alternative embodiment, control logic 801*a* receives a representation of geographic location from MPC 27*d* by way of station 27*b*, and antenna 27*a*, antenna 801*g*, and CU 801*f*. In such an embodiment, control logic 801*a*, via CU 801*f*, requests MPC 27*d* to send an indication of geographic location for BID 800. Obtaining geographic location indication from a mobile positioning system is well understood by those skilled in the art and need not be described in greater detail herein.

Alternatively, control logic 801*a* obtains via CU 801*e* an indication from a nearby communications device with the capacity to provide an indication because it is able to obtain one from a wireless (e.g., including but not limited to network 26) or wired network (e.g., including but not limited to network 28). Depending upon the embodiment, control logic 801*a* requests of, or, alternatively, periodically receives from, depending upon the embodiment, one or more of BID 11, phone 15, and computer 31 an indication of geographic location received from one or more of MPC 27*d*, and server 29*a*, 29*c*. One of ordinary skill in the art would appreciate that for the geographic location indication to be effective and useful it must allow the proper station schedule, information, or instructions be identified for the interactivity activation that is going to be processed by server 29*a*, 29*d* or as described elsewhere herein a broadcast interactivity device that performs "local interactivity activation processing;" that is after all one of the main reasons a geographic location is needed to provide services to the user or perform actions on behalf of the user or another party. Alternatively, control logic 801*a* obtains an indication of geographic location from a GPS receiver that is coupled to control logic 801*a* via CU 801*f*. Alternatively, control logic 801*a* obtains an indication of geographic location from a communications device that includes a GPS receiver that provides the indication of geographic location. Depending upon the embodiment the communications device is one of BID 11, phone 15, computer 31, and a broadcast reception device (not shown). Alternatively, control logic 801*a* obtains an indication of geographic location from a broadcast reception device that obtains geographic positioning data in a broadcast signal.

In an alternative embodiment, a device that receives from control logic 801*a* the information identifier also receives from MPC 27*d* a representation of geographic location. The receiving device, depending upon the embodiment, is one or more of, but not limited to the following: the server 29*a*, server 29*c*, computer 31, BID 11, and phone 15. The request is based upon a user identifier received at the device along with the information identifier. The user identifier allows MPC 27*d* to identify the communications device for which the receiving device is requesting an indication of geographic location. MPC 27*d* maintains indications or can determine upon request the geographic locations of communications devices communicating via network 26. When the communications device for which an indication of geographic location is requested is in the coverage area of the station for which control logic 801*a* composed an information identifier, the correct information (e.g., schedule, instructions, data, etc. . . . ) is identified by the receiving device when the correct information can be advantageously identified from among other potentially correct information based on having the correct indication of geographic location.

In an alternative embodiment, server 29*a*, 29*c* receives a user identifier including a telephone area code and local exchange code that is associated with the user and BID 800. In an alternative embodiment, the user identifier that server 29*a*, 29*c* receives is obtained from an Automatic Number Identification service provided by the telephone company. In an alternative embodiment, the area code and telephone local exchange code are provided by control logic 801*a*. Control logic 801*a* receives from user interface 801*c* indications of activations indicative of a telephone area code and local exchange code. When the telephone area code and local exchange code are associated with a geographic area that is within the coverage area of a broadcast station for whose programming the user of BID 800 made an interactivity activation, server 29*a*, 29*c* is able to identify the proper schedule or instructions in data storage 29*b*, 29*d*.

In an alternative embodiment, one of PSTN 32 or MSO 27*c*, or network 28 provide an AIN number that allows server 29*a*, 29*c* to determine the general location of the user based upon the AIN number. In an alternative embodiment, an Internet protocol (IP) address is provided to server 29*a*, 29*c*. Each AIN number includes a local exchange number which is associated with a unique geographic area in which certain stations may be received. Server 29*a*, 29*c* include data structures that allow the local exchange number to be mapped directly or indirectly to a limited number of stations each of which is associated with a channel. Alternatively, a different stored data structure allows server 29*a*, 29*c* to map an IP address to a geographic location at which certain stations may be received. By providing a channel in an information identifier, the proper station with the same frequency assignment as the one indicated in the information identifier may be selected from the among the stations associated with the mapped IP address.

Each of the telephone area codes has between 1 and 999 unique local exchange codes. Each local exchange code defines a small portion of the geographic area of the telephone area code with which the local exchange code is associated. Typically, an exchange code covers a small area such as a town, portion of a town or county. Every radio station has a broadcast coverage area that is publicly available on maps such that for every exchange code it can be determined which radio stations (i.e., frequencies) provide coverage within the boundaries of a particular exchange. By organizing this information in a database, it is possible to determine from the area code and exchange code to which possible radio stations the user was listening when the user made the interactivity activation. Referring to FIG. 1*c*, in an alternative embodiment, region field 7*a* includes a telephone area code and local exchange code. By entering DS 6 based upon the area code and local exchange code as a key, a record including entries for station identifier field 7*b* and schedule field 7*c* is identified. Based upon the frequency representation in the information identifier the right station is identified in station identifier field 7*b*. The station's schedule entry in schedule field 7*c* or pointed to by a pointer entry in schedule field 7*c* is then accessed to process the interactivity activation for which an information identifier is received. In an alternative embodiment, region field 7*a*, includes an IP address or a range of IP addresses. One of ordinary skill in the art would appreciate there is no limit to the different types of mappings that can be performed from defined geographical areas to stations that can be experienced in those areas.

An alternative method of determining geographic location is based upon obtaining the cell global identity (CGI). CGI identifies the cell in which a communications device is located when communicating with network 26. According to an alternative embodiment, BID 11, phone 15 or other network communications device stores in its memory a representation for CGI which is received over the control channels while setting up or maintaining (e.g., handover) a communications link between BID 11, phone 15 and mobile network 26. Depending upon the embodiment, a representation of CGI is provided by BID 11, phone 15 to BID 800 (or other interactivity device described herein) or BID 11, phone 15 provides a representation of CGI to server 29*a*, 29*c* or computer 31. In an alternative embodiment, BID 800 is itself a network communications device and can either obtain CGI from MPC 27*d* or receive it over control channels. According to an alternative embodiment, BID 11, phone 15 requests the CGI for BID 11, phone 15 from mobile network 26, and network 26, specifically MPC 27*d*, satisfies the request by obtaining a representation from the home location registry (HLR) (not shown in FIG. 2*a*), or visitor location registry (VLR) (not shown in FIG. 2*a*).

If the CGI is used as the geographic location, the position of the user is still not known because how the cells are numbered or named depends on the network operator; there is no standard for it. Consequently, CGI is matched with the coordinates of the cell at server 29*a*, 29*c* or computer 31. When the operator of network 26 adds a cell, changes a CGI, or modifies the coordinates of a cell, a cell to geographic location mapping database at server 29*a*, 29*c* or computer 31 is updated. This means that at server 29*a*, 29*c* or computer 31 a database is maintained for all operators for which this interactivity service is provided and that each network operator maintains its own database.

Since maintaining a CGI mapping database may be considered unnecessarily duplicative, in an alternative embodiment, server 29*a*, 29*c* or computer 31 request geographic location from MPC 27*d*. Depending upon the embodiment, server 29*a*, 29*c* or computer 31 issues a request to MPC 27*d* to provide the present location of BID 11, phone 15 or BID 800. Server 29*a*, 29*c* or computer 31 uses the geographic location provided by MPC 27*d* to determine the broadcaster whose programming is associated with the interactivity activation that caused the information identifier to be received.

MPC 27*d* provides the cell coordinates (usually a point with an uncertainty area) based on CGI. Depending upon the embodiment server 29*a*, 29*c* or computer 31, send a representation of CGI received from a network communications device such as BID 11, phone 15, or, alternatively, they send, to MPC 27*d*, a device identifier associated with the network communications device that allows MPC 27*d* to determine the CGI associated with the network device and to provide on that basis a representation of geographic location. MPC 27*d* of each network operator has access to an up-to-date database that associates for each CGI a cell coordinate and can provide up-to-date cell coordinates in response to requests.

A benefit of getting geographic location based on CGI is that an operator can provide it relatively cheaply to a user of BID 11, phone 15, BID 800, or to the economic owner of the interactivity system of server 29*a*, 29*c*. The cell coordinates and CGI are information that the operator already maintains in a database. Typically, geographic location based on CGI has an inaccuracy ranging from 100 meters to 35 kilometers, but this should not be a problem for the broadcast programming interactivity service.

There are other ways that network 26 can determine the geographic location of a network communication device such as BID 11, phone 15, wireless PDA, or depending upon the embodiment, BID 800 or another one of the interactivity devices described herein. However, they all involve much more complexity and expense which in the end are reflected in the price paid by a user for location based services (LBS). The other methods of determining the geographic location include: assisted GPS (A-GPS), the mobile network includes it's own GPS receivers which can provide assistance information to the GPS receiver on the communications device to help it calculate a more accurate position; CGI supplemented by timing advance ((CGI+TA), time for a radio signal to go from a base station to the communication device or the reverse); uplink time of arrival (UL–TOA) (time for a signal from a communication device to four or more measurement units located at separate base stations); and enhanced observed time difference (E–OTD) (the communications device measures the time difference it takes to receive data from three different, geographically separate, base stations (or more) and position is calculated based on that information either by the communications device or the MPC 27*d*).

Geographic locations such as CGI+TA, UL–TOA, and E–OTD can be obtained by BID 11, phone 15 or BID 800 from MPC 27*d*. However, depending upon the embodiment, E–OTD is determined locally by BID 11, phone 15 or BID 800, or determined locally by BID 11, phone 15 and provided to BID 800.

As indicated above, depending upon the embodiment, BID 11, phone 15 or BID 800 sends an information identifier including the time an interactivity activation was accepted and the detected tuned channel of a broadcast programming reception device to server 29*a*, 29*c* or computer 31. The information identifier typically includes a user identifier that allows personalized service to be provided by server 29*a*, 29*c* or computer 31. However, where an AIN number is available to server 29*a*, 29*c*, or computer 31, a user identifier may not be needed. However, in an alternative embodiment, sever 29*a*, 29*c*, or computer 31 confirms the received user identifier using the AIN number. One of ordinary skill in the art would appreciate that services that are described as being offered, depending upon the embodiment, by server 29*a*, 29*c*, or computer 31 are offered in an alternative embodiment by BID 11, phone 15, or media player 33. BID 11, phone 15, or media player 33 offer the services in cooperation with server 29*a*, 29*c*, or computer 31 or using information obtained from an alternative source.

Parts of the following description are made in terms of an information identifier that includes a representation of geographic location that is used to identify the proper information for processing the information identifier. However, one of ordinary skill in the art would appreciate that in an alternative embodiment a representation of geographic location is not used, or alternatively is not used for that purpose. In an alternative embodiment, the information identifier includes a representation of geographic location for another purpose, including but not limited to, determining where users are when listening to programming for which an interactivity activation is made. By identifying concentrations of users at certain times in certain locations, ads for merchants in the locations may be broadcast at certain times. An information identifier that arrives at a device for processing is referred to herein as an interactivity command.

Furthermore, parts of the following description are made in terms of a representative server reacting to receipt of an information identifier and providing a service or performing an action. However, one of ordinary skill in the art would appreciate that, in an alternative embodiment, other devices may perform the same or similar operations as those attributed to the server. Other devices include but are not limited to server 29*c*, computer 31, BID 11, phone 15, media player 33, and other communications or computing devices known in the art. Depending upon the embodiment, an interactivity device that generates an information identifier may receive information from another interactivity device, communications or computing device in response to sending the information identifier to the other device. Furthermore, the description is made in part by referring to storage 29*b*, but one of ordinary skill in the art would appreciate that the same description is applicable in an alternative embodiment to storage 29*d* or storage that is local to computer 31, BID 11, phone 15, media player 33 and other communications or computing devices known in the art.

In an alternative embodiment, server 35 provides additional services to the ones described elsewhere herein. In an alternative embodiment, server 35 provides different services than the ones described in an earlier description of server 35.

Server 35 is representative of servers 29*a*, 29*c*. Server 35 includes control logic 36*a* that includes one or more general purpose or specialized processors. Control logic 36*a* executes application and operating system (OS) instructions stored in memory 36*b*. The instructions are obtained from OS & applications 36*c* that is a disk drive controller and disk drive that also stores the applications and operating system instructions. Based upon instructions from control logic 36*a*, applications and operating system instructions are transferred to memory 36*b* for later retrieval and execution by control logic 36*a*.

Server 35 communicates with BID 11, phone 15, computer 31, media player 33, and multimedia recording device 34 (collectively communications devices). Server 35 communicates using TCP/IP networking protocol 36*e* which is the primary networking protocol of the Internet, but the present invention is not limited to any particular protocol. Server 35 includes communication unit 36*f* which translates electrical signals bearing requests and information from communications devices into units of information that are stored in memory 36*b* and manipulated and processed by control logic 36*a*. Similarly, communications unit 36*f* translates requests, replies, and information that control logic 36*a* wants to send to communications devices into electrical signals that can be received, and retransmitted and transferred by network 26, 28 or PSTN 32.

Server 35 includes storage controller 36*d* that allows control logic 36*a* to obtain data from and store data in storage 29*b*. When control logic 36*a* receives an information identifier that includes a representation of time, frequency indication and representation of geographic location, control logic 36a determines what service or action to perform on behalf of the user. To determine what action to perform, control logic 36a accesses in storage 29b a data structure such as that described in connection with FIG. 1a, 1b, 1c or alternatively FIG. 2c, which is described in greater detail below.

Figure 2C:
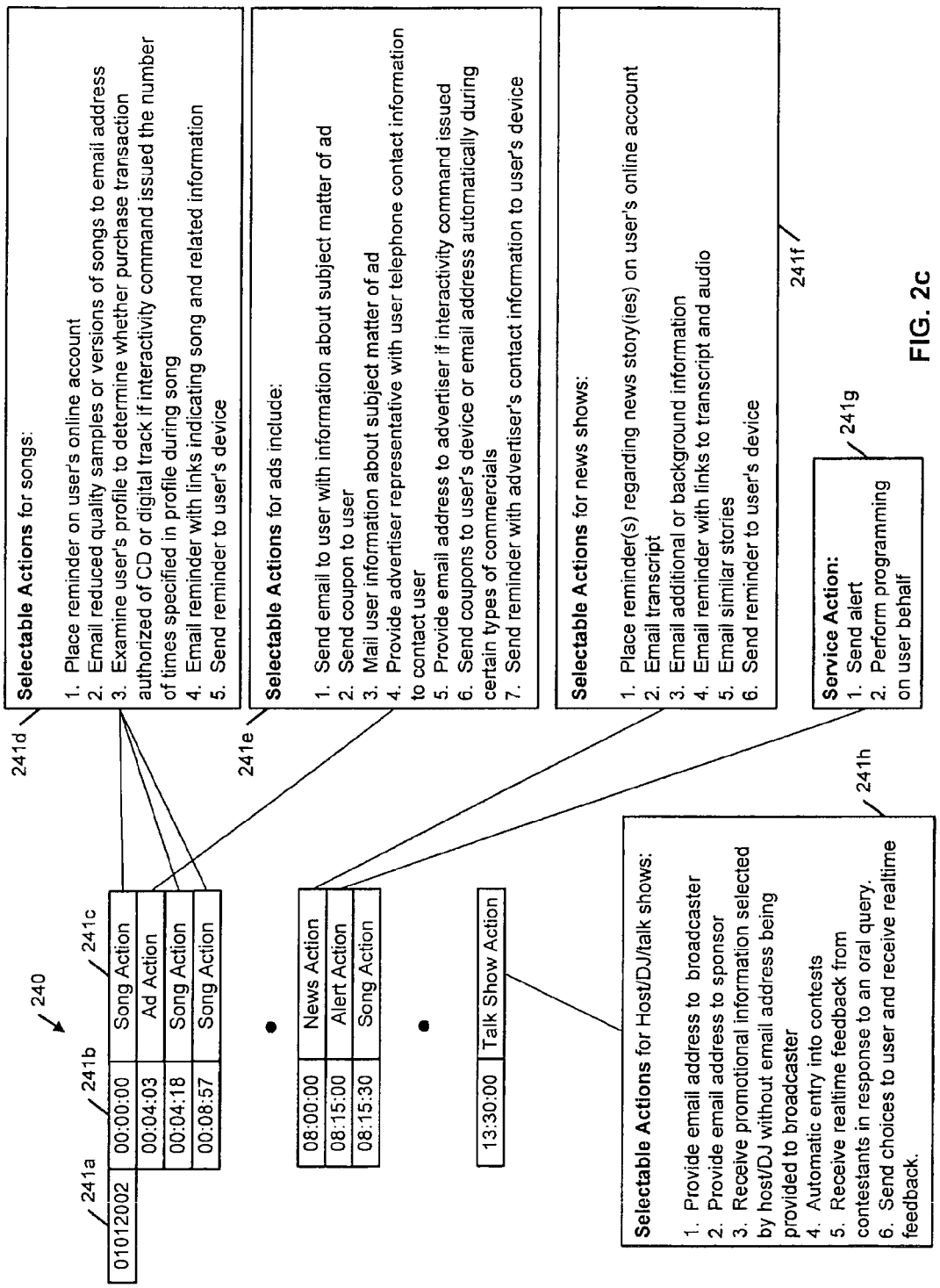
FIG. 2c illustrates an actions data structure that is a related to a broadcaster schedule according to an alternative embodiment of the present invention.

FIG. 2c illustrates an actions data structure that is a related to a broadcaster schedule according to an alternative embodiment of the present invention. Data structure 240 is representative of entries in schedule field 4c, 7c in an alternative embodiment. Depending upon the embodiment, one or more data structures such as those described in connection with FIG. 1a, 1b, 1c are stored in storage 29b. DS 240 is representative of an alternative implementation of DS 1 or entries in schedule field 4c, 7c. Where interactivity is provided for multiple broadcasters who have overlapping coverage areas, control logic 36a selects the appropriate broadcaster's DS 240 from among the entries in schedule field 4c, 7c based upon the representation of geographic location and channel indication received in the interactivity command. Once the proper DS 240 is identified, control logic 36a identifies the service or action to perform to satisfy the interactivity command based upon a selected entry in action field 241c. The proper entry in field 241c is selected based upon the representation of time received in the interactivity command.

As an illustrative, but not limiting, example consider the situation where BID 11 sends to server 35 an information identifier including a channel indication indicative of 106.7 FM and a representation of geographic location (e.g., latitude and longitude, zip code, area code and local exchange, etc. . . . ) that is in Manassas, Va. For purposes of illustration only consider DS 3 as being the data structure to which control logic 36a refers in order to identify the action to perform. One of ordinary skill in the art would appreciate that DS 6 or other suitable data structure may be used in an alternative embodiment. Based upon the channel indication control logic 36a identifies the entry for field 4a that matches 106.7. The entry for field 4a that matches 106.7 is associated with record 5d. Having identified the proper record, control logic 36a then compares the representation of geographic location received in the information identifier with the coverage areas defined in the entries for field 4b of record 5d. Since WJFK's coverage definition entry 5g in field 4b includes Manassas, Va., and WLTW's coverage definition entry doesn't, control logic 36a identifies WJFK schedule entry 5h in schedule field 4c as being the proper data structure to examine further to identify the action or service to perform in order to satisfy the received.

Where WJFK's schedule entry 5h in field 4c has the form of DS 240, depending upon the representation of time received in the interactivity command, control logic 36a identifies an action or service to perform. DS 240 includes pointers to instructions for actions for song, ad, news, alert, and talk show. For DS 240 illustrated in FIG. 2c, based upon the representation of time, control logic 36a identifies an entry in action field 241c. The entry in action field 241c, depending upon the embodiment, indicates to control logic 36a the default action or service that is to be performed, or alternatively, which group of actions to use to satisfy the interactivity command. In an embodiment in which an entry in action field indicates a default action or service, control logic 36a performs a default action for the programming in the associated timeslot irrespective of what the user might have desired. In such an embodiment, the item identifier does not include a command indication indicative of the particular action or service to be performed. A command indication is described in greater detail below, but for now it is sufficient to know that, in an alternative embodiment, it allows controls logic 36a to select one of several possible actions or services based upon the value of the command indication.

Consider for purposes of illustration a situation where an interactivity command includes a representation of time equal to "00:04:45." A representation of time equal to 00:04:45 maps to a song action entry in field 241c because the representation of time falls between entries 00:04:18 and 00:08:57 in field 241b, and during that time period, WJFK presented a song. Other types of programming, including but not limited to, news, advertisements, services, and talk shows have their own associated actions as indicated in other entries for field 241c. In an embodiment in which only default actions or services are performed, control logic 36a performs for the types of programming listed in Table 6 the associated actions specified in the adjacent cell in the action column.

TABLE 6

Default Actions

| Programming Type | Action |
| --- | --- |
| Song | Place marker regarding song on user's online account |
| Advertisement | Place marker regarding advertisement on user's online account |
| News | Place marker regarding news on user's online account |
| Talk Show | Place marker regarding talk show on user's online account |
| Service | Send alert (or perform other service) as described in broadcast announcement or advertisement |

There is no limit to the types of actions that may be performed by control logic 36a for an item of programming, and more than one default action may be performed, even though Table 6 specifies only one default action. Tables 6-11 provide illustrative and not limiting examples of actions and services some or all of which may be performed by one or more embodiments of the present invention. In an alternative embodiment, for each type of programming, control logic 36a performs two or more default actions from the associated table in Tables 6-11.

However, in an alternative embodiment, the actions specified in each of Tables 6-11 are selected by the user at the time an interactivity activation is made at a BID's user interface in reaction to the presentation of an item of programming. The manner in which the selection is made is described in greater detail below. However, in an alternative embodiment, a user specifies what actions are to be performed whenever control logic 36a receives an interactivity command from the user. A user specifies the actions using an interactive voice response system, online form(s) at a website, by emailing a form, or by mailing in a form. Indications of the user's specified actions are stored in storage 29b in a data structure that is accessible to control logic 36a. The information regarding the users' specified actions are organized and are separately accessible, depending upon the embodiment, based upon an AIN number, user identifier, or both. In order to access the correct user specified actions, depending upon the embodiment, when control logic 36a receives an interactivity command from a user's broadcast interactivity device—of which several embodiments are described herein—control logic 36a either uses a user identifier that arrives with the interactivity command from the broadcast interactivity device, or alternatively uses an AIN number that is provided by the appropriate communications system or network described herein.

FIG. 2d illustrates a data structure for user related information that is used by a server's control logic to process received information identifiers. Data structure 412 includes user id field 413*a* and user information field 413*b*. Depending upon the embodiment, either an AIN number or a user identifier that is associated with a received information identifier is used by control logic 36*a* to identify the appropriate entry in user information field 413*b*. The user information for the user 2 id entry in field 413*a* is entry 413*c* in user information field 413*b*. Information in an entry in information field 413*b* is described in greater detail below.

FIG. 2*e* illustrates in greater detail a data structure for user related information. The information in entry 413*c* is shown in greater detail in FIG. 2*e*. Depending upon the embodiment, information in entry 413*c* includes some or all of the following, but is not limited to: name 413*d*, device id 413*e*, phone number 413*f*, address 413*g*, email address 413*h*, payment information 413*i*, online account information 413*j*, personal information 413*k*, preferences 413*l*, past transactions 413*m*, pending transactions 413*n*, and alert and services information 413*o*. The information in entry 413*c* is used by control logic 36*a* to perform the actions and services described below in connection with Tables 6-11.

In an embodiment in which rights protected material are sent to a device associated with the user and are tied to being presented only on that device or other permitted devices, control logic 36*a* uses device id 413*e* to tie presentation and usage rights for the material to the device or devices. In the case where more than one device may present the material device id 413*e* includes a device id for each of the devices. Address 413*g* is used by control logic 36*a* or a fulfillment operation to have physical material (e.g., compact discs, cassettes, coupons, and any physical material that may be promoted via broadcasting) sent to the user. A fulfillment operation is a system that performs physical delivery (e.g., packaging, addressing, mailing, etc. . . . ) on behalf of server 35. Control logic 36*a* uses phone number 413*f* for many actions including, but not limited to, providing it to an advertiser representative to call the user to discuss a matter related to an advertisement. Control logic 36*a* uses email address 413*h* to send to the user information regarding an item of programming for which the user has indicated an interest. Payment information 413*i* includes credit card information or bank account number information for direct withdrawal, and control logic 36*a* uses it for performing financial transactions for purchases made by the user through interactivity activations made during certain types of items of programming, including but not limited to advertisements, songs, talk shows, etc. . . . . For example, the user may purchase the subject of an advertisement (e.g., tickets, t-shirts, movies, etc. . . . ) or have a service that costs money be performed. Control logic 36*a* stores in online account information 413*j* reminders about items of programming in which a user expressed interest by making an interactivity activation. Control logic 36*a* uses and stores in personal information 413*k* personal information about the user such as age, music interests, family description, income, marital status, etc. . . . . Personal information is used in targeting ads and music among other purposes. Information in preferences 413*l* indicates to control logic 36*a* the manner in which the user wants to be contacted by advertiser representatives or others. Information regarding past purchase transactions or interactivity activations and pending transactions that have not yet been processed are stored in past transactions 413*m*, and pending transactions 413*n*, respectively. Alert and services information 413*o* indicates the device(s) for which certain types of alerts are to be performed and the manner in which control logic 36*a* is to handle requests for services. For example, by making an interactivity activation during an item of programming that indicates that a user recording device may be programmed, the user may request that recording device 34 be programmed to record material described in the item of programming.

Table 7 illustrates a few actions that may be selected for performance by the user at the time an interactivity activation is made at a BID's user interface in reaction to a song.

TABLE 7

Song Actions

1. Place reminder on user's online account
2. Email reduced quality samples or versions of songs to email address
3. Examine user's profile to determine whether purchase transaction authorized for CD or digital track if interactivity command issued during song the number of times specified in profile
4. Email reminder with links indicating song and related information
5. Send reminder to user's broadcast interactivity device, and optionally allow the user to purchase the song or album by using the reminder The reminder, according to one embodiment, has more information about the song, artist, pricing, and ordering, etc. . . . . At a later time, the user can go online via computer 31, BID 11, BID 800, or any other of the broadcasting interactivity devices described herein and access the reminder to order music and discover more information about the lyrics, artist, and the band. The actions described in Table 7 or similar ones are well known in the art and need not be described in greater detail as to how a server such as server 35 implements them.

Table 8 illustrates a few actions that may be selected for performance by the user at the time an interactivity activation is made at a BID's user interface in reaction to an advertisement.

TABLE 8

Advertisement Actions

1. Send email to user with information about subject matter of ad
2. Send coupon to user
3. Mail user information about subject matter of ad
4. Provide advertiser representative with user telephone contact information to contact user
5. Provide email address to advertiser if interactivity command issued
6. Send coupons to user's device or email address automatically during certain types of commercials
7. Send reminder with advertiser's contact information to user's device In the situation where an item of broadcast programming is an advertisement and the user makes an interactivity activation during the advertisement, but is not limited to, one or more of the following operations: 1) sending an email with more information about an advertisement; 2) sending an electronic coupon to BID 11 or other broadcasting interactivity device described herein and/or the user's email address; 3) send information through the postal system; and 4) have a representative of the advertiser contact the user (e.g., by telephone, or in person) to provide more information.

Table 9 illustrates a few actions that may be selected for performance by the user at the time an interactivity activation is made at a BID's user interface in reaction to a news item.

TABLE 9

News Actions

1. Place reminder(s) regarding news story(ies) on user's online account
2. Email transcript
3. Email additional or background information
4. Email reminder with links to transcript and audio

TABLE 9-continued

News Actions

5. Email similar stories
6. Send reminder to user's communications device

Table 10 illustrates a few actions that may be selected for performance by the user at the time an interactivity activation is made at a BID's user interface in reaction to a presentation by a host, DJ, or talk show.

TABLE 10

Host, DJ, Talk Show Actions

1. Provide email address to broadcaster
2. Provide email address to sponsor
3. Receive promotional information selected by host/DJ without email address being provided to broadcaster
4. Automatic entry into contests
5. Receive real-time feedback from contestants in response to an oral query.
6. Send choices to user and receive real-time feedback.

Table 11 illustrates a few actions that may be selected for performance by the user at the time an interactivity activation is made at a broadcast interactivity device's user interface in reaction to an service announcement or advertisement.

TABLE 11

Service Actions

1. Send alert
2. Perform programming of recording device on behalf of user

With respect to the sending alerts service identified in Table 11, by making an interactivity activation in the appropriate manner at a broadcast interactivity device's user interface, a user may request server 35 to send to an alert to a communications device associated with the user or have a device programmed on behalf of the user. Depending upon the embodiment, the communications device is one or more of, but not limited to the following: broadcast interactivity device BID 700, 800, BID 11, phone 15, computer 31, pager, personal digital assistant, and pocket personal computer.

While driving or otherwise being preoccupied, a user who becomes aware (e.g., because an announcement regarding future programming is presented to the user) of a desirable program to be aired later or action that needs to be taken can make an interactivity activation to request an alert. During presentation of the announcement (e.g., including but not limited to, advertisement, DJ or talk show, presentation, news show), an interactivity activation made at the user interface of, depending upon the embodiment, a broadcast interactivity device described herein causes an information identifier to be sent to server 35. In response to receipt of the information identifier, control logic 36a, depending upon the embodiment, sends an alert to the appropriate device or causes a service to be performed. Depending upon the embodiment, the appropriate device is the broadcast interactivity device from which the information identifier was received, another communications device specified by the user to server 35 via any of the techniques described herein.

A user, for instance, may be tuned to a channel other than one that is associated with the alert that is received. Requiring the user to manually retune may be undesirable in situations where the user is preoccupied, as when driving.

Alerts are described in the context of BID 700, but one of ordinary skill in the art would appreciate that other broadcast interactivity devices described herein include the features described below in an alternative embodiment. When BID 700 receives an alert from control logic 36a, control logic 701a executes the alert at the appropriate time. When an alert indicates that control logic 701a is to change channels, control logic 701a changes, at the time specified in the alert, the channel, depending upon the embodiment, to which receiver 701h or the receiver in multiplexer 71a or frequency detector 70d is tuned. When an alert indicates that an item of programming is to be recorded at a certain time specified in the alert, control logic 701a has a recording unit (not shown) coupled, depending upon the embodiment, to receiver 701h or the receiver in multiplexer 71a or frequency detector 70d record the item at the appropriate time. Depending upon the embodiment, the recording unit is a cassette recorder, compact disc burner, an encoder that digitizes the signal and stores it in storage 701c. In an embodiment, in which the receiver receives a digital signal, the recording unit is simply the combination of control logic 701a and storage 701c.

As indicated above, by making an interactivity activation during an item of programming that indicates that a user recording device may be programmed, the user may request that a recording device such as recording device 34 be programmed to record material described in the item of programming. Recording device 34 is described in greater detail below.

FIG. 3 illustrates a recording device in greater detail according to an alternative embodiment of the present invention. Recording device 414 is representative of recording device 34. Recording device 414 includes a network transceiver 415d. The manner of operation of network transceiver 415d depends upon the network which couples it to server 35, 29a, 29c. In an alternative embodiment, transceiver 415d is an Ethernet controller that communicates in accordance with TCP/IP. By way of transceiver 415d, control logic 415b receives recording programming instructions from control logic 36a of server 35. The recording programming instructions are sent in response to control logic 36a receiving an information identifier indicating that recording device 414 is to be programmed to record material described in a broadcast which caused the user to make an interactivity activation during the broadcast. For example and purely by way of illustration, consider the case where an advertisement indicates that a certain TV or cable channel will broadcast a certain show at a certain time. Instead of having the user go home and using interface 415e program device 414 to record the show, in an alternative embodiment, simply by the user making an interactivity activation during the advertisement an information identifier is produced by the broadcast interactivity device (e.g., BID 700, 800, BID 11, media player 33) and sent to server 35. Based upon the received information identifier, control logic 36a of server 35 identifies in storage 29b the user's device and programming instructions that need to be sent to the user's device. Information about the device and programming instructions are stored in user information 413c for the user from whom the received information identifier is received.

Control logic 36a then sends via TCP/IP networking 36e and communications unit 36f programming instructions to the user's recording device, recording device 414. In an alternative embodiment, device 414 is identified in alert and services information 413o. The programming instructions are sent to an IP address identified for device 414 in information 413o. However, other mechanisms including email messages may be used for communicating between device 414 and server 35. In an alternative embodiment, the programming instructions are received at device 414 via a satellite downlink channel; in which case device 414 includes a satellite receiver or is coupled to one. The programming instructions include, but are not limited to including, indication of channel whose programming device 414 is to record and duration of recording. Control logic 415b receives via transceiver 415d the instructions and stores them in memory 415a or storage 415c and at the appropriate time executes them to record programming received over the air or from a cable television provider. In an embodiment, device 414 receives programming via programming receiver 415f which is coupled to antenna 30f. The programming is transmitted by television station 30c which broadcasts the programming via antenna 30d. However, in an alternative embodiment, receiver 415f receives programming from cable station 30e. One of ordinary skill in the art would appreciate that other types of programming instructions may be caused to be sent in this manner. Other types of programming instructions include: adding information to an address book of a computing or communications device: adjusting controls (anything including but not limited to station presets, graphic equalizer settings, recording instructions, etc. . . . ) of an entertainment device in the car, home, or elsewhere; turn on security lights, among other things.

Irrespective of the source of the programming, based upon the received programming instructions, control logic 415b instructs programming receiver 415f to demodulate the programming for storage in storage 415c. Depending upon the embodiment, storage 415c is, one or more of, but not limited to the following: a tape drive with tape, compact disc burner with disc, magnetic hard disk or some type of flash or random access memory.

FIG. 4 illustrates a broadcast interactivity device presenting a coupon according to an alternative embodiment of the present invention. BID 416 is representative of an, but not the only, embodiment of BID 11, BID 700, BID 800, and media player 33. In such an embodiment, control logic 701a, 801a receives via a communication unit coupled to control logic 701a, 801a information representative of a manufacturer's coupon. In an alternative embodiment, control logic 701a, 801a receives the coupon information in response to sending an information identifier to server 35. Depending upon the embodiment, the communication unit includes one or more of, but not limited to, the following: communication unit 801f, transceiver 701f, receiver 701h, the receiver in multiplexer 71a, the receiver in frequency detector 70d, and RCU 701j. While BID 416 includes a cell phone, in an alternative embodiment, BID 416 does not include a cell phone. By pressing one or more keys such as key 415i on the user interface of BID 11, BID 700, BID 800, and media player 33, the user is able to have control logic 701a, 801a, retrieve the coupon information for a particular coupon from storage 701c, 801d for presentation on a display included in user interface 701d, 801c. For the embodiment represented by BID 416, a coupon 415h in bar code form is presented on the display of BID 416. The user can provide BID 416 to a sales person so that the displayed bar code representation may be scanned.

Referring to FIG. 12b, in an alternative embodiment, instead of BID 700 receiving a geographic location indication from a communications device as described elsewhere herein, BID 800 includes GPS receiver 801h. In such an embodiment, control logic 801a obtains from receiver 801h the indication of geographic location.

In an alternative embodiment, BID 800 includes control logic 801a that is coupled to frequency detection unit 801b. Control logic 801a receives from detection unit 801b an indication of the frequency to which a nearby broadcast receiver is tuned. Control logic 801a provides, depending upon the embodiment, via communications unit 801f the indication of the frequency to another communications device. Examples of communications devices that receive a frequency indication from control logic 801a include, depending upon the embodiment, one or more of, but are not limited to: BID 11, phone 15, media player 33, pocket personal computer, pager, personal digital assistant, computer 31. Depending upon the embodiment, control logic 801a provides the indication of frequency in response to receiving a request from the communications device or provides the indication of frequency without receiving a request.

In an alternative embodiment, control logic 801a is coupled to timer 801e. In such an embodiment, control logic 801a provides a representation of time along with the frequency indication to the communications device. In an alternative embodiment, control logic 801a obtains the representation of time in response to receiving a request from the other communications device. In an alternative embodiment, control logic 801a obtains the time in response to receiving a frequency indication from frequency detection unit 801b.

Depending upon the embodiment, control logic 801a provides to another communications device a frequency indication when 1) BID 800 is first activated and 2) subsequently whenever control logic 801a determines that a frequency indication received from detection unit 801b is different from the one previously provided. In such an embodiment, detection unit 801b is regularly determining the frequency to which a nearby receiver is tuned. Depending upon the embodiment, detection unit 801b provides to control logic 801a a frequency indication after making a frequency determination or provides a frequency indication when a frequency determination indicates that a change has occurred since the last indication that was provided to control logic 801a.

In an alternative embodiment, control logic 801a receives from detection unit 801b at regular intervals an indication of frequency to which a nearby receiver is tuned. Depending upon the embodiment, control logic 801a provides the indication of frequency to the communications device when a change in frequency has occurred or whenever a frequency indication is received.

As described elsewhere herein, control logic 41f, 51c, 61f, 69a, 69h, 69i, 71e, 73h, in its respective embodiments produces an information identifier based on a frequency or channel indication. The information identifier is generated in response to an interactivity activation at a user interface. Examples of interactivity activations include, but are not limited to, activations of button 13a or key 73r. In an alternative embodiment, an interactivity activation is an activation of a combination of keys: for example, including, but not limited to, any two, three, four or more combination of key presses on a key pad or voice activations directed to a voice recognition engine in a user interface. One of ordinary skill in the art would appreciate that in an alternative embodiment an information identifier is not generated based on a frequency indication. In an alternative embodiment, an information identifier is received by the control logic from a receiver coupled to the control logic. Depending upon the embodiment, the receiver is a unit of a transceiver, or, alternatively, a broadcast reception receiver.

As described elsewhere herein, control logic 41f, 51c, 61f, 69a, 69h, 69i, 71e, 73h, in its respective embodiments produces an information identifier based on a frequency or channel representation. The information identifier is generated or identified based upon an interactivity activation at a user interface. Examples of interactivity activations include, but are not limited to, activations of button 13a or key 73r.

Furthermore, as described above server 35 performs services based upon the information identifier produced by the various embodiments described herein. In an alternative embodiment, however, the services are partially or fully performed in a broadcast interactivity device. For example, for a desirable song heard on a broadcast reception device, instead of obtaining a copy of a song from server 35 in response to a broadcast interactivity device sending an information identifier to server 35, a copy of the song is obtained from storage included in the broadcast interactivity device. The present invention is not limited to providing 'local interactivity' just for songs. Depending upon the embodiment, other items of interest include, but are not limited to: transcripts of shows, information related to advertisers, and information related to products or services advertised. Furthermore, functions may be performed at the device in response to an interactivity activation.

FIG. 13a illustrates a broadcast interactivity device according to an alternative embodiment of the present invention. BID 700 is representative of multiple broadcast interactivity devices that can be implemented in accordance with various embodiments of the present invention. The dashed lines in FIG. 13a identify the optional units that are, depending upon the embodiment, coupled to control logic 701a. That one or more optional units are coupled to control logic 701a is not to mean that a particular implementation's control logic 701a is capable of being coupled to any optional unit. Rather, for an implementation of an embodiment, control logic 701a is only capable of operating in conjunction with the optional unit or optional units with which it is designed to operate. However, in an alternative embodiment, control logic 701a is capable of operating with all the optional units even though less than all the optional units are coupled to control logic 701a.

As indicated above, interactivity, depending upon the embodiment, is sometimes based upon the generation of an information identifier. The generation of an information identifier in the various embodiments of BID 700 is described herein. Furthermore, the information (e.g., including but not limited to, copies of songs, advertiser information, coupons . . . ) that satisfies an interactivity activation that causes an information identifier to be produced, depending upon the embodiment, arrives at storage 701c by one of several mechanisms. That the information arrives by one of several mechanisms does not mean that every implementation or every embodiment must support all the several mechanisms. Generation of an information identifier in accordance with the various embodiments, receipt of information that satisfies an interactivity activation, and satisfaction of the interactivity activation are described herein in the context of the description of various implementations of BID 700.

In an alternative embodiment, BID 700 includes receiver 701h that is coupled to antenna 701i and control logic 701a. In such an embodiment, broadcast RF signals arrive at antenna 701i and are demodulated by receiver 701h into audio signals for presentation by speaker 701k. Certain user activations accepted via user interface 701d result in frequency control indications being provided to control logic 701a. Based upon the frequency control indications, control logic 701a sets the frequency to which receiver 701h is tuned and maintains in memory (not shown in FIG. 13a) an indication of the frequency to which receiver 701h is tuned. When an interactivity activation is accepted at interface 701d, control logic 701h obtains a representation of the present time from timer 701b. Control logic 701a then uses the present time and the stored frequency indication to satisfy the interactivity activation as described below. In an alternative embodiment, control logic 701a also uses an indication of geographic location to satisfy the interactivity activation. The various mechanisms for obtaining a geographic location indication are described herein and are incorporated herein by reference for the foregoing alternative embodiment and alternative embodiments of any embodiments described in connection with BID 700. If one or more additional units need to be added to an alternative embodiment of BID 700 (e.g., global positioning system receiver, user interface, or transceiver 701f) to provide the geographic location functionality, the description(s) provided elsewhere of such one or more additional units is incorporated into the alternative embodiment's description as necessary.

With respect to all the embodiments described, one of ordinary skill in the art would appreciate that, in an alternative embodiment, user activations are accepted via transceiver 701f rather than interface 701d which is not included in such an embodiment, or alternatively activations are accepted by either interface 701d and transceiver 701f because both of them are included in such an alternative embodiment. This description of alternative mechanisms for accepting user activations will not be repeated herein with respect to other embodiments of BID 700, meaning that such description is an alternative embodiment to whatever embodiment is being described.

In an alternative embodiment, receiver 701h is a digital audio broadcast receiver which receives both programming and data. Depending upon the embodiment the programming and data may be received separately on separate channels or collectively on a single channel. In such an embodiment, the data stream is provided to control logic 701a. The data stream includes one or more identifiers associated with the items being received for presentation by receiver 701h. In an alternative embodiment, in addition to identifiers, the data stream includes information that is used by control logic 701a to satisfy interactivity activations.

In an alternative embodiment, BID 700 includes multiplexer 71a that is coupled to antennas 71b, 71f and control logic 701a. In such an embodiment, broadcast RF signals arrive at antenna 71b and are demodulated by receiver 71c (see FIG. 7p) in multiplexer 71a into audio signals for presentation by speaker 701k. Certain user activations accepted via user interface 701d result in frequency control indications being provided to control logic 701a. Based upon the frequency control indications, control logic 701a sets the frequency to which receiver 71c and the frequency to which transmitter 71d is tuned. When an interactivity activation is accepted at interface 701d, control logic 701h obtains a representation of the present time from timer 701b. Control logic 701a then uses the present time and the stored frequency indication to satisfy the interactivity activation as described below. In an alternative embodiment, control logic 701a also uses an indication of geographic location to satisfy the interactivity activation.

In an alternative embodiment, BID 700 includes multiplexer 71a that is coupled to antennas 71b, 71f and control logic 701a. In such an embodiment, broadcast RF signals arrive at antenna 71b and are demodulated by receiver 71c (see FIG. 7p) in multiplexer 71a into audio signals for presentation by speaker 701k. Certain user activations accepted via user interface 701d result in frequency control indications being provided to control logic 701a. Based upon the frequency control indications, control logic 701a sets the frequency to which receiver 71c and the frequency to which transmitter 71d is tuned. Both frequencies are stored in memory in control logic 701a. When an interactivity activation is accepted at interface 701d, control logic 701h obtains a representation of the present time from timer 701b. Control logic 701a then uses the present time and the stored frequency indication for receiver 71c to satisfy the interactivity activation as described below. In an alternative embodiment, control logic 701a also uses an indication of geographic location to satisfy the interactivity activation.

In an alternative embodiment, BID 700 includes frequency detector 70d that is coupled to control logic 701a. When an interactivity activation is accepted at interface 701d, control logic 701h obtains a representation of the present time from timer 701b and control logic 701h commands frequency detector 70d to detect the frequency to which a nearby broadcast reception device is tuned. Control logic 701a then uses the present time and the frequency indication received from detector 70d to satisfy the interactivity activation as described below. In an alternative embodiment, control logic 701a also uses an indication of geographic location to satisfy the interactivity activation.

In an alternative embodiment, BID 700 includes radiated tuning signal receiver and characterization unit (RCU) 701j that is coupled to control logic 701a. When an interactivity activation is accepted at interface 701d, control logic 701h obtains a representation of the present time from timer 701b and control logic 701h commands RCU 701j to detect a nearby broadcast reception device's radiated tuning signal to determine the frequency to which the nearby broadcast reception device is tuned. Control logic 701a then uses the present time and the frequency indication received from RCU 701j to satisfy the interactivity activation as described below. In an alternative embodiment, control logic 701a also uses an indication of geographic location to satisfy the interactivity activation. RCU 701j is representative of RCU 40, 52, 62 described above.

In an alternative embodiment, BID 700 includes both RCU 701j and frequency detector 70d. In such embodiment determination of the frequency to which a nearby broadcast reception device is tuned is determined in accordance with the description made in connection with FIG. 7n.

In an alternative embodiment, via transceiver 701f, control logic 701a receives from a nearby broadcast reception device, an indication of the frequency to which the broadcast reception device is tuned. When an interactivity activation is accepted at interface 701d, control logic 701h obtains a representation of the present time from timer 701b and control logic 701h requests, via transceiver 701f, the broadcast reception device to provide an indication of the frequency to which the broadcast reception device is tuned. Control logic 701a then uses the present time and the received frequency indication to satisfy the interactivity activation as described below. In an alternative embodiment, control logic 701a also uses an indication of geographic location to satisfy the interactivity activation.

As indicated elsewhere herein, having a schedule or schedule including action instructions (collectively scheduling information) allows a server 29a to perform services on behalf of a user of an interactivity device. Similarly presence of a schedule at BID 700 allows the same services to be performed. How the schedule arrives at BID 700 so that control logic 701a can use it to perform services on behalf of the user is immaterial to the present invention. Nevertheless, several mechanisms by which scheduling information arrives in various embodiments are described herein. One of ordinary skill in the art would appreciate that the mechanisms for receiving the scheduling information are also the mechanisms, depending upon the embodiment, for receiving information that allows control logic 701a to identify information that is used by control logic 701a to satisfy an interactivity activation or for receiving information that is stored in storage 701c and that is used by control logic 701a to satisfy the interactivity activation. The use of the mechanisms for receiving scheduling information is described below, followed by a description of the same mechanisms being used, depending upon the embodiment, for other purposes, such as providing identification information used in satisfying interactivity activations, and information that satisfies interactivity activations.

In an alternative embodiment, control logic 701a accepts from transceiver 701g schedules for one or more broadcasters for storage in storage 701c. In an alternative embodiment schedules or fractions thereof are received by receiver 701h via data transmitted on a subcarrier channel tuned by receiver 701h. In one embodiment, the demodulated subcarrier data signal is provided by receiver 701h to control logic 701a for decoding. Control logic 701a stores the decoded scheduling data in storage 701c. In an alternative embodiment, receiver 701h itself decodes the data transmission and provides the decoded data to control logic 701a for processing and storage in storage 701c. Transmitting, receiving, and decoding data transmission on a subcarrier channel are operations that are understood well by those skilled in the art and need not be described in greater detail herein.

In an alternative embodiment, to obtain the scheduling data, instead of demodulating a subcarrier data signal receiver 701h demodulates a radio broadcast data system (RBDS) signal or a data radio channel (DARC) signal. RBDS is referred to as radio data system (RDS) in Europe. There are minor differences between the two In an alternative embodiment, the scheduling information is sent in the radio text (RT) field of an RBDS signal. The RT field is typically used for free-form textual information that can be either static e.g. station slogans or in sync with the programming such as the title and artist of the currently-playing song. However, in an alternative embodiment, an uncommon combination of text letters (e.g., "?@") is used to delimit the RT field into two portions: a first portion containing the typical free-form textual information; and a second portion containing the scheduling information.

FIG. 13b illustrates the baseband spectrum of a frequency modulated signal, including mono signal, stereo signal, subcarriers and radio data service signal, in the United States commercial FM band. Spectrum 702 includes mono signal 703a that is typically the sum of the left and right stereo signals. Pilot tone 703b at 19 KHz is recovered by broadcast reception devices after reception and multiplied by two to create a 38 KHz carrier which is used to demodulate L-R stereo signal 703c. RBDS 703d is a radio data system signal that is described above. Subcarriers 703e, 703f are often used to transmit uninterrupted background music for stores, offices, and restaurants. However, they are also used to transmit traffic information, voice mail, paging information, data, and graphics. DARC is a 76 KHz subcarrier signal service that is popular in Japan and Sweden. The manner in which information such as that in DS 1 is coded and modulated onto a subcarrier signal and transmitted to receivers for reception is well known in the art and need not be described in greater detail herein.

In an alternative embodiment, receiver 701h receives scheduling data over a digital data channel that is part of a digital audio broadcast (DAB) in accordance with a DAB standard. Scheduling data is provided to control logic 701b for storage in storage 73f. Examples of a DAB standard include Europe's Eureka, and the United States In-Band-On-Channel (IBOC) standard which is promoted by Lucent Technologies of Cherry Hill, N.J. However, receiver 701h is not limited to operating in accordance with these two DAB standards or any other DAB standard. How, in an alternative embodiment, receiver 701h would receive, demodulate, and decode a DAB data channel is well understood in the art and need not be described in greater detail herein. One of ordinary skill in the art would appreciate that scheduling data need not be received by receiver 701h on a data channel that is exclusive to a certain broadcaster, but may received on a channel that is shared by multiple broadcasters in a digital broadcasting system. In the Eureka DAB system, data may be sent in stream and packet mode. In stream mode, data is typically sent as it is received from a broadcaster. In packet mode, however, data is broken into packets each of which has an address that is associated with a particular broadcaster. When a DAB receiver is tuned to the channel of a broadcaster, the stream data is decoded and presented as audio, and the packet data is filtered for the packets whose address is associated with the broadcaster. The filtered packets are then decoded and the information in them recovered and used by the receiver.

Figure 13C:
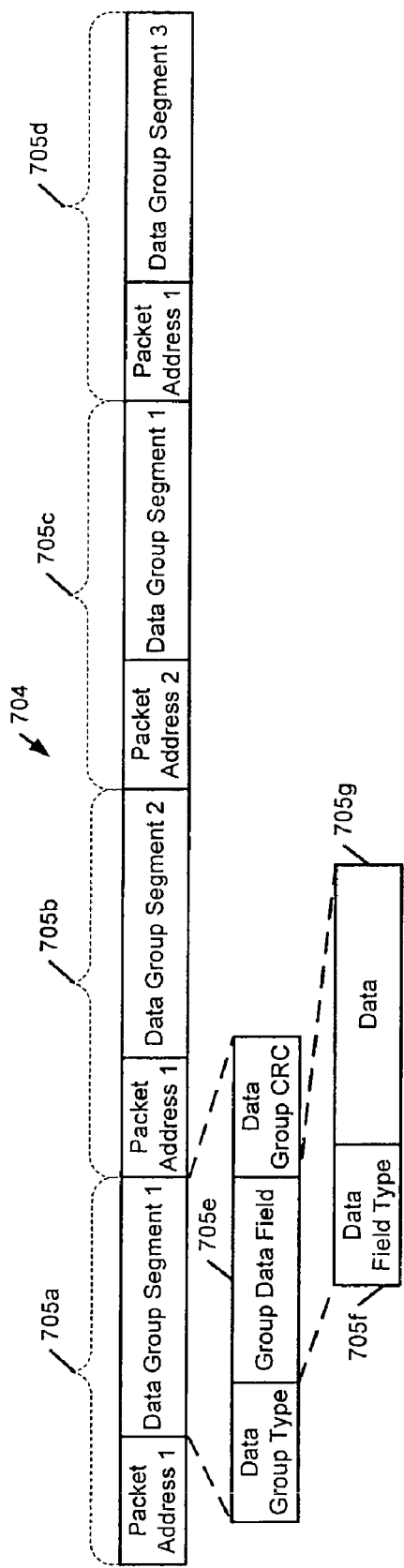
FIG. 13c illustrates a several packets in a data packet stream in a digital audio broadcast signal according to an alternative embodiment of the present invention.

FIG. 13c illustrates a several packets in a data packet stream in a digital audio broadcast signal according to an alternative embodiment of the present invention. Packet stream 704 includes packets 705a-705d. Each packet has a packet address field. The packet address field is associated with a broadcaster or service provided by the DAB system. Packets 705a, 705b, 705d are associated with a broadcaster having the address "Packet Address 1," and packet 705c is associated with a broadcaster having the address "Packet Address 2." As illustrated in FIG. 13c, the packets for a certain broadcaster need not be contiguous but may be separated by the packets of another broadcaster or service. Each packet 705a-705d includes a data group segment containing data. The data can be anything including, but not limited to, graphics, music clips, conditional access information granting or forbidding access to programming, complete songs, software, advertisements, coupons, voice mail, faxes, or paging message from a paging system. The data group segment comprises a group data field 705e with a type field and a cyclic redundancy check field. The entry for type field indicates the type of data (e.g., general data, entitlement data, conditional access parameters, etc. . . . ) held in the entry for group data field 705e. Group data field 705e includes data type field 705f and data 705g. The entry for data type field 705f identifies the type of data in data 705g. Depending upon the embodiment, the entry for data type field 705f includes a code that indicates whether the entry for data 705g is one of, but not limited to the following: scheduling information; item indicators that are used in connection with control logic 701a satisfying interactivity activations, information that control logic 701a uses to satisfy interactivity activations; one of the foregoing, two of the foregoing; or all three of the foregoing.

While in the foregoing description the packet data channel supported transmission of data for multiple broadcasters, one of ordinary skill in the art would appreciate that a broadcaster may have its own dedicated channel as in the IBOC system in the US, in which case packet addresses each of which is associated with a unique broadcaster is unnecessary in an alternative embodiment. Furthermore, one of ordinary skill in the art would appreciate that the data described in connection with group data field 705e of FIG. 13c is transmitted, in an alternative embodiment, on a standard FM subcarrier that is part of an FM broadcast signal that includes an analog FM stereo or mono signal.

One of ordinary skill in the art would also appreciate that scheduling information, identification information, and information that satisfies an interactivity activation, may also be received by receiver 701h as program-associated-data (PAD) that is received along with a frame of coded audio data. How, in an alternative embodiment, receiver 701h receives, demodulates, and decodes PAD and provides it to control logic 73h is well understood by those skilled in the art and need not be described in greater detail herein. Nevertheless, the organization, in a digital radio frame of the DAB Eureka system, of an MPEG I audio layer II audio frame bearing information used in alternative embodiments of the present invention is described below in connection with FIG. 13d. One of ordinary skill in the art would appreciate that the digital radio frame in another system, such as IBOC or another system, will be organized differently but that essentially any system that operates in accordance with an embodiment will incorporate the basic features described below in connection with FIG. 13d.

Figure 13D:
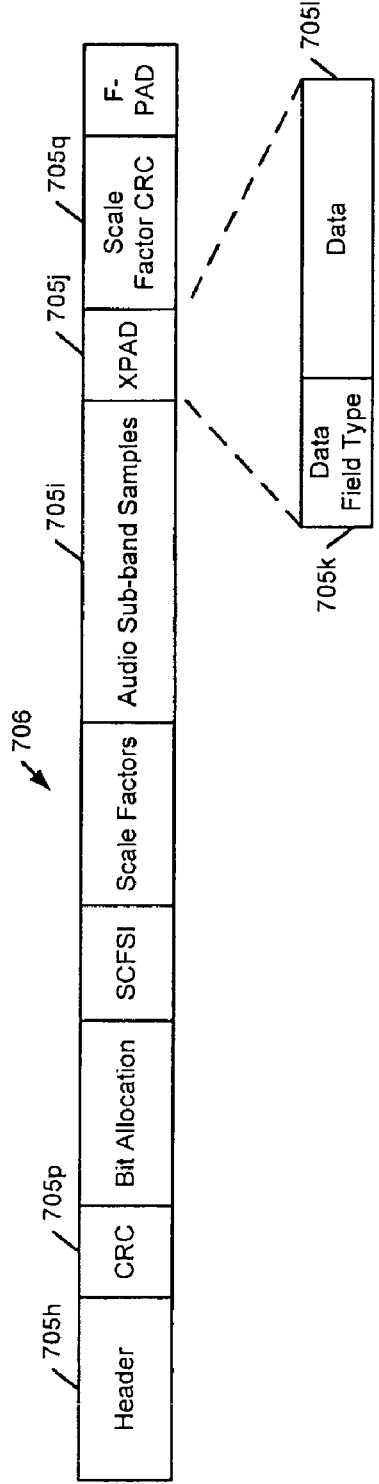
FIG. 13d illustrates an MPEG audio layer II audio frame in a digital radio frame.

FIG. 13d illustrates an MPEG audio layer II audio frame in a digital radio frame. Frame 706 includes header 707a that contains information about synchronization, layer type, bit rates, sampling rates, mode (stereo, mono, etc. . . . ) and pre-emphasis. Header 707a is followed by additional units of information including audio samples 705i, and extended program associated data 705j. Program associated data includes, but is not limited to including, information related to the item (i.e., program being presented as consequence of decoding the audio samples 705i) being presented, or additional data unrelated to the item. PAD 705j includes, but is not limited to including data type field 705k and data 705l. Depending upon the embodiment, the entry for data type field 705k includes a code that indicates whether the entry for data 705l includes one of, but not limited to the following: scheduling information; item indicators that are used in connection with control logic 701a satisfying interactivity activations, information that control logic 701a uses to satisfy interactivity activations; one of the foregoing, two of the foregoing; or all three of the foregoing. When a data segment, such as a file or multimedia object is broken up across several entries for PAD 705j each which resides in its own digital radio frame, PAD 705j includes a data segment length field that indicates the number of PAD 705j entries in the segment, and a record field indicative of the position of the PAD 705j entry in the group of entries that make up a data segment.

One of ordinary skill in the art would appreciate that scheduling data may also be stored in unused bits of the coded digital audio stream itself. In such an alternative embodiment, the decoding of the audio stream yields the scheduling data. One of ordinary skill in the art would appreciate how receiver 701h, in an alternative embodiment, decodes the audio stream and extracts the scheduling information.

In an alternative embodiment, receiver 701h receives data for a schedule via sub-audible tones that are transmitted along with the digital or analog programming signal produced by a broadcaster's transmission system. Generation of sub-audible tones and decoding of sub-audible tones is well understood by those skilled in the art and need not be described in greater detail herein.

In an alternative embodiment, receiver 701h receives scheduling data via an audio spread spectrum signal that is added to the audio programming signal before transmission of the combined signal. In such an embodiment, receiver 701h includes a spread spectrum audio receiver that extracts the scheduling data signal that is hidden in the audio signal. Receiver 701h provides the scheduling data to control logic 701a for storage in storage 701c. While the audio programming signal is analog according to one embodiment, one of ordinary skill in the art would appreciate that a spread spectrum digital signal may also be added to a digital audio signal in an alternative embodiment.

One of ordinary skill in the art would appreciate that receiver 701*h*'s receipt of the scheduling information need not be performed by receiver 701*h*. Rather, in an alternative embodiment, a broadcast reception device receives the information and provides the information, via transceiver 701*f*, to control logic 701*a* for storage in storage 701*c*. Additionally, one of ordinary skill in the art would appreciate that the scheduling information may also be received by RCU 701*j*, or the receiver of frequency multiplexer 71*a*, all of which are described elsewhere herein, and provided to control logic 701*a*.

One of ordinary skill in the art would appreciate that, in an alternative embodiment, to each of any of the embodiments described herein, a receiver demodulates two or more separate channels simultaneously. Scheduling information or other information as described herein is received on one or more channels, and programming (e.g., audio, video, etc. . . . ) for real-time presentation is received on another channel. Motorola, Inc. of Schaumberg, Ill. produces a chip set, Symphony™ that allows one channel to be demodulated and presented to a listener while another channel is demodulated and processed in alternative manner (e.g., recorded, data extracted, etc. . . . ). While the Symphony™ chip set facilitates digital processing of signals, the same is done using completely analog processing in an alternative embodiment. By demodulating more than one channel, BID 700, in an alternative embodiment, is able to collect scheduling information and other information for channels other than the one which is presenting the programming being experienced by the user.

One of ordinary skill in the art would appreciate that the mechanisms for receiving the scheduling information are also mechanisms, depending upon the embodiment, for receiving identification information that allows control logic 701*a* to identify information, that control logic 701*a* uses to satisfy an interactivity activation or for receiving information that is stored in storage 701*c* and that is used by control logic 701*a* to satisfy the interactivity activation. Depending upon the embodiment, the identification information is an item indicator which is metadata (e.g., song title), or alternatively, a code associated with the item being presented, or both. Depending upon the embodiment, the received information that control logic 701*a* uses to satisfy the interactivity activation includes, but is not limited to: copies of songs or other items presented, advertiser information, and coupons.

As described herein, depending upon the embodiment, BID 700 includes a unit (e.g., multiplexer 71*a*, detector 71*d*, RCU 701*j*) that is dedicated to determining the frequency of a nearby broadcast reception device, receives a frequency indication via transceiver 701*f*, or control logic 701*a* stores an indication of the frequency to which receiver 701*h* is tuned. In an alternative embodiment, instead of creating an information identifier using a time stamp, or, alternatively, a time stamp and frequency indication, a receiver coupled to control logic 701*a* provides an item indicator that is associated with the item being presented by a receiver. Depending upon the embodiment, the receiver coupled to control logic 701*a* is a broadcast reception device that is coupled via transceiver 701*f* or one of receiver 701*h*, receiver in multiplexer 71*a*, and RCU 701*j*. Depending upon the embodiment, the receiver doing the presentation is a broadcast reception device that is coupled via transceiver 701*f* or one of receiver 701*h*, receiver in multiplexer 71*a*, and RCU 701*j*. Depending upon the embodiment, the receiver coupled to control logic 701*a* is either the same as the receiver doing the presentation or, alternatively, different from the receiver doing the presentation.

The item indicator(s) provided by, depending upon the embodiment, one of the receivers that is described above as being coupled to control logic 701*a* are stored in storage 701*c* or in memory in control logic 701*a*. Control logic 701*a* uses a stored item indicator to identify information in storage 701*c* that will satisfy an interactivity activation. Depending upon the embodiment, the item indicator used by control logic 701*a* in connection with satisfying an interactivity activation need not be the same as the one described in connection with DS 139, DS 150, DS 152, and other data structures described herein, but it may be. In response to an interactivity activation at user interface 701*d*, control logic 701*a* selects the item indicator that is associated with the item being presented. The technique by which an item indicator is selected depends upon the embodiment.

In an embodiment, in which the item indicator associated with an item being presented by a receiver arrives at the receiver coupled to control logic 701*a* while the item is being presented, the item indicator is provided by the coupled receiver to control logic 701*a* to store in software construct or variable CurrentItemIndicator in memory in control logic 701*a* or in storage 701*c*. Depending upon the embodiment, the item indicator arrives in PAD 705*j*, in a packet channel described above, or on one of the following: RDS, RBDS, DARC, subcarrier, spread spectrum signal embedded in the audio signal being presented, or sub-audible tones embedded in the audio signal.

FIG. 13*e* illustrates, according to an alternative embodiment of the present invention, a temporary storage space that includes information related to an item of programming that is being presented. Interactivity activation information storage space 707 depending upon the embodiment, is located in one or more of the following: memory space included in control logic 701*a*, memory space accessible to control logic 701*a*, or separately in storage 701*c*. When control logic 701*a* receives an item indicator for an item being presented, control logic 701*a* stores the item indicator in CurrentItemIndicator 705*m*.

When an interactivity activation is accepted at user interface 701*d*, control logic 701*a* receives an indication of the activation. In an alternative embodiment, an interactivity activation is made by the user activating key 73*r*, or alternatively button 13*a*. However, the present invention is not limited to interactivity activations being made using a key such as key 73*r*, button 13*a*, or an interface such as interface 73*i*.

When control logic 701*a* receives an indication of the activation, control logic 701*a* retrieves the item indicator value from CurrentItemIndicator 705*m*. Based upon the retrieved value, control logic 701*a* identifies an item in storage 701*c* that satisfies the interactivity activation. For example, the item indicator may point to a song and the song is set aside and a record is made of the user's interest in the song in user items of interest 705*r*. At a later time, the user using interface 701*d* may examine the records in items of interest 705*r* and perform a purchase transaction, when the item is a song, or alternatively may examine information that was stored as a consequence of making the interactivity activation. A case when the latter situation holds, occurs when, but is not limited to occurring when, the interactivity activation is made during an advertisement. In such a case, the retrieved item indicator value points to advertiser related information including one or more of, but not limited to the following: address, telephone number, uniform resource locator (URL), coupon, etc. . . . ). At a later time, the user using interface 701*d* may examine the records in items of interest 705*r* and retrieve the advertiser related information. Depending upon the embodiment, the user can have the coupon displayed in bar code format, or, alternatively the number displayed on a display (not shown) that is part of interface 701*d*. Displaying graphics include bar codes on a display is well known in the art and need not be described in greater detail herein.

Depending upon the embodiment, the item indicator value stored in CurrentItemIndicator 705*m* points to both an item or information that satisfies the interactivity activation as well as instructions for control logic 701*a* to execute in order to satisfy the interactivity activation. Depending upon the embodiment, the instructions include one or more of, but are not limited to, the following: record an item on a certain channel at a certain time; change channels to a channel specified in the information pointed to by the item indicator value; ring an alarm (not shown) at a certain time in order remind the user to do something that is described on the display of interface 701*d*, have control logic 701*a* monitor a data stream or messages (depending upon the embodiment, one or more but not limited to the following—PAD, packet channel, subcarrier channel, RDS, RBDS, DARC, sub-audible data, or spread spectrum data signal in the audio signal, etc.) being received from a coupled receiver or transceiver 701*g* for the occurrence of a keyword identified in the information pointed to by the retrieved item indicator value and to perform an action specified in the information, where the action includes switching channels if necessary, recording an item, etc. . . . .

In an alternative embodiment, the interactivity activation is one or more key activations. For example, the user presses "*1" and based upon the key activation combination control logic 701*a* identifies information in storage 701*c* that satisfies the interactivity activation. In such an embodiment, at least some of the information stored has an associated field which holds a key combination. Control logic 701*a* compares the key combination of at least some of the stored information with the key combination that is due to the interactivity activation. When control logic 701*a* identifies a match, control logic 701*a* uses the information associated with the key combination with which there is a match. Referring to FIG. 13*e*, key combination data structure 710 includes key combination field 705*n* and information field 705*o*. By comparing the key combination of an interactivity activation with the entries in key combination field 705*n*, control logic 701*a* identifies the information entry in information field 705*o* that satisfies the interactivity activation.

In an alternative embodiment, the interactivity activation is one or more key activations and based upon the key activation combination and the time the key activation combination was made control logic 701*a* identifies information that satisfies the interactivity activation. In such an embodiment, at least some of the information stored has an associated field which holds a key combination and a validity time period. For a stored information unit to be selected the key combination in the associated field and the key combination activation must match and the time when the key combination activation occurred must fall within the validity time period. One of ordinary skill in the art would appreciate that in such an embodiment, DS 710 includes an additional field that hold time entries each of which is associated with an associated key combination entry and information entry pair.

In an alternative embodiment, the item indicator is retrieved from a schedule such as DS 1, or DS 150 or a play list. To identify the item indicator associated with an interactivity activation received at interface 701*d*, control logic 701*a*, in response to an interactivity indication received from interface 701*d*, retrieves a present time indication from timer 701*b*. If or when the schedule or play list of more than one broadcaster is used, control logic 701*a* also uses a frequency indication of the channel tuned by a nearby receiver or a receiver coupled to control logic 701*a*. Based upon the frequency indication, if or when necessary, control logic 701*a* identifies the schedule associated with the tuned channel. Based upon the present time indication, control logic 701*a* identifies in the identified scheduled the record whose associated timeslot includes the present time indication, and retrieves from the record the item indicator associated with the item being presented. Control logic 701*a*, depending upon the embodiment, performs one or more of the operations described above in connection with an item indicator that is received in a data stream or message.

One of ordinary skill in the art would appreciate that item indicators, depending upon the embodiment, arrive in groups in anticipation of future items being received, item indicators are identified in a data structure based upon the combination of time of activation of a key and activation of the same or different key.

Depending upon the embodiment, control logic 701*a* receives information that is, used to satisfy interactivity activations by the same mechanisms by which item indicator(s) are received by control logic 701*a* for storage in storage 701*c*. Depending upon the embodiment, control logic 701*a* receives scheduling information by the same mechanisms by which item indicator(s) are received by control logic 701*a* for storage in storage 701*c*.

One of ordinary skill in the art would appreciate that, in an alternative embodiment, a receiver coupled to control logic 701*a*, such as RCU 701*j* or a receiver of multiplexer 71*a*, is instructed by control logic 701*a* to identify the frequency to which a nearby broadcast reception receiver is tuned and then to tune that same frequency (i.e., channel) or, alternatively a separate corresponding data channel, in order to obtain from a data signal, depending upon the embodiment, scheduling information, identification information for identifying information for satisfying interactivity activations or information for satisfying interactivity activations.

Alternatively, depending upon the embodiment, RCU 701*j* or a receiver of multiplexer 71*a*, identify the frequency to which a nearby broadcast reception receiver is tuned and provide an indication of that frequency either to control logic 701*a* to provide to receiver 701*h* or, alternatively, directly to receiver 701*h*. In response to receiving the frequency indication, receiver 701*h* tunes to the frequency which is represented by the frequency indication, or, alternatively, a corresponding data channel, at which receiver 701*h* demodulates and decodes, or just demodulates, a data signal. Depending upon the embodiment, the data signal includes, but is not limited to, one or more of the following: scheduling information, identification information for identifying information for satisfying interactivity activations or information for satisfying interactivity activations. Depending upon the embodiment, one or more of the foregoing types of information is stored in storage 701*c*.

In an alternative embodiment, control logic 701*a* retrieves from removable storage (e.g., electronic memory, magnetic storage), depending upon the embodiment one or more of the following: scheduling information, identification information for identifying information for satisfying interactivity activations, and information for satisfying interactivity activations.

As described herein in connection with FIG. 2*c*, control logic 701*a* satisfies the interactivity activation by obtaining information (song, advertiser information, instructions for actions etc. . . . ) from storage 701*c*. One of ordinary skill in the art would appreciate that the actions and services described above in connection with FIG. 2*c* are adaptable to the various implementations of BID 700 and any of the other interactivity devices described herein. For instance, actions that involve providing information to the user on an online account are provided to the user via interface 701*d* by control logic 701*a*. Similarly coupons and advertiser information are retrieved from storage 701*c* and provided to the user pursuant to an interactivity activation. Depending upon the embodiment, when an interactivity activation cannot be satisfied locally, control logic 701*a* sends the indicator or information identifier associated with the interactivity activation to server 35 for satisfaction. Depending upon the embodiment and the action or service, control logic 701*a* receives information (e.g., song, advertiser information, coupon, etc. . . . ) from server 35 that satisfies the interactivity activation.

In an alternative embodiment, control logic 701*a* is coupled to decoder 701*l*, and decoder 701*l* is coupled to storage 701*c* and speaker 701*k*. In such an embodiment, control logic 701*a* instructs decoder 701*l* to retrieve items stored in storage 701*c* and present them by way of speaker 701*k*. One of ordinary skill in the art would appreciate that a speaker, such as speaker 701*k*, is not the only way to present material to a user of any of the broadcast interactivity devices described herein. In an alternative embodiment to any of the broadcast interactivity devices or media customization devices described herein, depending upon the embodiment, a display or other sensory communications apparatus (e.g., one providing tactile or olfactory sensations) is coupled to the control logic of the broadcast interactivity device described herein or alternatively a display or other sensory communications apparatus is part of the user interface. In an alternative embodiment, BID 700 includes a display as part of user interface 701*d*, or alternatively a display (not shown) is coupled to control logic 701*a*. Media customization devices are described elsewhere herein. For now it is sufficient to know that media customization devices customize presentation of programming received via a receiver such as receiver 701*h*, customize presentation of play lists whether received from a server such as server 35 or from the broadcast interactivity device or media customization device of a user, or customize both broadcast programming and play lists. As described in greater detail elsewhere herein, the processes of identifying unsuitable items in a schedule or play list or identifying suitable substitute items, or both, depending upon the embodiment, are performed exclusively by control logic 36*a* of server 35, exclusively by a broadcast interactivity device, such as BID 700, 800, or media customization device, or are shared processes. There are at least three alternative embodiments regarding the division of customization processes among server 35*a* and a broadcast interactivity device or media customization device. In an alternative embodiment, control logic 36*a* of server 35 performs the identification of unsuitable items for a particular user and provides indication of such to control logic 701*a* allowing control logic 701*a* to focus on identifying suitable substitute items in storage coupled to logic 701*a*. In an alternative embodiment, server 35*a* performs both the identification of unsuitable items and the identification of suitable items, but does not do that for, depending upon the embodiment, all schedules and play lists, and allows control logic 701*a* to perform such processes for, depending upon the embodiment, at least some schedules or some play lists.

Depending upon the embodiment in which a speaker is included, control logic 701*a* presents items according to a play list received from server 35. Depending upon the embodiment, the play list includes item indicators for one or more of, but not limited to, the following: songs, ads, miscellaneous information, talk shows, recorded books, video clips, and other visual, graphical, textual, or audiovisual material. Depending upon the embodiment, the play list is customized in accordance with one of the techniques described herein, whether real-time customization or non real-time customization. Depending upon the embodiment, the play list arrives at control logic 701*a* largely customized and requiring limited customization, or alternatively requires no customization. One of ordinary skill in the art would appreciate that customization capability may be added as an alternative embodiment to any of the broadcast interactivity devices described herein.

Furthermore, one of ordinary skill in the art would appreciate that customization of play lists or schedules does not require a frequency multiplexer such as frequency multiplexer 71*a*. According to an alternative embodiment, control logic 701*a* of BID 700 customizes, depending upon the embodiment, a play list or schedule stored in storage 701*c*, by either letting the programming received by receiver 701*h* be applied to speaker 701*k* or the output of decoder 701*l* be applied to speaker 701*k*, but generally not both simultaneously. For any of the embodiments involving customization described herein, when there is an emergency broadcast and the control logic receives an indication of the emergency broadcast whether due to an audible or sub-audible tone or some other technique, the control logic, depending upon the embodiment, either interrupts the item being presented by the decoder and presents the emergency broadcast being received by the receiver or lowers the volume on the item being presented by the decoder and simultaneously presents the emergency broadcast at a relatively higher volume than that of the item being decoded. For an alternative embodiment of BID 700, when control logic 701*a* receives an indication of the emergency broadcast whether due to an audible or sub-audible tone or some other technique, control logic 701*a* either interrupts the item being presented by decoder 701*l* and presents the emergency broadcast being received by receiver 701*h* or, alternatively, lowers the volume on the item being presented by decoder 701*l* and simultaneously presents the emergency broadcast at a relatively higher volume than that of the item being decoded.

The programming received by receiver 701*h* is applied to speaker 701*k* when the programming is acceptable to the user. When the programming received by receiver 701*h* is unacceptable to the user, control logic 701*a* has decoder 701*l* decode an item in storage 701*c* for presentation by speaker 701*k*. Depending upon the embodiment, the item selected by control logic 701*a* is either one defined by a customization process executed by server 35 or defined by a customization process executed by control logic 701*a*. For instance in an alternative embodiment, control logic 701*a* receives from server 35 via transceiver 701*f*, depending upon the embodiment, a schedule for programming to be received by receiver 701*h* and substitute items specific for the user of BID 700, or, alternatively, a general play list common to several users and substitute items specific for the user of BID 700. In such embodiments, the process of identifying unsuitable items in a schedule or play list and identifying suitable substitute items is performed by server 35. Depending upon the embodiment, control logic 701*a* alternates between allowing the programming received by receiver 701*h* or an item decoded by decoder 701*l* to be presented by speaker 701*k*, or alternatively, alternates between allowing an item specified in a play list to be decoded by decoder 701*l* and presented by speaker 701*k*.

However, in an alternative embodiment, customization is performed some of the time by control logic 701a, and some of the time, control logic 701a receives a schedule or play list and suitable substitute items specific to the user of BID 700. One of ordinary skill in the art would appreciate that the foregoing description of embodiments in which customization is only performed by a broadcast interactivity device, only performed by a server, or is performed by both, is an alternative embodiment of one or more of the embodiments of broadcast interactivity devices or customized media presentation devices described herein. A broadcast interactivity device as defined herein, depending upon the embodiment, either provides to another device an information identifier associated with an item of programming in order to have an action or service performed, accepts from a user at a user interface ranking activations of items of programming presented by the interactivity device or another device (e.g., receiver, but may be in an alternative embodiment a media player), or does both. A broadcast interactivity device also performs programming customization in an alternative embodiment. A media (or programming) customization device does not provide either form of interactivity, but does provide customization of programming. However, in an alternative embodiment, the customization of programming is not provided with a frequency multiplexer, but is provided in such a manner according to an alternative embodiment. In an alternative embodiment, the user is allowed to select whether customization of programming is to be provided via a frequency multiplexer or whether such customization is to be provided by control logic in the programming customization device simply alternating between the programming provided by a first source and the programming provided by a second source. Depending upon the embodiment, the first source is a receiver such as receiver 701h and the second source is a decoder such as decoder 701l. However, in an alternative embodiment both sources are decoders (such as decoder 701l) coupled to control logic 701a but only one of the decoders is instructed to obtain items from storage and decode them while the other decoder decodes a stream of items over which control logic 701a does not completely control the content of the stream or sequence of items.

One of ordinary skill in the art would appreciate that the foregoing alternative embodiment with two decoders is advantageously employed in a communications device that is coupled to a network such as network 26, 28 over which a stream of programming is received. One of ordinary skill in the art would appreciate that a decoder may be a single integrated circuit that can decode two streams separately or can be a general purpose microprocessor that can decode two streams using a software decoder. The communications device is computer 31 in an alternative embodiment. However, one of ordinary skill in the art would appreciate that other communications devices that are capable of being coupled to a wired or wireless network to receive a stream of programming. A programming customization device or broadcast interactivity device that receives a digital stream and produces another one is an alternative embodiment of a two decoder device that perform customization.

Where computer 31 is performing the customization, one of the streams may be a stream that arrives from an Internet based online radio station. The other intermittent stream that is used when an item in the online stream is unacceptable is produced locally at computer 31, whether by the control logic, microprocessor or a decoder integrated circuit.

In an alternative embodiment of BID 700, control logic 701a is coupled to decoders 701l, 701m. Depending upon the embodiment, decoder 701m is coupled to a digital receiver 701h or transceiver 701f. Where decoder 701m is coupled to digital receiver 701h, digital receiver 701h demodulates a digital bit stream containing programming and provides it via control logic 701a to decoder 701m for decoding and application to speaker 701k. One of ordinary skill in the art would appreciate that in an alternative embodiment, digital receiver 701h includes decoder 701m. Where transceiver 701f is coupled to decoder 701m, transceiver 701f provides a digital bit stream to decoder 701m for decoding and application to speaker 701k.

Irrespective of whether decoder 701m is included in receiver 701h or is a separate unit, control logic 701a controls whether speaker 701k presents, depending upon the embodiment, the output of decoder 701m, decoder 701l, neither decoder, an alternative source of programming, or both decoder 701m, 701l. Storage 701c stores a schedule or play list of the items of programming presented by decoder 701m at its output. Where a device includes more than one source whose output is to be customized, one of ordinary skill in the art would appreciate that for customization to be provided for all possible sources in a device control logic needs information, such as, including but not limited to schedules or play lists, regarding the items being presented and their timing. As indicated elsewhere herein, it does not matter to the present invention how scheduling information arrives at storage 701c so that control logic can use it for customization.

A mechanism for facilitating distribution of media items is described in greater detail herein. The description of the distribution mechanism is made in the context of an alternative embodiment of BID 700, but one of ordinary skill in the art would appreciate that the description is applicable as an alternative embodiment to any of the broadcast interactivity or media customization devices described herein.

As described above, items (e.g., including but not limited to information that satisfies an interactivity activation) are stored in storage 701c. It is irrelevant how the items arrive at storage 701c. Depending upon the embodiment, the items include, but are not limited to, one or more of the following: songs, videos, electronic books, games, software, and electronic media of any kind. At least some of the items that are held in storage 701c are digital rights management (DRM) protected content. DRM protected content is presented by control logic 701a on, depending upon the embodiment, user interface 701d, speaker 701k, or both, or headphones (not shown).

Depending upon the embodiment, DRM protected content arrives with a key and usage rights or without a key and usage rights. A key allows the content to be decrypted and presented on a particular device or device(s). Depending upon the embodiment, when a user indicates via user interface 701d that the user desires to purchase a particular item of DRM content, control logic 701a requests from control logic 36a of server 35 a license for the DRM content. The request includes the identity of the DRM content and optionally usage rights requested by the user. Control logic replies back with a license that includes a key that is encrypted using identifying information of BID 700. This may be the identification number of the central processing unit of control logic 701a, a serial number associated with the operating system, hard drive where storage 701c includes one, or memory card.

Alternatively, the DRM content arrives with a key that is already tied to BID 700. In such an embodiment, identifying information for BID 700 is stored in storage 29d and is used by control logic 36a to encrypt keys for DRM content sent to BID 700. Using a signature for server 35, control logic 36a uniquely identifies server 35 to BID 700. No other device that communicates with BID 700 can easily present itself to BID 700 as being server 35. Depending upon the embodiment, in return for receiving the DRM content, control logic 701a sends an electronic token from smartcard 701e or sends to control logic 36a a user identifier that allows control logic 36a to perform a payment transaction using user payment information 413j.

Each BID 700 also has a unique signature that identifies it to the server or another BID 700. In an alternative embodiment, control logic 701a of a BID 700 (hereafter referred to as 'the first BID 700') transfers an item of DRM content to another BID 700 (hereafter referred to as 'the second BID 700') via transceiver 701f. Depending upon the embodiment, control logic 701a of the first BID 700 only transfers the DRM content when the smartcard 701e of the second BID 700 has sufficient electronic tokens. In such an embodiment, control logic 701a of the first BID 700 receives an indication from the second BID 700 that there are sufficient electronic tokens in smartcard 701e of the second BID 700. In an alternative embodiment, control logic 701a of the second BID 700 does not request the DRM content unless there are sufficient tokens in smartcard 701e of the second BID 700. Depending upon the embodiment, control logic 701a of the second BID 700 makes the determination because it already has in its storage 701c an indication of the value of such DRM content or because it receives such indication from control logic 701a of the first BID 700. After successful transfer, control logic 701a of the second BID 700 debits smartcard 701e of the second BID 700 by the value of the transferred DRM content. In an alternative embodiment, control logic 701a of the second BID 700 debits smartcard 701e of the second BID 700 by an amount less than the value of the transferred DRM content. The difference between the value of the content and the amount debited is referred to herein as 'transfer credit.' The 'transfer credit' is a unit of information that is packaged along with the DRM content. An electronic token whose value is the 'transfer credit' is transferred by control logic 701a of the second BID 700 to control logic 701a of the first BID 700 for storage in smartcard 701e of the first BID 700.

In an alternative embodiment, control logic 701a of the first BID 700 receives an electronic token from control logic 701a of the second BID 700 after the DRM content is transferred successfully. Alternatively, control logic 701a of the first BID 700 receives an indication of successful transfer from control logic 701a of the second BID 700 after the DRM content is transferred successfully. Control logic 701a later sends the indication of successful transfer to control logic 36a that, depending upon the embodiment, either sends, via control logic 701a, an electronic token to smartcard 701e of the first BID 700, or credits an account associated with the user of the first BID 700. Depending upon the embodiment, the user may use the credits to purchase additional items instead of having to pay via tokens or some other means including but not limited to check transfer, credit card, or debit card. Alternatively, control logic 701a of the second BID 700 sends an indication of successful transfer to control logic 36a. Depending upon the embodiment, control logic 36a provides an electronic token to smartcard 701e of the first BID 700 or credits an account associated with the user of the first BID 700.

In an alternative embodiment, control logic 701a of the first BID 700 transfers the content even though there are insufficient electronic tokens, but the rights associated with the transferred content are limited by control logic 701a of the first BID 700. Limitations include one or more of, but are not limited to, the following: limits on number of presentations, time period within which the content can be used before purchase is required, quality (visual, aural, completeness, etc. . . . ) of content, ability to transfer further, etc. . . . . When control logic 701a of the second BID 700 makes to control logic 36a of server 35 the appropriate payment for the limited rights DRM content, control logic 701a receives indications of additional rights (e.g., including but not limited to longer play times, more numerous presentations, higher quality, ability to transfer, . . . ) that reflect that payment has been made. In an alternative embodiment, control logic 36a accepts payment for less than the value of the DRM content had the content been obtained from server 35. Furthermore, control logic 36a, depending upon the embodiment, either credits the account associated with the user of the first BID 700 or sends an electronic token to smartcard 701e of the first BID 700. In such an embodiment, control logic 701a of the second BID 700 sends to control logic 36a an indication of having received the limited rights DRM content from the user of the first BID 700. The indication is, but is not limited to being, the user identifier associated with the user of the first BID 700. The user identifier is received by control logic 701a of the second BID 700 along with the limited rights DRM content received from control logic 701a of the first BID 700.

In an alternative embodiment, broadcast interactivity and media customization devices described herein exchange items among each other. Depending upon the embodiment, the items may be DRM protected content, but need not be. The following description is made in terms of BID 700, but one of ordinary skill in the art would appreciate that the description is adaptable to other embodiments of broadcast interactivity devices, including but not limited to BID 11, 72, 800 and media player 33. Reference is made below to a first BID 700 and a second BID 700 exchanging information including items and performing acceptability or recommendation determination(s) (described below). One of ordinary skill in the art would appreciate that such transfer and recommendation, depending upon the embodiment, is effectuated by control logic 701a, storage 701c that stores the items or content, transceiver 701f, or a memory stick or a memory card that is coupled to control logic 701a. For ease of expression, the units of BID 700 that participate in the exchange and recommendation are not specified because the operations they perform have already been described in the context of other embodiments. Furthermore, one of ordinary skill in the art would appreciate that operations that are specific to the exchange would be performed by control logic 701a; such operations are described below.

FIG. 13f illustrates audiovisual material in the storage of a broadcast interactivity device according to an alternative embodiment of the present invention. Audiovisual material 720 of the first BID 700 and the second BID 700 include items or content that are exchanged between the first BID 700 and the second BID 700.

In an alternative embodiment, a first BID 700 is able to receive items from a second BID 700 after the first BID 700 has determined what items that are in audiovisual material 720 of the second BID 700 are not present in audiovisual material 720 of the first BID 700 (hereafter referred to as "potential items to request"). For the first BID 700 to be able to perform this determination it must receive from the second BID 700 the item indicators for the items that are stored in the audiovisual material 720 of the second BID 700. The potential items to request are a list of item indicators each of which is associated with an item in audiovisual material 720 of the second BID 700. After the first BID 700 makes the determination, the first BID 700 determines, for each item associated with an item indicator in the potential items to request, a predicted user rating. If, before it can determine a predicted user rating for a potential item, the first BID 700 needs the top item similarity coefficients for the potential item, BID 700 requests the second BID 700 to send the missing similarity coefficients to the first BID 700. Based upon the predicted user rating for each of the items associated with an item indicator in potential items to request, the first BID 700 send one or more item indicators to the second BID 700. In response to receiving the item indicators, the second BID 700 sends the associated items to the first BID 700. In an alternative embodiment, the first BID 700 only sends item indicators for items whose predicted rating exceeds a user threshold of the user using the first BID 700. In an alternative embodiment, the second BID 700 only sends samples of the items associated with item indicators it received from the first BID 700.

In an alternative embodiment, the second BID 700 sends the entire item associated with an item indicator received from the first BID 700, but the item includes digital rights management information. The first BID 700 presents the item based upon the limitations imposed by the digital rights management information. In an alternative embodiment, the first BID 700 sends a lower quality version of the item, to the second BID 700.

FIG. 13*k* illustrates a process by which a broadcast interactivity device requests items from another broadcast interactivity device according to an alternative embodiment of the present invention. In process 820, the first BID 700 receives 821*a* item indicators representative of items stored in the storage of the first BID 700. The first BID 700 then determines 821*b* based upon past item user rankings stored in the first BID 700 predicted user rankings for the items that are stored in the second BID 700 are as associated with the item rankings received from it. The first BID 700 then determines 821*c* what items to request based upon the predicted user rankings.

One of ordinary skill in the art would appreciate that wherever 'song' is used herein the term 'musical composition' may also be used and that embodiments of the present invention are not limited to any particular type of musical composition or type of programming.

In an alternative embodiment, BID 700 includes a digital broadcast receiver 701*h* that receives digital programming. The digital programming arrives in the form of a sequence of frames such as that shown in FIG. 13*d*.

In an alternative embodiment, the frames are audio frames that include audio samples. In an alternative embodiment the frames are video frames that include audio samples. However, one of ordinary skill in the art would appreciate that embodiments of the present invention are not limited to any particular type of material.

Where receiver 701*h* receives audio frames including audio samples, the audio samples are extracted from the frame and decoded by decoder 701*l* and presented by speaker 701*k*. Some of the audio frames include audio samples 705*l* that are not corrupted with extraneous signals, but other audio frames include audio samples 705*l* that are corrupted with extraneous signals. Examples of extraneous signals include, but are not limited to, the commentary of a disc jockey that is intermixed with the audio of an item of programming or radio interference or fading that adversely affects the item. In an embodiment, the item is a musical composition that is being broadcast to many receivers for simultaneous real-time reception.

However, many of the audio frames arrive at receiver 701*h* without audio samples 705*i* so suffering adversely that the listener notices undesirable sounds or the lack of sound. Control logic 701*a* stores for each item of programming received by receiver 701*h* the audio samples of each frame that is demodulated by receiver 701*h*, decoded by decoder 701*l* and presented by speaker 701*k*. In an alternative embodiment, does not include a broadcast receiver 701*h*, but rather control logic 701*a* receives, depending upon the embodiment, decoded or compressed audio samples via a digital input/output interface (not shown) coupled to control logic 701*a*. The audio samples are decoded, where such embodiment requires decoding, and turned into an analog signal for application to speaker 701*k*. In an alternative embodiment, speaker 701*k* and any speaker described herein is a digital speaker that is capable of receiving a digital audio signal and generating sound based upon the digital signal, making it unnecessary to convert the decoded samples into an analog signal.

In an alternative embodiment, control logic 701*a* does not store the audio samples of the frames of every item of programming received by receiver 701*h*. Rather, as described in greater detail below, depending upon a storage indication in the audio frame, control logic 701*a* either stores or ignores the audio samples for a received item.

Where the item being received is one that the user of BID 700 may want to purchase or access later after the broadcast is over, having most of the audio samples already stored allows for efficient distribution of items. In many cases enough of the audio samples arrive without suffering adversely that it becomes unnecessary for control logic 701*a* to request the entire item from server 35, in the event the user indicates an interest in the item. Rather control logic 701*a* only requests from server 35 those frames that have corrupted audio samples. Depending upon the embodiment, control logic 701*a* requests the frames from server 35 via transceiver 701*f* or alternatively via a physical storage media on which control logic 701*a* stores requests. Another device to which the storage media is coupled sends the requests to server 35 and receives in return the requested frames for storage on the same (i.e., the one in which the requests were stored) or different storage media. When the storage media with the requested frames is coupled to control logic 701*a*, control logic 701*a* retrieves the requested frames from the storage media and uses them as described elsewhere herein. In an alternative embodiment, control logic 701*a* obtains substitute frames from storage 701*c* without having to explicitly request them from another device such as server 35.

Depending upon the embodiment, the item of programming is identifiable by information in header 705*h*, XPAD 705*j*, or both. The audio frames of an item of programming are numbered sequentially in header 705*h* and include cyclic redundancy check (CRC) bits 705*p*, 705*q*. CRC bits 705*p*, 705*q* allow control logic 701*a* to identify which audio frames have been so corrupted as to require replacement with audio frames from server 35, or alternatively, storage 701*c*. In an alternative embodiment, instead of a CRC scheme, other error detection and correction schemes are used.

FIG. 13*g* illustrates a data structure for received digital audio samples according to an alternative embodiment of the present invention. Received samples data structure 810 includes item name field 811*a*, number of frames field 811*b*, good frames field 811*c*, bad frames field 811*d*, and good frame field 811*e*. As the digital audio broadcast frames are received for each item of programming, control logic 701*a* creates a record with entries for some or all fields 811*a*-811*e*. Depending upon the embodiment, not all items of programming have records created for them in DS 810. In an alternative embodiment, a storage indicator is included in header 705*h* or XPAD 705*j* that indicates to control logic 701*a* whether a record is to be created and whether audio samples are to be stored, or the former but not the latter. Entries for record 811g are associated with a radio show hosted by a Dr. Dean Edell.

An entry for item name field 811a is obtained from XPAD 705j. An entry for item name field 811a indicates the name of the item of programming. An entry for total number of frames field 811b indicates the number of frames that make up the complete item identified in an entry in item name field 811a.

In an alternative embodiment, DS 810 includes a field that has item identifier entries such as those described elsewhere herein. An entry for an item identifier field indicates a code or label by which the item is identified in storage 701c or at a server such as server 35. An entry for good frames field 81k indicates the frames that were received without errors that would be unacceptable to a listener or viewer. An entry for bad frames 811d indicates the frames that were received with significant errors. Depending upon the embodiment, control logic 701a substitutes bad frames (i.e., audio samples) with good ones, or provides the entries for good frames 811c and bad frames 811d to another device to perform this substitution and composition of a relatively uncorrupted (i.e., acceptable to the typical listener, viewer, purchaser, etc. . . . ) copy of the item. Depending upon the embodiment, where control logic 701a performs the substitution and composes a proper copy of an item using substituted audio frames, control logic 701a either requests substitutes for the bad frames identified in the entry for field 811d from server 35, or obtains substitutes for them from storage 701c. Good frames entry 811f of FIG. 13g holds the frame numbers of audio frames that were received and that had acceptable audio samples.

FIG. 13h illustrates in greater detail an entry in a data structure that holds indications of received frames with acceptable samples according to an alternative embodiment of the present invention. Entry 811f of FIG. 13h is a truncated entry with just some of the frames that arrived for the item—"Honky Cat"—identified by item entry 811h. Entry 811f indicates that frame 93, 94, 95, and frame p, among other frames, arrived with acceptable audio samples.

An entry for valid audio sample frames field 811e, includes, for each good frame the audio samples grouped together to facilitate the insertion of substitute audio samples for bad frames that were received. What constitutes a good frame or a bad frame depends upon the type of programming (audio, video, text, etc. . . . ), is implementation dependent, known in the art and need not be described in greater detail herein because it is not a limitation of embodiments of the present invention. Typically, the subjective opinion of users is used to determine a certain bit error rate or other measure below which quality is deemed acceptable. However, errors in scale factors for a frame generally mean that the samples of that frame are likely to have an effect on the presentation of the item so as to appear undesirable to the listener or viewer. Examples of undesirable effects include but are not limited to dead spots (i.e., no sound), skipping, popping or screeching sounds, smearing, jitter, etc. . . . . Errors in a few audio samples may not cause a perceptible undesirable effect, but that is a design judgment by which embodiments of the invention are not limited.

Depending upon the embodiment, storage 701c stores a beginning portion and an ending portion of some or, alternatively, all the items of programming that are broadcast by a broadcaster. The embodiments of the present invention are not limited by the mechanism by which the beginning fragment and ending fragment of items of programming arrive at storage 701c. Common mechanisms for transfer include transceiver 701f, receiver 701h, and removable storage media that are coupled to control logic 701a. In an alternative embodiment, receiver 701h receives both a data channel bearing the fragments as well a programming channel.

FIG. 13i illustrates a data structure that stores fragments of items of broadcast programming according to an alternative embodiment of the present invention. Fragment data structure 812 includes item name field 813a, beginning fragment field 813b, and ending fragment field 813c. As explained in connection with DS 810, an item identifier field may also be included in an alternative embodiment of DS 812. An entry for an item identifier field indicates a code or label by which the item is identified in storage 70k or at a server such as server 35. Depending upon the embodiment, DS 812 includes entries for both fields 813a and an item identifier field, or just one of the fields. The field included and its contents are irrelevant so long DS 812 allows the beginning and ending fragments for an incomplete item in DS 810 to be identified and accessed by control logic 701a.

An entry for item name field 813a indicates the name of the item of programming. Beginning fragment entry 813e of FIG. 13i holds the first z audio frames that for the item—"Honky Cat"—identified by item name entry 813f, where z is an integer that is implementation dependent. Embodiments of the present invention are not limited to a particular value of z.

FIG. 13j illustrates in greater detail an entry in a data structure that holds frames that represent a fragment of an item according to an alternative embodiment of the present invention. Entry 813e of FIG. 13j includes the first 1000 audio sample frames of the item—"Honky Cat"—identified by item entry 813f. Control logic 701a retrieves as necessary the audio samples of frames F1-F1000 from storage 701c for use by control logic to substitute for frames F1-F92, and for other bad frames above F95 and below frame 1000.

Depending upon the embodiment, the duration in time of the beginning portion and ending portion either depends on the type of programming (e.g., song, video, etc. . . . ) or does not. There is no fixed value for the duration, and the value need not be the same for both portions. However, in an alternative embodiment, the duration in time for beginning and ending value is the same, and is equal to 15 seconds. In an alternative embodiment most of the songs broadcast by a station have fragments stored in storage 701c. Where a station broadcasts about 3000 unique songs each of which is about 4 minutes in length, 30 seconds of substitute frames per song amounts to about 250 songs worth of data to be stored in storage 701c. Depending upon the embodiment, some or all of the songs broadcast by a station have fragments stored in storage 701c in anticipation of the songs being broadcast. Depending upon the embodiment, the fragments arrive via transceiver 701f, receiver 701h, or physical storage media coupled to control logic 701a.

Depending upon the embodiment, receiver 701h and control logic 701a cooperate to store received items in storage 701c. The embodiments of the present invention are not limited to a particular type of item. However, parts of the description below are made in the context of receiver 701h receiving audio frames for a song. Each audio frame includes fields that identify the song by a song label or item indicator and its number in the sequence of audio frames that make up the item. When an item is being received for the first time control logic 701a creates a record for the item in DS 810 in storage 701c and stores in field 811e the acceptable audio frames received from receiver 701h and that are associated with the item. Control logic 701a stores in the record's entry for good frames field 811c the frame numbers that were acceptable and stores in the record's entry for bad frames field 811d the frame numbers that were unacceptable. In an alternative embodiment, control logic 701a stores both acceptable and unacceptable audio frames in field 811*e* and DS 810 does not includes fields 811*c*, 811*d*. However, in an alternative embodiment, control logic 701*a* stores both acceptable and unacceptable audio frames in field 811*e* and stores frames numbers in entries to fields 811*c*, 811*d*.

In an alternative embodiment, when the audio frames for the same song are received later by receiver 701*h* from the same or, alternatively, another station, control logic 701*a* replaces low quality frames (too many errors that make the song audio unacceptable to listeners) that were received earlier with higher quality frames that are received later. In an alternative embodiment, control logic 701*a* does not store low quality frames in DS 810, but maintains in bad frames field 811*d* the frame numbers of low quality frames. Alternatively, where control logic 701*a* rejects low quality frames when they are received for the first time without storing them in DS 180, control logic 701*a* adds to field 811*e* good quality frames to fill in the missing frames due to earlier rejection. In an alternative embodiment, control logic 701*a* also adds the frame numbers of the newly added frames to the item's record's entry for field 811*c*.

Depending upon the embodiment, all, none, or some of the stored frames are subject to digital rights management controls. Depending upon the embodiment, digital rights management usage rights and keys associated with received items are included in an audio frame field such as XPAD 705*j*, a separate data channel received by receiver 701*h*, information received via transceiver 701*f*, or physical media coupled to control logic 701*a*. In such an alternative embodiment, DS 180 includes a digital rights management field (not shown). Control logic 701*a* stores the digital rights management information for an item in the item's corresponding record's DRM field entry in DS 180. At least some of the records in DS 180 have an entry in the digital rights management field indicating the controls to which the audio frames in the record are subject. One of ordinary skill in the art that the frames of an item in an alternative embodiment have different DRM rights including unlimited rights relative to other frames in the item's record entry in DS 180.

When the user indicates via user interface 701*d* that the user desires to have a complete uncorrupted version of a stored item in DS 180, control logic 701*a* makes an uncorrupted version available to the user by placing a presentable version of the stored item in storage 701*c*. In an alternative embodiment in which DRM controls are enforced by control logic 701*a*, the stored item includes a DRM key and usage rights and presentation of the item is made by decrypting using the key and subject to the usage rights.

Depending upon the embodiment, control logic 701*a* either creates an uncorrupted version of a stored item in DS 180 in anticipation of the user requesting the item or, alternatively, creates one after the user requests that one be composed. Irrespective of when an uncorrupted version of a stored item is composed, control logic 701*a*, depending upon the embodiment, obtains substitute or fill-in frames from server 35 or from storage 701*c*.

In an alternative embodiment, BID 72 keeps track of channels tuned by receiver 73*b*. In such an embodiment, control logic 73*h* accepts indications of activations from user interface 73*i* that indicate the channel to which control logic 73*h* is to tune receiver 73*b*. Receiver 73*b* provides at its output to transmitter 73*d* the programming being received on the tuned channel. Depending upon the embodiment, the output of receiver 73*b* is coupled to the input of transmitter 73*d* via switch 73*c*, or without switch 73*c* being an intermediate unit. One of ordinary skill in the art would appreciate that in an alternative embodiment, switch 73*c*, codec 73*g*, or both are not included. Depending upon the embodiment, control logic 73*h* includes temporary storage or memory or, alternatively, is coupled to such storage or memory, or to storage 73*f*. When control logic 73*h* receives from user interface 73*i* an indication indicative of the channel that is to be tuned by receiver 73*b*, control logic 73*h*, depending upon the embodiment, stores a representation of the channel to which receiver 73*b* is tuned in memory included in control logic 73*h*, storage 73*f*, or other fixed or, alternatively, removable memory coupled to control logic 73*h*. Control logic 73*h* also stores a representation of the time at which receiver 73*b* is made to tune the channel. Depending upon the embodiment, when the user turns off BID 72, changes channels, or changes programming source applied to transmitter 73*d* (e.g., depending upon the embodiment, including but not limited to one of the following: to a tape, compact disc, or codec 73*g*), control logic 73*h* stores a representation of the time at which the channel is no longer tuned by receiver 73*b*. Depending upon the embodiment, the channel tracking information stored in memory or temporary storage is communicated or transferred to server 35 via transceiver 73*j*, removable memory, or a paper printout to a printer coupled to control logic 73*h*. The printout is mailed to a service facility that has personnel that enter the information in the printout into a data base in storage 29*b*, 29*d* for access by server 35. As with all transfers described herein, the transfer is initiated, depending upon the embodiment, 1) according to a predefined schedule stored in memory in control logic 73*h* or, alternatively, storage 73*f*, 2) when control logic 73*h* accepts an indication of a user activation at interface 73*i* indicative that a transfer is to be made, 3) whenever a broadcast interactivity device, including BID 72, is coupled to server 35, 4) or whenever removable memory is coupled to control logic 73*b*. Depending upon the embodiment, control logic 73*h* also provides a user identifier to server 35, or removable memory or includes such information in the printout information.

FIG. 13*l* illustrates a data structure for channel tracking information according to an alternative embodiment of the present invention. Channel tracking data structure 730, depending upon the embodiment, is located in one or more of the following: memory space included in control logic 73*h*, memory space accessible to control logic 73*h*, or separately in storage 73*f*. Entries in data structure 730 are made by control logic 73*h* as a consequence of the user making changes to the channel tuned by receiver 73*b*. Data structure 730 includes channel field 731*a*, starting time field 731*b*, and ending time field 731*c*. Four records are shown in DS 730 of which record 731*d* is highlighted by dashed lines. The embodiments of the present invention are not limited to DS 730 including a certain number of records. One of ordinary skill in the art would appreciate that the number of records permitted to DS 730 is implementation dependent. Record 731*d* includes "97.3" as the entry for channel field 731*a*, "Jan. 1, 2003 10:42:05" as the entry for starting time field 731*b*, "Jan. 1, 2003 10:43:01" as the entry for ending time field 731*c*. The entries for record 731*d* indicate that at Jan. 1, 2003 10:42:05 AM receiver 73*b* was tuned to 97.3 MHz, and that at Jan. 1, 2003 10:42:05 AM receiver 73*b* stopped being tuned to 97.3 MHz.

Server 35 accepts a data structure 730 from each of multiple BID 72 devices. Control logic 36*a* also has access to user information such as that described in connection with information 413*c* for the users of each of the multiple BID 72. Depending upon the embodiment, all the fields in information 413*c* are maintained, but one of ordinary skill in the art would appreciate that, depending upon the embodiment, one or more of the following items may be omitted: device number 413*e*, payment information 413*i*, past transaction 413*m*, pending transactions 413n, alert information 413o. Depending upon the embodiment, control logic 36a accesses the user information for a particular user based upon a user identifier received along with the channel tracking information compiled for a particular user, or via an AIN number or other technique that allows server 35 to associate that channel tracking information with a particular user. The terms 'user' and 'listener' are, depending upon the context, used interchangeably herein.

Control logic 36a uses the profile information to determine the type of listeners a particular station attracts. Depending upon the embodiment, control logic 36a determines many valuable statistics including the number of users who listen to a particular station, the length time users listen during certain periods of the day, and the type of listeners that a particular station attracts. Depending upon the embodiment and where control logic 36a has access to the schedule of each station for which statistics are produced, control logic 36a also determines what items of programming cause users to change channels, what (i.e., item on another station, or item from another source of programming such as tape, compact disc, digital media file in storage 73f, etc. . . . ) finally captures their attention, or both. For example, where a user listens x or more seconds to a first channel and then settles on a second channel without passing through any intermediate channels or passes through one or more channels, without resting for longer than y seconds on any one of them, before settling on the second channel, the item broadcast by the first channel and the item broadcast second channel are used to determine what turns off listeners on the first channel and what attracts them when they do decide to change channels (i.e., stations). To determine what items are being broadcast on the first and second channels, control logic 36a indexes into the station's respective schedule stored in storage 29b, 29d based upon the entry in starting time field 731b of the appropriate records (i.e., record associated with the first channel and the record associated with the second channel).

The user is considered by control logic 36a to have settled on the second channel when the user stays for longer than z seconds on the second channel. One of ordinary skill in the art would appreciate that the embodiments of the present invention are not limited to any particular value of x, y, and z. However, in an embodiment, x and z have a value between 90-120 seconds and y has a value between 15-30 seconds.

In the preceding specification, the invention has been described with reference to specific exemplary embodiments of the invention. It will, however, be evident to one of ordinary skill in the art that various modifications and changes may be made without departing from the broader spirit and scope of the invention as set forth in the claims that follow. The specification and drawings are accordingly to be regarded in an illustrative rather than restrictive sense.

What is claimed is:

1. A method for automatically substituting programming with alternative programming, comprising:
receiving information indicating a first item of programming for playback at a radio;
automatically determining whether the first item of programming is acceptable, wherein said automatically determining does not receive user input directly specifying whether the first item of programming is acceptable; and
in response to determining that the first item of programming is not acceptable, providing playback of alternative programming on the radio instead of the first item of programming.

2. The method of claim 1, wherein said providing playback of the alternative programming is provided from a digital media source in communication with the radio.

3. The method of claim 1, wherein the first item of programming is received for immediate playback.

4. The method of claim 1, wherein said automatically determining is performed using programming acceptability information of a current user.

5. The method of claim 1, wherein the alternative programming meets minimum time spacing constraints, wherein the minimum time spacing constraints are used to prevent items recently heard from being heard again in a certain period of time.

6. The method of claim 1, wherein the alternative programming has a length of time that is close to the length of time of the first item of programming.

7. The method of claim 1, wherein the first item of programming comprises an advertisement.

8. The method of claim 1, wherein the alternative programming comprises one or more songs.

9. A non-transitory memory medium storing program instructions for automatically substituting programming with alternative programming, wherein the program instructions are executable to:
receive information indicating a first item of programming for playback;
automatically determine whether the first item of programming is acceptable, wherein said automatically determining does not receive user input directly specifying whether the first item of programming is acceptable; and
in response to determining that the first item of programming is not acceptable, provide playback of alternative programming instead of the first item of programming.

10. The non-transitory memory medium of claim 9, wherein said providing playback of the alternative programming is provided from a digital media source.

11. The non-transitory memory medium of claim 9, wherein the first item of programming is received for immediate playback.

12. The non-transitory memory medium of claim 9, wherein said automatically determining is performed using programming acceptability information of a current user.

13. The non-transitory memory medium of claim 9, wherein the alternative programming has a length of time that is close to the length of time of the first item of programming.

14. A system, comprising:
a radio frequency (RF) antenna configured to receive radio signals from radio stations;
a memory;
an input for receiving user input to control operation of the radio;
an output for providing audio signals to one or more speakers; and
processing logic coupled to the RF antenna, the memory, the input, and the output, wherein the processing logic is configured to:
receive information indicating a first item of programming for playback;
automatically determine whether the first item of programming is acceptable, wherein said automatically determining does not receive user input directly specifying whether the first item of programming is acceptable; and
in response to determining that the first item of programming is not acceptable and that the memory has stored therein one or more audio files, process a first audio file of the one or more audio files to provide audio file audio signals to the output, wherein the audio file audio signals correspond to an alternative item of programming.

15. The system of claim 14, wherein the first item of programming is received for immediate playback via the RF antenna after said receiving the information.

16. The system of claim 14, wherein said automatically determining is performed using programming acceptability information of a current user, wherein the acceptability information is stored in the memory.

17. The system of claim 14, wherein the alternative programming has a length of time that is close to the length of time of the first item of programming.

18. The system of claim 14, wherein the first item of programming comprises an advertisement.

19. The system of claim 14, wherein the alternative programming comprises one or more songs.

* * * * *

UNITED STATES PATENT AND TRADEMARK OFFICE
CERTIFICATE OF CORRECTION

PATENT NO.        : 8,290,425 B2                                     Page 1 of 3
APPLICATION NO.   : 12/605987
DATED             : October 16, 2012
INVENTOR(S)       : Albrett It is certified that error appears in the above-identified patent and that said Letters Patent is hereby corrected as shown below:

On the Title Page, in Item (57), under "ABSTRACT", in Column 2, Line 3, delete "nedia" and insert -- media --, therefor.

On the Title Page, in Item (57), under "ABSTRACT", in Column 2, Line 7, delete "storage an" and insert -- storage of an --, therefor.

In the Specification:

In Column 7, Line 24, delete "invention." and insert - - invention; - -, therefor.

In Column 9, Line 55, delete "Skies"" and insert - - Skies". - -, therefor.

In Column 20, Line 38, delete "446" and insert - - 146 - -, therefor.

In Column 27, Line 50, delete "73 MHz Lower" and insert - - 73 MHz and - -, therefor.

In Column 28, Line 42, delete "$F_{peak}$" and insert - - $F_{peak}$, - -, therefor.

In Column 29, Line 21, delete "$P_{Lower\_Bin}$)" and insert - - $P_{Lower\_Bin}$), - -, therefor.

In Column 29, Line 22, delete "$a_0= 1.7488$." and insert - - $a_0= -1.7488$. - -, therefor.

In Column 29, Line 27, delete "$P_{Upper\_Bin}/P_{Upper\_Bin}$," and insert - - $P_{Upper\_Bin}/P_{Lower\_Bin}$, - -, therefor.

In Column 31, Lines 20-21, delete "$P_{Upper\_Bin}+P_{Upper\_Bin}$)," and insert - - $P_{Upper\_Bin}/P_{Lower\_Bin}(P_{Upper\_Bin})$, - -, therefor.

In Column 44, Line 41, delete "DS 52 a re" and insert - - DS 52 are - -, therefor.

Signed and Sealed this
Seventeenth Day of September, 2013

Teresa Stanek Rea
*Deputy Director of the United States Patent and Trademark Office*

CERTIFICATE OF CORRECTION (continued)
U.S. Pat. No. 8,290,425 B2

In Column 47, Line 13, delete "indications, of" and insert -- indications of --, therefor.

In Column 48, Line 63, delete "logic 736" and insert -- logic 73h --, therefor.

In Column 49, Line 28, delete "transmit, a" and insert -- transmit a --, therefor.

In Column 50, Line 34, delete "Conventional" and insert -- conventional --, therefor.

In Column 51, Line 17, delete "logic 736" and insert -- logic 73h --, therefor.

In Column 62, Line 66, delete "FIG. 81" and insert -- FIG. 8l --, therefor.

In Column 65, Line 27, delete "FIG. 80." and insert -- FIG. 8o. --, therefor.

In Column 81, Line 57, delete "FIG. 90" and insert -- FIG. 9o --, therefor.

In Column 82, Line 21, delete "afield" and insert -- a field --, therefor.

In Column 82, Line 48, delete "item 1," and insert -- item i, --, therefor.

In Column 85, Line 43, delete "$r_{o,j}$" and insert -- $r_{a,i}$ --, therefor.

In Column 96, Line 67, delete "(i:e.," and insert -- (i.e., --, therefor.

In Column 99, Line 4, delete "by'embodiment," and insert -- by embodiment, --, therefor.

In Column 99, Line 63, delete "embodiment;" and insert -- embodiment, --, therefor.

In Column 101, Line 62, delete "831e:" and insert -- 831e. --, therefor.

In Column 104, Line 26, delete "non-acceptance" and
insert -- non-acceptance. --, therefor.

In Column 111, Line 49, delete "$W_{u,10,q1}$," and insert -- $W_{u,19,q1}$, --, therefor.

In Column 111, Line 65, delete "determine $W_{u,GC,qv}$" and
insert -- determine $W_{u,GC,qv}$, --, therefor.

In Column 116, Line 40, delete "know" and insert -- known --, therefor.

In Column 127, Line 1, delete "a" and insert -- α --, therefor.

In Column 132, Line 2, delete "CU 8011," and insert -- CU 801f, --, therefor.

In Column 133, Lines 43-44, delete "Internet" and insert -- internet --, therefor.

In Column 141, Line 27, delete "an service" and insert -- a service --, therefor.

CERTIFICATE OF CORRECTION (continued)
U.S. Pat. No. 8,290,425 B2

In Column 148, Line 31, delete "two" and insert -- two. --, therefor.

In Column 151, Line 38, delete "information," and insert -- information --, therefor.

In Column 154, Line 23, delete "that is," and insert -- that is --, therefor.

In Column 158, Line 34, delete "(e,g.," and insert -- (e.g., --, therefor.

In Column 163, Line 13, delete "81k" and insert -- 811c --, therefor.

In Column 164, Line 11, delete "70k" and insert -- 701c --, therefor.

In Column 166, Line 33, delete "73b." and insert -- 73h. --, therefor.